United States Patent
Shoham et al.

(10) Patent No.: US 12,527,896 B2
(45) Date of Patent: Jan. 20, 2026

(54) MEDICAL FLUID DELIVERY DEVICES AND METHODS

(71) Applicant: Unit Medical Devices LTD, Sderot (IL)

(72) Inventors: Oriya Shoham, Yakir (IL); Amir Rasowsky, Yakir (IL); Moshe Shoham, Hoshaya (IL); Igal Rasin, Haifa (IL)

(73) Assignee: Unit Medical Devices LTD, Sderot (IL)

( * ) Notice: Subject to any disclaimer, the term of this patent is extended or adjusted under 35 U.S.C. 154(b) by 0 days.

(21) Appl. No.: 19/177,457

(22) Filed: Apr. 11, 2025

(65) Prior Publication Data

US 2025/0325734 A1 Oct. 23, 2025

Related U.S. Application Data

(60) Provisional application No. 63/633,092, filed on Apr. 12, 2024.

(51) Int. Cl.
*A61M 1/02* (2006.01)
*A61F 7/00* (2006.01)

(52) U.S. Cl.
CPC .............. *A61M 1/02* (2013.01); *A61F 7/007* (2013.01); *A61F 2007/0093* (2013.01);
(Continued)

(58) Field of Classification Search
CPC .................. A61M 1/02; A61M 1/0259; A61M 2202/0007; A61M 2202/0413;
(Continued)

(56) References Cited

U.S. PATENT DOCUMENTS

| | | | | |
|---|---|---|---|---|
| 4,857,042 A | * | 8/1989 | Schneider | A61M 1/602 600/580 |
| 6,582,386 B2 | * | 6/2003 | Min | A61M 1/3692 604/6.11 |

(Continued)

OTHER PUBLICATIONS

Sahar Avazzadeh, Establishing electroporation thresholds for targeted cell specific cardiac ablation in a 2D culture model, Journal, May 24, 2022, pp. 2050-2061.
(Continued)

*Primary Examiner* — Philip R Wiest
(74) *Attorney, Agent, or Firm* — Greenberg Traurig, LLP

(57) ABSTRACT

A method including coupling a disposable device to a reusable device, wherein the disposable device includes: a heating segment including a fluid conduit including an inlet and an outlet, a first dielectric window at an upstream location, and a second dielectric window at a downstream location, wherein the reusable device includes: a receptacle configured to receive the disposable device, a first electrode positioned to be aligned with the first dielectric window, and a second electrode positioned to be aligned with the second dielectric window; supplying blood to the inlet to pass the blood through the fluid conduit; and activating the reusable device to cause the reusable device to apply an RF current between the first electrode and second electrodes, whereby the RF current is conducted into the fluid conduit through the first and second dielectric windows, thereby being conducted through the blood in the fluid conduit to heat the blood.

15 Claims, 138 Drawing Sheets

(52) U.S. Cl.
CPC .............. *A61M 2202/0007* (2013.01); *A61M 2202/0413* (2013.01); *A61M 2205/0233* (2013.01); *A61M 2205/0238* (2013.01); *A61M 2205/3327* (2013.01); *A61M 2205/3368* (2013.01); *A61M 2205/368* (2013.01)

(58) Field of Classification Search
CPC .. A61M 2205/0233; A61M 2205/0238; A61M 2205/3327; A61M 2205/3368; A61M 2205/368; A61F 7/007; A61F 2007/0093; G16H 40/63
See application file for complete search history.

(56) References Cited

U.S. PATENT DOCUMENTS

| | | | |
|---|---|---|---|
| 10,064,985 B2* | 9/2018 | Gerber | A61M 1/3607 |
| 10,082,338 B2 | 9/2018 | Pain et al. | |
| 11,654,221 B2* | 5/2023 | Kelly | A61M 1/3646 604/10 |
| 11,758,621 B2* | 9/2023 | Dietschi | H05B 1/0297 392/314 |
| 11,872,382 B2* | 1/2024 | Landy, III | A61M 5/445 |
| 2002/0092363 A1* | 7/2002 | Jorgenson | G01F 1/7082 73/861.95 |
| 2004/0149711 A1* | 8/2004 | Wyatt | A61F 7/007 219/217 |
| 2021/0153302 A1 | 5/2021 | Wieckowski et al. | |
| 2022/0304847 A1* | 9/2022 | Kuroda | A61F 7/08 |

OTHER PUBLICATIONS

Donald C Chang, Electroporation and Electrofusion, Encyclopedia, 2004, pp. 1-23.
Donald C Chang, Electroporation and Electrofusion, Encyclopedia, 2006, pp. 135-157.
R. L. Hesslink, Radio frequency (13.56 MHz) energy enhances recovery from mild hypothermia, Journal, 1989, pp. 1208-1212.
K.V. Iserson, Blood warming: current applications and techniques, Journal, 1991, pp. 558-571, vol. 31, No. 6.
J.W. Kaufman, Comparative effectiveness of hypothermia rewarming techniques: radio frequency energy vs. warm water, Journal, 1995, pp. 203-214.
Thomas G. Poder, Blood Warming and Hemolysis: A Systematic ReviewWith Meta-Analysis, Journal, 2015, pp. 1-9.
Ian Rogers, Which rewarming therapy in hypothermia? A review of the randomised trials, Journal, 1997, pp. 213-220, vol. 9.

* cited by examiner

1700 use environments

- 1702 battlefield
- 1704 point of injury
- 1706 ambulance
- 1708 airplane
- 1710 helicopter
- 1712 ship
- 1714 field hospital

1716 hospital

- 1718 blood bank
- 1720 trauma bay
- 1722 hallway
- 1724 emergency room
- 1726 imaging suite
- 1728 nurse station
- 1730 operating room
- 1732 oncology suite
- 1734 patient room
- 1736 patient bed

| 5800 | | | | 106 | 108 | 118 | 5104 |
|---|---|---|---|---|---|---|---|
| 2104 | 1114 | 104 | 5802 | 5804 | 5806 | 5808 | |
| 5810 | 5812 | 1020 | 108 | 148 | | | |

| 6300 | | | 3260 | 142 | 1100 | 1060 |
|------|------|-----|------|-----|------|------|
| 3230 | 3220 | 690 | 2104 | 148 | 690  | 2710 |

| 6800 | | | | 6802 | 6804 | 1100 | 6806 |
|---|---|---|---|---|---|---|---|
| 6808 | 2104 | 6810 | 6812 | 6814 | 6816 | | 4622 |
| 6818 | 2160 | 6820 | 6822 | 6824 | 1100 | | 4622 |

| 3200 | | | | | | |
|---|---|---|---|---|---|---|
| | | | 134 | 7402 | 7404 | 7406 |
| 7408 | 7410 | 7412 | 7414 | 7416 | 7418 | 306 |
| 7420 | 7422 | 7424 | 4622 | 2160 | 7426 | 7428 |
| 7430 | 144 | 7432 | 7446 | 304 | 7442 | 7444 |
| 7448 | 7450 | 7452 | 1600 | 2108 | 7454 | 7456 |
| 7458 | 7460 | 2102 | 7490 | 2182 | 2184 | 2150 |
| 2115 | 2110 | 2112 | 2116 | 2120 | 2117 | 2160 |
| 2132 | 2172 | 2170 | 2106 | 2162 | 2174 | 2180 |

FIG. 74

| 7490 | | | | | | |
|---|---|---|---|---|---|---|
| | | | 2104 | 7502 | 2174 | 7524 |
| 2180 | 7526 | 7446 | 7538 | 7540 | 7564 | 7506 |
| 7512 | 7534 | 7536 | 6016 | 7558 | 7542 | 2160 |
| 7514 | 7528 | 7530 | 7566 | 7568 | 7532 | 7508 |
| 7516 | 2120 | 2112 | 2110 | 7544 | 7546 | |
| 7518 | 7520 | 7522 | 7552 | 7554 | 2108 | |

MEDICAL FLUID DELIVERY DEVICES AND METHODS

CROSS-REFERENCE

This is a Section 111(a) application related to and claiming the benefit of U.S. Provisional Patent Application No. 63/633,092, filed on Apr. 12, 2024, and entitled "MEDICAL FLUID DELIVERY DEVICES," the contents of which are incorporated herein by reference in their entirety.

FIELD

Some embodiments of the invention relate generally to medical fluid delivery devices and methods.

BACKGROUND

Medical fluids, such as blood, are typically stored at refrigerated temperatures. In some situations, it is desirable to heat a medical fluid to a higher temperature, such as human body temperature, before delivery to a patient. Such medical fluids should be free of mixed-in gases in order to be delivered safely.

SUMMARY

Some embodiments of the present disclosure relate to a medical fluid delivery device with an anti-backflow mechanism. A set of embodiments is summarized as follows:

Currently, there are a number of solutions for medical fluid delivery. Some of these solutions attempt to prevent backflow, but in some cases these solutions fail to meet the needs of the industry because hydrophobic membranes clog upon contact with blood, there are height difference limitations, there is minimum activation pressure, there is cavitation due to flow resistance, there is significant pressure required to prime, backpriming for unused line is needed, large molecules can be damaged, red blood cells can undergo extensive hemolysis.

It would be desirable to have a device and an associated method that can prevent fluid from an upstream conduit escaping via another upstream conduit which communicates with the first upstream conduit via a junction even if none of conduits are manually occluded or clamped. Furthermore, it would also be desirable to have a device and an associated method that prevents fluid from one upstream conduit from flowing backwards up a communicating upstream conduit. Still further, it would be desirable to have a device and an associated method that will allow fluid to escape if not manually clamped and only some the remaining unused upstream lines are connected to fluid. Additionally, it would be desirable to have a device and an associated method that has a one-way valve installed in each line upstream of junction so flow can progress downstream only without manual intervention.

In some embodiments, a medical fluid delivery device with anti-backflow mechanism is made up of the following components: a plurality of upstream conduits, a one-way valve fitted in each upstream conduit, a common downstream conduit. These components typically are related or connected as follows: the plurality of upstream conduits is connected at a junction to the common downstream conduit. The associated method is typically made up of the following steps: fluid flows through one-way valve, fluid flows via conduit to junction with additional upstream conduit(s) and downstream conduit, fluid is prevented from flowing upstream past one-way valve(s) in additional upstream conduit(s).

The device may also have one or more of the following: bag or reservoir, spike, at least one upstream conduits longer or of larger inner diameter or of lower flow resistance than at least one other upstream conduit; at least one of the one-way valves with a higher cracking pressure than at least one other one-way valve; camera or detector or sensor to determine the temperature or whether the valve is open or whether the conduit contained gas versus liquid; additional valves disposed to occlude any of the upstream conduits whereas the valves may be contained in a pumping mechanism or housing to which the conduits can be installed or assembled to occlude any of the conduits; additional junction(s)/y-site(s) for needle-free injection of fluid into any of the conduits; one-way valves assembled directly as part of the spike assembly used to connect to a bag or reservoir, bypass valve for returning fluid to upstream reservoir, controller, motor. These components may also be related or connected as follows: the one-way valves are in parallel, the other parts are downstream, one-way valve is assembled directly as part of the spike assembly. These components may also have the following characteristics: automated or mechanized valve operation, integrated spike and valve, one-way valve could be with any cracking pressure from virtually zero to 15 bar. Similarly, the associated method may also include one or more of the following steps: when the conduits are outside of the pumping mechanism, the one-way valves prevent hydrostatic pressure induced mixing of the liquids from different upstream conduits; once the conduits are installed within a pumping mechanism or housing, each upstream can be opened or closed individually to enable coordinated flow at a desired intermittent or alternating or sequenced timing, positive differential pressure is applied to the reservoir by gravity/head height or squeezing of the reservoir.

In some embodiments, the devices and associated methods described herein provide the following: no clogging upon contact with blood, no height difference limitations, no minimum activation pressure, no cavitation due to flow resistance, no significant pressure required to prime, backpriming for unused line not needed, large molecules and blood are not damaged/hemolyzed, once reservoir is connected to set the fluid cannot escape to environment rather only to downstream intended destination.

Typically, the device includes the following features: one-way valves upstream of junction of plurality of conduits, integrated free flow protection valve.

Typically, the methods described herein enable closure of upstream openings during manufacturing rather than as a step required of the user in the clinical setting.

Some embodiments of the present disclosure relate to a medical fluid delivery device with passive gas release. A set of embodiments is summarized as follows:

Currently, there are a number of solutions for passively removing air. Some of these solutions attempt to use floating materials and some use hydrophobic membranes, but in some cases these solutions fail to meet the needs of the industry because they can only be used once per set, air is released effectively once during prime or only while air vent remains dry or entrained air is released easily at start of treatment, but when bags run empty, air cannot escape or gas remains trapped in the ullage above the liquid and eventually migrates downstream of the chamber entrained in the liquid having failed to be released.

It would be desirable to have a device and an associated method that can separate and release gas entrained in a liquid at the start of delivery, throughout delivery, and after an upstream liquid supply is depleted temporarily leaving only gas flow and subsequently replenished with liquid from a chamber, for example a chamber used to filter particulates or to heat the liquid. Furthermore, it would also be desirable to have a device and an associated method that releases gas entrained in a liquid from a chamber despite a higher or lower pressure in the chamber compared with the pressure in the ambient environment. Still further, it would be desirable to have a device and an associated method that can deliver medical fluid while releasing gas entrained in a liquid, for example for liquids which tend to clog hydrophobic membranes. Additionally, it would be desirable to have a device and an associated method that can separate and release gas entrained in a liquid from a chamber used to filter particles from a liquid or from a chamber used to heat a liquid.

In some embodiments, a medical fluid delivery device with passive gas release is made up of the following components: a chamber comprising a float, lever, ports for fluid input and output and for gas release, one-way valve and buoyancy-actuated valve. These components are typically related or connected as follows: ports create opening in chamber wall, buoyancy actuated valve positioned to open and close one port, lever has a pivot connection to chamber to provide mechanical advantage with the possibility to multiply buoyant force of float into a valve force capable of closing valve. The associated method is typically made up of the following steps: fluid level increases or decreases, valve opens or closes.

The device may also have one or more of the following: particulate filter, filter chamber, heating mechanism, hydrophobic membrane, air-eliminating chamber, air sensor, temperature sensor, actuator to override valve, magnet inside float, magnetic sensor outside chamber to determine whether valve is open or closed, automatically closed connector. These components may also be related or connected as follows: the float is captured within the chamber such that it has vertical play; the gas release port is located within the chamber wall which is angled between vertical and horizontal such that the gas release port becomes blocked and sealed by a corresponding angled surface on the rising buoy as the chamber fills with liquid; the projection of the angled gas release port perimeter onto a horizontal plane is smaller than if the port opening were horizontal thereby minimizing the upwards force induced on the sealed buoy by positive pressure in the chamber such that a reduced gravitational force is needed to overcome the upwards pressure force and the buoy falls and opens the port despite the positive pressure and without requiring an excessively heavy buoy and correspondingly large buoy size since the volumetric displacement of the buoy must account, one-way valve positioned to connect between buoyancy-actuated valve and eventually the ambient environment, hydrophobic membrane positioned to connect between buoyancy-actuated valve and eventually the environment, order of hydrophobic membrane and one-way valve may be interchanged. These components may also have the following characteristics: cross-sectional area of float and lever may be significantly smaller than cross-sectional area of chamber which allows us to minimize the surface area of the liquid exposed to air by making the upper portion of the chamber narrow or small to be slightly bigger that the perimeter of the float and lever thereby reducing the negative interactions between air and fluid such as coagulation. Similarly, the associated method may also include one or more of the following steps: chamber is empty and upright, liquid enters the chamber, weighted buoy rises, controller determines that pump is disposed upright based on data from accelerometer, gyroscope, and magnetometer, pumping to stop if device is not vertical, removal of air from downstream chamber (e.g., heating chamber) to upstream chamber (e.g., filter chamber).

In some embodiments, the devices and associated methods provide the following: can be used repeatedly during a treatment without clogging and means for releasing gas to the ambient environment despite a higher pressure in the chamber compared with the pressure in the ambient environment and it provides a means for releasing gas which does not allow the liquid to come in contact with a hydrophobic membrane during normal use thereby preventing liquids from clogging any hydrophobic membrane.

Typically, the device includes the following features: levered valve or buoyant plug stops most liquid from escaping, azimuth sensor ensures pumping only when upright, one-way valve prevents intake of air and only allows release, chamber between valves and hydrophobic membrane captures liquid which did manage to pass levered valve or buoyant plug.

Typically, the methods described herein enable the float to plug an opening with a small hole whose plane is oriented at the large angle with respect to the horizon in order for the smallest possible force to be exerted upwards upon the float to ensure that the float can drop downwards upon the liquid level dropping without the pressure force keeping the float suspended.

Some embodiments of the present disclosure relate to a medical fluid delivery device with ohmic heating. A set of embodiments is summarized as follows:

Currently, there are a number of solutions for heating medical fluids. Some of these solutions attempt to heat blood, but in some cases these solutions fail to meet the needs of the industry because heating fluid at high flow rates causes hotspots, large, bulky, and heavy equipment, low heating efficiency, long heating time, large heat transfer area needed, overheating, difficulty controlling heating, no possibility of heating deep within volume of fluid.

It would be desirable to have a device and an associated method that can heat a conductive liquid at flow rates ranging from very low to very high without causing hotspots, for example whole blood, packed red blood cells, platelets, plasma, saline, dialysis fluid, or any other conductive medical fluid. Furthermore, it would also be desirable to have a device and an associated method that heats a conductive liquid at flow rates ranging from very low to very high to a uniform temperature. Still further, it would be desirable to have a device and an associated method that uses radio frequencies above 1 MHz or 10 MHz for heating due to narrow conductivity range. Additionally, it would be desirable to have a device and an associated method that can eliminate contact resistance and corrosion effects of the non-disposable portion of the device by using capacitive transfer energy from a non-disposable portion of the device to a disposable portion of the device.

In some embodiments, a medical fluid delivery device with ohmic heating is made up of the following components: a conduit comprising an electrically insulating conduit wall except at at least two locations where electrodes are disposed apart from each other along the direction of fluid flow, a conductive medical fluid within the conduit, a temperature sensor, an electrical power source, controller. These components typically are related or connected as follows: electrodes are positioned on the same side of the conduit such that the fluid does not necessarily pass between the electrodes, the conductive fluid forms a conductive path which allows heating. The associated method Is made up of the following steps: heat fluid.

The device may also have one or more of the following: temperature sensor at fluid input or upstream of electrodes, temperature sensor at fluid output or downstream of electrodes, dielectric material, a power source providing alternating current; EMI/RFI shield or faraday cage; dielectric material with high dielectric constant and low loss tangent, for example sapphire or polypropylene between power source and fluid, plastic barrier between electrodes and fluid to be heated, thin polymer film to avoid metal contact with fluid, metal electrodes may be part of non-disposable portion and not part of disposable, conductive material in contact with fluid to provide grounding and prevent leakage current for example to patient. These components may also be related or connected as follows: utilize fluid conductivity for alternating current ohmic or Joule heating, disposable electrodes can be powered by capacitive circuit with no contact between electrode and fluid, range of blood component conductivity narrows above 1 MHz, current parallel to flow, the electrodes may be sealingly attached along their perimeter to the conduit wall, the temperature sensor is configured to measure the temperature of the fluid by infrared thermometer via a portion of the conduit wall which is approximately transparent to infrared radiation or by measuring the temperature of at least one conductive plates or electrode by infrared thermometer, by thermocouple or by any other measurement of temperature that can be performed by a sensor installed on the non-disposable portion of the components. These components may also have the following characteristics: capacitive transfer of energy to eliminate contact resistance and corrosion effects. Similarly, the associated method may also include one or more of the following steps: measure temperature of fluid inside or downstream of conduit, heat medical fluid while flowing or while not flowing; measure fluid temperature at conduit input to more rapidly/closely control the output temperature by varying the electrical power flowing across the conductive plates; stop the flow; measure impedance/resistance/temperature and tune the impedance of the electrical power source to match the load and/or achieve optimal transmission or heating efficiency, pump fluid, measure fluid temperature, heat fluid, release entrained air, apply power source pump fluid, measure fluid temperature.

In some embodiments, the devices and associated methods described herein provide the following: does not cause significant radio transmission compared with microwave or wireless RF heating and transfers energy from a non-disposable portion of the device to a disposable portion of the device without contact resistance between the non-disposable and disposable portions and heats any conductive fluid.

Typically, the device includes the following features: plastic barrier between each electrode and fluid to be heated, electrodes positioned along fluid flow path, thin polymer film to avoid metal contact with fluid, metal electrodes are not part of disposable.

Typically, the methods described herein enable RF ohmic heating with current flowing in parallel to fluid flow.

Some embodiments of the present disclosure relate to a medical fluid delivery device with a non-occluding plunger. A set of embodiments is summarized as follows:

Currently, there are a number of solutions for damage-free pumping of blood and other fluids. Some of these solutions attempt to pump medical fluids without damage, but in some cases these solutions fail to meet the needs of the industry because roller pumps damage blood and/or activate platelets, pressurized bags or chambers do not provide accurate volumetric delivery over time and are poorly controlled.

It would be desirable to have a device and an associated method that can pump fluid without damaging or activating components of the fluid, for example platelets. Furthermore, it would also be desirable to have a device and an associated method that can pump fluid volumetrically while maintaining a sterile barrier between mechanism and fluid. Still further, it would be desirable to have a device and an associated method that can pump over a range of upstream and downstream pressures which are above and below ambient pressure. Additionally, it would be desirable to have a device and an associated method that can pump at high flow rates up to or above 1 liter per minute.

In some embodiments, a medical fluid delivery device with non-occluding plunger is made up of the following components: a flexible conduit comprising an upstream and a downstream one-way valve, a transverse reciprocating plunger and opposite surface. These components are related or connected as follows: plunger and opposite surface impinging on opposite sides of the conduit downstream with respect to the upstream one-way valve and upstream with respect to the downstream one-way valve. The associated method is typically made up of the following steps: plunger motion compresses the conduit.

The device may also have one or more of the following: force sensor, free flow protection valve. These components may also be related or connected as follows: force sensor impinges transversely on conduit. These components may also have the following characteristics: plunger mechanism can move at reciprocating rates up to and above two cycles per second and can displace up to and above one milliliter of fluid per reciprocating plunger cycle. Similarly, the associated method may also include one or more of the following steps: measure pressure within conduit.

In some embodiments, the device and associated method provide the following: valves are not closed by an occluding or impinging finger, high volume delivery under a wide range of pressures, accurate delivery under a wide range of temperatures.

Typically, the device includes the following features: self-closing valves for example those similar to a heart valve.

Typically, the methods described herein enable non-occluding plunger which does not bottom out to displace fluid from between two one-way valves towards downstream and creates suction of fluid from upstream into the conduit section which is between the two one-way valves.

Some embodiments of the present disclosure relate to a medical fluid delivery device with continuous flow. A set of embodiments is summarized as follows:

Currently, there are a number of solutions for fluid delivery at high flow rates. Some of these solutions attempt to deliver fluid at a high flow rate, but in some cases these solutions fail to meet the needs of the industry because of pressure spikes, pumping against constriction (e.g., catheter) is limited in time domain when pumping cell has punctuated intake/delivery phases, reverse flow during opening of downstream valve, limited flow for a given pressure source.

It would be desirable to have a device and an associated method that can pump fluid through a conduit continuously without punctuated delivery in the time domain. Furthermore, it would also be desirable to have a device and an associated method that can maximize catheter flow at a given pressure limit. Still further, it would be desirable to have a device and an associated method that can provide constant downstream pressure over time in a flexible conduit. Additionally, it would be desirable to have a device and an associated method that can provide uniform volumetric fluid delivery over entire duration of therapy.

In some embodiments, a medical fluid delivery device with continuous flow is made up of the following components: a plurality of conduits with at least two of the conduits each comprising at least one upstream and at least one downstream valve. These components are related or connected as follows: communicating to common downstream conduit. The associated method is typically made up of the following steps: sequential delivery of fluid from one out of the plurality of conduits followed by another of the plurality of conduits.

The device may also have one or more of the following: independent, individually actuated plungers, plungers that are both actuated by a single mechanism with a phase-shift between the plunger motions, one-way bearing, camshaft. These components may also be related or connected as follows: each pumping conduit communicates with at least one upstream conduit via at least one valve configured to control flow from the upstream conduit into the pumping conduit. These components may also have the following characteristics: high flow up to or above one liter per minute. Similarly, the associated method may also include one or more of the following steps: mix fluids from a plurality of containers at a desired volumetric ratio, multiple pumping plungers where one of the plungers delivers fluid through one lumen, for example for irrigation, and the other plunger provides suction through another lumen, for example, to remove waste/fluid from patient.

In some embodiments, the devices and associated methods provide the following: we can stop and pump slowly with low pressure to remove in-line air even automatically or to purge line and then resume continuous flow, can produce continuous flow thereby maximizing the flow rate for a given flow restriction or pressure limit, pump at stable pressure despite compliance of downstream conduit, intake at high flow is split in the time-domain into more than one sequential suction actions thereby reducing the negative pressure needed and then damage to fluid components and cavitation and associated gas bubbles, bigger pumping chamber volume, split intake to two volumes to allow more time for vacuum to dissipate completely and less deep vacuum needed.

Typically, the device includes the following features: parallel pumping cells which are synchronized to provide continuous flow including overlapping flow at the end of one pumping cell delivery and the beginning of another pumping cell delivery, integrated free flow protection valve.

Typically, the methods described herein enable sequential delivery of fluid from one out of the plurality of conduits followed by another of the plurality of conduits.

Some embodiments of the present disclosure relate to a medical fluid delivery device with guided insertion. A set of embodiments is summarized as follows:

Currently, there are a number of solutions for attaching a disposable administration set to an infusion device. Some of these solutions attempt to enable connection of disposable to non-disposable device, but in some cases these solutions fail to meet the needs of the industry because setup time is delayed when disposable needs to be installed into pump and user needs to manage the priming process, false alarms, unintended misplaced cassette.

It would be desirable to have a device and an associated method that can be assembled by quick insertion of a disposable portion into a non-disposable portion. Furthermore, it would also be desirable to have a device and an associated method that reduces the set-up time. Still further, it would be desirable to have a device and an associated method that eliminates need for specialized training and prevents user errors regarding setting up and starting an infusion. Additionally, it would be desirable to have a device and an associated method that ensures reliable and safe assembly of disposable fluid path into a device that can pump and/or heat.

In some embodiments, a medical fluid delivery device with guided insertion is made up of the following components: mounting apparatus, cassette. These components are related or connected as follows: wherein the mounting apparatus comprises opposing guide walls forming a slot, a transverse rod or rods at one end of the slot, and a latch; and the cassette comprises at least one fluid conduit, open ended groove(s) to engage with the rod(s) and outward facing walls guided by the opposing guide walls upon assembly of the cassette to the mounting apparatus. The associated method is typically made up of the following steps: guide the cassette towards the mounting apparatus by placing the outward facing walls between the opposing guide walls, engage groove of cassette with rod(s) on mounting apparatus, rotate cassette about rod(s) to cause latch to secure cassette to mounting apparatus.

The device may also have one or more of the following: keyed groove(s) on either cassette or mounting apparatus and matching protrusion(s) on the opposing device to prevent incompatible cassettes being assembled to given mounting apparatus, multiple cassette types capable of insertion into a single mounting apparatus, cartridge with integrated fluid reservoir, filter, temperature sensor, pressure sensor, ultrasonic air detector, pumping mechanism, radiofrequency identification, heating mechanism for example by ohmic radiofrequency, air trap, air release mechanism, stopcock, air inlet fluid outlet. These components may also be related or connected as follows: sensors and tubing are positioned between the cassette body and mounting apparatus such that they are protected against damage or accidental or unintended interference. These components may also have the following characteristics: parts made from metal or rigid plastic or semi-rigid plastic. Similarly, the associated method may also include one or more of the following steps: quick removal of cassette from mounting apparatus.

In some embodiments, the devices and associated methods provide the following: one-click infuser set up.

Typically, the device includes the following features: cassette includes all connections preassembled, integrated free flow protection valve.

Typically, the methods described herein enable insertion of cassette into pump to trigger priming of liquid through disposable.

Some embodiments of the present disclosure relate to a medical fluid delivery device with self-priming. A set of embodiments is summarized as follows:

Currently, there are a number of solutions for priming an infusion set. Some of these solutions attempt to enable priming of set, but in some cases these solutions fail to meet the needs of the industry because time and training required by clinician cause delay of therapy for patient, prime is not automatically stopped as quickly as possible, liquid escapes the downstream end of the tube during priming.

It would be desirable to have a device and an associated method that can perform a self-priming sequence upon insertion of a disposable portion into a non-disposable portion of the device. Furthermore, it would also be desirable to have a device and an associated method that warms and/or delivers blood or other medical fluids to patient quickly with minimal user interaction. Still further, it would be desirable to have a device and an associated method that can stop a priming sequence upon detecting that a disposable portion is fully primed. Additionally, it would be desirable to have a device and an associated method that reduces the time and training needed by medical staff to set up and prime the fluid delivery device.

In some embodiments, a medical fluid delivery device with self-priming is made up of the following components: mounting apparatus, cassette, pumping mechanism, conduit. These components are related or connected as follows: wherein the mounting apparatus comprises a switch or sensor to detect the mounting of the cassette into the mounting apparatus. The associated method is typically made up of the following steps: insertion of cassette into pump triggers priming of liquid through disposable or prompt user to choose whether to start priming.

The device may also have one or more of the following: force sensor, air sensor, hydrophobic membrane, controller. These components may also be related or connected as follows: hydrophobic membrane removably mounted at downstream end of conduit to allow gas to escape during priming and to prevent liquid from escaping. These components may also have the following characteristics: audible and visible indications are provided to inform the user of the progress of the priming set up. Similarly, the associated method may also include one or more of the following steps: sensors are used to measure the progress of liquid, hydrophobic membrane is used to stop flow at patient end without leaving air.

In some embodiments, the devices and associated methods provide the following: priming or user prompt for priming occurs automatically upon insertion of cassette into mounting apparatus, clinician can tend to patient while pump automatically performs priming sequence, pump can automatically mix between fluid types, smart prime sensing.

Typically, the device includes the following features: integrated free flow protection valve, hydrophobic membrane at downstream end of set, sensor, or detector, for example, a microswitch or reed switch, to automatically switch the power on when set is inserted into mounting apparatus.

Typically, the methods described herein enable removal of air from liquid prior to allowing liquid to enter downstream tubing, then automatically begins filling downstream tubing without need for user interaction, senses pressure during priming process at rates above 400 milliliters per minute.

Some embodiments of the present disclosure relate to a medical fluid delivery device with feedback. A set of embodiments is summarized as follows:

Currently, there are a number of solutions for closed-loop medical fluid delivery. Some of these solutions attempt to deliver the correct amount of medical fluid, but in some cases these solutions fail to meet the needs of the industry because while patient is bleeding, transfusion can cause excess blood pressure thereby preventing clotting, healing process at injury (permissive hypotension), too much blood volume is dangerous after bleeding stops as well.

It would be desirable to have a device and an associated method that can limit delivery flow rate based on downstream pressure or arterial pressure, for example by sensing a patient's blood pressure and delivering only enough fluid to raise the blood pressure to a desired clinical set point, but not higher. Furthermore, it would also be desirable to have a device and an associated method that can control the flow and pressure of medical fluid delivery to prevent "popping the clot" and to maintain permissive hypotension. Still further, it would be desirable to have a device and an associated method that can use blood gas saturation measurement and/or blood pressure and/or pulse and/or other measurements to determine how quickly and how much fluid should be delivered to a patient. Additionally, it would be desirable to have a device and an associated method that can provide dynamic or pulsatile medical fluid delivery based on patient vital signs, for example pulsating flow in synchronization with a heartbeat and with a phase shift.

In some embodiments, a medical fluid delivery device with feedback is made up of the following components: controller, pumping mechanism, conduit, sensor. These components are related or connected as follows: pumping mechanism is mechanically connected to the conduit to cause fluid delivery. The associated method is typically made up of the following steps: perform measurement using sensor, process measurement for example by comparing with desired set point, deliver fluid by pumping.

The device may also have one or more of the following: sensor for any of the following: force, pressure, temperature, humidity, urine, hemoglobin, oxygen, ketosis, blood glucose level, blood pressure, blood gas saturation, pulse oximetry, N-title $CO_2$, EKG monitor. These components may also be related or connected as follows: sensor communicates with controller by wireless or wired connection. These components may also have the following characteristics: encrypted communication protocol. Similarly, the associated method may also include one or more of the following steps: change delivery rate, stop delivery, start delivery, change ratio of delivered fluids, sound alarm based on length of time at a particular range of sensor values, deliver continuously, delivery intermittently, change pressure, change flowrate.

In some embodiments, the devices and associated methods provide the following: can use arterial pressure readings to control how much fluid to deliver or when to stop when permissive hypotension is clinically desired for example due to active hemorrhage, or to prevent waste of fluids.

Typically, the device includes the following features: pump algorithm uses inline pressure combined with clinical input from GUI and/or external devices to regulate flow for safe blood volume.

Typically, the methods described herein enable reduced flowrate of medical fluid delivery automatically based on vital signs.

Some embodiments of the present disclosure relate to a medical fluid delivery device with fluid detector. A set of embodiments is summarized as follows:

Currently, there are a number of solutions for testing fluid properties. Some of these solutions attempt to test blood type before administering transfusion, but in some cases these solutions fail to meet the needs of the industry because wrong fluid could be administered with negative consequences, for example mismatched blood type could be administered causing damage to patient health and economic losses for health system, some blood units are not within safe chemical limits and are given to patients without being recently measured.

It would be desirable to have a device and an associated method that can detect, store, indicate, alarm, and/or transmit properties of fluid being delivered by means of a detector in a non-disposable portion positioned to detect the properties of an indicator located inside the disposable fluid path, for example a paper blood type test indicator. Furthermore, it would also be desirable to have a device and an associated method that compares the fluid properties to the expected properties and provides an alarm if there is not a positive match. Still further, it would be desirable to have a device and an associated method that displays the fluid properties, for example blood type, on the device display panel. Additionally, it would be desirable to have a device and an associated method that records the fluid properties.

In some embodiments, a medical fluid delivery device with fluid detector is made up of the following components: conduit, detector. These components are related or connected as follows: detector is outside the conduit. The associated method is typically made up of the following steps: detect fluid property.

The device may also have one or more of the following: liquid test indicator, detector, sensor, sensor which measures blood type of potential donor (as in a walking blood bank) as part of the blood donation set or not, communication between donor sensor and receiver sensor for example via the delivery device in order to prevent incorrect crossmatching, sensor which measures blood type of intended recipient as part of the blood transfusion set or not. These components may also be related or connected as follows: indicator or detector are outside or inside the conduit. These components may also have the following characteristics: able to provide audible and visual feedback. Similarly, the associated method may also include one or more of the following steps: check blood ABO type; check pH level; check fibrogen or hemoglobin or oxygen or toxin or ketosis level in fluid.

In some embodiments, the devices and associated methods provide the following: identification of type and properties and quality of fluid to be administered.

Typically, the device includes the following features: fluid measurement device, fluid delivery device.

Typically, the methods described herein enable identification of fluid type, decides whether to perform delivery.

Some embodiments of the present disclosure relate to a medical fluid delivery device with active gas release. A set of embodiments is summarized as follows:

Currently, there are a number of solutions for active air elimination of gas from a medical fluid. Some of these solutions attempt to separate gas bubbles from blood, but in some cases these solutions fail to meet the needs of the industry because air trapped after pumping and heating is entrained in liquid.

It would be desirable to have a device and an associated method that can detect and purge entrained gas from a liquid in a device which pumps and/or heats the liquid. Furthermore, it would also be desirable to have a device and an associated method that separates gas bubbles from a liquid by allowing them to rise to an ullage space and controls a gas outlet valve causing the gas to escape when collected. Still further, it would be desirable to have a device and an associated method that allows blood or another fluid with entrained gas bubbles to enter a tall chamber, allows time and space for the air bubbles to collect in the upper portion of the chamber, measures the height of the gas/liquid interface in the chamber and opens and closes the gas escape valve to force the gas to escape thereby enable liquid delivery free of gas bubbles. Additionally, it would be desirable to have a device and an associated method that has an ultrasonic air sensor or optical air sensor together with a heating chamber to detect and remove air entrainment.

In some embodiments, a medical fluid delivery device with active gas release is made up of the following components: chamber with sufficient height, width and depth to allow buoyant forces to separate air bubbles from flowing liquid where the chamber comprises ports for fluid input and output and gas output, one or more detectors to differentiate between gas and liquid within the chamber, controller, downstream valve operated by pressure or other actuation method. These components are related or connected as follows: gas output should be from a point near the top of the chamber, liquid output should be from a point near the bottom of the chamber. The associated method is typically made up of the following steps: fluid enters chamber, gas bubbles collect in the upper portion of the chamber, valve opens to release gas opens and closes the gas escape valve to force the gas to escape thereby enable liquid delivery free of gas bubbles.

The device may also have one or more of the following: plurality of valved inputs with or without mechanical, electronic and/or software control, a conduit connecting the liquid output to a pressure activated valve, a valved conduit connected to the gas output, valves, hydrophobic membrane, one-way valve at gas output, accelerometer, or azimuth detector, audible or visual indicator to ensure device is positioned upright. These components may also be related or connected as follows: pressure-activated valve is connected in-line and downstream of chamber in order to allow delivery of fluid through the pressure-activated valve when the gas outlet valve is closed and to prevent flow of liquid towards the downstream patient when the gas outlet valve is open, one-way valve and hydrophobic membrane could be connected at the gas outlet or the gas outlet could be connected to another chamber such as an upstream chamber with a filter to remove blood clots and recirculate the blood. These components may also have the following characteristics: minimal area of gas-liquid interface to minimize blood coagulation or other gas-liquid interaction. Similarly, the associated method may also include one or more of the following steps: dispose some fluid as waste, flush or purge chamber with a particular fluid type, separate gas from liquid, separate dense liquid from less dense liquid, capture noxious, poisonous gas, circulate fluid back to original reservoir after heating or cooling or testing for type or measuring temperature, release downstream pressure to prevent unintended bolus.

In some embodiments, the devices and associated methods provide the following: monitoring of high and low levels to determine timing for opening valve, provides tall chamber for natural gas separation before actively opening gas release valve.

Typically, the device includes the following features: large height separation; sensor at high and low point; stopcock with motor control.

Typically, the methods described herein enable monitoring of height of gas-liquid interface.

Some embodiments of the present disclosure relate to a medical fluid delivery device with waste reduction. A set of embodiments is summarized as follows:

Currently, there are a number of solutions for medical fluid delivery. Some of these solutions attempt to reduce the wasted volume within administration sets, but in some cases these solutions fail to meet the needs of the industry because blood and other fluids are wasted when sets are disposed especially when a small number of blood units are given since the priming volume of the set may be tens of milliliters or more which in significant when compared to critical resources such as blood or expensive drugs.

It would be desirable to have a device and an associated method that delivers fluid to a patient and then when fluid container is empty allows ingress of air into chambers and conduit in order to minimize the wasted fluid that otherwise would remain in the administration set. Furthermore, it would also be desirable to have a device and an associated method that reduces the amount of wasted blood. Still further, it would be desirable to have a device and an associated method that empties the remaining volume of liquid in an administration set. Additionally, it would be desirable to have a device and an associated method that allows the entire volume of liquid prepared to be delivered to a patient.

In some embodiments, a medical fluid delivery device with waste reduction is made up of the following components: gas intake valve, downstream liquid outlet. These components are related or connected as follows: gas intake is connected to the upper portion or an upper chamber within an administration set. The associated method is typically made up of the following steps: open gas intake valve releasing vacuum lock, liquid released, detect gas in fluid conduit, close gas intake valve.

The device may also have one or more of the following: upstream fluid inlet, filter chamber, one-way valve, hydrophobic membrane. These components may also be related or connected as follows: downstream liquid outlets should be at the lower portion of any chambers. These components may also have the following characteristics: the same stopcock valve and actuator used to actively purge gas from a chamber towards another chamber which is back upstream can be set to an alternative input port and be used to intake air from the environment thus filling the upstream chamber and all chambers and tubes downstream of the upstream chamber with air thus allowing the remaining liquid to be delivered and no longer trapped in the chambers and tubing. Similarly, the associated method may also include one or more of the following steps: allow air intake.

In some embodiments, the devices and associated methods provide the following: monitoring of high and low levels to determine timing for opening valve.

Typically, the device includes the following features: large height separation; sensor at high and low point; stopcock with motor control; can achieve complete deprime of set by allowing intake of air into upstream filter, pumping, heating and air trap chambers and entire set.

Typically, the methods described herein enable intake of gas upon depletion of fluid reservoir.

Some embodiments of the present disclosure relate to a medical fluid delivery device with fluid removal mechanism. A set of embodiments is summarized as follows:

Currently, there are a number of solutions for removing waste from administration sets. Some of these solutions attempt to remove fluid from administration sets, but in some cases these solutions fail to meet the needs of the industry because tubing and administration sets used to deliver blood and blood components become clogged to do built-up coagulation or debris, coagulation or debris can cause hotspots if built up in heating chamber.

It would be desirable to have a device and an associated method that can empty a conduit selectively upon buildup of waste in conduit. Furthermore, it would also be desirable to have a device and an associated method that can return a set to proper functioning upon being clogged or filled partially with waste or debris. Still further, it would be desirable to have a device and an associated method that can remove one type of fluid from fluid path in order to make room for another. Additionally, it would be desirable to have a device and an associated method that extends length of therapy possible with a single set.

In some embodiments, a medical fluid delivery device with fluid removal mechanism is made up of the following components: conduit, multi-port valve with at least three ports, pumping mechanism, controller, waste container. These components are related or connected as follows: valve input is connected to fluid source; valve can be adjusted to first output leading to patient or second output leading to waste container. The associated method is typically made up of the following steps: fluid is pumped from fluid source toward the patient, valve is then operated to redirect fluid to second output thereby for example removing waste or a fluid sample to be tested.

The device may also have one or more of the following: filtered chamber, color sensor, optical sensor, bag for waste, one-way valve, valve(s) with automatic closure upon disconnection, vial, or test tube to contain fluid sample, fluid heating mechanism. These components may also be related or connected as follows: valve which automatically closes could be used after disconnecting waste container from second valve output to prevent escape of fluid from waste container and/or from second valve output, color sensor or optical sensor could be positioned to determine which fluid type is present at inlet of multi-port valve. These components may also have the following characteristics: second valve output may be connected to an upstream filtered chamber or to a waste container or to a sample container for testing. Similarly, the associated method may also include one or more of the following steps: sense type of fluid entering valve.

In some embodiments, the devices and associated methods provide the following: removes fluid or waste or debris from in-line fluid path without disconnecting patient or fluid source.

Typically, the device includes the following features: multi-port valve for computer-controlled fluid removal during infusion.

Typically, the methods described herein enable removal of fluid from infusion line.

Some embodiments of the present disclosure relate to a medical fluid delivery device with multiple inputs. A set of embodiments is summarized as follows:

Currently, there are a number of solutions for delivering multiple fluid types to a patient. Some of these solutions attempt to deliver fluid from multiple fluid sources with a single administration set, but in some cases these solutions fail to meet the needs of the industry because tubing and administration sets used to deliver blood and blood components require manual intervention or manual operation of valves in order to switch or mix between fluid sources or fluid types.

It would be desirable to have a device and an associated method that can deliver from multiple fluid sources selectively. Furthermore, it would also be desirable to have a device and an associated method that can clear debris or clogging or ensure fluid remaining in conduit is flushed to patient or to another desired output destination by mechanically switching from one input fluid source to another one. Still further, it would be desirable to have a device and an associated method that can remove one type of fluid from fluid path by pumping a different fluid type into the fluid path. Additionally, it would be desirable to have a device and an associated method that extends length of therapy possible with a single set by washing the stagnant fluid and preventing buildup of contamination or microbes.

In some embodiments, a medical fluid delivery device with multiple inputs is made up of the following components: conduit, multi-port valve with at least three ports, pumping mechanism, controller, multiple fluid sources. These components are related or connected as follows: valve can be adjusted to accept fluid from any of multiple fluid input sources, valve output is connected to patient. The associated method is typically made up of the following steps: fluid is pumped from fluid source toward the patient, valve is then operated to redirect fluid to second output thereby for example removing waste or a fluid sample to be tested.

The device may also have one or more of the following: filtered chamber(s), color sensor, optical sensor, bag for waste, one-way valve, valve(s) with automatic closure upon disconnection, fluid heating mechanism. These components may also be related or connected as follows: valve which has multiple inputs can be connected to and/or disconnected from multiple fluid sources, valve(s) with automatic closure upon disconnection could be used to prevent escape of fluid from fluid source or from valve input before or after fluid source(s) and valve input(s) are connected, color sensor(s) or optical sensor(s) could be positioned to determine which fluid type is present at inlet or outlet of multi-port valve. These components may also have the following characteristics: second valve output may be connected to an upstream filtered chamber or to a waste container or to a sample container for testing. Similarly, the associated method may also include one or more of the following steps: sense type of fluid being delivered to patient, flush the remaining volume of a first fluid type from within a conduit by toggling to another fluid source and displacing the first fluid towards the patient, mix between multiple compatible fluid types or drugs at any desired ratio to be delivered to a patient.

In some embodiments, the devices and associated methods provide the following: toggles as many times as needed between fluid sources without disconnecting patient or fluid source.

Typically, the device includes the following features: multi-port valve for computer-controlled fluid input selection during infusion.

Typically, the methods described herein enable toggling between infusion line sources.

Some embodiments of the present disclosure relate to a medical fluid delivery device with recirculation. A set of embodiments is summarized as follows:

Currently, there are a number of solutions for pre-heating a volume of blood. Some of these solutions attempt to pre-heat fluids, but in some cases these solutions fail to meet the needs of the industry because upstream chamber is filled with air which causes coagulation, manual intervention and a long period of time is required to sufficiently mix between a powder and liquid.

It would be desirable to have a device and an associated method that pre-heats a fluid and/or keeps it warm and filtered when low or no flow to patient is needed. Furthermore, it would also be desirable to have a device and an associated method that keeps blood warm and mixed and free of sediment and coagulation when flow rate is below the highest rate. Still further, it would be desirable to have a device and an associated method that fills an upstream reservoir with heated fluid before delivery to patient is desired. Additionally, it would be desirable to have a device and an associated method that mixes between multiple fluid types, for example several types of blood components, before delivering to patient or between powder and fluid.

In some embodiments, a medical fluid delivery device with recirculation is made up of the following components: conduit, upstream chamber, pumping mechanism, multi-port valve, actuator, controller, downstream valve operated by pressure or other actuation method. These components are related or connected as follows: upstream chamber output is connected to at least one input of multi-port valve, at least one output of multi-port valve leads to patient and at least one output of multi-port valve leads to upstream chamber, controller controls actuator which toggles the outputs of the multi-port valve. The associated method is typically made up of the following steps: set valve output to deliver fluid back to an upstream reservoir, pump fluid.

The device may also have one or more of the following: battery for warming fluid, fluid heating mechanism, multiple chambers, filter, gas vent, temperature sensor, thermal insulation, baffles for mixing fluid. These components may also be related or connected as follows: battery for warming fluid is connected to fluid heating mechanism such that fluid can be recirculated and heated without connection to AC mains power source, fluid which returned to upstream chamber is directed pass through filter to remove coagulation and/or debris from fluid, gas vent is connected to allow escape of gas from upstream chamber thereby allow chamber to fill with fluid to be recirculated, temperature sensor is positioned to measure fluid temperature before it is heated to enable controller to determine how much heat to apply and how quickly to recirculate fluid in order to maintain a desired temperature, thermal insulation is positioned to keep upstream reservoir thermally isolated from environment, baffles for mixing fluid are positioned in chamber or fluid path or heating chamber to prevent hotspots and sedimentation. These components may also have the following characteristics: can be used to reconstitute a powdered drug, for example plasma substitutes like Plasma-Lyte A, by mixing and/or heating drug. Similarly, the associated method may also include one or more of the following steps: heat fluid, reconstitute powder in liquid.

In some embodiments, the devices and associated methods provide the following: when treatment is stopped of low flow only is needed, fluid can be recirculated intermittently to keep it fresh, warm, filtered, or heat in multiple cycles.

Typically, the device includes the following features: downstream valve operated by pressure or other actuation method, pumping mechanism which does not mechanically damage or activate the molecules, high surface area filter.

Typically, the methods described herein enable downstream valve operated by pressure or other actuation method to prevent flow of fluid towards patient while multi-port valve is set to connect at least one of its outputs to an upstream chamber such that even when pumping mechanism is operated the pressure that builds is low enough that it does not induce fluid flow towards patient rather only upstream towards chamber.

Some embodiments of the present disclosure relate to a medical fluid delivery device with communication. A set of embodiments is summarized as follows:

Currently, there are a number of solutions for set identification. Some of these solutions attempt to manage fleet of pumps and inventory of disposables, but in some cases these solutions fail to meet the needs of the industry because inventory is not managed efficiently, incorrect disposable is used, location of pump unknown, hospital database does not include record of which fluids were delivered to which patient with which parameters.

It would be desirable to have a device and an associated method that can determine which disposables are used by device, need to be restocked, by type and/or location. Furthermore, it would also be desirable to have a device and an associated method that can detect, store, indicate, alarm, and/or transmit location of device, type of disposable, manufacturing date, expiration date, lot number, record of which fluids were delivered, fluid properties (for example blood type), to which patients, at what time, at what downstream pressure conditions, and/or at what temperature or other data, for example by uploading the information to the electronic health record of a patient. Still further, it would be desirable to have a device and an associated method that connects to a remote computer and communicates. Additionally, it would be desirable to have a device and an associated method that enables remote monitoring and analysis of fleet of devices, problems, alarms, usage, shock from drop or collision based on accelerometer.

In some embodiments, a medical fluid delivery device with communication is made up of the following components: disposable cassette, non-disposable pump, the disposable cassette comprising a fluid conduit and an encoded label or tag or marking or color, the non-disposable pump comprising a label- or tag-reading detector. These components are related or connected as follows: transmitter assembled to pump, cassette removably engages with non-disposable pump, upon engaging cassette with pump the tag or label in the cassette is forced into a close and specific location compared with the reader/scanner. The associated method is typically made up of the following steps: engage disposable cassette with non-disposable pump, read or scan label/tag.

The device may also have one or more of the following: NFC tag, NFC reader, health system database, a wireless transceiver communicating with the health system database, remote receiver, the non-disposable pump comprising a wireless transmitter, wireless receiver, detector, vital sign detector, infusion pump, health system database, remove alarm, remote buzzer, remote speaker, remote visual display, remote warehouse management system, disposable cassette comprising an encoded label or tag or marking or color, the non-disposable pump comprising a label- or tag- or marking- or color-reading detector; user interface; touchscreen; chatbot; Wi-Fi and/or cellular modem installed, remote receiver, detector to differentiate between gas and liquid, embedded wireless connectivity, monitoring, geolocation, RFID and bar codes. These components may also be related or connected as follows: upon engaging cassette with pump the tag or label in the cassette is forced into a close and specific location compared with the reader/scanner. These components may also have the following characteristics: can be used to update software on pump, add languages, update drug library, set types, remove old options that have been determined to be unsafe, cybersecurity features. Similarly, the associated method may also include one or more of the following steps: pump liquid into downstream conduit of at least a length known to pump based on identification of the disposable type; once detector finds that in the upstream conduit there is mainly gas instead of liquid, the pump continues to pump gas of a volume no greater than the designed downstream volume as stored in a database of the design parameters for the identified set; scan geometric pattern, for example patient wristband, detect, calculate, determine, analyze, store, indicate, monitor, alarm, notify, and/or transmit geolocation, inventory data, clinical data, fluid type, test results, calibration data, damage, error state, impact, request a replacement pump, disposable, spare part; cause the fluid delivery device to default to a, be programmed to a, or limit a range for delivery duration, date, time, volume to be delivered, flow rate, allowed users, allowed user types, prevent use of expired or unsafe or recalled or incompatible disposables, limit fluid type, provide preset default values for delivery, scan data from fluid container for example blood type, expiration date, communicate relevant data to management software.

In some embodiments, the devices and associated methods provide the following: set identified by pump and automatic restockability, manage inventory.

Typically, the device includes the following features: embedded wireless connectivity, monitoring, geolocation, RFID and bar codes.

Typically, the methods described herein enable automatic recording and management of usage of disposables by type and/or location.

Some embodiments of the present disclosure relate to a medical fluid delivery device with a particular cross-section. A set of embodiments is summarized as follows:

Currently, there are a number of solutions for multi-lumen fluid delivery. Some of these solutions attempt to maintain warm fluids for delivery, but in some cases these solutions fail to meet the needs of the industry because tubes become kinked, bubbles become stuck in tubing, heat is lost to environment.

It would be desirable to have a device and an associated method that transfers multiple fluids separately. Furthermore, it would also be desirable to have a device and an associated method that insulates fluid from the environment. Still further, it would be desirable to have a device and an associated method that maintains warm fluids for delivery. Additionally, it would be desirable to have a device and an associated method that prevents conduit from kinking.

In some embodiments, a medical fluid delivery device with a particular cross-section is made up of the following components: pumping mechanism, conduit. These components are related or connected as follows: pumping mechanism causes fluid to flow in conduit. The associated method is typically made up of the following steps: delivery of fluid to a patient.

The device may also have one or more of the following: double wall conduit with gas-filled lumen insulating inner lumen, UV protection, gas permeability protection, anti-tear, inner section with biocompatible materials and outer section with stronger material, fluid heater, temperature sensor, flow sensor. These components may also be related or connected as follows: protective parts are assembled around the flow path; fluid heater and temperature sensor are assembled so as to controllably heat the fluid. These components may also have the following characteristics: multiple fluid sources are pumped and flow within an extruded tube with multiple downstream from pump. Similarly, the associated method may also include one or more of the following steps: transfers sterile fluid in one direction and waste separately in the other direction, multiple fluid sources are pumped and flow within an extruded tube with multiple downstream from pump, multiple pumping plungers where one of the plungers delivers fluid through one lumen, for example for irrigation, and the other plunger provides suction through another lumen, for example, to remove waste/fluid from patient.

In some embodiments, the devices and associated methods provide the following: insulates warmed fluid from cooler environment.

Typically, the device includes the following features: heating, pumping and insulation.

Typically, the methods described herein enable insulation of fluid from environment.

Some embodiments of the present disclosure relate to a medical fluid delivery device that transfers fluid from one patient to the same patient or another patient. A set of embodiments is summarized as follows:

Currently, there are a number of solutions for transferring fluid from one patient to the same patient or another patient.

Some of these solutions attempt to transfuse blood quickly, but in some cases these solutions fail to meet the needs of the industry because equipment is bulky or does not have sufficient battery life or is difficult to operate.

It would be desirable to have a device and an associated method that transfers fluid from one patient to the same patient or another patient. Furthermore, it would also be desirable to have a device and an associated method that reduces the need for a blood bank or cold-storage facilities for blood components. Still further, it would be desirable to have a device and an associated method that enables a walking blood bank. Additionally, it would be desirable to have a device and an associated method that reduces the time until a patient receives blood.

In some embodiments, a medical fluid delivery device that transfers fluid from one patient to the same patient or another patient is made up of the following components: pumping mechanism, input conduit, output conduit, patient. These components are related or connected as follows: the input conduit connects the patient's bloodstream to the pumping mechanism; the output conduit connects the pumping mechanism to the same patient or another patient's bloodstream. The associated method is typically made up of the following steps: pump blood.

The device may also have one or more of the following: heating mechanism, blood type testing apparatus, temperature sensor, filter, fluid heating mechanism, air release mechanism. These components may also be related or connected as follows: the filter is positioned first in the flow path followed by the pumping mechanism, the heating mechanism, the temperature sensor, and the air release mechanism. These components may also have the following characteristics: blood type testing apparatus can be provided such that the donor and the recipient can have blood type testing to be sure that they match before transfusion; apparatus can be arranged to allow blood to be pumped from a patient to him/herself via a different port. Similarly, the associated method may also include one or more of the following steps: remove blood from a patient, heat and then return the blood at a higher temperature, heat a blanket with fluid, suction of fluid from bags, transfers fluid from one patient to another.

In some embodiments, the devices and associated methods provide the following: enable a walking blood bank and transfusions in locations that do not have a blood supply and enable portable hyperthermia treatment.

Typically, the device includes the following features: combination of blood type testing and pumping and heating all together in a battery-powered device.

Typically, the methods described herein enable blood type testing directly preceding heated transfusion.

Some embodiments of the present disclosure relate to a medical fluid delivery device with free-flow protection. A set of embodiments is summarized as follows:

Currently, there are a number of solutions for Pressure-activated free-flow protection. Some of these solutions attempt to instruct user to close clamps, but in some cases these solutions fail to meet the needs of the industry because gravity causes uncontrolled free-flow when set it removed from pump.

It would be desirable to have a device and an associated method that can prevent uncontrolled gravity free-flow. Furthermore, it would also be desirable to have a device and an associated method that allows disposal to be removed from reusable portion without the risk of free flow. Still further, it would be desirable to have a device and an associated method that eliminates the need for the user to clamp the set. Additionally, it would be desirable to have a device and an associated method that prevents fluids from leaking from the set.

In some embodiments, a medical fluid delivery device with free-flow protection is made up of the following components: conduit, pumping mechanism, pressure-activated valve. These components are related or connected as follows: pressure activated valve is downstream with respect to the pumping mechanism and in line with conduit. The associated method is typically made up of the following steps: shut off flow of fluid when pumping mechanism is not connected to disposable.

The device may also have one or more of the following: heating mechanism, temperature sensor, air release mechanism. These components may also be related or connected as follows: the filter is positioned first in the flow path followed by the pumping mechanism, the heating mechanism, the temperature sensor, and the air release mechanism. These components may also have the following characteristics: pressure activated valve could be integrated into the downstream luer connector. Similarly, the associated method may also include one or more of the following steps: valve opens upon pumping mechanism producing over 0.3 bar.

In some embodiments, the devices and associated methods provide the following: no manual clamping is necessary.

Typically, the device includes the following features: pressure-activated valve in-line downstream of cassette.

Typically, the methods described herein enable removal of set from pumping mechanism without clamping.

Some embodiments of the present disclosure relate to a medical fluid delivery device with filter. A set of embodiments is summarized as follows:

Currently, there are a number of solutions for filtering blood. Some of these solutions attempt to filter blood, but in some cases these solutions fail to meet the needs of the industry because particles, for example coagulated blood, clog the coarse filter upstream of the pump.

It would be desirable to have a device and an associated method that filters blood or other medical fluid in a compact geometry. Furthermore, it would also be desirable to have a device and an associated method that provides a high contact area filter. Still further, it would be desirable to have a device and an associated method that does not clog after many hours of transfusion. Additionally, it would be desirable to have a device and an associated method that does not require clinician to replace filter often.

In some embodiments, a medical fluid delivery device with filter is made up of the following components: upstream conduit; folded arrangement of coarse filter; downstream conduit; housing or chamber. These components are related or connected as follows: filter is folded and assembled in chamber with inlet and outlet conduit connected on opposite sides of the filter such that fluid passes through filter. The associated method is typically made up of the following steps: fluid enters chamber; particles are removed; particle-free fluid exits chamber.

The device may also have one or more of the following: air release mechanism. These components may also be related or connected as follows: air release mechanism is arranged such that filter material is submerged. These components may also have the following characteristics: support structure is overmolded onto filter material forming the folded shape or structure. Similarly, the associated method may also include one or more of the following steps: remove air in parallel to filtering fluid.

In some embodiments, the devices and associated methods provide the following: filter allows longer term usage without clogging.

Typically, the device includes the following features: more surface area by folding.

Typically, the methods described herein enable creation of folded structure when manufacturing filter assembly.

This disclosure will now provide a more detailed and specific description that will refer to the accompanying figures of the drawings, which are provided by way of non-limiting example. Some embodiments of the invention are herein described, by way of example only, with reference to the accompanying drawings. The drawings and specific descriptions of the drawings, as well as any specific or alternative embodiments discussed, are intended to be read in conjunction with the entirety of this disclosure. The described medical fluid delivery devices and methods may, however, be embodied in many different forms and should not be construed as being limited to the embodiments set forth herein; rather, these embodiments are provided by way of illustration only and so that this the description taken with the drawings makes apparent to those skilled in the art how embodiments of the invention may be practiced.

In some embodiments, a method includes coupling a disposable device to a reusable device, wherein the disposable device includes: a heating segment, wherein the heating segment includes: a fluid conduit including an inlet and an outlet, a first dielectric window into the fluid conduit at an upstream location that is proximate to the inlet, and a second dielectric window into the fluid conduit at a downstream location that is proximate to the outlet, wherein the reusable device includes: a receptacle configured to receive the disposable device, a first electrode positioned within the receptacle, and a second electrode positioned within the receptacle, wherein the first electrode and the second electrode are spaced apart from one another to align the first electrode with the first dielectric window and to align the second electrode with the second dielectric window when the disposable device is received within the receptacle; supplying blood to the inlet of the fluid conduit to result in the blood passing through the fluid conduit; and activating the reusable device, wherein the activating causes the reusable device to apply an RF current between the first electrode and the second electrode, and wherein the RF current between the first electrode and the second electrode is conducted into the fluid conduit through the first dielectric window and the second dielectric window, thereby being conducted through the blood in the fluid conduit to result in heating of the blood in the fluid conduit.

In some embodiments, the first electrode and the second electrode are positioned within the receptacle so as to be on a same side of the fluid conduit when the receptacle receives the disposable device.

In some embodiments, during the method the reusable device and the disposable device are maintained at an orientation such that the outlet of the fluid conduit is positioned above the inlet of the fluid conduit.

In some embodiments, the blood in the fluid conduit is heated to a normothermic human body temperature. In some embodiments, the blood in the fluid conduit is heated to the normothermic human body temperature with sufficient uniformity such that none of the blood is heated to a temperature above 42 degrees Celsius.

In some embodiments, the heating of the blood in the fluid conduit produces heated blood, and the method also includes supplying the heated blood to a patient.

In some embodiments, each of the first dielectric window and the second dielectric window includes a dielectric material positioned to separate the blood in the fluid conduit from respective ones of the first and second electrodes. In some embodiments, the dielectric material includes a dielectric polymer having a relative permittivity that is in a range of between 2 and 12. In some embodiments, the dielectric polymer includes a fluorinated ethylene propylene film.

In some embodiments, each of the first electrode and the second electrode includes a conductive material coated by an insulative coating.

In some embodiments, the RF current is impedance matched to an impedance of the blood. In some embodiments, the RF current is impedance matched to the impedance of the blood by a process including: performing an iterative process to initialize a heating system, wherein the iterative process includes: applying an RF current burst at a burst RF impedance between the first electrode and the second electrode, measuring an initialization process reflected power between the first electrode and the second electrode resulting from the RF current burst; if the initialization process reflected power is less than a predetermined threshold reflected power, concluding the iterative process and using the burst RF impedance as a heating RF impedance of the RF current; and if the initialization process reflected power is greater than the predetermined threshold reflective power, reducing adjusting the burst RF impedance and repeating the iterative process. In some embodiments, the blood is heated by a steady state heating process, wherein the steady state heating process includes: applying the RF current between the first electrode and the second electrode at the heating RF impedance and at a constant RF power for a duty cycle duration for each aliquot of blood; wherein the RF current between the first electrode and the second electrode is conducted into the fluid conduit through the first dielectric window and the second dielectric window, thereby being conducted through the blood in the fluid conduit to result in heating of the blood in the fluid conduit, and wherein the duty cycle duration is controlled based on the inlet temperature, the target temperature, the heating RF impedance, the constant RF power, a volumetric heat capacity of the blood, and a volume of the aliquot to thereby cause the blood to be at the target temperature when the blood passes through the outlet of the fluid conduit; measuring a steady state reflected power during heating of each aliquot of blood; if the steady state reflected power is less than the predetermined threshold reflected power, continuing the steady state heating process; and if the steady state reflected power is greater than the predetermined threshold reflected power, repeating the iterative process. In some embodiments, an RF burst inductance is varied to thereby vary the RF burst impedance. In some embodiments, the RF burst inductance is varied by varying an inductance of at least one variable inductor.

In some embodiments, a method includes performing an initial priming process, wherein the initial priming process includes: operating a pump to flow blood into a first chamber of a device; operating the pump to flow the blood from the first chamber of the device to a second chamber of the device; while the blood flows to the second chamber, maintaining the device at an orientation such that gas within the second chamber separates from the blood within the second chamber and flows out of the device until the first chamber and the second chamber contain an amount of the blood that is greater than a predetermined threshold level; operating the pump to cause the blood to flow out of the second chamber and to an outlet of the device; while the blood is flowed out of the second chamber to an outlet of the device, monitoring a level of blood in the first chamber and the second chamber; if the level of the blood in the first chamber or the level of the blood in the second chamber is less than a predetermined threshold level, performing steps of: ceasing flow of the blood to the outlet of the device, and performing a subsequent priming process.

In some embodiments, the method also includes heating the blood in a heating chamber to produce heated blood, wherein the blood that flows to the outlet of the device is the heated blood. In some embodiments, the heating chamber is upstream of the pump.

In some embodiments, the pump is a reciprocating pump that acts on a pumping chamber of the device to thereby induce pressure in the pumping chamber that causes the blood to flow within the device. In some embodiments, the blood flows through a pressure-activated valve between the second chamber and the outlet of the device. In some embodiments, the pressure induced by the pump activates the pressure-activated valve.

In some embodiments, a method includes coupling a disposable device to a reusable device, wherein the disposable device includes a pumping segment, wherein the pumping segment includes: a flexible tube comprising an inlet and an outlet, wherein the inlet and the outlet are located at a same end of the pumping segment, an inlet valve positioned at the inlet, and an outlet valve positioned at the outlet, and wherein the reusable device includes: a receptacle configured to receive the disposable device, and a plunger positioned within the receptacle so as to contact the flexible tube when the disposable device is received within the receptacle; supplying blood to the disposable device; activating the reusable device to pump the blood through the disposable device, wherein the activating causes the reusable device to cycle the plunger between: an intake position in which the blood is drawn into the flexible tube, and a delivery position, in which the blood is forced out of the flexible tube.

In some embodiments, the disposable device is oriented such that the inlet valve and the outlet valve are positioned at a top end of the pumping segment with respect to gravity.

In some embodiments, when the plunger is positioned in the intake position, the plunger does not compress the flexible tube, thereby inducing a reduced pressure that causes the blood to flow into the flexible tube. In some embodiments, when the reduced pressure is induced, the inlet valve is forced to an open position to allow the blood to flow into the flexible tube, and the outlet valve is forced to a closed position to prevent the blood from flowing out of the flexible tube.

In some embodiments, when the plunger is positioned in the delivery position, the plunger compresses the flexible tube, thereby inducing an increased pressure that causes the blood to flow out of the flexible tube. In some embodiments, when the increased pressure is induced, the inlet valve is forced to a closed position to prevent the blood from flowing into the flexible tube, and the outlet valve is forced to an open position to allow the blood to flow out of the flexible tube.

In some embodiments, a method includes: supplying blood to an inlet of a fluid conduit to result in the blood passing through the fluid conduit, wherein the fluid conduit includes: an inlet, an outlet, a first dielectric window into the fluid conduit at an upstream location that is proximate to the inlet, and a second dielectric window into the fluid conduit at a downstream location that is proximate to the outlet, and wherein the blood is supplied at an inlet temperature; activating a heating device to cause the heating device to heat the blood to a target temperature, wherein the activating causes the heating device to perform a heating process including: performing an iterative process to initialize a heating system, wherein the iterative process includes: applying an RF current burst at a burst RF impedance between a first electrode and a second electrode, wherein the first electrode is aligned with the first dielectric window, and wherein the second electrode is aligned with the second dielectric window, measuring an initialization process reflected power between the first electrode and the second electrode resulting from the RF current burst; if the initialization process reflected power is less than a predetermined threshold reflected power, concluding the iterative process and using the burst RF impedance as a heating RF impedance; and if the initialization process reflected power is greater than the predetermined threshold reflective power, reducing adjusting the burst RF impedance and repeating the iterative process.

In some embodiments, the heating process also includes performing a steady state heating process, wherein the steady state heating process includes: applying an RF current between the first electrode and the second electrode at the heating RF impedance and at a constant RF power for a duty cycle duration for each aliquot of blood; wherein the RF current between the first electrode and the second electrode is conducted into the fluid conduit through the first dielectric window and the second dielectric window, thereby being conducted through the blood in the fluid conduit to result in heating of the blood in the fluid conduit, and wherein the duty cycle duration is controlled based on the inlet temperature, the target temperature, the heating RF impedance, the constant RF power, a volumetric heat capacity of the blood, and a volume of the aliquot to thereby cause the blood to be at the target temperature when the blood passes through the outlet of the fluid conduit; measuring a steady state reflected power during heating of each aliquot of blood; if the steady state reflected power is less than the predetermined threshold reflected power, continuing the steady state heating process; and if the steady state reflected power is greater than the predetermined threshold reflected power, repeating the iterative process. In some embodiments, the target temperature is a normothermic human body temperature. In some embodiments, the steady state heating process results in the blood being uniformly heated to a temperature that is within 4 degrees Celsius of the normothermic human body temperature.

In some embodiments, an RF burst inductance is varied to thereby vary the RF burst impedance. In some embodiments, the RF burst inductance is varied by varying an inductance of at least one variable inductor.

BRIEF DESCRIPTION OF THE DRAWINGS

References are made to the accompanying drawings that form a part of this disclosure and that illustrate embodiments in which the systems and methods described in this Specification can be practiced.

FIG. 17 is a simplified schematic of a system view of environmental elements important to the invention according to some embodiments of the invention.

Figure 51:
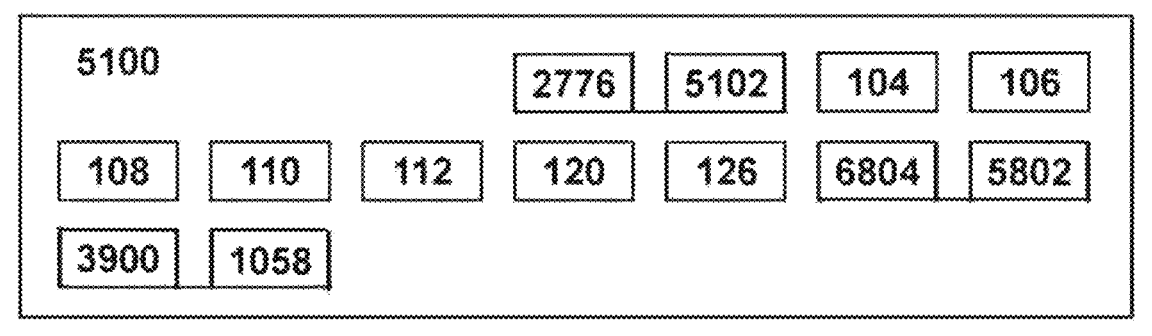

FIG. 51 is a simplified schematic of a system view of upstream parts according to some embodiments of the invention.

Figure 53:
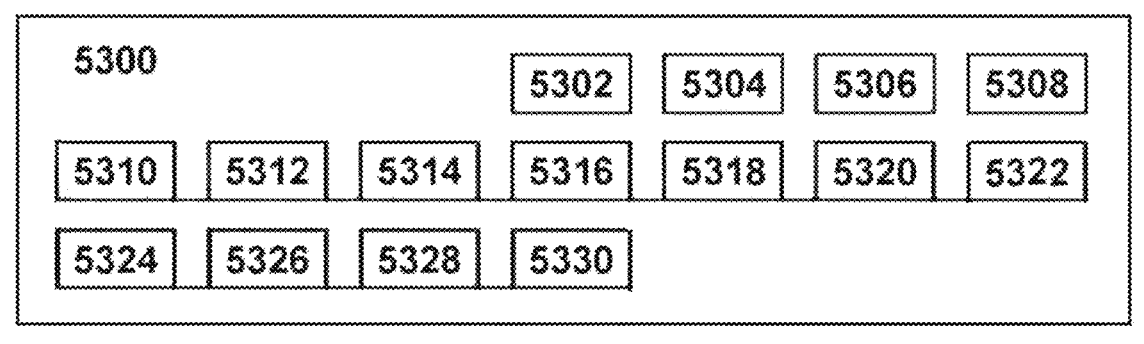

FIG. 53 is a simplified schematic of a system view of accessories according to some embodiments of the invention.

FIG. 54 is a simplified schematic of a system view of medical fluid delivery device with non-occluding plunger according to some embodiments of the invention.

FIG. 58 is a simplified schematic of a system view of medical fluid delivery device with anti-backflow mechanism according to some embodiments of the invention.

Figure 59:
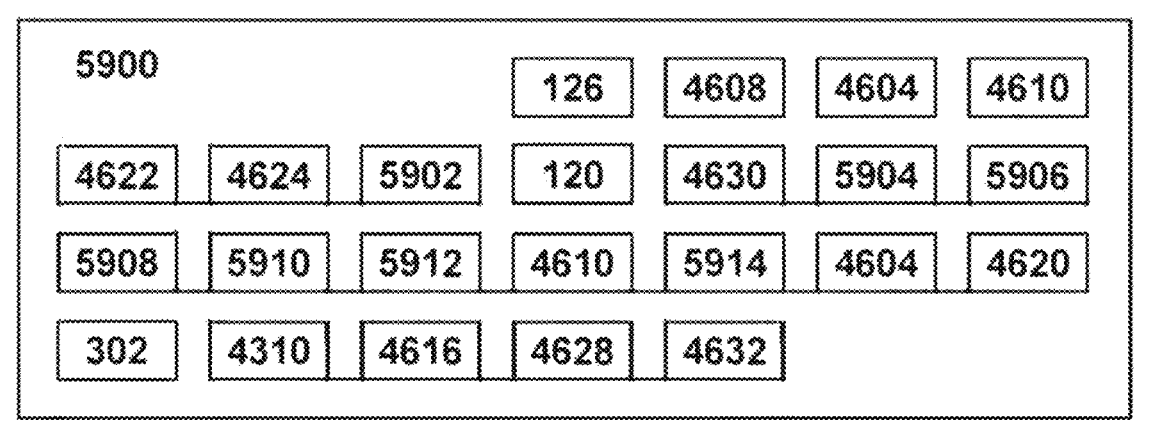

FIG. 59 is a simplified schematic of a system view of medical fluid delivery device with passive gas release according to some embodiments of the invention.

Figure 60:
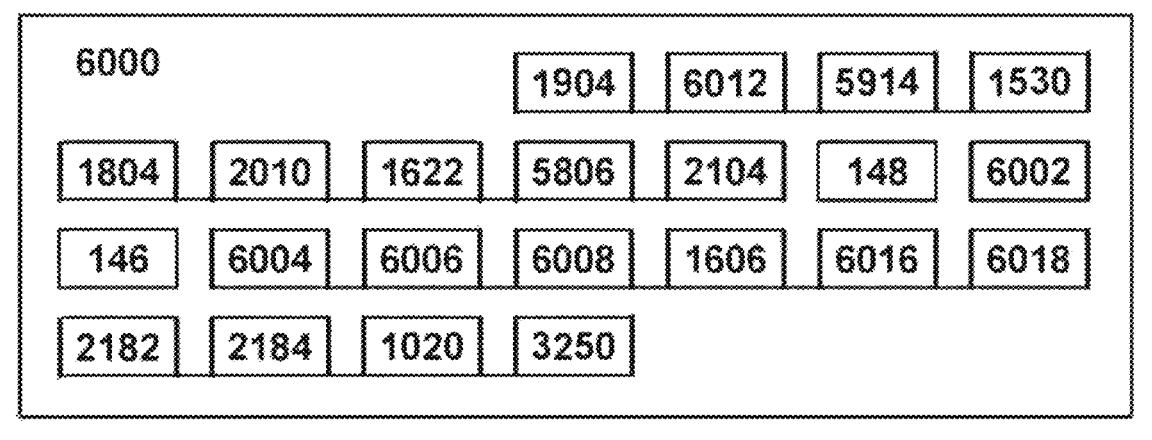

FIG. 60 is a simplified schematic of a system view of medical fluid delivery device with active gas release according to some embodiments of the invention.

FIG. 61 is a simplified schematic of a system view of medical fluid delivery device with continuous flow according to some embodiments of the invention.

FIG. 62 is a simplified schematic of a system view of medical fluid delivery device with guided insertion according to some embodiments of the invention.

FIG. 63 is a simplified schematic of a system view of medical fluid delivery device with self-priming according to some embodiments of the invention.

Figure 65:
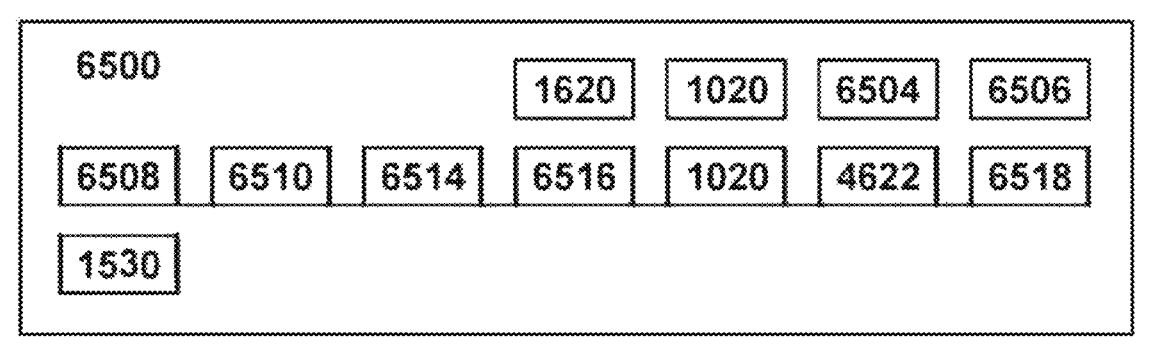

FIG. 65 is a simplified schematic of a system view of medical fluid delivery device with waste reduction according to some embodiments of the invention.

Figure 66:
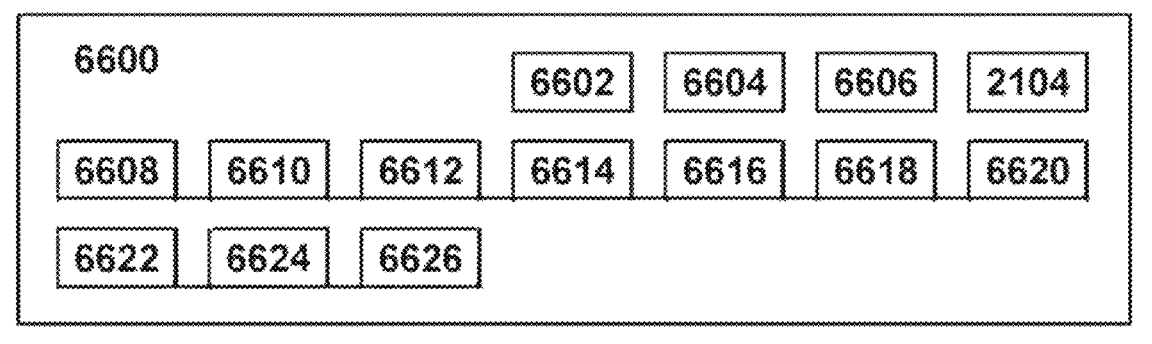

FIG. 66 is a simplified schematic of a system view of medical fluid delivery device with fluid removal mechanism according to some embodiments of the invention.

Figure 67:
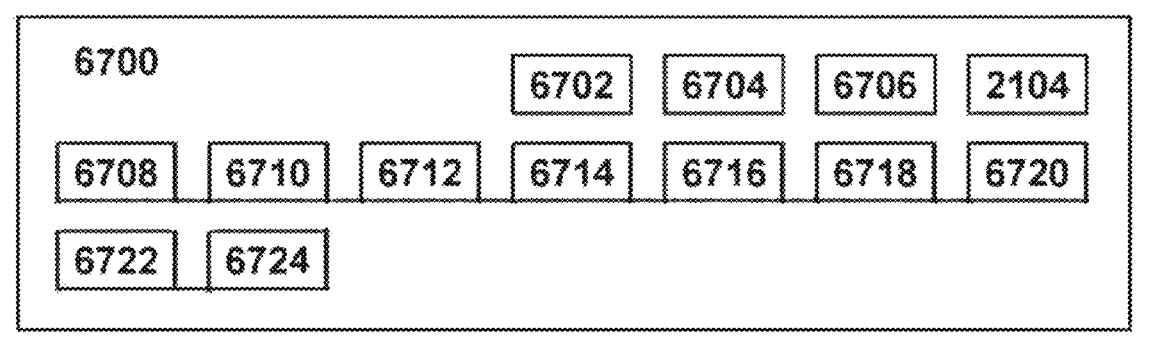

FIG. 67 is a simplified schematic of a system view of medical fluid delivery device with multiple inputs according to some embodiments of the invention.

FIG. 68 is a simplified schematic of a system view of medical fluid delivery device with recirculation according to some embodiments of the invention.

Figure 69:
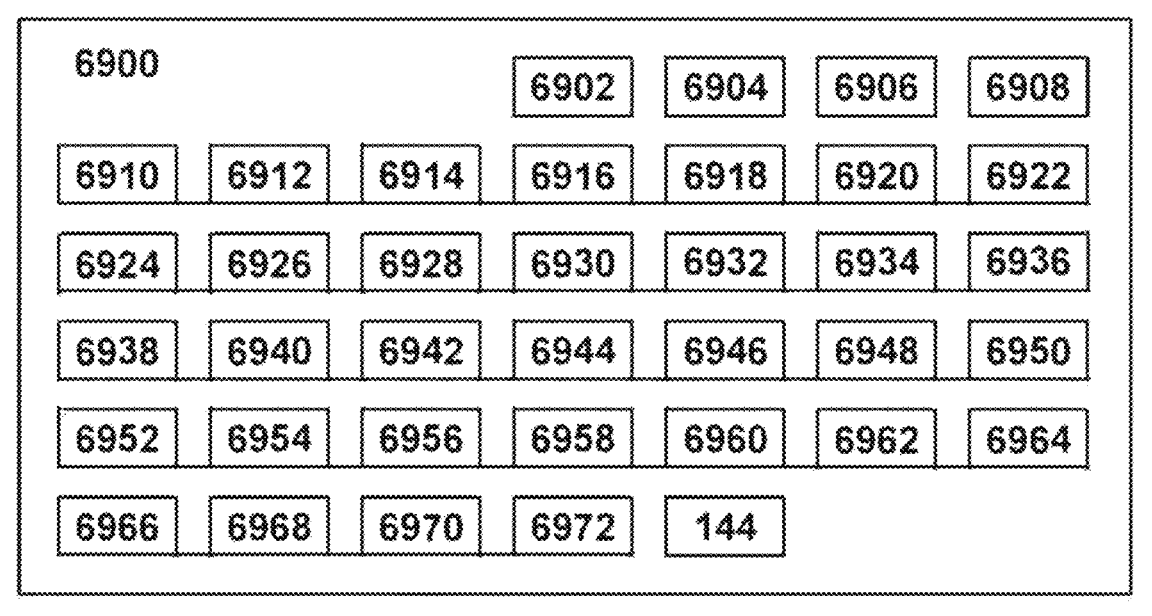

FIG. 69 is a simplified schematic of a system view of medical fluid delivery device with communication according to some embodiments of the invention.

FIG. 74 is a simplified schematic of a system view of reusable assembly according to some embodiments of the invention.

FIG. 75 is a simplified schematic of a system view of reusable assembly according to some embodiments of the invention.

FIG. 110A is a back elevation view of a disposable assembly according to some exemplary embodiments.

FIG. 110B is a sectional view taken along line B-B of FIG. 110A according to some exemplary embodiments.

FIG. 110C is a sectional view taken along line C-C of FIG. 110A according to some exemplary embodiments.

FIG. 110D is a sectional view taken along line D-D of FIG. 110A according to some exemplary embodiments.

FIG. 110E is a detail view of area E of FIG. 110D according to some exemplary embodiments.

FIG. 110F is a sectional view of along line F-F of FIG. 110A according to some exemplary embodiments.

FIG. 111 is a back elevation view of a disposable assembly according to some exemplary embodiments.

FIG. 112A is a back elevation view of a disposable assembly configured with only some portion of the assembly shown to illustrate the heating chamber according to some exemplary embodiments.

FIG. 112B is a sectional view taken along line B-B of FIG. 112A according to some exemplary embodiments.

FIG. 112C is a sectional view taken along line C-C of FIG. 112A according to some exemplary embodiments.

FIG. 113 is a back elevation view of a disposable assembly configured with only some portion of the assembly shown to illustrate the heating chamber and without certain parts that cover some portions of the fluid path such that certain internal surfaces of the fluid path are visible according to some exemplary embodiments.

FIG. 114A is a top plan view of a disposable assembly configured in a rotated position according to some exemplary embodiments.

Figure 114A:
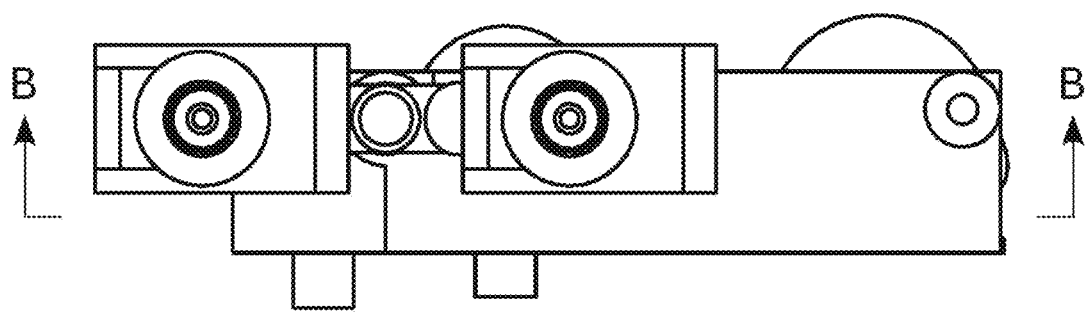
Figure 114B:
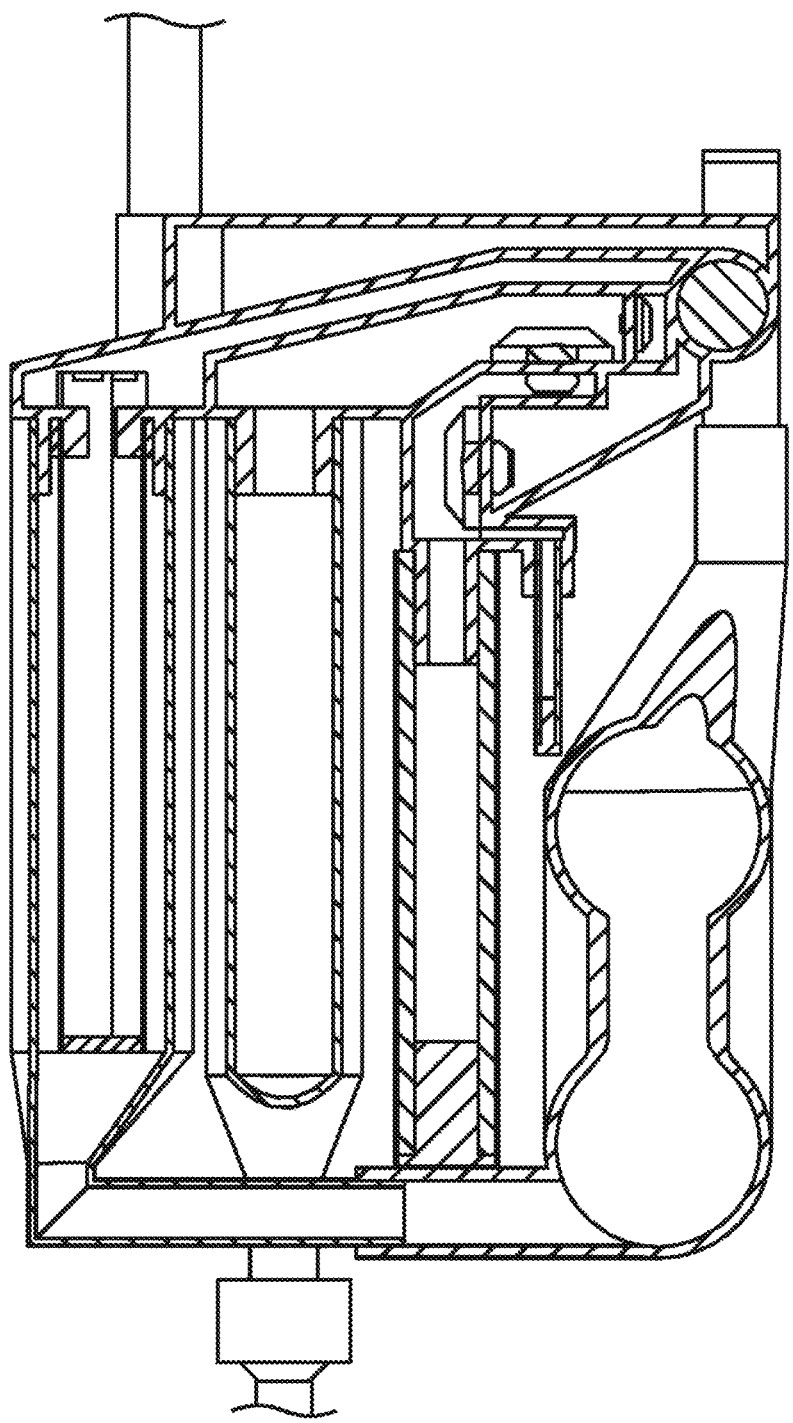

FIG. 114B is a sectional view taken along line B-B of FIG. 114A according to some exemplary embodiments.

Figure 115:
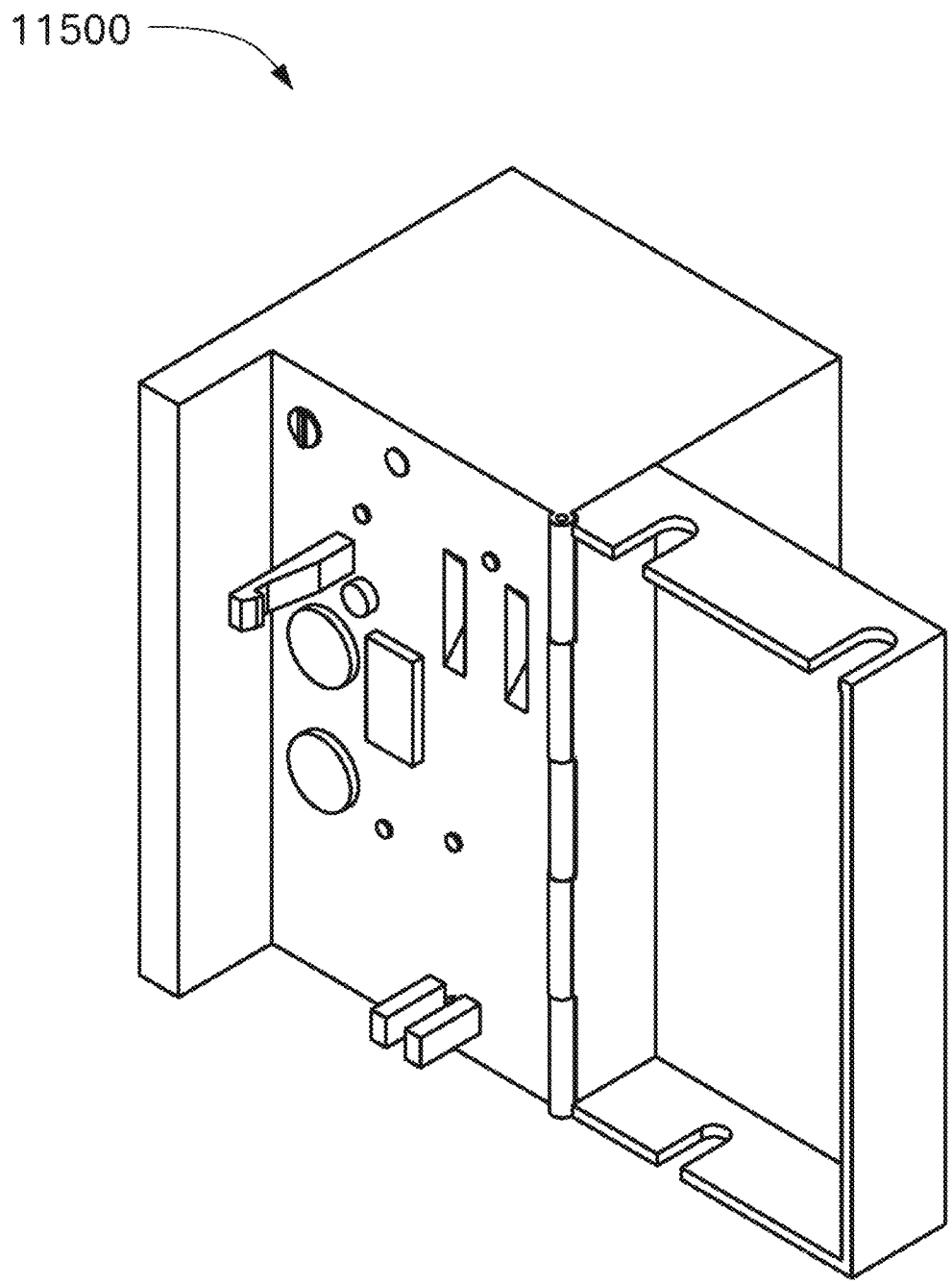

FIG. 115 is a perspective view of a non-disposable assembly configured with a door in a rotated position such that the disposable interface is accessible according to some exemplary embodiments.

Figure 116:
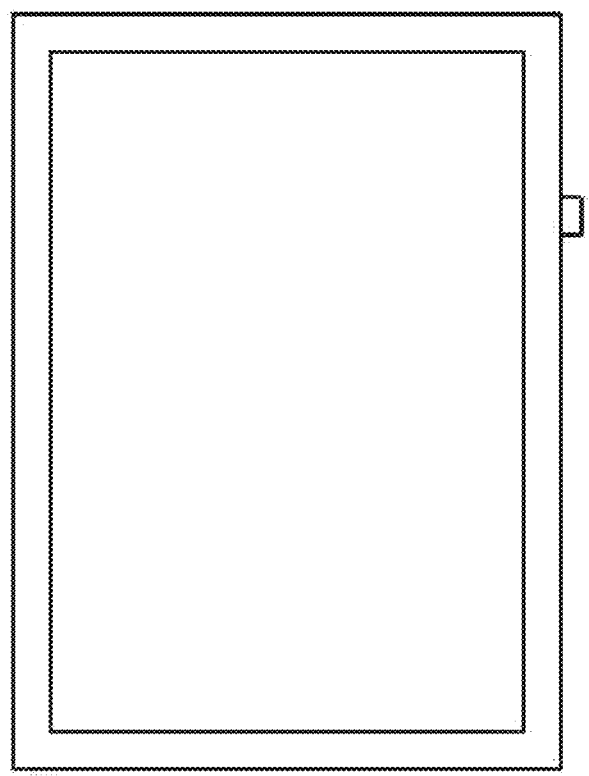

FIG. 116 is a left side elevation view of a non-disposable assembly configured with a door in a rotated position such that the disposable interface is accessible according to some exemplary embodiments.

Figure 117:
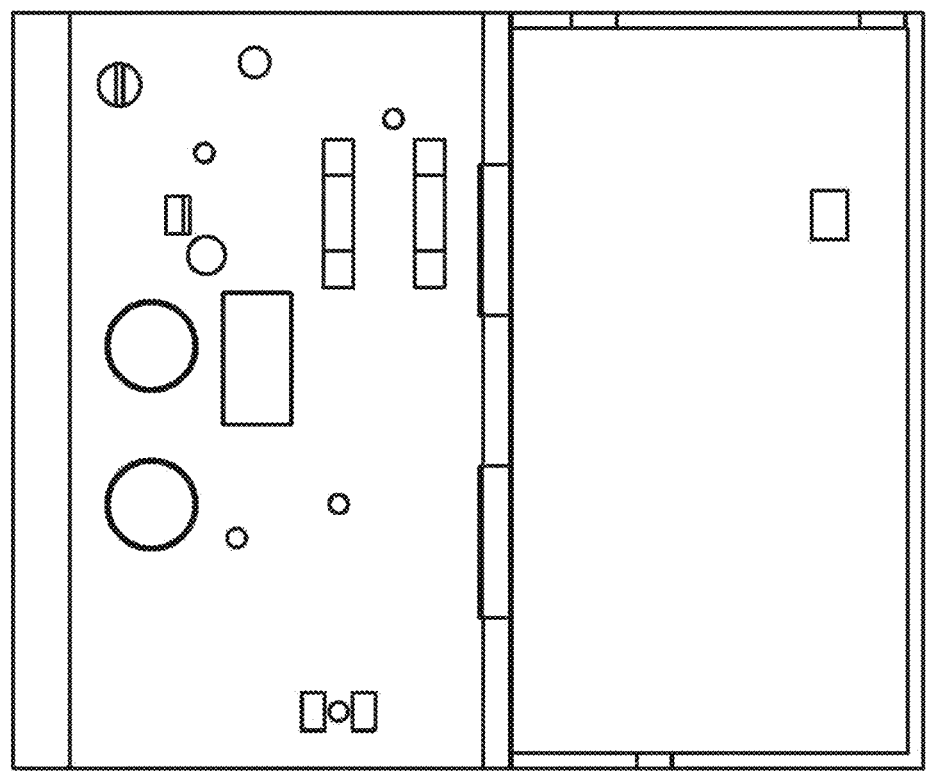

FIG. 117 is a front elevation view of a non-disposable assembly configured with a door in a rotated position such that the disposable interface is accessible according to some exemplary embodiments.

Figure 118:
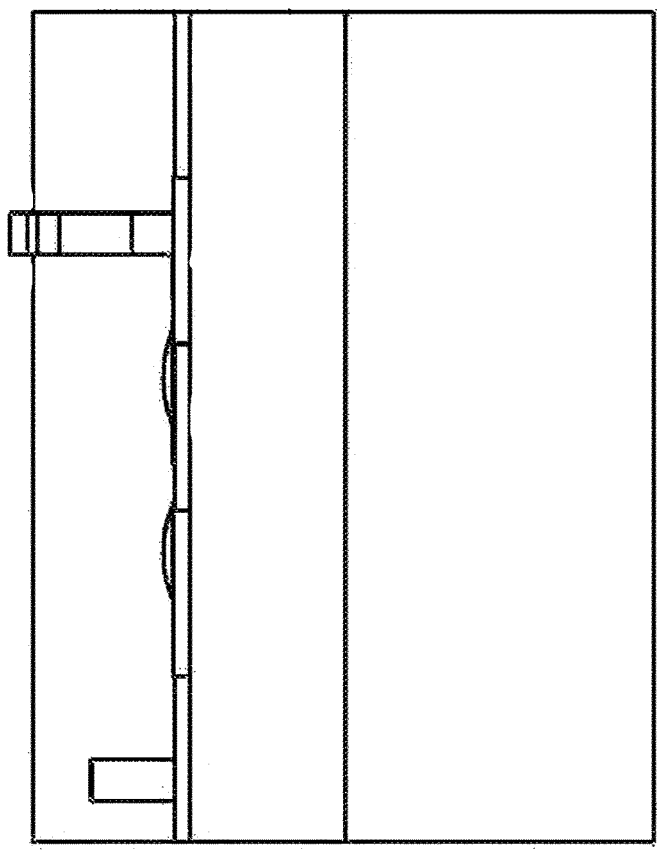

FIG. 118 is a right side elevation view of a non-disposable assembly configured with a door in a rotated position such that the disposable interface is accessible according to some exemplary embodiments.

Figure 119:
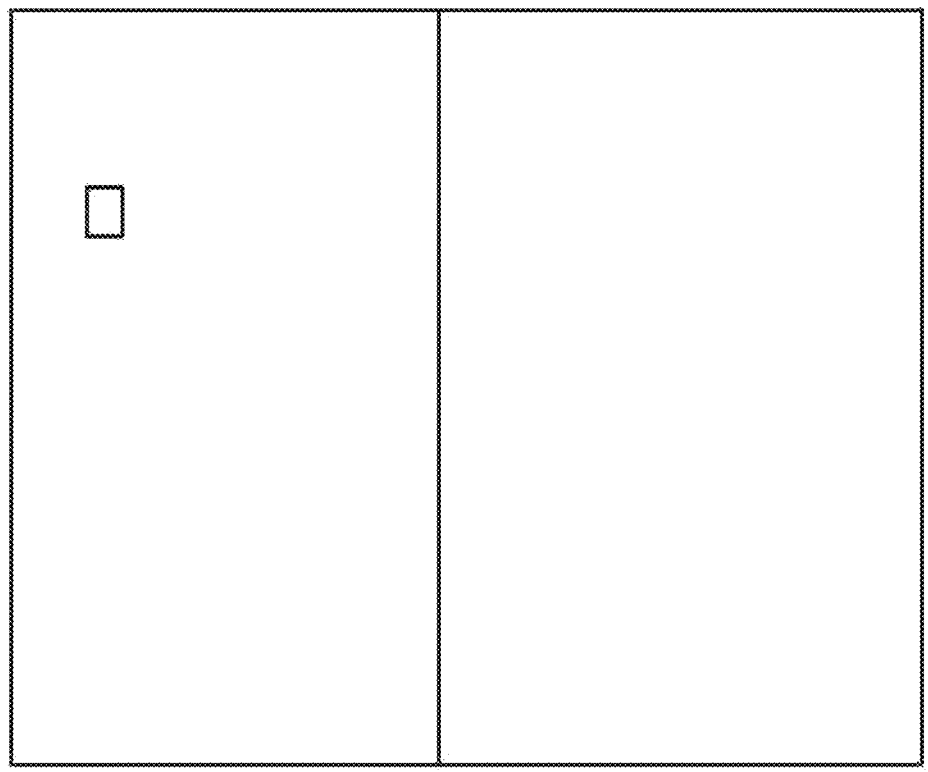

FIG. 119 is a back elevation view of a non-disposable assembly configured with a door in a rotated position such that the disposable interface is accessible according to some exemplary embodiments.

Figure 120:
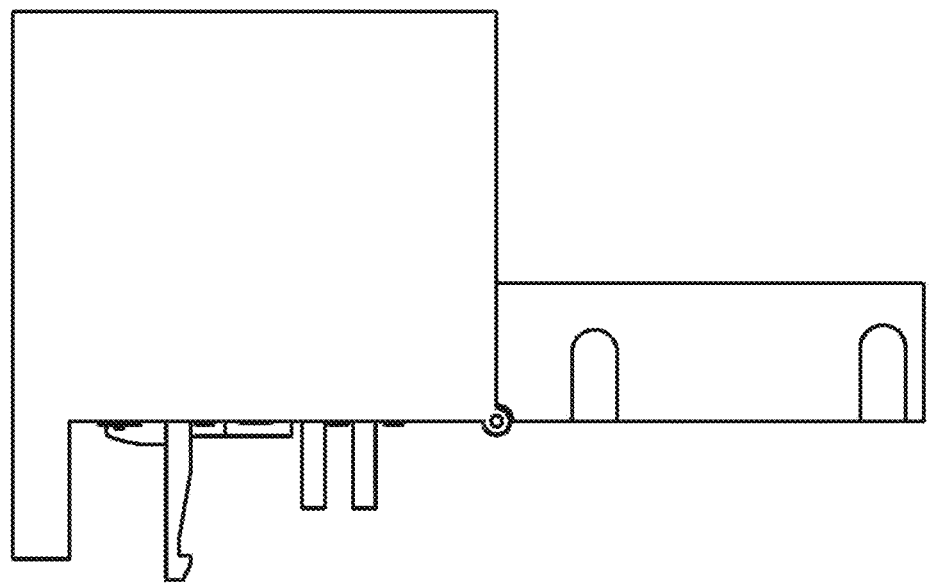

FIG. 120 is a top plan view of a non-disposable assembly configured with a door in a rotated position such that the disposable interface is accessible according to some exemplary embodiments.

Figure 121:
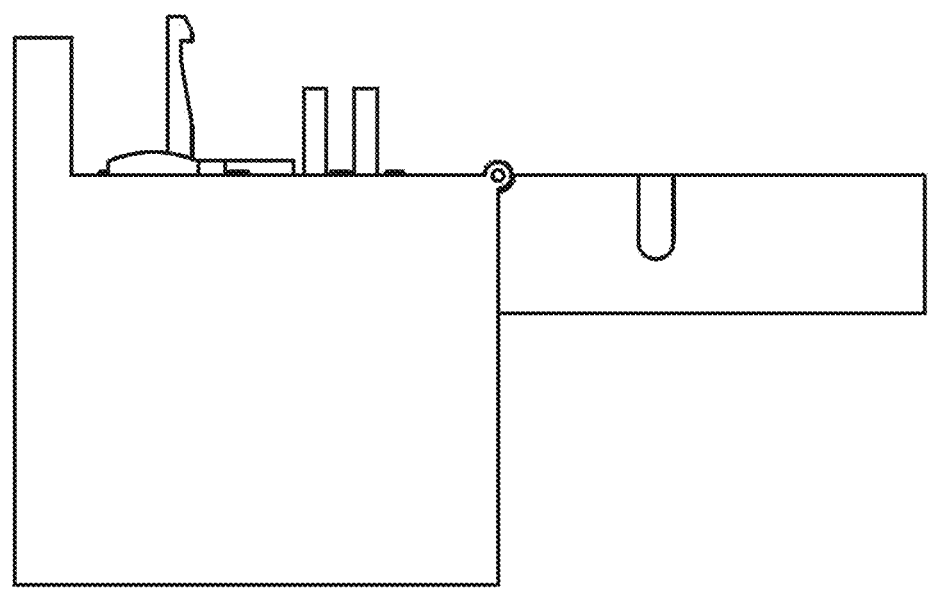

FIG. 121 is a bottom plan view of a non-disposable assembly configured with a door in a rotated position such that the disposable interface is accessible according to some exemplary embodiments.

Like reference numbers represent the same or similar parts throughout.

DETAILED DESCRIPTION

Some embodiments of the present invention are directed to medical fluid delivery devices and methods.

The terms "non-disposable" and "reusable" are used interchangeably herein.

With reference now to the drawings, the device typically comprises one or more of the following components: apparatus comprising reusable and disposable assemblies 100, spike cap 102, upstream spike 104, plurality of upstream conduits 106, one-way valve(s) fitted in conduit upstream of junction of plurality of conduits 108, upstream end of extension conduit 110, upstream conduit clamp 112, downstream end of extension conduit 114, manifold 116, a common downstream conduit 118, upstream hydrophobic membrane assembly 120, passive air exhaust assembly 122, chamber seal, may be overmold 124, upstream chamber 126, recirculation conduit 128, cassette inlet conduit 130, one-way valve assembly 132, reusable housing 134, mounting latch 136, mounting latch guard 140, cassette 142, radiofrequency identification tag 144, conduit disposed in contact with connecting liquid output to an anti-free flow valve 146, integrated free flow protection valve, may be pressure-activated, in-line, downstream of cassette 148, luer connector 150, air intake assembly 202, LCD touchscreen assembly with protective glass or crystal 204, mounting clamp assembly 206, conduit connecting free-flow protection valve to luer connector 208, fluid input port 302, cable connection 304, mounting apparatus rod 306, pumping inlet port 308, filter assembly, optionally hydrophobic 402, opening in cassette for latch 404, left reusable guide wall 406, right reusable guide wall 408, product or regulatory label 502, air cooling 602, hydrophobic membrane at downstream end of set 690, temperature sensor 702, lower left diagonally-sloped side of cassette 802, lower right diagonally-sloped side of cassette 808, semi-circular hooks 814, sterile disposable assembly 900, filter housing upper cap 910, pumping segments 920, cassette includes all connections preassembled 1000, filter membrane 1002, filter overmold 1004, bypass valve for returning fluid to upstream reservoir, may be a stopcock with motor control 1020, upper soft lobe-shaped protrusion for air detection 1022, lower soft lobe-shaped protrusion for air detection 1024, heat-sealed connection between film which is transparent to RF, e.g., polypropylene and chamber 1026, electrically insulating elongated wall(s) parallel to direction of flow forming a conduit 1030, dielectric material between power source and fluid with high dielectric constant and low loss tangent, for example a thin film barrier between each electrode and fluid to be heated to avoid electrode or metal contact with fluid, whereas barrier may be plastic or polymer such as polypropylene 1040, window at downstream of heating chamber for sensing temperature via IR thermometer mounted in reusable device, optionally transparent to IR 1042, keyed groove(s) on either cassette or mounting apparatus and matching protrusion(s) on the opposing device to prevent incompatible cassettes being assembled to given mounting apparatus 1050, upstream port for mounting by solvent bonding of pumping tube 1052, second upstream port for mounting by solvent bonding of pumping tube 1058, flexible conduit comprising an upstream and a downstream one-way valve, may be a plurality of conduits with at least two of the conduits each comprising at least one upstream and at least one downstream valve 1060, downstream ports for mounting by solvent bonding of pumping tube 1062, protrusions for aligning mounting ports with cassette 1064, diagonally sloped ceiling of air trap 1066, window at upstream of heating chamber for sensing temperature via IR thermometer mounted in reusable device, optionally transparent to IR 1068, second flexible conduit comprising an upstream and a downstream one-way valve 1070, opposite surface serving as an anvil for compression of conduit 1080, cassette right wall 1090, pumping mechanism which does not mechanically damage or activate the molecules 1100, internal end of mounting latch with attachment for spring 1102, translational guide for plungers 1104, elongated protrusions from plungers 1106, bias springs for maintaining contact between plunger assembly and cam 1108, stiff structure for aligning disposable and reusable portions of pumping mechanism 1110, geared motor for driving pumping mechanism 1114, timing belt for connecting motor to cam shaft while reducing gear vibration 1116, timing wheel for gear output shaft 1120, timing teeth 1122, timing wheel for cam shaft 1124, upper portion of stiff structure for aligning disposable and reusable portions of pumping mechanism 1126, axle for mounting latch 1128, cassette left wall 1210, semi-circular groove formed by hooks 1420, chamber with sufficient height, width and depth to allow buoyant forces to separate, entrap and store air bubbles from flowing liquid and/or to allow heating of liquid 1530, air trap 1540, second opposite surface serving as an anvil for compression of conduit 1550, Inner wall of viscoelastic conduit 1552, conduit for transporting fluid from chamber to recirculation conduit 1560, Inner wall of second viscoelastic conduit 1562, one-way valve housing 1568, air release mechanism 1600, one-way valve outlet port 1602, one-way valve membrane 1606, openings in membrane 1608, conduit connecting filter to air intake port 1618, gas intake port 1620, gas output port 1622, port connecting valve to conduit for transporting fluid from chamber to recirculation conduit 1626, wall separating chamber from conduit for transporting fluid from chamber to recirculation conduit 1628, stopcock housing with ports 1630, conduit connecting stopcock to one-way valve 1638, environment 1700, battlefield 1702, point of injury 1704, ambulance 1706, airplane 1708, helicopter 1710, ship 1712, field hospital 1714, hospital 1716, blood bank 1718, trauma bay 1720, hallway 1722, emergency room 1724, imaging suite 1726, nurse station 1728, operating room 1730, oncology suite 1732, patient room 1734, patient bed 1736, inlet conduit(s) 1802, fluid input port 1804, self-closing valve, for example similar to a heart valve 1830, second self-closing valve 1840, Connectivity network 1900, Wi-Fi network 1902, cellular communication network 1904, Bluetooth network 1906, GNSS network 1908, Wi-Fi module 1910, Bluetooth module 1912, BLE module 1914, cellular module 1916, GNSS module 1918, other cellular device 1920, RFID reader and tag in reusable device 1922, fluid outlet port 2010, port connecting chamber to conduit for transporting fluid from chamber to recirculation conduit 2020, heating mechanism for example by ohmic radiofrequency 2100, electrical power source 2102, controller 2104, power source providing alternating current 2106, reusable EMI/RFI shield or Faraday cage 2108, upstream electrode, metal electrodes may be part of non-disposable portion and not part of disposable 2110, additional electrodes positioned along fluid flow path 2112, disposable EMI/RFI shield or Faraday cage 2114, dielectric window between upstream electrode and dielectric film of disposable for example from sapphire or glass or plastic 2115, dielectric windows, for example from sapphire or glass or plastic 2116, dielectric window between downstream electrode and dielectric film of disposable for example from sapphire or glass or plastic 2117, downstream electrode disposed apart from upstream electrode along the direction of fluid flow, metal electrodes may be part of non-disposable portion and not part of disposable 2120, grounding apparatus made from conductive material in contact with fluid to provide grounding and prevent leakage current, for example to patient 2130, reusable grounding apparatus in contact with fluid-contacting disposable grounding apparatus to provide grounding and prevent leakage current, for example to patient 2132, patient 2140, temperature sensor at fluid input or upstream of electrodes 2150, temperature sensor, for example at fluid output or downstream of electrodes 2160, power factor correction module, for example Advanced Energy's Artesyn 2.4 kW AIF06ZPFC series 2162, RF power MOSFET for example Microchip Technology DRF1510 or NXP MRFX1K80H 2170, cooling system 2172, power management system 2174, bag or reservoir 2176, battery system 2180, one or more detectors to differentiate between gas and liquid within the chamber, may be ultrasonic and may be at upper liquid limit level 2182, one or more detectors to differentiate between gas and liquid within the chamber, may be ultrasonic and may be at lower liquid limit level 2184, fluid types to be pumped and/or heated 2300, blood bag 2302, saline 2304, crystalloid fluids 2306, chemotherapy fluids 2308, colloid fluids 2310, blood products 2312, whole blood 2314, packed red blood cells 2316, plasma 2318, artificial plasma 2320, powdered plasma 2322, powdered artificial plasma 2324, platelets 2326, red blood cells of a particular blood type 2328, red blood cells of a particular Rh factor 2330, total parenteral nutrition 2332, enteral nutrition 2334, IV medication 2336, disposable Faraday cage 2520, single mechanism actuating multiple plungers with a phase-shift between the plunger motions 2650, sensor or detector, for example, a microswitch or reed switch, to automatically switch the power on when set is inserted into mounting apparatus 2710, camshaft 2720, reciprocating plunger, with motion that may be transverse to conduit, may be independent and individually activated 2730, parallel pumping cells which are synchronized to provide continuous flow including overlapping flow at the end of one pumping cell delivery and the beginning of another pumping cell delivery 2810, second reciprocating plunger, with motion that may be transverse to conduit 2830, ball bearings 2840, cams 2850, reusable assembly 3200, force or pressure sensor 3230, second force sensor 3240, motor control for stopcock 3250, mounting apparatus 3260, one or more detectors to differentiate between gas and liquid before delivery to patient, may be ultrasonic 3402, one-way valve(s) fitted in conduit upstream of junction of plurality of conduits 3900, filter assembly with passive air release 4200, filter housing fluid outlet port 4310, one-way valve prevents intake of air and allows release only 4604, float housing 4606, float buoyant material 4608, buoyancy-actuated valve, may be levered float sealing tip valve or buoyant plug which stops most liquid from escaping 4610, exhaust sealing orifice 4612, gas release port 4616, exhaust valve upper cap 4618, exhaust conduit serving as chamber between valves hydrophobic membrane captures liquid which did manage to pass levered valve or buoyant plug 4620, filter with high surface area, for example for particulates in blood 4622, filter chamber housing wall 4624, support receptacle 4626, lever 4628, air-eliminating chamber 4630, pivot for lever 4632, exhaust assembly 4650, filter support structure 4702, more surface area by folding 4760, manifold assembly 5000, upstream parts 5100, upstream luer connector 5102, medical fluid delivery device with fluid detector 5200, conduit 5210, detector 5212, liquid test indicator 5214, sensor 5218, apparatus which measures blood type of potential donor and/or potential recipient (as in a walking blood bank) as part of the blood donation set or not 5220, communication between donor sensor and receiver sensor for example via the delivery device in order to prevent incorrect cross-matching 5222, sensor which measures blood type of intended recipient as part of the blood transfusion set or not 5224, fluid measurement device 5226, fluid delivery device 5228, accessories 5300, cradle 5302, patient monitor 5304, multi-device rack 5306, pendulum rack 5308, battery pack 5310, protective box 5312, device bag 5314, arterial pressure monitor 5316, electrocardiogram system 5318, blood pressure monitor 5320, blood oxygen monitor 5322, pulse oximetry 5324, power cable 5326, battery pack charger 5328, body temperature monitor 5330, medical fluid delivery device with non-occluding plunger 5400, infusion system(s) 5502, computer configured to perform control functions 5602, computer configured to perform real time operating system functions 5604, computer configured to perform user interface functions 5606, computer configured to perform communication system functions 5608, computer configured to perform watchdog system functions 5610, disposable devices 5700, pouch 5702, high-flow blood set 5704, medium-flow blood set 5706, non-blood set 5708, hyperthermia set 5710, hypothermia set 5712, hydration set 5714, medical fluid delivery device with anti-backflow mechanism 5800, at least one upstream conduit longer or of larger inner diameter or of lower flow resistance than at least one other upstream conduit 5802, at least one of the one-way valves with a higher cracking pressure than at least one other one-way valve 5804, camera or detector or sensor to determine the temperature or whether the valve is open or whether the conduit contained gas versus liquid 5806, additional valve(s) disposed to occlude any of the upstream conduits whereas the valves may be contained in a pumping mechanism or housing to which the conduits can be installed or assembled to occlude any of the conduits 5808, additional junction(s)/y-site(s) for needle-free injection of fluid into any of the conduits 5810, one-way valves assembled directly as part of the spike assembly used to connect to a bag or reservoir 5812, medical fluid delivery device with passive gas release 5900, heating mechanism 5902, air sensor 5904, temperature sensor 5906, magnetic sensor outside chamber to determine whether valve is open or closed 5908, magnet inside float 5910, automatically closed connector 5912, azimuth sensor ensures pumping only when upright 5914, medical fluid delivery device with active gas release 6000, plurality of valved inputs with or without mechanical, electronic and/or software control 6002, a valved conduit connected to the gas output 6004, valves 6006, hydrophobic membrane 6008, accelerometer or azimuth detector 6016, audible or visual indicator to ensure device is positioned upright 6018, medical fluid delivery device with continuous flow 6100, one-way bearing 6102, medical fluid delivery device with guided insertion 6200, multiple cassette types capable of insertion into a single mounting apparatus 6202, cartridge with integrated fluid reservoir 6204, medical fluid delivery device with self-priming 6300, medical fluid delivery device with feedback 6400, pump algorithm uses inline pressure combined with clinical input from GUI and/or external devices to regulate flow for safe blood volume 6402, sensor for any of the following: force, pressure, temperature, humidity, urine, hemoglobin, oxygen, ketosis, blood glucose level, blood pressure, blood gas saturation, pulse oximetry, N-title CO2, EKG monitor 6450, medical fluid delivery device with waste reduction 6500, gas intake valve 6502, downstream liquid outlet 6504, upstream fluid inlet 6506, filter chamber 6508, one-way valve 6510, hydrophobic membrane 6512, large height separation 6514, sensor at high and low point 6516, pumping mechanism 6518, medical fluid delivery device with fluid removal mechanism 6600, conduit 6602, multi-port valve with at least three ports 6604, pumping mechanism 6606, waste container 6608, filtered chamber 6610, color sensor 6612, optical sensor 6614, bag for waste 6616, one-way valve 6618, valve(s) with automatic closure upon disconnection 6620, vial or test tube to contain fluid sample 6622, fluid heating mechanism 6624, multi-port valve for computer controlled fluid removal during infusion 6626, medical fluid delivery device with multiple inputs 6700, conduit 6702, multi-port valve with at least three ports 6704, pumping mechanism 6706, multiple fluid sources 6708, filtered chamber(s) 6710, color sensor 6712, optical sensor 6714, bag for waste 6716, one-way valve 6718, valve(s) with automatic closure upon disconnection 6720, fluid heating mechanism 6722, multi-port valve for computer controlled fluid input selection during infusion 6724, medical fluid delivery device with recirculation 6800, conduit 6802, upstream chamber 6804, multi-port valve 6806, actuator 6808, downstream valve operated by pressure or other actuation method 6810, battery for warming fluid 6812, fluid heating mechanism 6814, multiple chambers 6816, gas vent 6818, thermal insulation 6820, baffles for mixing fluid 6822, downstream valve operated by pressure or other actuation method 6824, medical fluid delivery device with communication 6900, disposable cassette 6902, fluid conduit and an encoded label or tag or marking or color 6904, non-disposable pump 6906, label- or tag-reading detector 6908, NFC tag 6910, NFC reader 6912, health system database 6914, wireless transceiver communicating with the health system database 6916, remote receiver 6918, non-disposable pump 6920, wireless transmitter 6922, wireless receiver 6924, detector 6926, vital sign detector 6928, infusion pump 6930, health system database 6932, remote alarm 6934, remote buzzer 6936, remote speaker 6938, remote visual display 6940, remote warehouse management system 6942, disposable cassette 6944, encoded label or tag or marking or color 6946, a label- or tag- or marking- or color-reading detector 6948, user interface 6950, touchscreen 6952, chatbot 6954, Wi-Fi and/or cellular modem installed 6956, remote receiver 6958, detector to differentiate between gas and liquid 6960, embedded wireless connectivity 6962, monitoring 6964, geolocation 6966, bar code(s) 6968, embedded wireless connectivity 6970, monitoring 6972, computers configured to perform delivery of medical fluids 7000, medical fluid delivery device with a particular cross-section 7100, pumping mechanism 7102, conduit 7104, double wall conduit with gas-filled lumen insulating inner lumen 7106, UV protection 7108, gas permeability protection 7110, anti-tear construction 7112, inner section with biocompatible materials 7114, outer section with stronger material 7116, fluid heater 7118, flow sensor 7120, heating mechanism 7122, pumping mechanism 7124, insulation 7126, medical fluid delivery device that transfers fluid from one patient to the same patient or another patient 7200, pumping mechanism 7202, input conduit 7204, output conduit 7206, medical fluid delivery device with free-flow protection 7300, user interface 7402, mounting clamp 7404, power cable port 7406, power cable hook 7408, cooling air openings 7410, enclosure 7412, control panel 7414, eject lever 7416, slot for disposable 7418, keyed groove(s) on either cassette or mounting apparatus and matching protrusion(s) on the opposing device to prevent incompatible cassettes being assembled to given mounting apparatus, 7420, multiple cassette types capable of insertion into a single mounting apparatus 7422, cartridge with integrated fluid reservoir 7424, pressure sensor 7426, ultrasonic air detector 7428, pumping mechanism 7430, heating mechanism for example by ohmic radiofrequency 7432, air trap 7434, air release mechanism 7436, air inlet 7438, fluid outlet 7440, ventilation openings 7442, carry handle 7444, power cord connection 7446, mounting clamp 7448, product or regulatory label 7450, pumping mechanism 7452, speaker port 7454, second speaker port 7456, buzzer port 7458, microphone port 7460, electronics subsystem 7490, MCU 7502, air sensors 7506, pressure sensors 7508, alarm system 7512, LEDs 7514, wireless system 7516, motor driver(s) 7518, encoder(s) 7520, index 7522, real-time clock 7524, supercap 7526, touchscreen 7528, RF heating system 7530, RFID reader 7532, speaker 7534, second speaker 7536, buzzer 7538, microphone 7540, rechargeable battery 7542.

It is noted that some embodiments of the device include only a portion of the above-described components, and the scope of the present disclosure includes the use of one or more of the above-described components in a medical fluid delivery device, in the manner described herein.

Typically, the method associated with the disclosed device includes at least some of the following steps: prevents backflow; passively releases gas; heats medical fluid; does not non occlude the pumping conduit by means of the pumping plungers; provides continuous delivery flow of medical fluid; enables guided insertion; provides self-priming; collects and uses feedback; detects fluid; actively releases gas; reduces medical fluid waste; removes fluid; accepts multiple inputs; recirculates the medical fluid; communicates wirelessly; transfers fluid from one patient to the same patient or another patient; prevents free-flow upon removing the disposable from the reusable portion; filters; fluid flows through one-way valve; fluid flows via conduit to junction with additional upstream conduit(s) and downstream conduit; fluid is prevented from flowing upstream past one-way valve(s) in additional upstream conduit(s); when the conduits are outside of the pumping mechanism; the one-way valves prevent hydrostatic pressure induced mixing of the liquids from different upstream conduits; once the conduits are installed within a pumping mechanism or housing, each upstream can be opened or closed individually to enable coordinated flow at a desired intermittent or alternating or sequenced timing, positive differential pressure is applied to the reservoir by gravity/head height or squeezing of the reservoir; closure of upstream openings during manufacturing rather than as a step required of the user in the clinical setting; fluid level increases or decreases, valve opens or closes; chamber is empty and upright; liquid enters the chamber; weighted buoy rises; controller determines that pump is disposed upright based on data from accelerometer, gyroscope, and magnetometer; pumping to stop if device is not vertical; removal of air from downstream chamber (e.g., heating chamber) to upstream chamber (e.g., filter chamber); float can plug an opening with a small hole whose plane is oriented at the large angle with respect to the horizon in order for the smallest possible force to be exerted upwards upon the float to ensure that the float can drop downwards upon the liquid level dropping without the pressure force keeping the float suspended; heat fluid; measure temperature of fluid inside or downstream of conduit; heat medical fluid while flowing or while not flowing; measure fluid temperature at conduit input to more rapidly/closely control the output temperature by varying the electrical power flowing across the conductive plates; stop the flow; measure impedance/resistance/temperature and tune the impedance of the electrical power source to match the load and/or achieve optimal transmission or heating efficiency; pump fluid; measure fluid temperature; release entrained air; apply power source pump fluid; measure fluid temperature; RF ohmic heating with current flowing substantially; in parallel to fluid flow; plunger motion compresses the conduit; measure pressure within conduit; non-occluding plunger which does not bottom out displaces fluid from between two one-way valves towards downstream and creates suction of fluid from upstream into the conduit section which is between the two one-way valves; sequential delivery of fluid from one out of the plurality of conduits followed by another of the plurality of conduits; mix fluids from a plurality of containers at a desired volumetric ratio, multiple pumping plungers where one of the plungers delivers fluid through one lumen, for example for irrigation, and the other plunger provides suction through another lumen, for example, to remove waste/fluid from patient; sequential delivery of fluid from one out of the plurality of conduits followed by another of the plurality of conduits; guide the cassette towards the mounting apparatus by placing the outward facing walls between the opposing guide walls, engage groove of cassette with rod(s) on mounting apparatus, rotate cassette about rod(s) to cause latch to secure cassette to mounting apparatus; quick removal of cassette from mounting apparatus; insertion of cassette into pump triggers priming of liquid through disposable; insertion of cassette into pump triggers priming of liquid through disposable or prompt user to choose whether to start priming; sensors are used to measure the progress of liquid; hydrophobic membrane is used to stop flow at patient end without leaving air; remove air from liquid prior to allowing liquid to enter downstream tubing; then automatically begin filling downstream tubing without need for user interaction; sense pressure during priming process at rates above 400 milliliters per minute; perform measurement using sensor, process measurement for example by comparing with desired set point; deliver fluid by pumping; change delivery rate; stop delivery; start delivery; change ratio of delivered fluids; sound alarm based on length of time at a particular range of sensor values; deliver continuously; delivery intermittently; change pressure; change flowrate; reduce flowrate of medical fluid delivery automatically based on vital signs; detect fluid property; check blood ABO type; check pH level; check fibrogen or hemoglobin or oxygen or toxin or ketosis level in fluid; identify fluid type, decide whether to perform delivery; fluid enters chamber, gas bubbles collect in the upper portion of the chamber, valve opens to release gas opens and closes the gas escape valve to force the gas to escape thereby enable liquid delivery free of gas bubbles; dispose some fluid as waste; flush or purge chamber with a particular fluid type; separate gas from liquid; separate dense liquid from less dense liquid; capture noxious, poisonous gas; circulate fluid back to original reservoir after heating or cooling or testing for type or measuring temperature; release downstream pressure to prevent unintended bolus; monitor height of gas-liquid interface; open gas intake valve releasing vacuum lock; release liquid; detect gas in fluid conduit; close gas intake valve; allow air intake; intake of gas upon depletion of fluid reservoir; fluid is pumped from fluid source toward the patient; valve is then operated to redirect fluid to second output thereby for example removing waste or a fluid sample to be tested; sense type of fluid entering valve; remove fluid from infusion line; fluid is pumped from fluid source toward the patient, valve is then operated to redirect fluid to second output thereby for example removing waste or a fluid sample to be tested; sense type of fluid being delivered to patient; flush the remaining volume of a first fluid type from within a conduit by toggling to another fluid source and displacing the first fluid towards the patient; mix between multiple compatible fluid types or drugs at any desired ratio to be delivered to a patient; toggle between infusion line sources; set valve output to deliver fluid back to an upstream reservoir; pump fluid; heat fluid; reconstitute powder in liquid; downstream valve operated by pressure or other actuation method prevents flow of fluid towards patient which multi-port valve is set to connect at least one of its outputs to an upstream chamber such that even when pumping mechanism is operated the pressure that builds is low enough that it does not induce fluid flow towards patient rather only upstream towards chamber; engage disposable cassette with non-disposable pump; read or scan label/tag; pump liquid into downstream conduit of at least a length known to pump based on identification of the disposable type; once detector finds that in the upstream conduit there is mainly gas instead of liquid, the pump continues to pump gas of a volume no greater than the designed downstream volume as stored in a database of the design parameters for the identified set; scan geometric pattern, for example patient wristband, detect, calculate, determine, analyze, store, indicate, monitor, alarm, notify, and/or transmit geo-location, inventory data, clinical data, fluid type, test results, calibration data, damage, error state, impact, request a replacement pump, disposable, spare part; cause the fluid delivery device to default to a, be programmed to a, or limit a range for delivery duration, date, time, volume to be delivered, flow rate, allowed users, allowed user types, prevent use of expired or unsafe or recalled or incompatible disposables, limit fluid type, provide preset default values for delivery, scan data from fluid container for example blood type, expiration date, communicate relevant data to management software; automatically record and manage usage of disposables by type and/or location; delivery of fluid to a patient; transfers sterile fluid in one direction and waste separately in the other direction, multiple fluid sources are pumped and flow within an extruded tube with multiple downstream from pump, multiple pumping plungers where one of the plungers delivers fluid through one lumen, for example for irrigation, and the other plunger provides suction through another lumen, for example, to remove waste/fluid from patient; insulates fluid from environment; remove blood from a patient, heat and then return the blood at a higher temperature, heat a blanket with fluid, suction of fluid from bags, replaces removed fluid from one patient to another; prime conduit with liquid; pressure activated valve prevents free flow; transfusion heating; spike one or more medical fluid bags; prevent reverse flow; release entrained air; filter out particles; then pump; detect entrained air at two or more levels; remove air; then measure fluid temperature; then heat; then measure fluid temperature; then remove air after heating; detect entrained air; release entrained air; prevent free flow; insulate fluid from environment; deliver fluid to patient; no clogging upon contact with blood; no height difference limitations; no minimum activation pressure; no cavitation due to flow resistance; no significant pressure required to prime; backpriming for unused line not needed; large molecules and blood are not damaged/hemolyzed, once reservoir is connected to set the fluid cannot escape to environment rather only to downstream intended destination; can be used repeatedly during a treatment without clogging and means for releasing gas to the ambient environment despite a higher pressure in the chamber compared with the pressure in the ambient environment and it provides a means for releasing gas which does not allow the liquid to come in contact with a hydrophobic membrane during normal use thereby preventing liquids from clogging any hydrophobic membrane; does not cause significant radio transmission compared with microwave or wireless RF heating and transfers energy from a non-disposable portion of the device to a disposable portion of the device without contact resistance between the non-disposable and disposable portions and, heat any conductive fluid; valve are not closed by an occluding or impinging finger; high volume delivery under a wide range pressures, accurate delivery under a wide range of temperatures we can stop and pump slowly with low pressure to remove in-line air even automatically or to purge line and then resume continuous flow; can produce continuous flow thereby maximizing the flow rate for a given flow restriction or pressure limit; pump at stable pressure despite compliance of downstream conduit; intake at high flow is split in the time-domain into more than one sequential suction actions thereby reducing the negative pressure needed and then damage to fluid components and cavitation and associated gas bubbles; bigger pumping chamber volume, split intake to two volumes to allow more time for vacuum to dissipate completely and less deep vacuum needed; one-click infuser set up; priming or user prompt for priming occurs automatically upon insertion of cassette into mounting apparatus; clinician can tend to patient while pump automatically performs priming sequence, pump can automatically mix between fluid types;

smart prime sensing; can use arterial pressure readings to control how much fluid to deliver or when to stop when permissive hypotension is clinically desired for example due to active hemorrhage or prevent waste of fluids; identification of type and properties and quality of fluid to be administered; monitoring of high and low levels to determine timing for opening valve; provide tall chamber for natural gas separation before actively opening gas release valve; monitoring of high and low levels to determine timing for opening valve; removes fluid or waste or debris from in-line fluid path without disconnecting patient or fluid source; toggle as many times as needed between fluid sources without disconnecting patient or fluid source; when treatment is stopped of low flow only is needed; fluid can be recirculated intermittently to keep it fresh, warm, filtered, or heat in multiple cycles; set identified by pump and automatic restockability; manage inventory; insulates warmed fluid from cooler environment; patients are not harmed due to entrained air and fluid free flow; faster to set up; cheaper to make; easier to use; fewer parts; no clogging of hydrophobic membrane upon contact with blood; no height difference limitations; no activation pressure; no cavitation due to flow restrictions; no pressure priming; no backprime needed for unused line since volume after valves is minimal; all molecules of all sizes without damage or hemolysis; pump blood; shut off flow of fluid when pumping mechanism is not connected to disposable; fluid enters chamber; particles are removed; particle-free fluid exits chamber; valve opens upon pumping mechanism producing over 0.3 bar; remove air in parallel to filtering fluid; enables a walking blood bank and transfusions in locations that do not have a blood supply and enables portable hyperthermia treatment; no manual clamping is necessary; filter allows longer term usage without clogging; enables blood type testing directly preceding heated transfusion; enables removal of set from pumping mechanism without clamping; enables creation of folded structure when manufacturing filter assembly.

It is noted that some embodiments of the method include only a portion of the above-described steps, and the scope of the present disclosure includes any performing any one of the above-described steps in the manner described herein.

Additional Information

The present disclosure provides a portable and rapid infuser and warmer to expedite infusion of blood and medical fluids in austere, mobile, or hospital settings.

The device described herein is a compact and efficient blood and fluid infuser/warmer to speed up the care and recovery of warfighters and any patient who has lost blood. The infuser/warmer is intended for mobile medical units, medical evacuation by helicopter, and all hospital settings. Because of its small size, ease of use, ability to operate on both AC and rechargeable battery power, and fast warming capabilities, the device is typically well-suited to provide care in both military and civilian settings, from the point of injury to the most demanding hospital use cases.

Infusion of normothermic blood or fluids is essential for resuscitation after heavy blood loss: hemorrhage is a leading cause of death of wounded soldiers and others with traumatic injuries. To reduce mortality, critical care involves stopping bleeding, ventilation, and infusion of warm blood or fluids until the patient is hemodynamically stable. Resuscitative measures are not yet optimal. Analysis of combat deaths by the Department of Defense reveals that about 50% of hospital fatalities and 25% of prehospital deaths may be prevented with faster intervention. Delays are deadliest for hemorrhaging soldiers or civilians requiring massive blood replacement, because they must be evacuated to an advanced facility for infusions. Equipment setup adds delay. Patients die from complications such as unstoppable bleeding, hypothermia, hypoxia-induced acidosis, and trauma-induced coagulopathy. In the USA, hemorrhage accounts for 30-40% of trauma deaths. The global toll is 1.5 million/year. To increase survival and reduce delays, ideally, our portable infuser/warmer, operating on AC/DC power, can uninterruptedly accompany the hemorrhaging patient from the field to medivac to operating room.

Over 16 million blood product units are transfused in the USA per year to replace blood in patients experiencing hemorrhage, surgical emergencies, and anemia. Infusions are also used to boost blood cell count in patients with many types of cancer, and to treat side effects of chemotherapy. Although blood infusers are essential and ubiquitous at surgical facilities, they lack the portability and functionality needed for saving lives closer to where traumas occur. There is rising demand and unmet need for portable high-flow infusers and warmers, to enable continuous use across all healthcare settings, from austere locations to mobile and established facilities.

It is challenging to provide a device that heats blood or fluids with battery power and enables precise infusions from very low to very high flow rates (0.1 to 1000 ml/min).

Previously existing high-flow infusers and warmers are typically bulky and cumbrous, with technical limitations that raise the risk of glitches and errors. Mechanical stress caused by pumps, aberrant heating, and imperfect air removal may cause hematologic damage (to blood cells, platelets, and biologicals), triggering physiological responses that raise morbidity and mortality risk. Safety issues with several models have in some cases elicited product recalls.

Portable and efficient versions of previously existing infusers/warmers cannot be made because their internal components rely on engineering principles that provide miniaturization challenges. Technology gaps also exist in components such as the pump, warmer, and air remover.

Rotary peristaltic pumps generate full-compression shear stress on flexible tubing, which can damage cells and platelets. Pressure variations can create air bubbles (embolism risk) and cavitation (stress red blood cells). Peristaltic motion can also induce spallation or breaking away of small silicon particles from tubing, contaminating blood. In contrast, our proprietary mechanism avoids high shear stress by never fully compressing or releasing the tubing. The mechanism also prevents stressful variations and never impacts the far wall of the tubing, eliminating spallation risk.

Large volume warmers rely on induction or convection systems with high energy requirement, ceding portability. Portable versions exist but fail for high volumes. Our device uses a compact in-line RF heater.

Air removal devices are supposed to work automatically, but in practice, if emptied fluid bags are not manually disconnected or if connections are not properly tightened, air can enter the system. Purging air requires the clinician to stop flow to patients, release air, and re-prime the system to start infusion. The device described herein, with a simple 1-click cassette, minimizes time-wasting manual interventions and user errors. The vertically elongated air chamber provides volume buffer for all entrained air to be entrapped and purged even if blood bag empties; and the priming (or initial air purging) is done automatically, preventing user error.

The high-flow infuser/warmer described herein typically provides exceptional portability, durability, and safety compared to currently used bulky and cumbersome devices. It will speed up care of injured warfighters and save lives.

The compact infuser/warmer described herein incorporates technologies that provide improvements in performance and usability compared to the legacy devices in use today. Typically, the device includes a pump mechanism as described herein, an in-line RF heater, and an automated air removal system. Lab test results provide evidence to support the use of this heating technology for blood cells.

The device is a high-flow infuser/warmer that meet the needs of modern trauma and surgical care providers. The novel infuser includes an in-line warmer, auto-air-remover, and one-click operation will reduce setup time to under 2 min and minimize the risk of hematological damage and embolism, while permitting fast and consistent delivery of normothermic blood in injured soldiers and civilians.

Principles of Infuser/Warmer Design:

To achieve faster setup times (1-2 min) with fast and continuous flow, an all-in-one device is provided, with self-priming dual plunger pump connected to a compact and capable in-line radio frequency heater and an automated air separator and eliminator. Distributed pump forces and favorable thermodynamics permit the pumping of warm blood and fluids precisely over a range of flow rates (up to and above 1000 ml/min) and duration, while avoiding damage to cells and biologicals. Materials and processes are compatible with a variety of fluids, including whole blood, blood components, plasma, crystalloids, and other injectables. A single box makes superfluous the need to stock parts and implements for traditional infusers and warmers.

Human factors and safety: Minimizing human intervention and frustration-free operation were key attributes requested for freeing up personnel and reducing human errors. Solving this required designing a 1-click cassette with simple connectors, which eliminates the need for manual interventions and reduces training time. A touch-screen display allows monitoring and adjustments. Multiple sensors activate warning alarms as needed. The same infuser can be used across all medical settings.

Military guidance: Design considerations included the need for small size, portability, durability, and low energy AC/DC operation for use in forward treatment centers to speed up the resuscitation of injured warfighters. Devices are 'hardened' to survive drops and improve security.

The portable and rechargeable (AC/DC) blood infuser/warmer pump can save thousands of patients' lives every year in both civilian and military settings, including emergency rooms and trauma centers. The pump can be used for heating both blood products and saline. The new infuser/warmer will save substantial time for all medical staff, as it is easy to use and does not require advance preparation. Also, the compact device will reduce clutter and save space around the patient's bed (1 small pump provides the full solution). Its size and adaptability will enable use during transit on helicopters and ambulances, and for transferring a patient from one department to another, as there will be a rechargeable battery and one pump on the patient bed.

Novel infuser/warmer prototype design. Compact size, high capacity, battery backup, and user-friendly one-click-cassette operation make this device suitable for use in multiple health care settings.

The coarse filter removes coagulated materials and particles, dual plungers work in concert to smooth out pulsing; in-line RF heater warms fluid; and any spurious air is removed automatically to reduce the risk of embolism. Embedded sensors provide exquisite control over patient-specific infusion parameters. Multiple warming signals and alarms ensure safe operation. Successful completion of the proposed is expected to result in a lightweight, portable device compared to existing infusers/warmers.

Novel dual-pumping mechanism reduces the risk of hemolysis and platelet activation while enabling precise control of flow rates (0.1 to 1000 ml/min).

Fluid transfer system consists of two parallel vertically placed tubes, each with a one-way valve at both ends. Plunger presses on the center of the segment without fully squeezing. The pumping mechanism never impinges fully on the opposite tube wall, enabling damage free pumping at high flow rates.

One-way flow of blood into patients is achieved by simulating the operation of the heart. High-flow one-way valves (like heart valves) allow fluid to pass in and out of pumping tubing segments without mechanical damage. Upon retraction of the plunger, the tube segment returns to its original round shape, triggering the replenishment/intake of blood (from bag) into the tubing via a one-way valve. This operation does not damage blood or its components.

The dual system allows flow at a high and continuous rate and low pressure. Shear stress is avoided. Dual plungers enable uniform flow rate over the pumping cycle with no break in flow over time domain since, as one plunger reduces its flow rate in preparation for its intake phase, the other plunger ramps up its flow rate to take over pumping for the second half of the pumping cycle.

Continuous flow with overlapping plunger phases allows maximal flow for a given catheter diameter since pressure is maintained actively, continuously, algorithmically with no need to manually measure or adjust.

Fluid warming using an in-line RF (radio frequency) heater provides rapid and controlled heating without the risk of hot spots.

When the disposable cassette is clicked into the infuser, the positive and negative flat electrodes start conducting electricity through the flowing liquid by using alternating current. Heat is produced by Ohm's law.

Because the current alternates at RF frequencies, charge buildup is avoided since polarity switches very rapidly, thus preventing damage to blood or fluid.

The pump, controlling the flow rate, can apply the precise amount of heat based on the temperature of the liquid being infused.

Air Eliminating Chamber design: separation of air from blood/fluids; passive removal of air from upstream filter chamber using proprietary buoyant valve mechanism to ensure maximal liquid in chamber and purge of liquid free air via hydrophobic membrane.

Active stopcock-valve-controls a dedicated motor in the pump which opens to release air only when sensed by ultrasonic liquid level sensor.

Second ultrasonic sensor continuously monitors downstream tubing to ensure no entrained air migrates toward patient and stops the pumping process if cumulative limit of 0.5 mL of air is approached.

The infusion pump is a single-channel, volumetric infusion pump which provides a high speed, simple and safe system for rapid infusion of warmed fluid. The infusion pump infuses blood, replacement IV fluids or irrigation fluids warmed to physiologic temperature at user-set rates from 0.1 to 1000 milliliters per minute (ml/min). Unit Medical infuser is suitable for low (0.1-50 mL/min, moderate (50-150 mL/min) and high flow applications (>150 mL/min). The system heats the fluid to body temperature, accurately pumps the fluid at a programmed rate of flow and actively removes air from the fluid before delivering it to the patient.

The system uses radiofrequency (RF) ohmic heating technology to warm blood and fluids. Based on in-line sensors, the system calculates the energy required to safely warm the perfusates. Pumping is achieved at the rate required by the clinical health care professional.

Viability assays showed no damage to red blood cells (hemolysis assay) or PBMCs (peripheral blood mononuclear cells, analyzed by FACS) in the normothermic range after RF heating of blood. Samples of blood (unusable, from Sheba blood bank) were exposed to 200 W RF ohmic heating from 14° C. (control) to 55° C. Red blood cells remained intact, as measured using a hemolysis assay, until temperatures were raised to 49° C. Fluorescent activated cell sorter (FACS) analysis showed normal distribution of peripheral blood mononuclear cells in 49° C.-treated blood vs untreated control. Multisample analysis indicated no significant aberrations. The data suggest that RF heating is safe for normothermic warming of blood.

Figure 1:
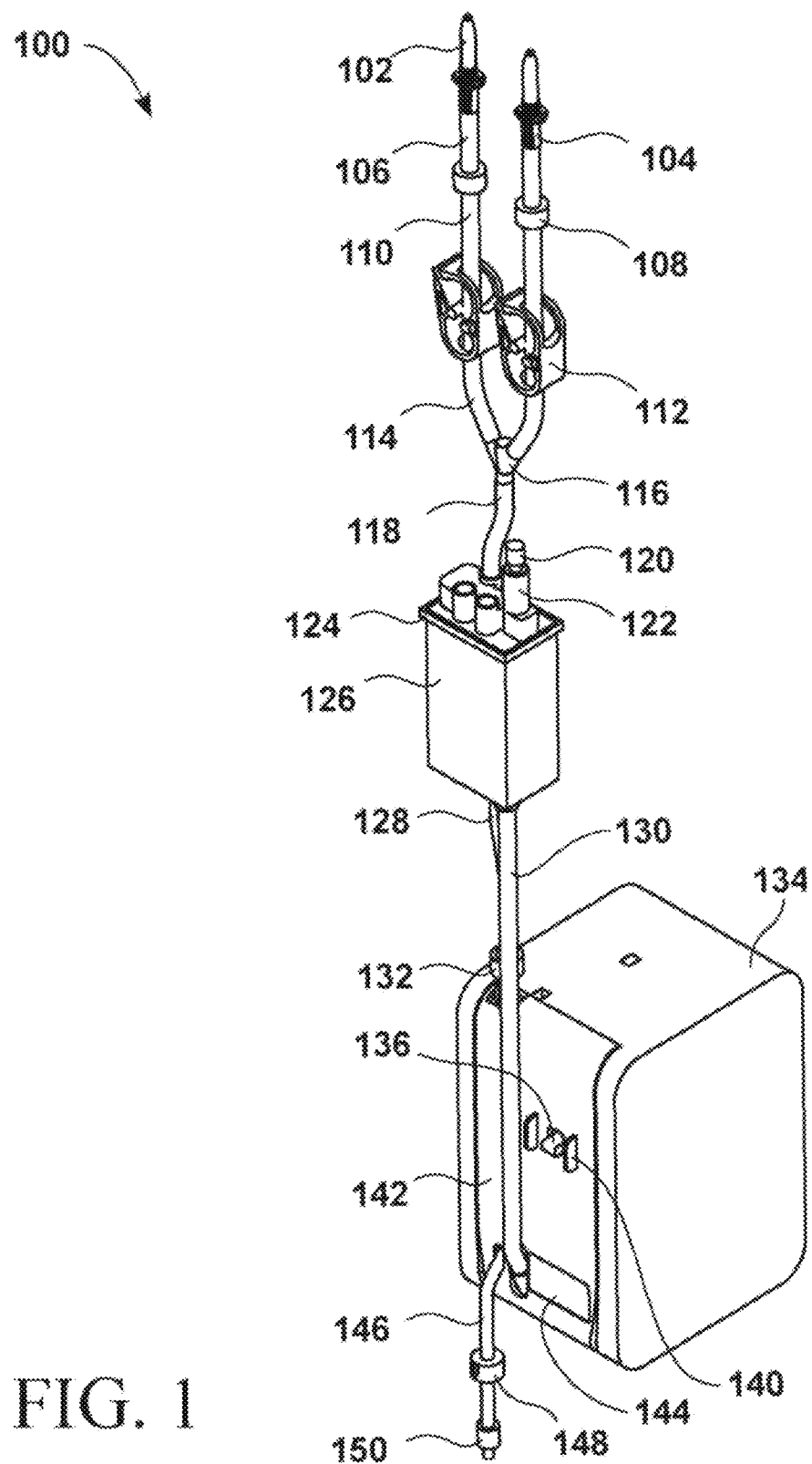
FIG. 1 is a perspective view of an apparatus comprising reusable and disposable assemblies according to some embodiments of the invention.
Figure 2:
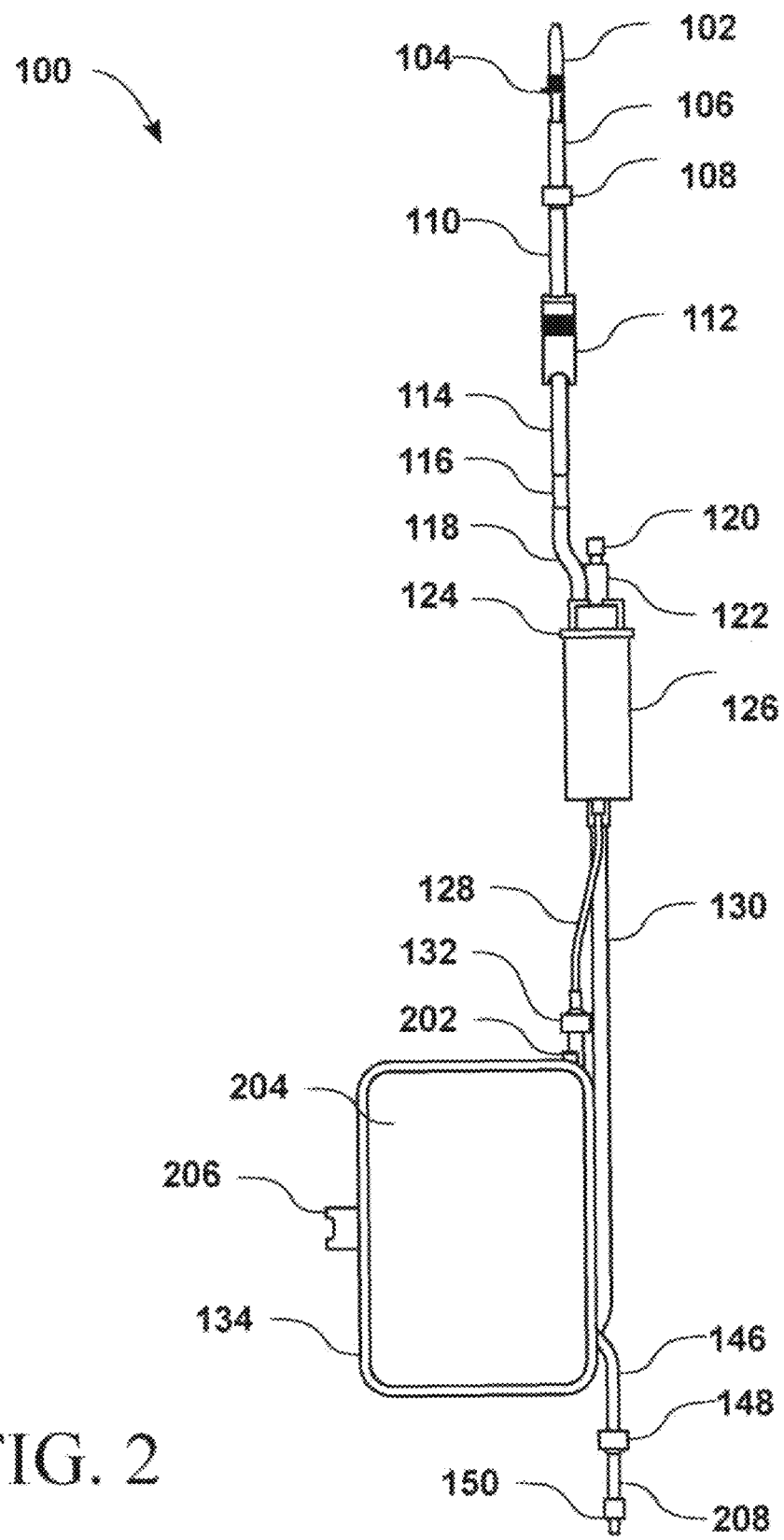
FIG. 2 is a left side elevation view of an apparatus comprising reusable and disposable assemblies according to some embodiments of the invention.
Figure 3:
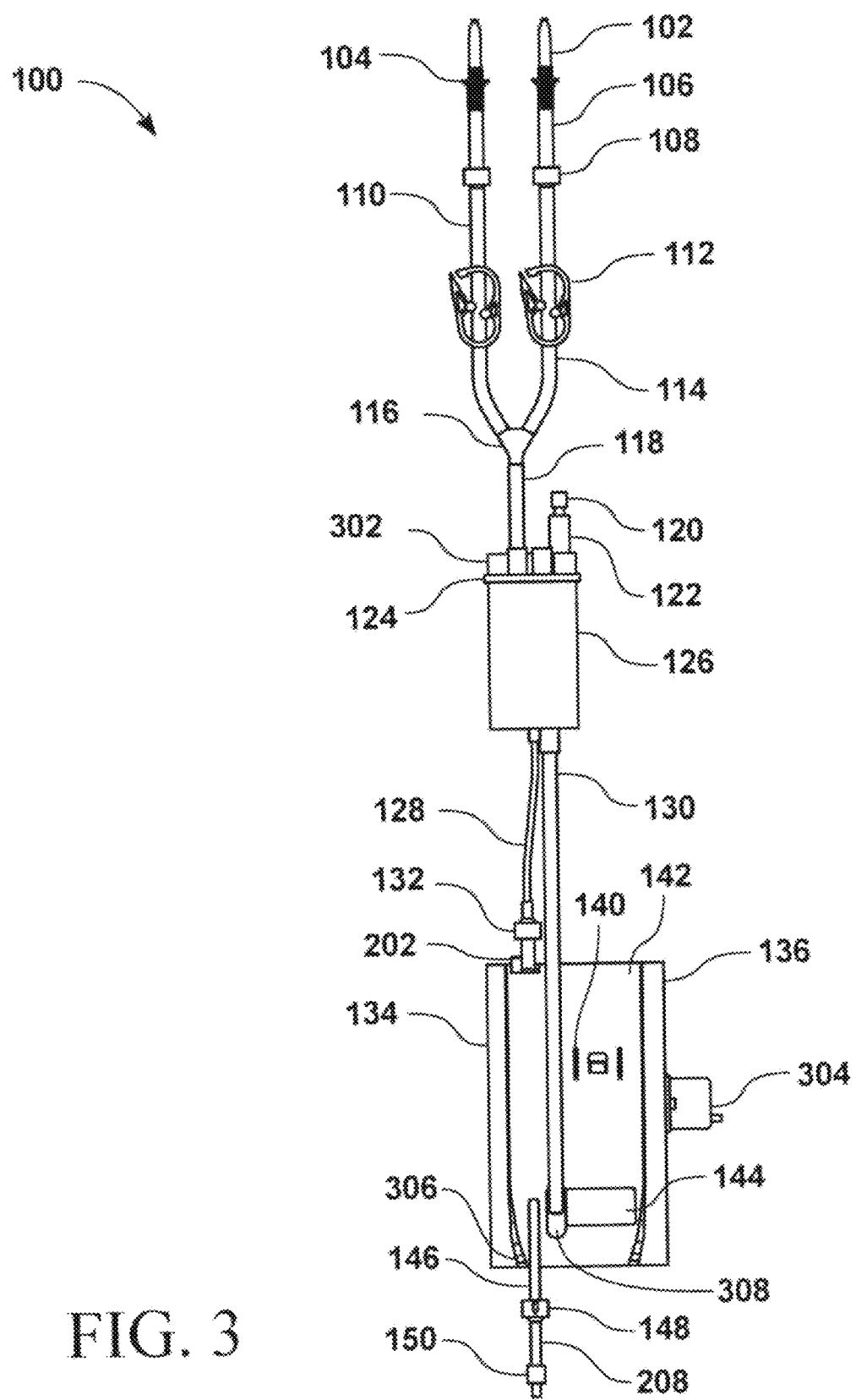
FIG. 3 is a front elevation view of an apparatus comprising reusable and disposable assemblies according to some embodiments of the invention.
Figure 4:
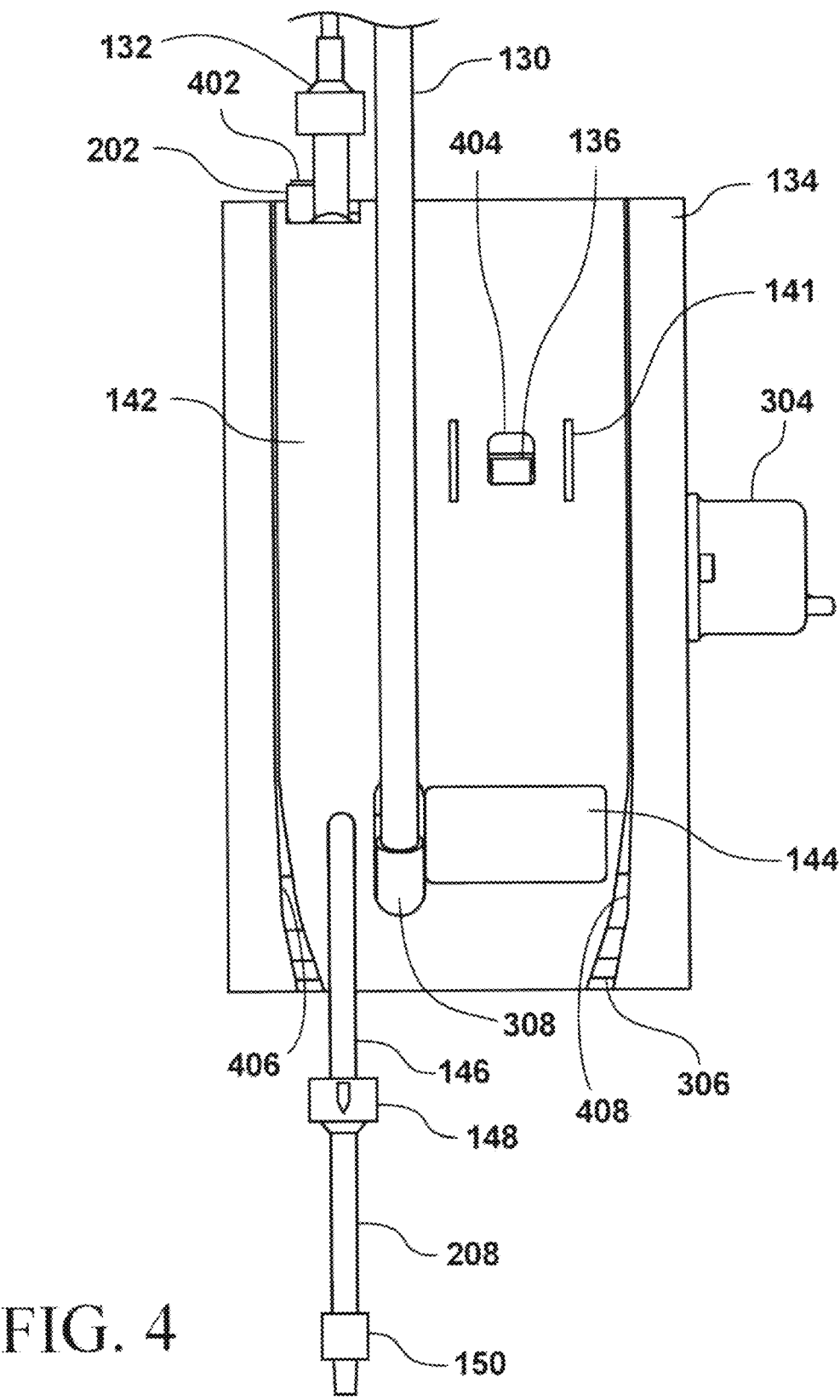
FIG. 4 is a front elevation view of the lower portion of an apparatus comprising reusable and disposable assemblies according to some embodiments of the invention.
Figure 5:
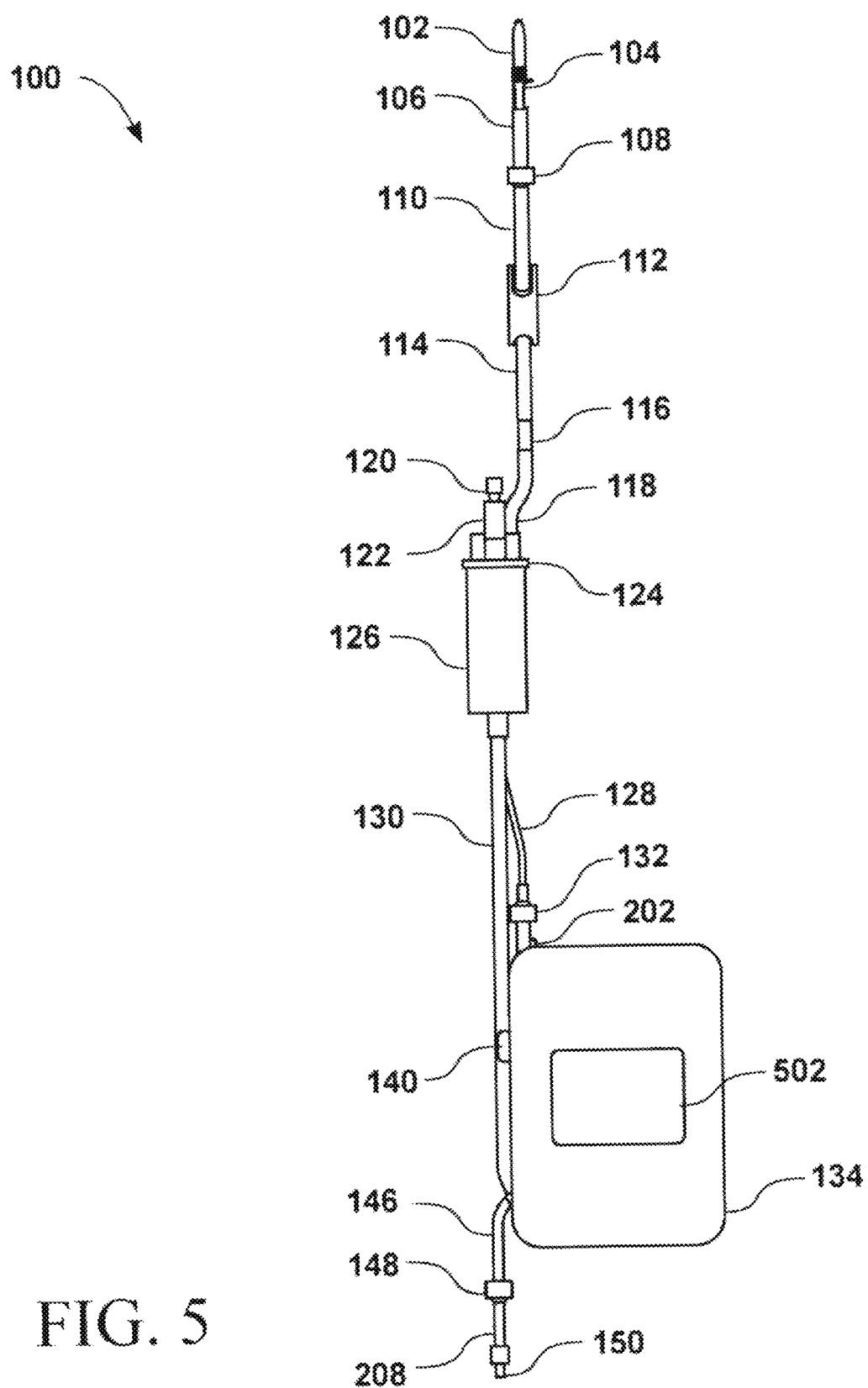
FIG. 5 is a right side elevation view of an apparatus comprising reusable and disposable assemblies according to some embodiments of the invention.
Figure 6:
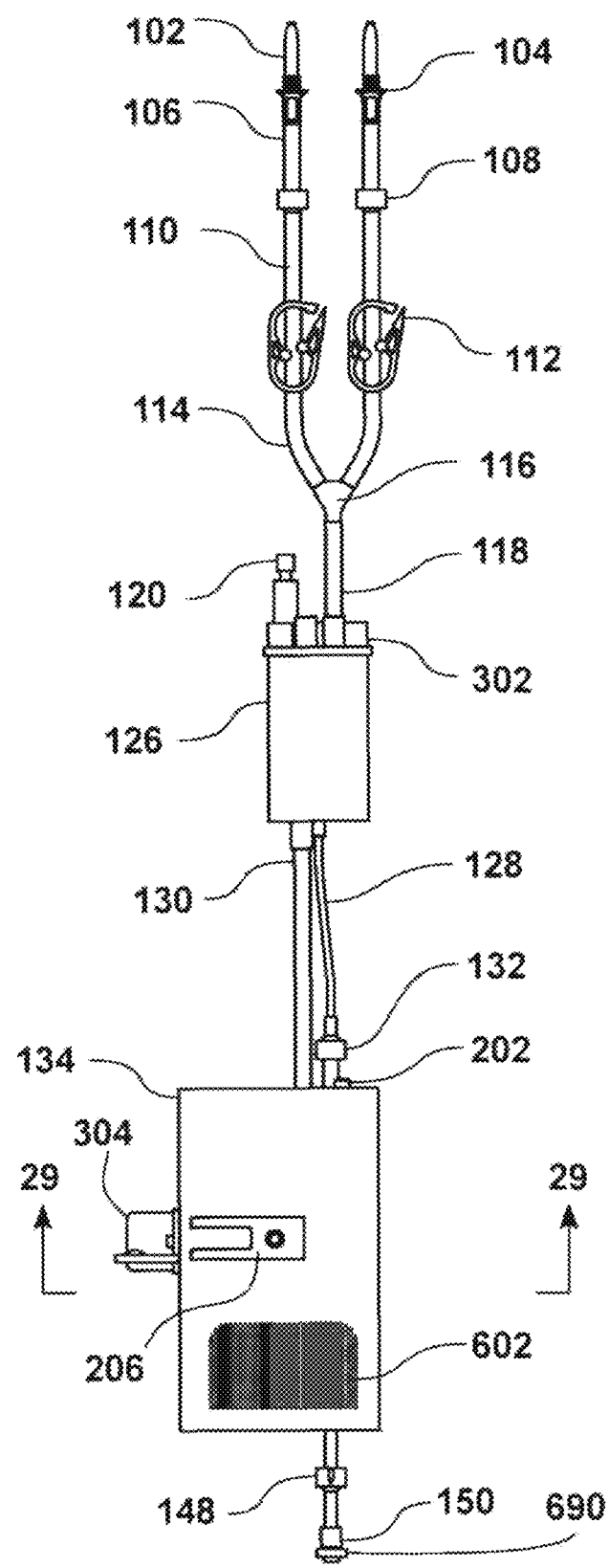
FIG. 6 is a back elevation view of an apparatus comprising reusable and disposable assemblies according to some embodiments of the invention.
Figure 7:
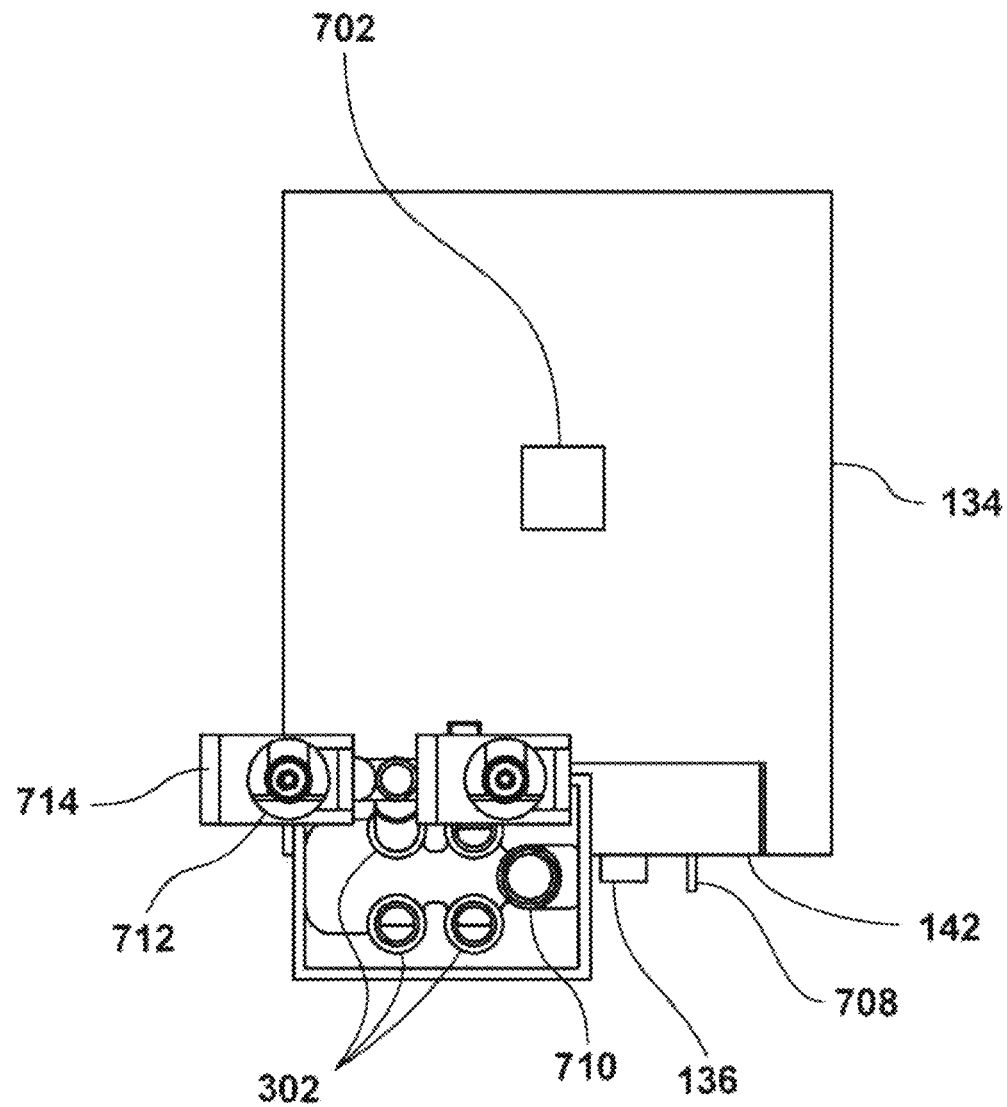
FIG. 7 is a top plan view of an apparatus comprising reusable and disposable assemblies according to some embodiments of the invention.
Figure 8:
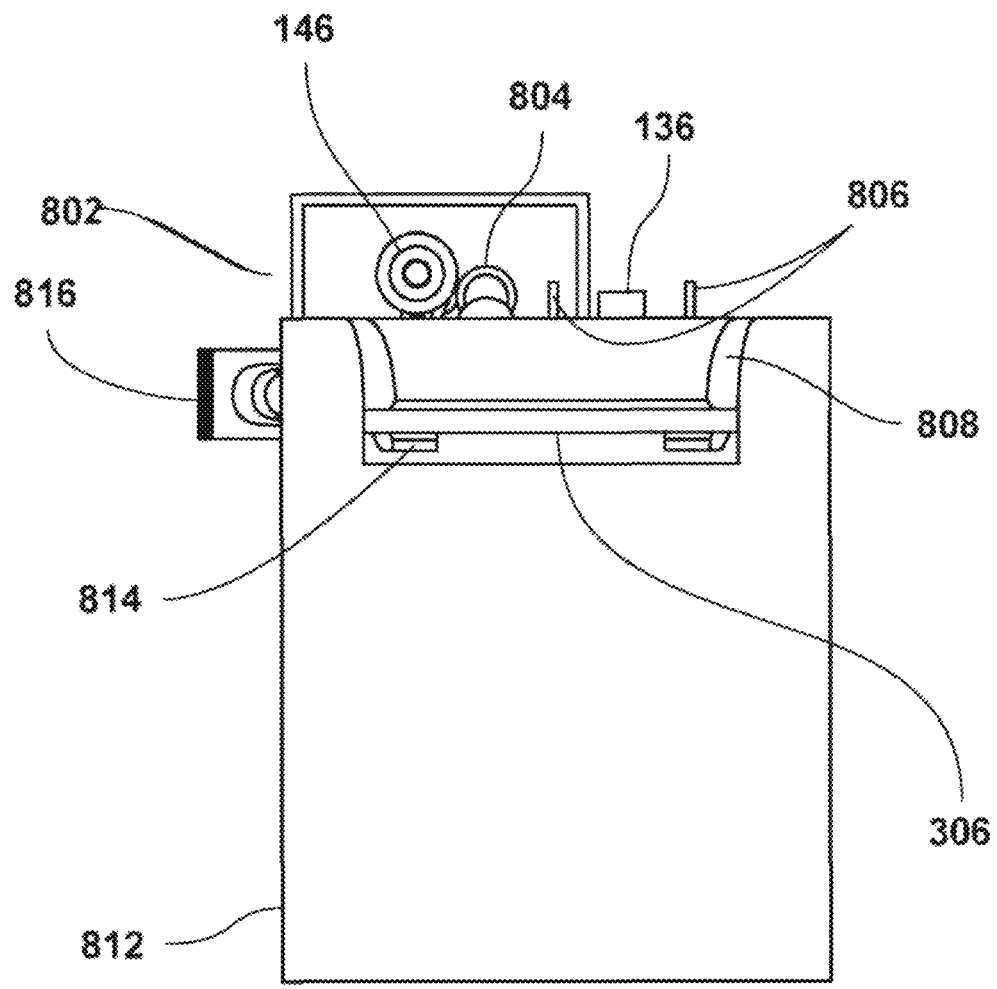
FIG. 8 is a bottom plan view of an apparatus comprising reusable and disposable assemblies according to some embodiments of the invention.
Figure 9:
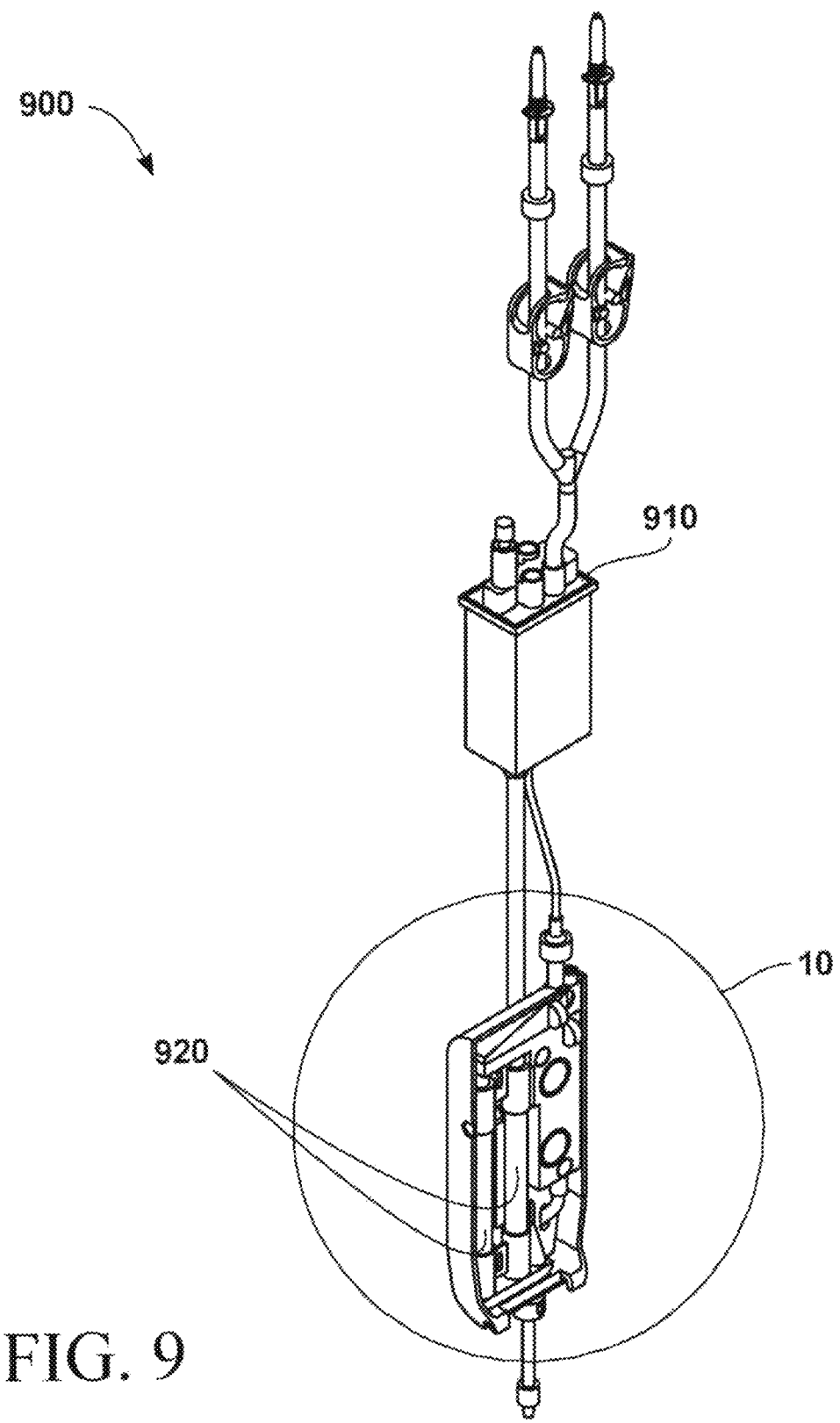
FIG. 9 is a perspective view of a sterile disposable assembly according to some embodiments of the invention.
Figure 10:
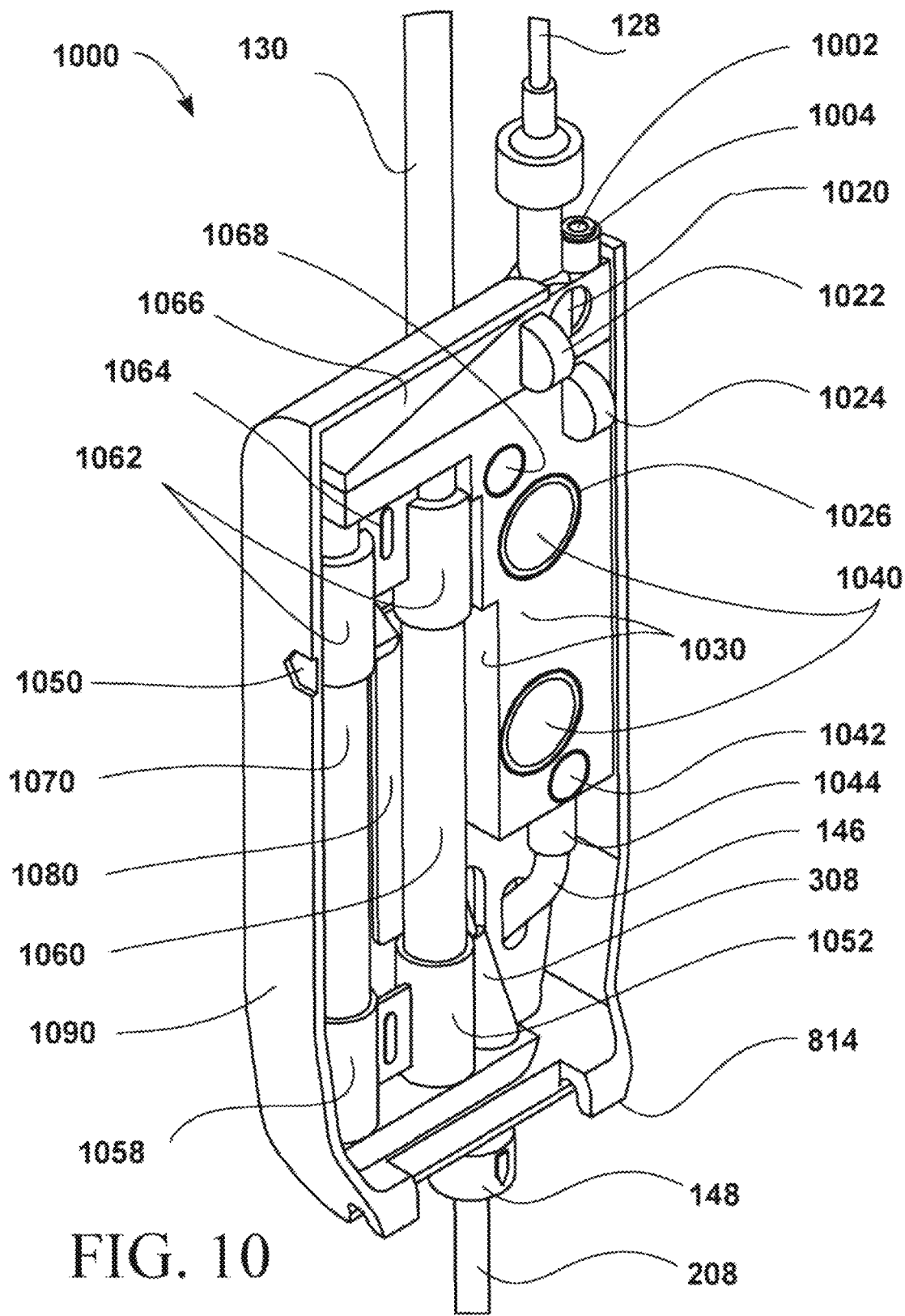
FIG. 10 is a detail view of an embodiment of the invention of area 10 of FIG. 9 according to some embodiments of the invention.
Figure 11:
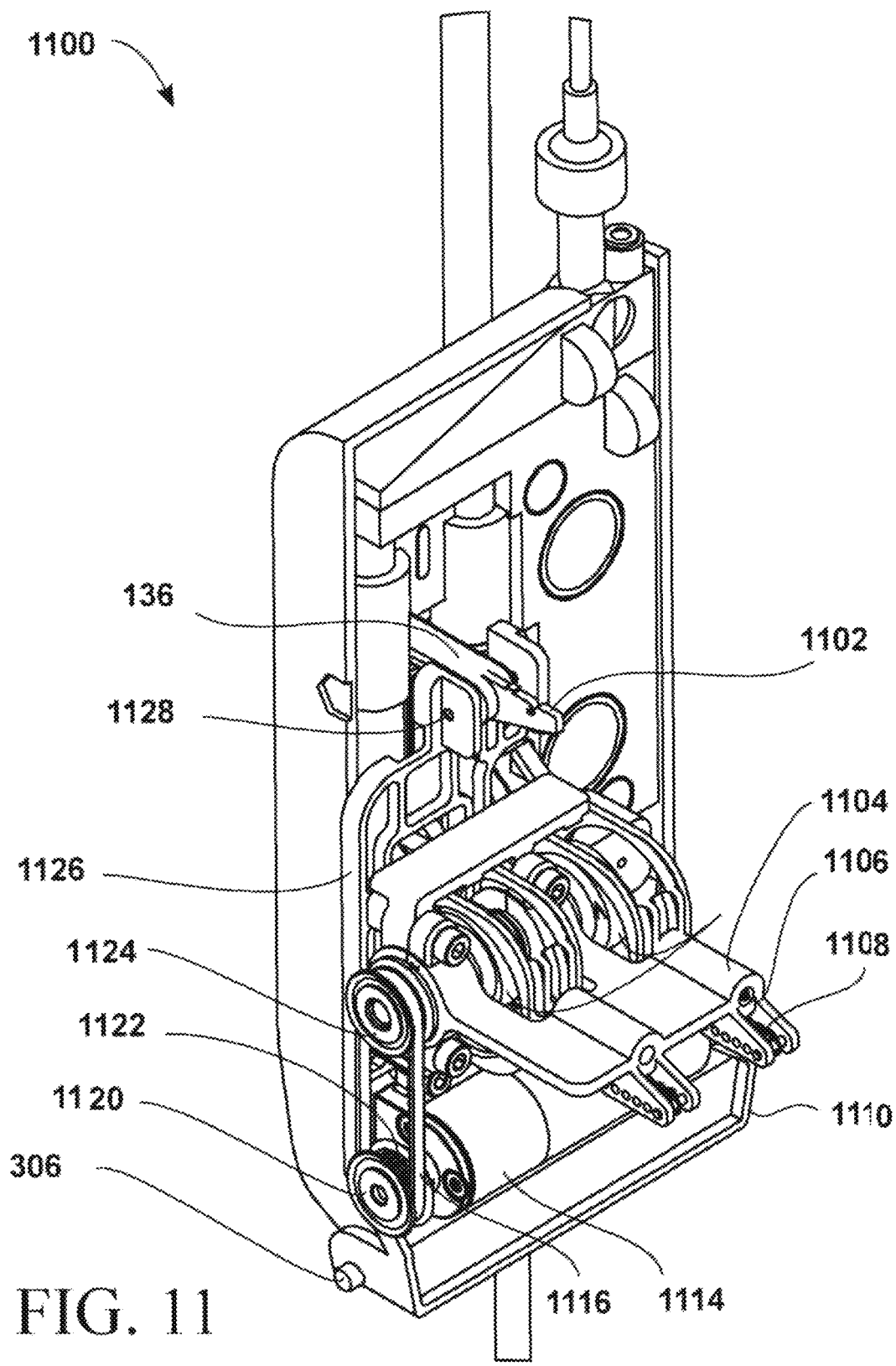
FIG. 11 is a detail view of an embodiment of the invention of area 10 of FIG. 9 but with the addition parts which interact with the sterile disposable assembly to form a pumping mechanism according to some embodiments of the invention.
Figure 12:
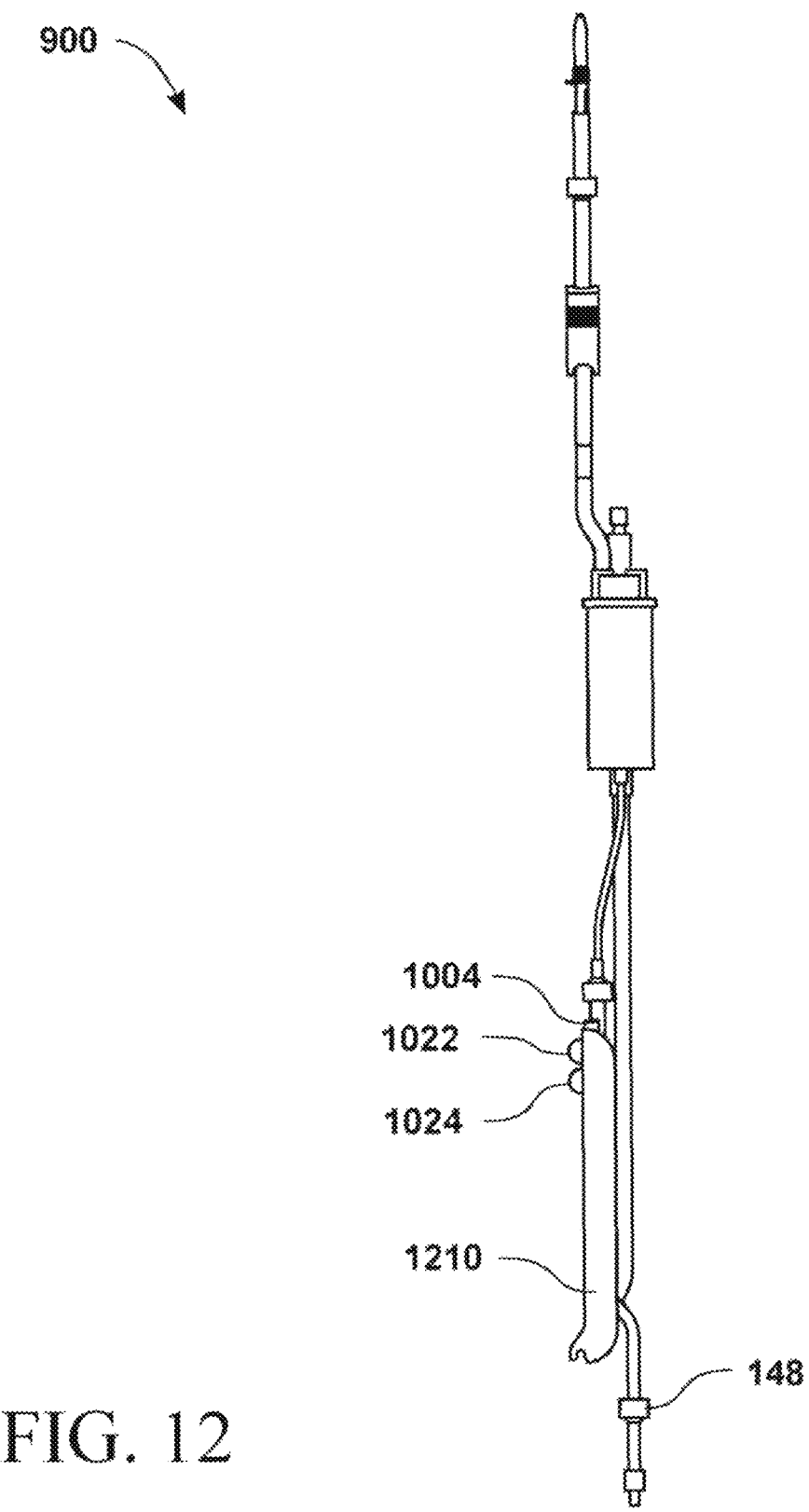
FIG. 12 is a left side elevation view of a sterile disposable assembly according to some embodiments of the invention.
Figure 13:
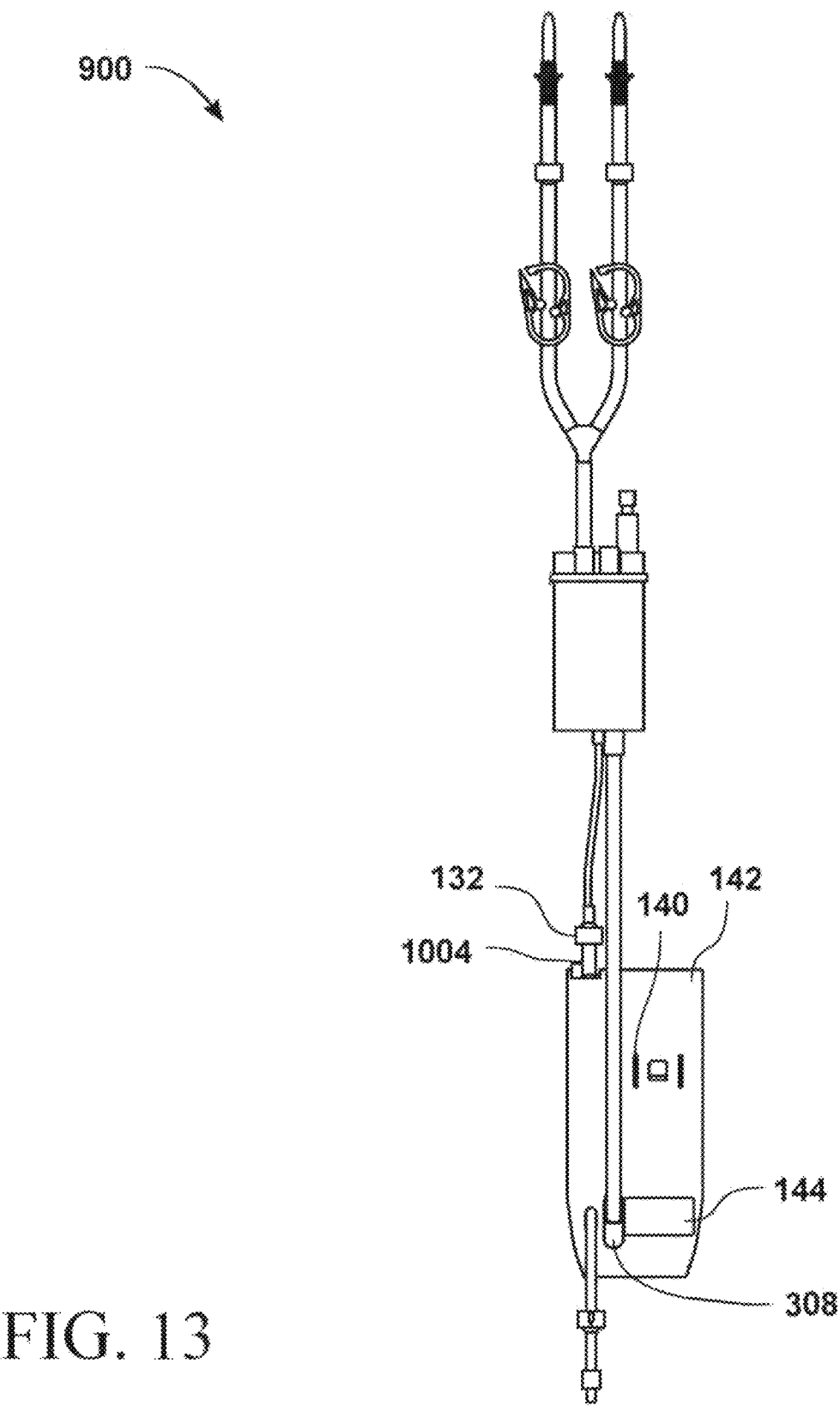
FIG. 13 is a front elevation view of a sterile disposable assembly according to some embodiments of the invention.
Figure 14:
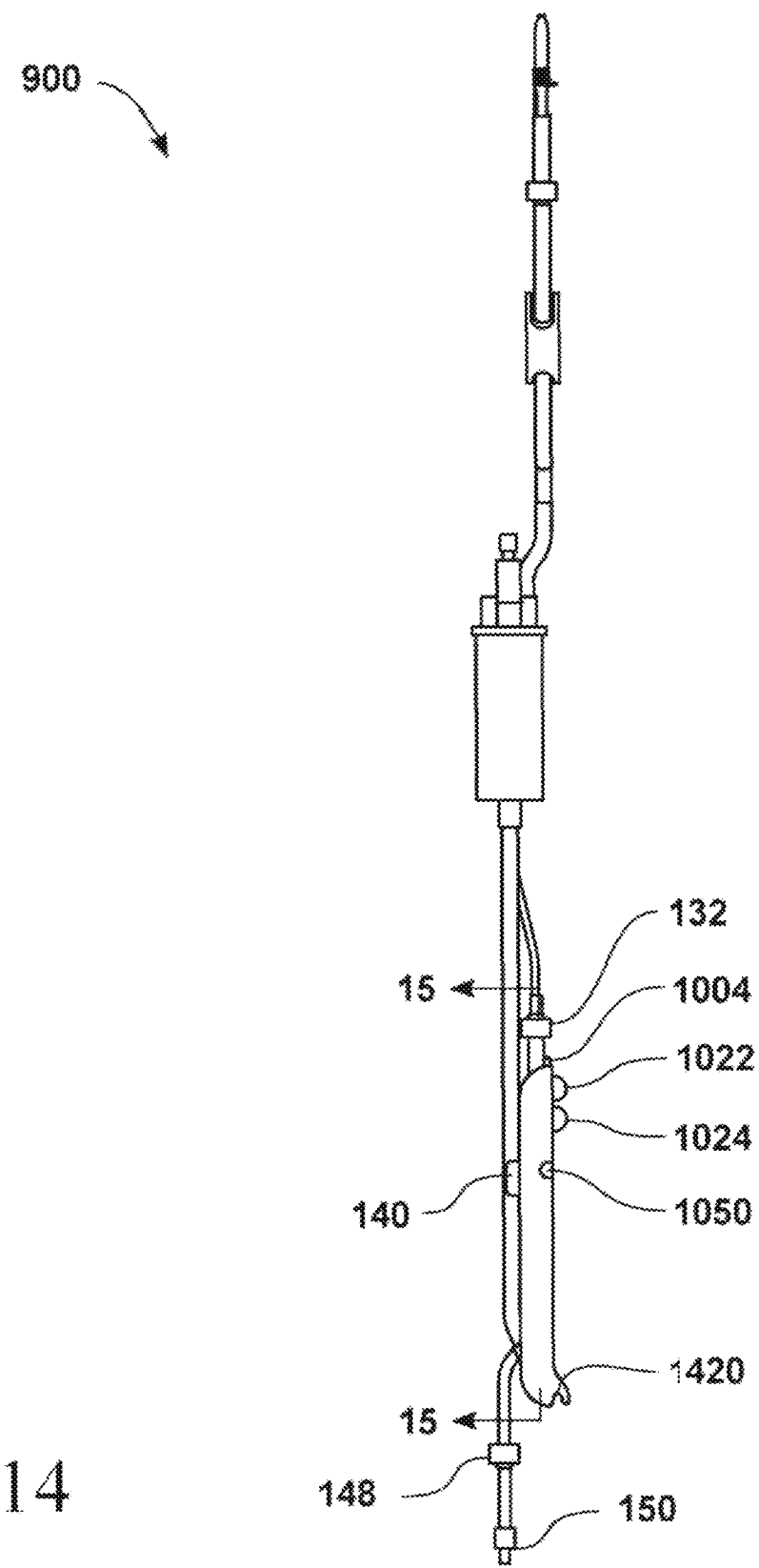
FIG. 14 is a right side elevation view of a sterile disposable assembly according to some embodiments of the invention.
Figure 15:
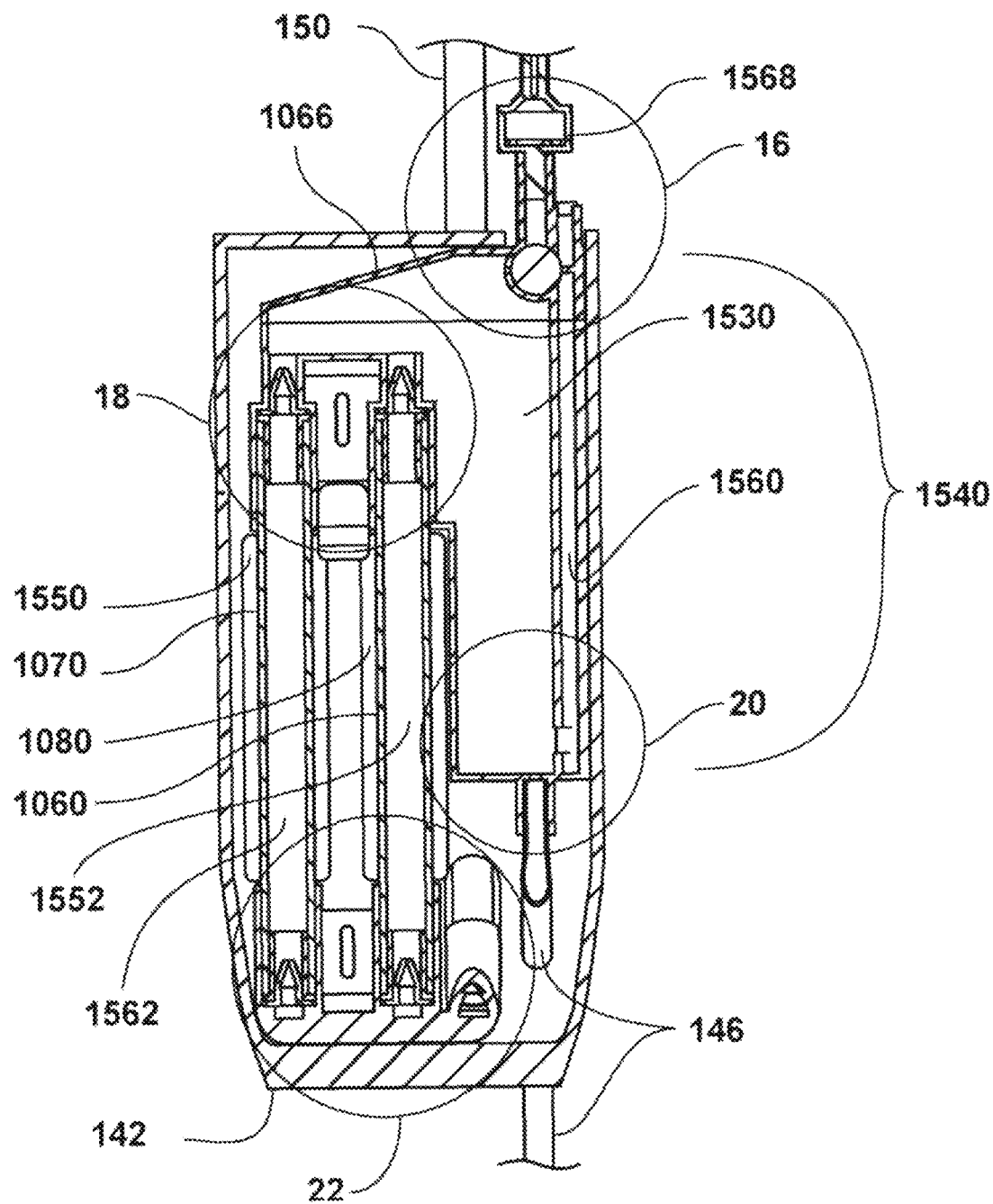
FIG. 15 is a sectional view along line 15-15 of FIG. 14 according to some embodiments of the invention.
Figure 16:
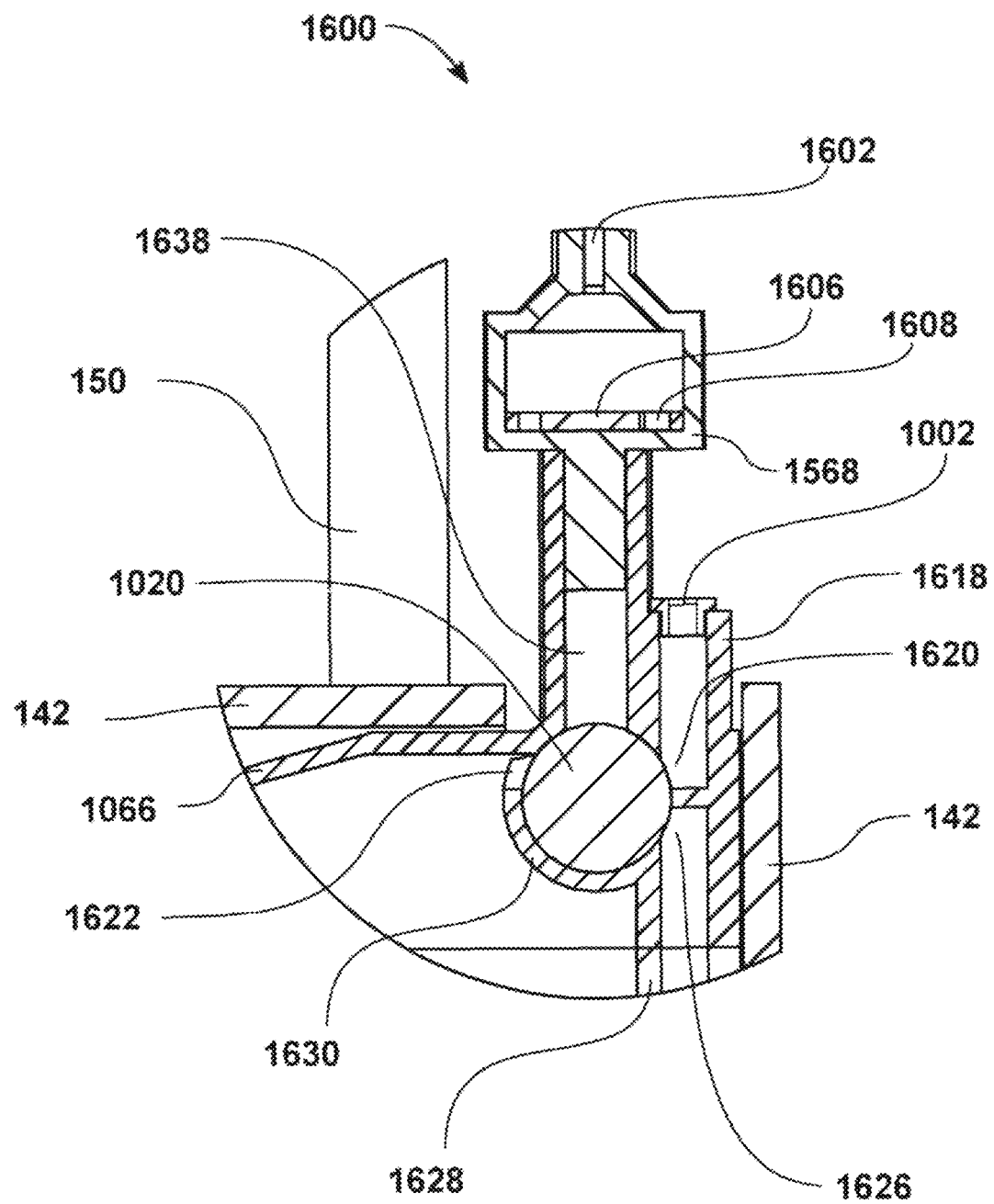
FIG. 16 is a detail view of area 16 of FIG. 15 according to some embodiments of the invention.
Figure 18:
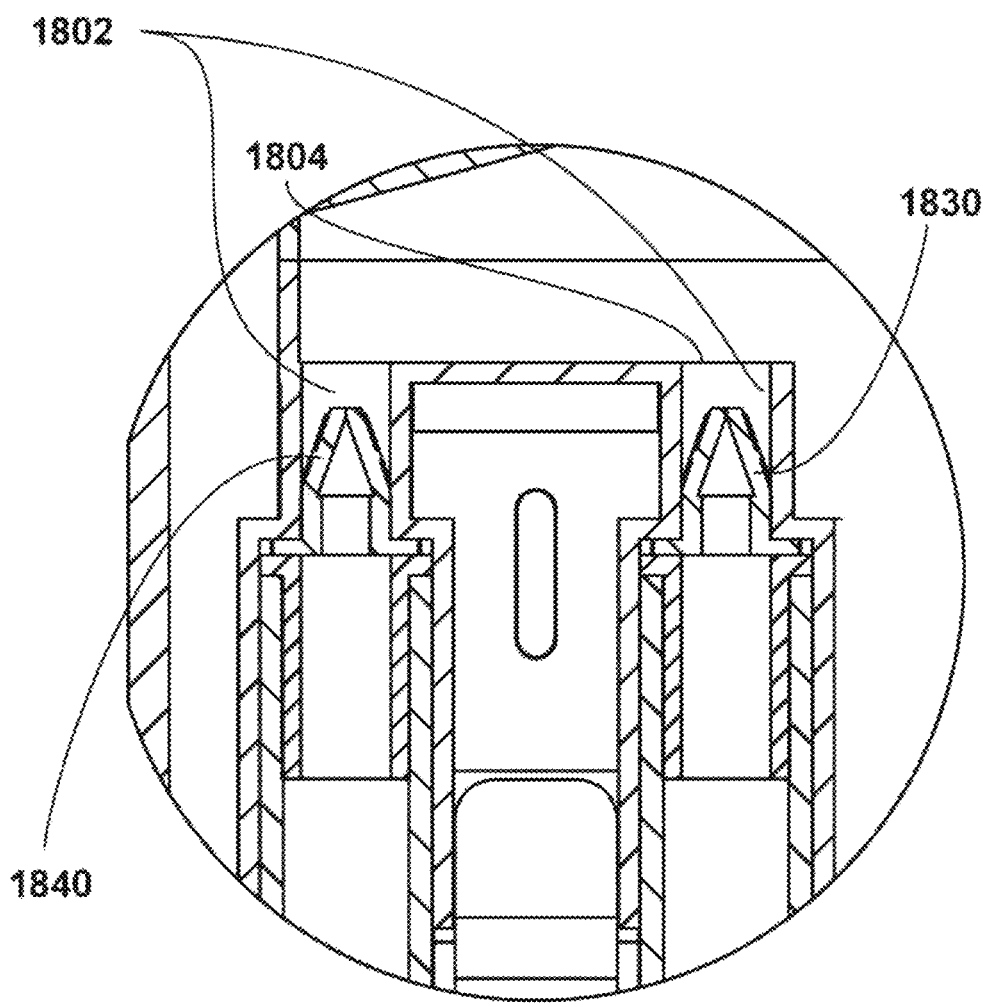
FIG. 18 is a detail view of area 18 of FIG. 15 according to some embodiments of the invention.
Figure 19:
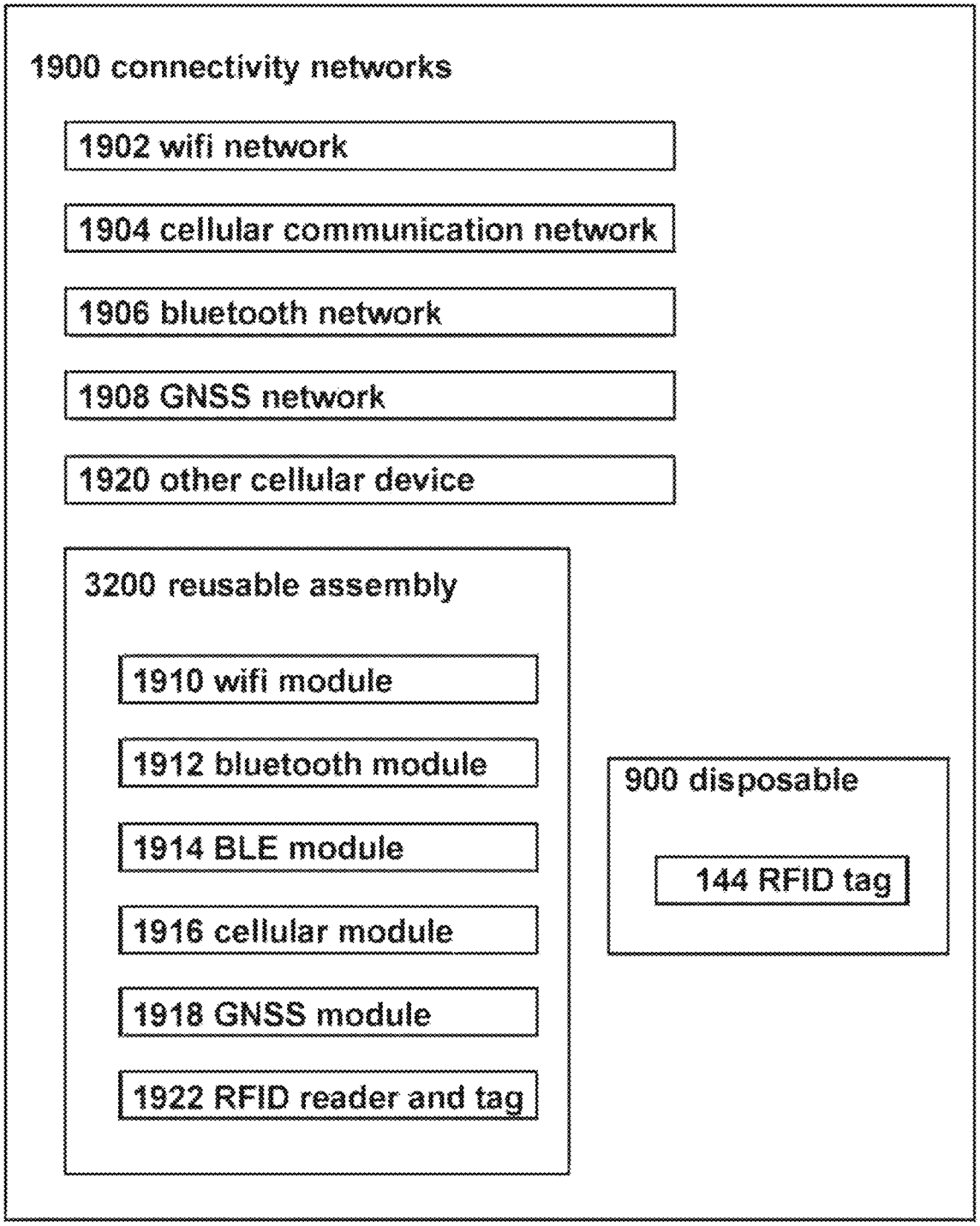
FIG. 19 is a simplified schematic of a system view of connectivity networks important to the invention according to some embodiments of the invention.
Figure 20:
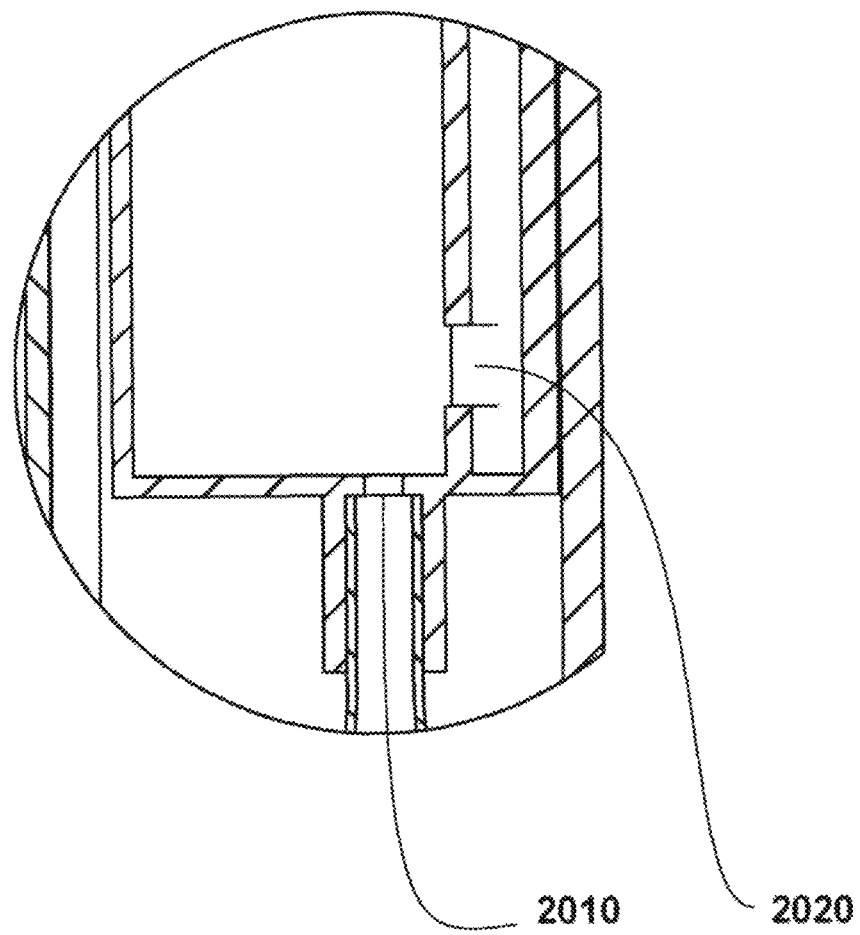
FIG. 20 is a detail view of area 20 of FIG. 15 according to some embodiments of the invention.
Figure 21:
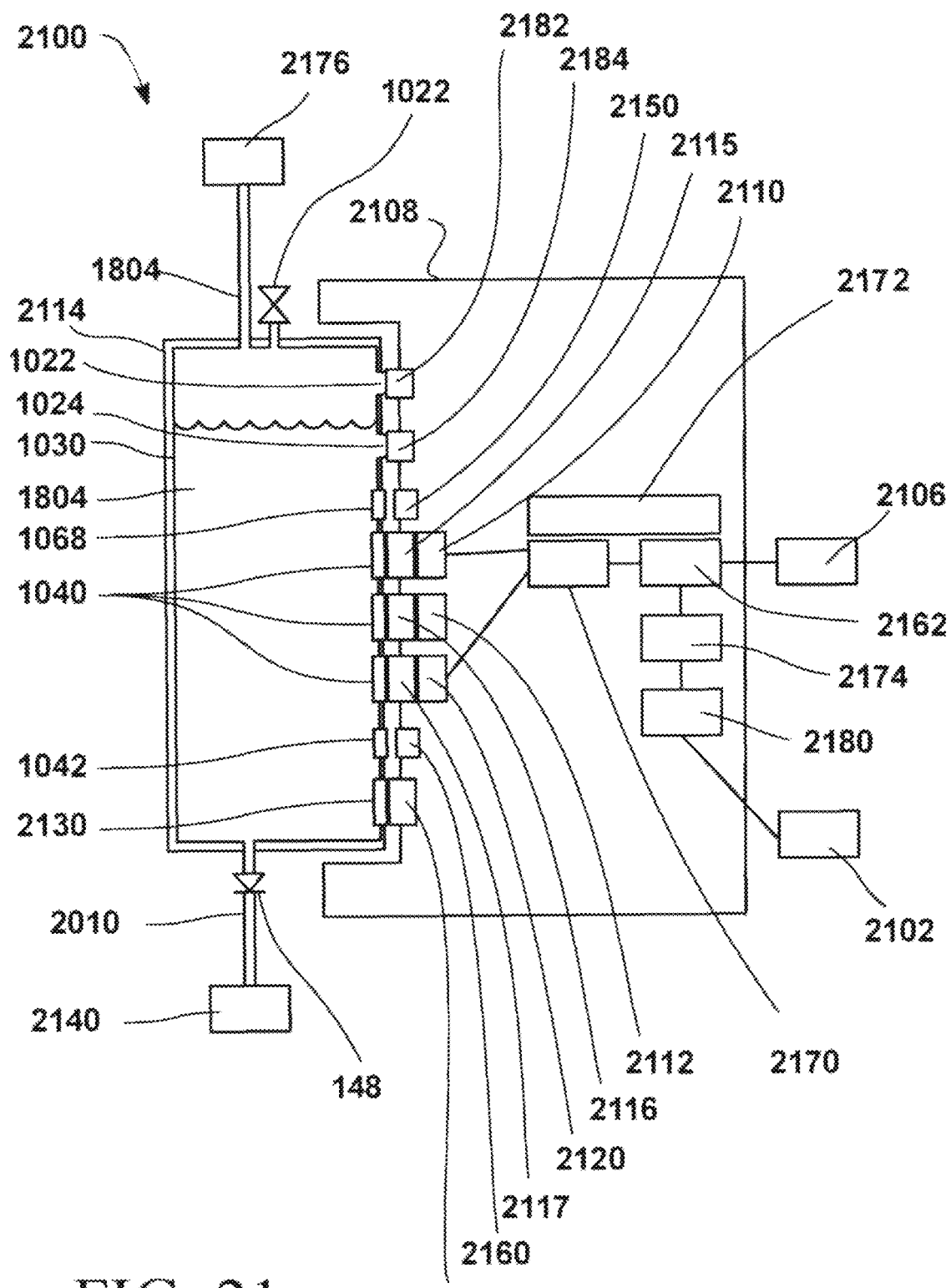
FIG. 21 is a simplified schematic of a system view of a heating mechanism according to some embodiments of the invention.
Figure 22:
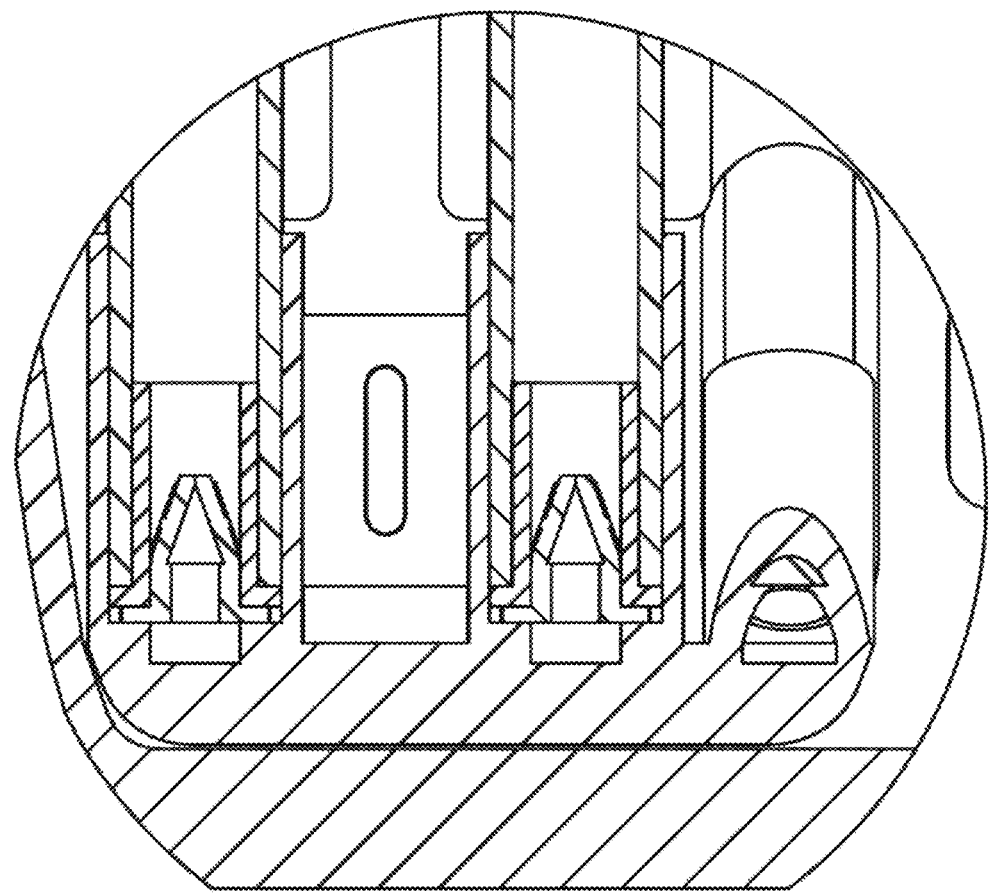
FIG. 22 is a detail view of area 22 of FIG. 15 according to some embodiments of the invention.
Figure 23:
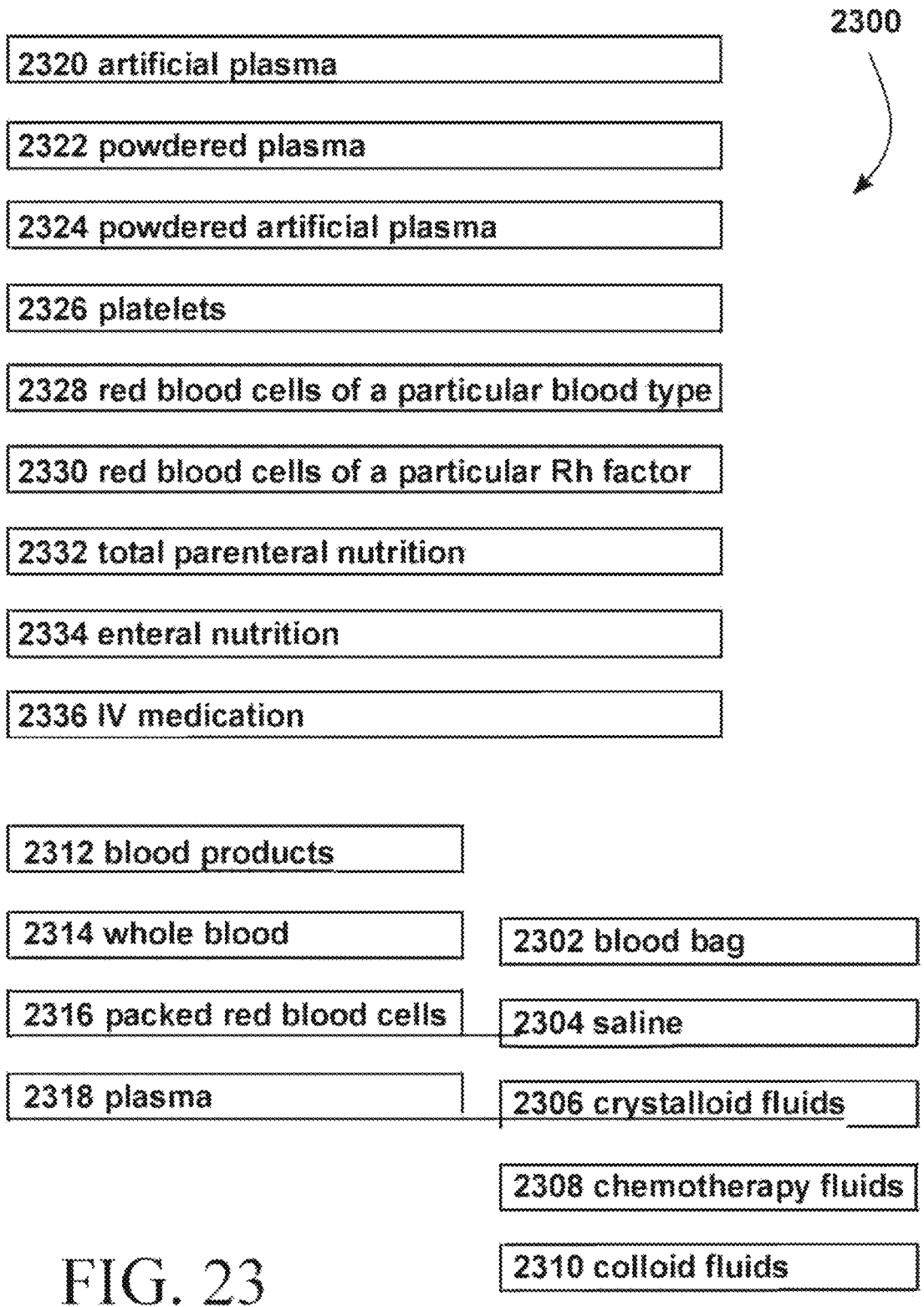
FIG. 23 is a simplified schematic of a system view of fluid types which are to be pumped and/or heated according to some embodiments of the invention.
Figure 24:
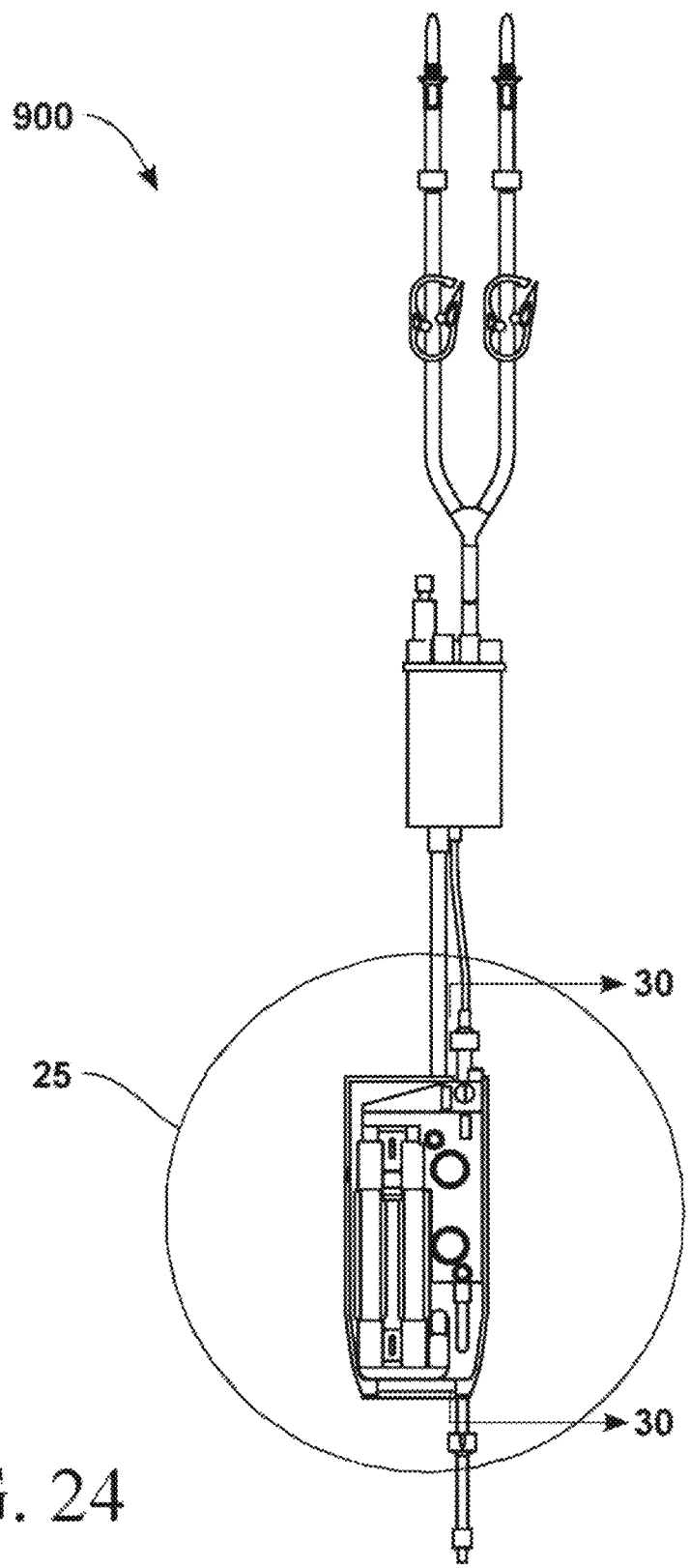
FIG. 24 is a back elevation view of a sterile disposable assembly according to some embodiments of the invention.
Figure 25:
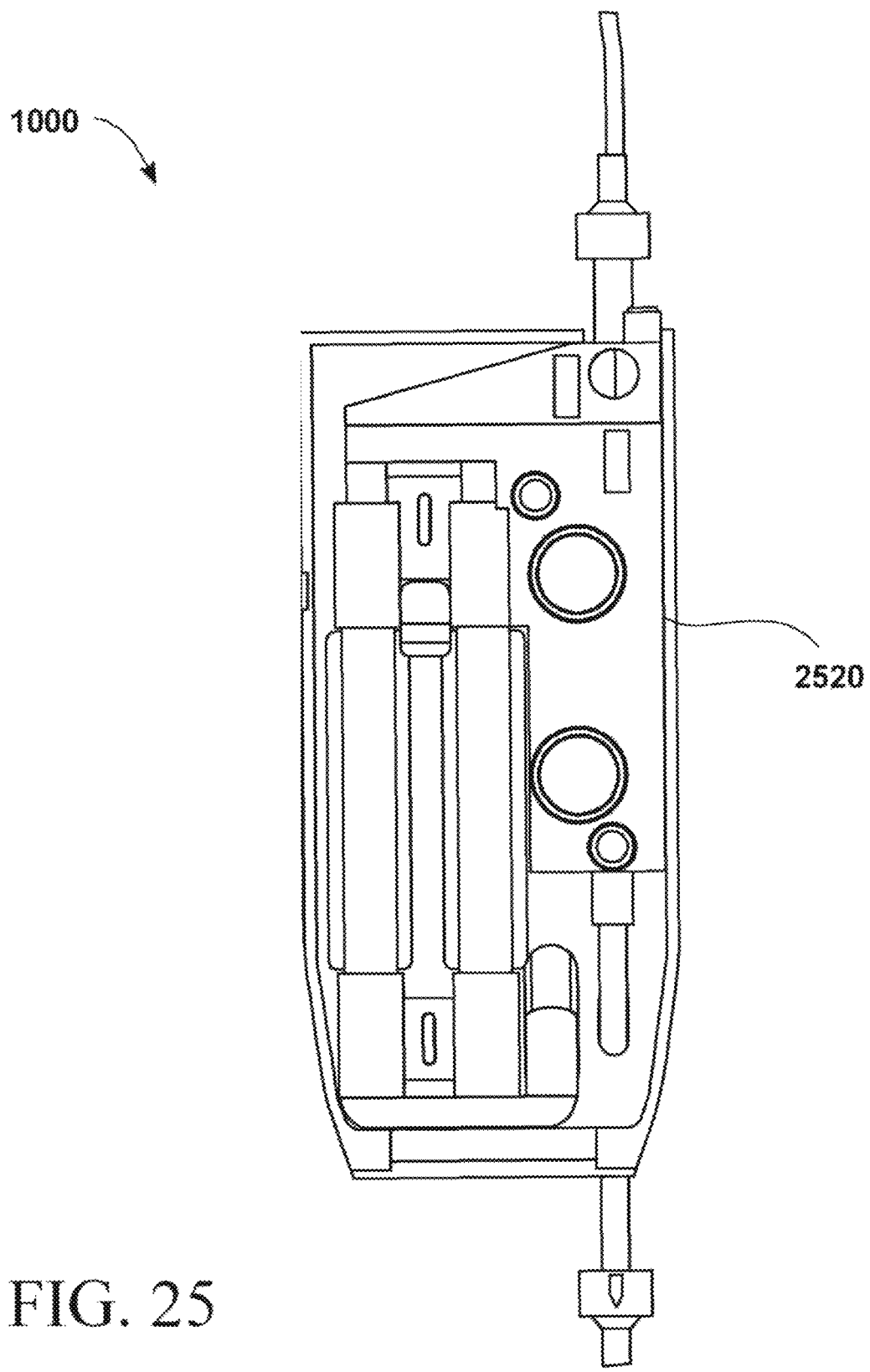
FIG. 25 is a detail view of area 25 of FIG. 24 according to some embodiments of the invention.
Figure 26:
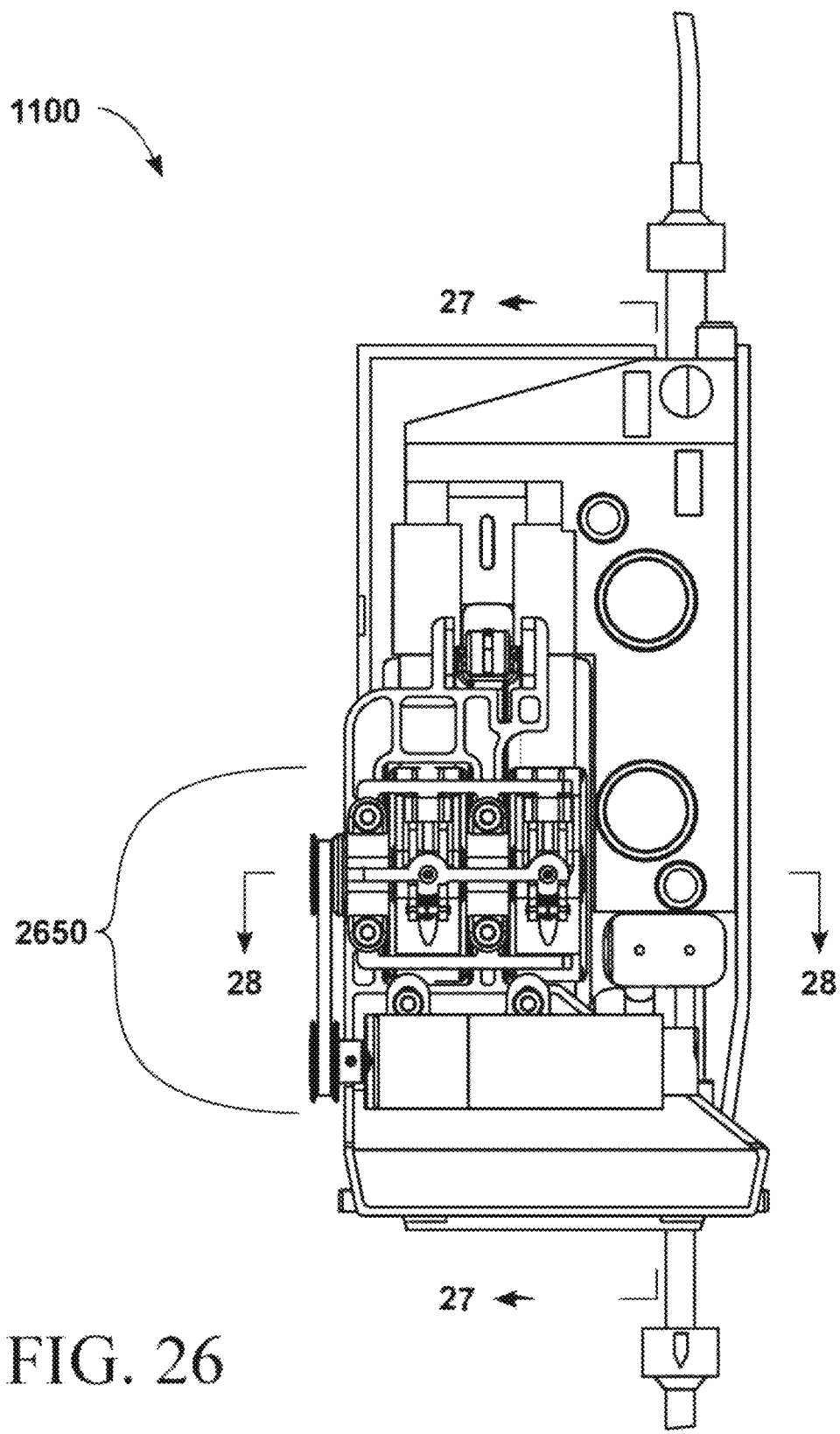
FIG. 26 is a detail view of an embodiment of the invention of area 25 of FIG. 24 but with the addition parts which interact with the sterile disposable assembly to form a pumping mechanism according to some embodiments of the invention.
Figure 27:
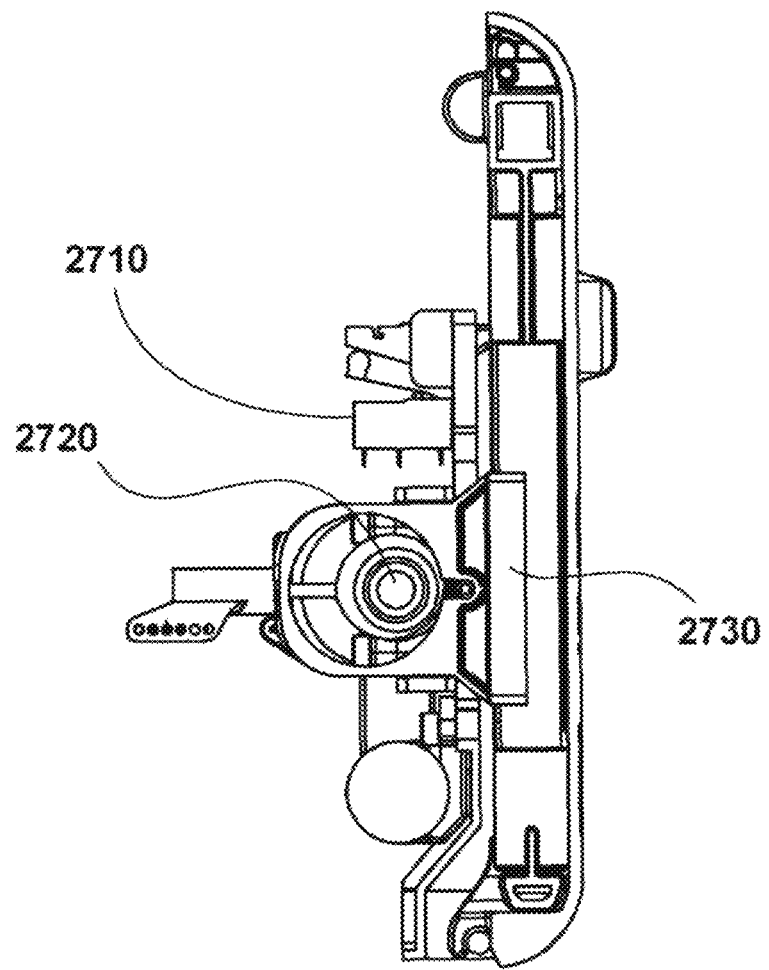
FIG. 27 is a sectional view along line 27-27 of FIG. 26 according to some embodiments of the invention.
Figure 28:
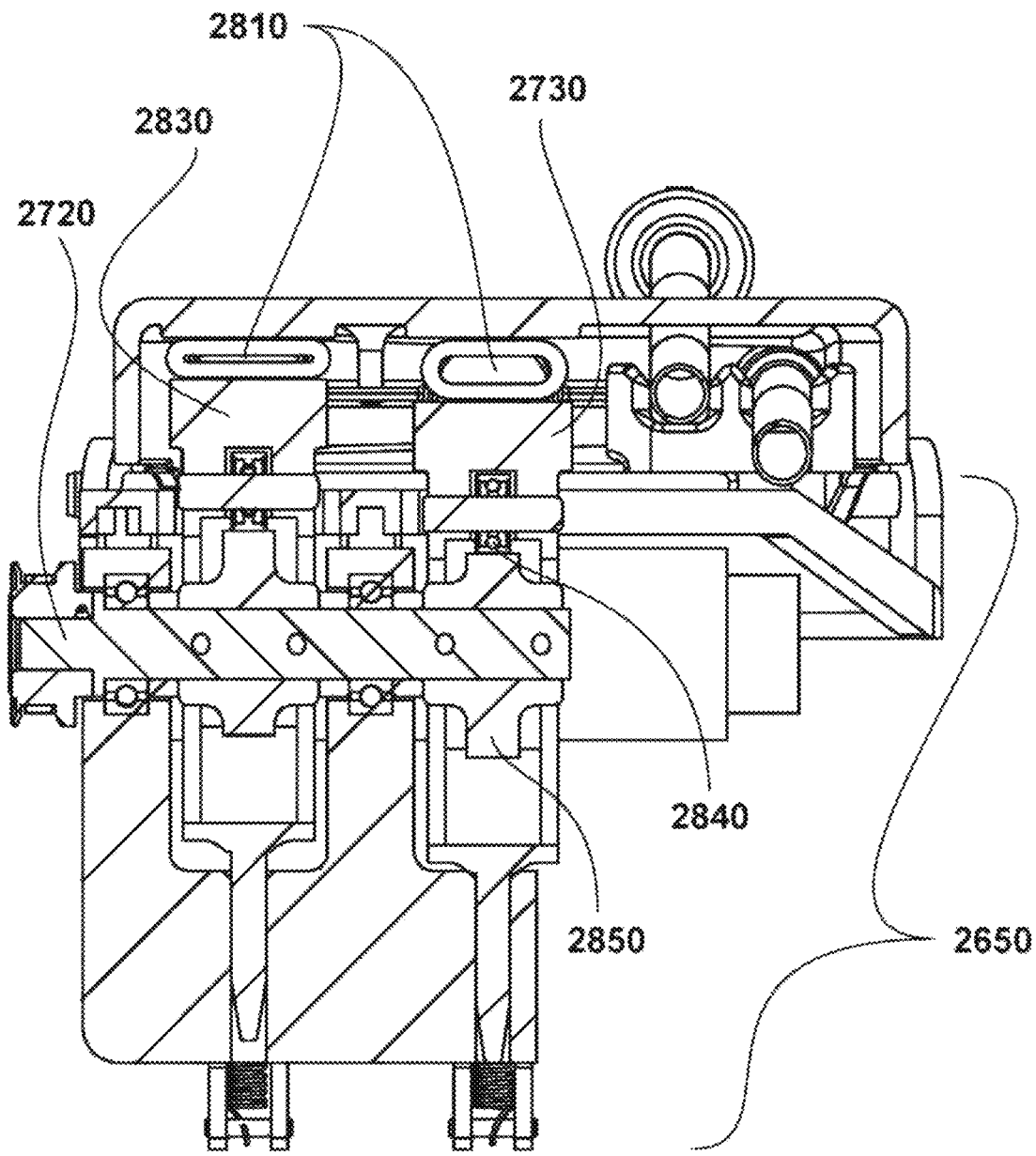
FIG. 28 is a sectional view along line 28-28 of FIG. 26 according to some embodiments of the invention.
Figure 29:
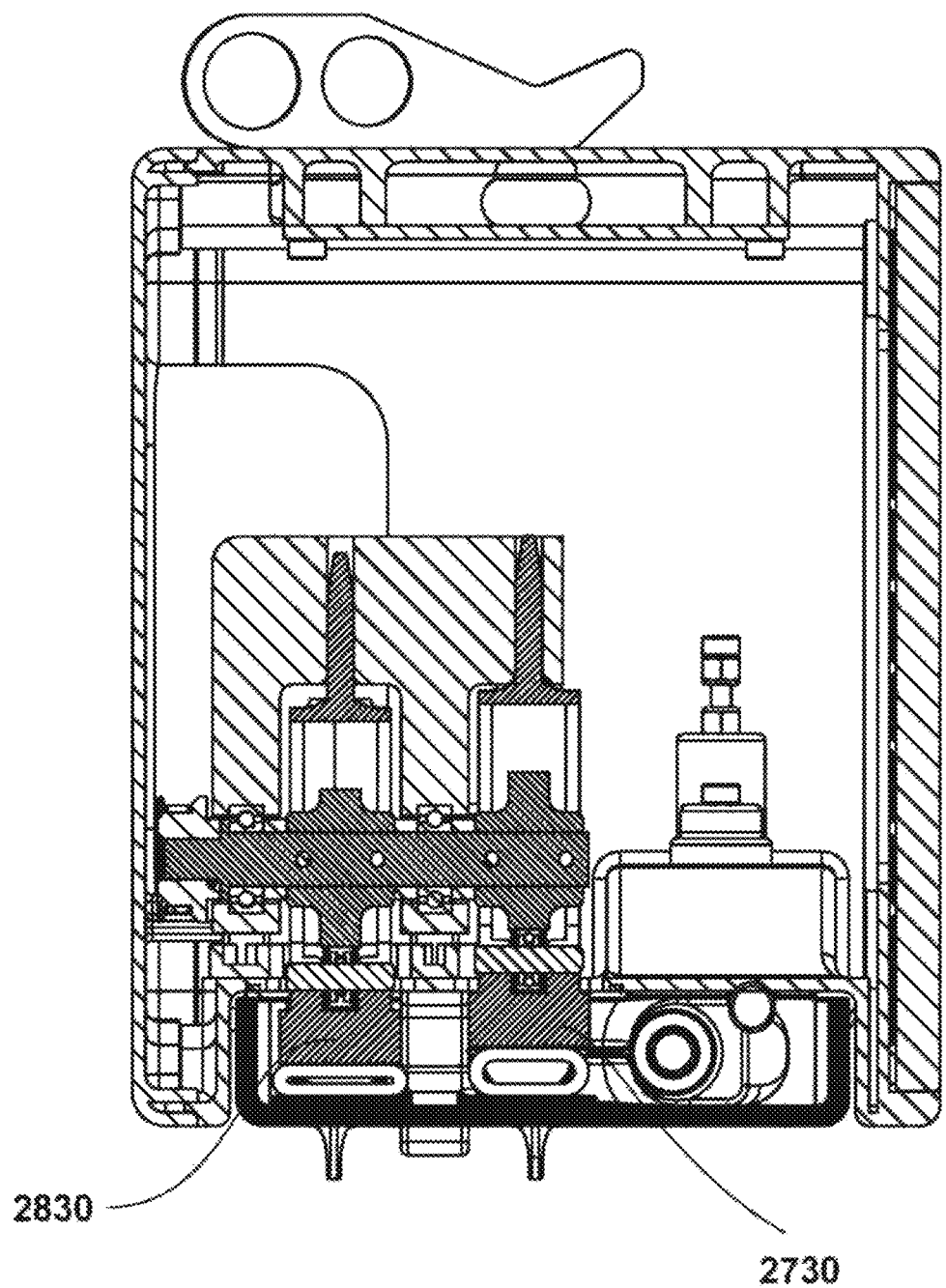
FIG. 29 is a sectional view of a pumping mechanism mounted in a reusable housing according to some embodiments of the invention.
Figure 30:
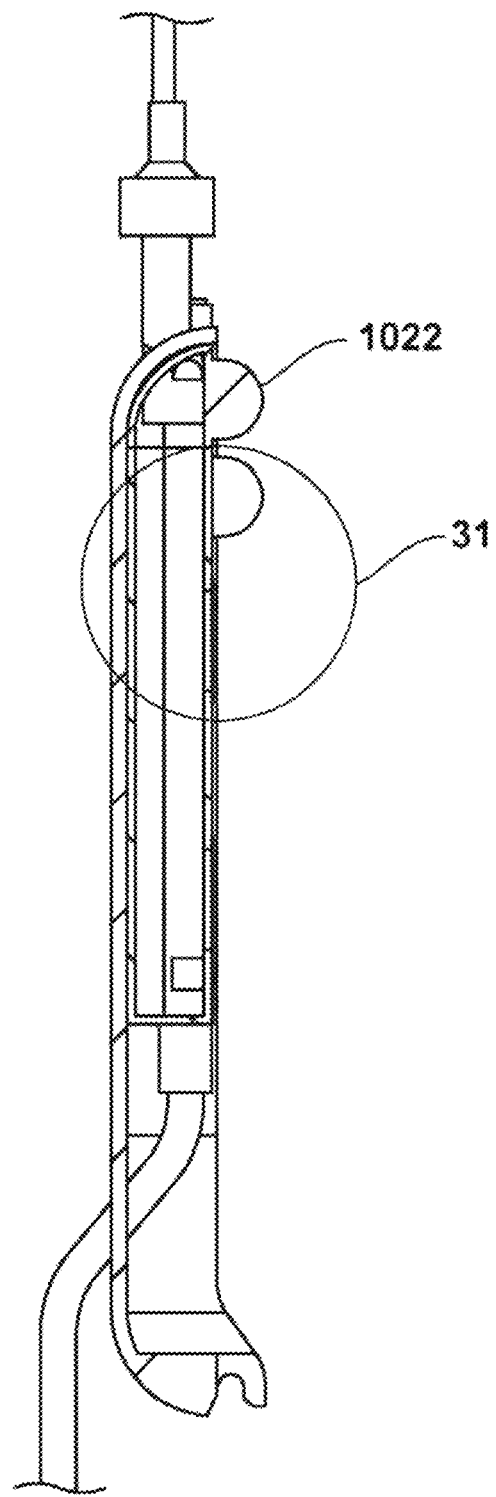
FIG. 30 is a sectional view along line 30-30 of FIG. 24 according to some embodiments of the invention.
Figure 31:
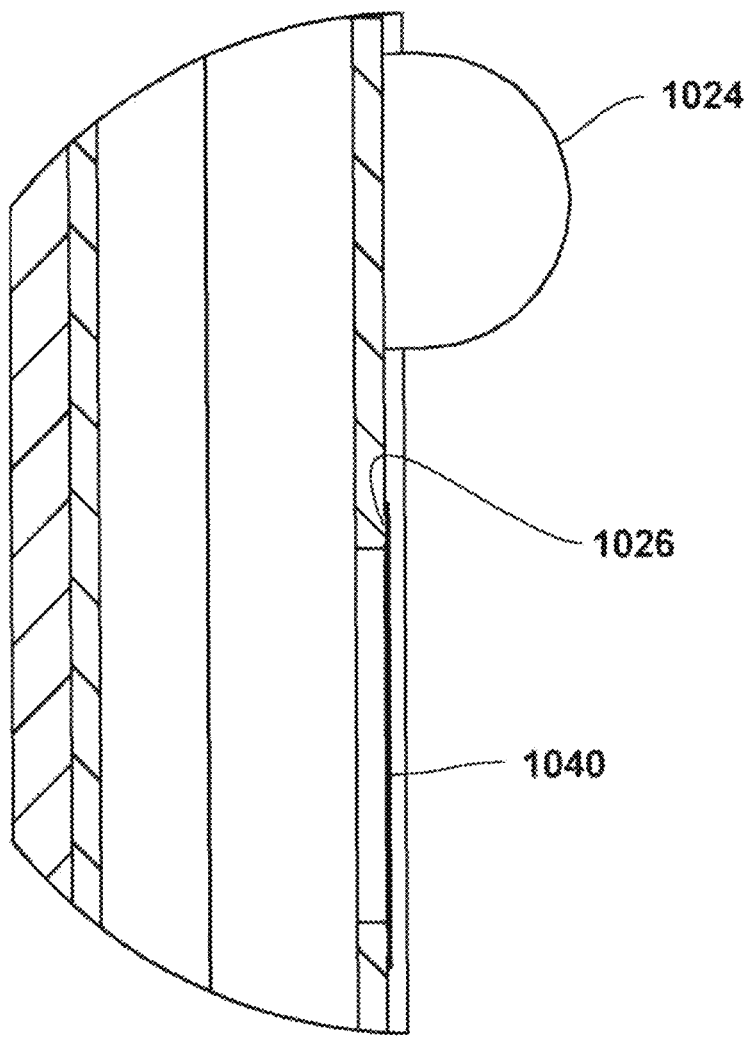
FIG. 31 is a detail view of area 31 of FIG. 30 according to some embodiments of the invention.
Figure 32:
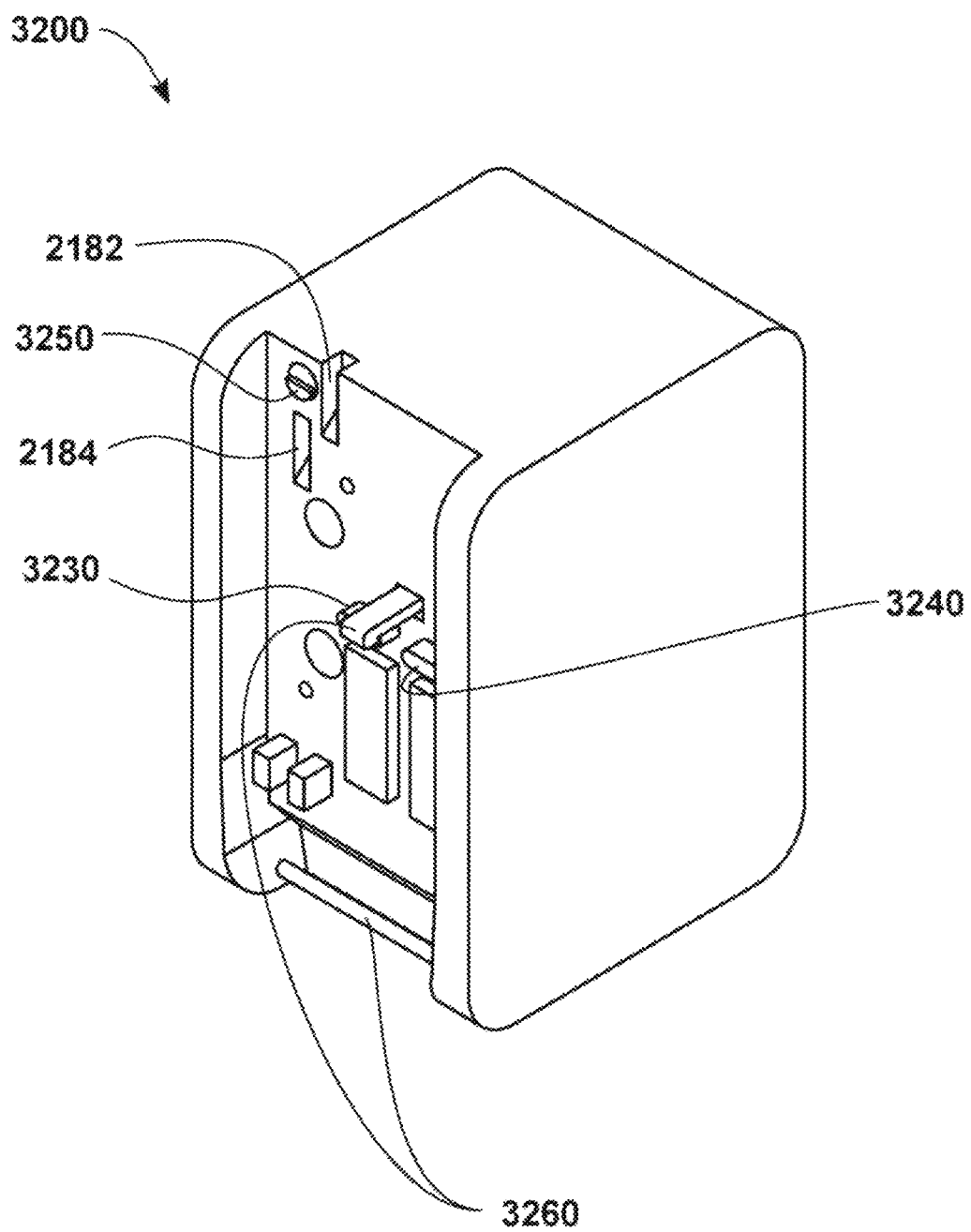
FIG. 32 is a perspective view of reusable assembly according to some embodiments of the invention.
Figure 33:
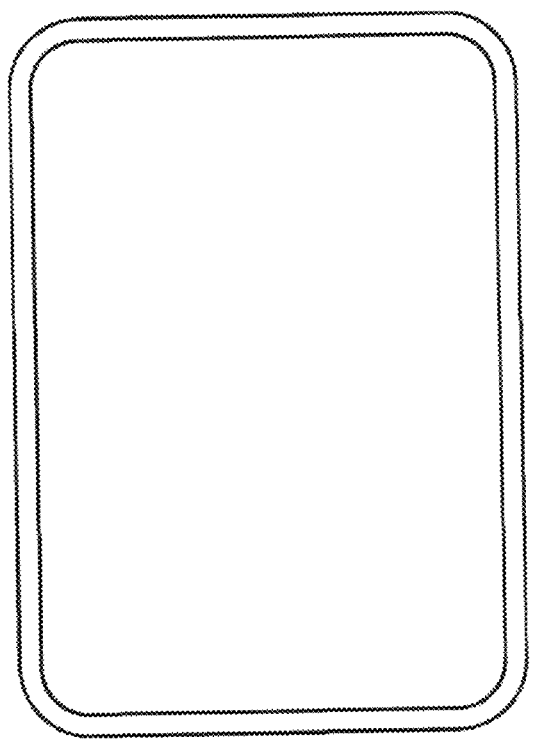
FIG. 33 is a left side elevation view of reusable assembly according to some embodiments of the invention.
Figure 34:
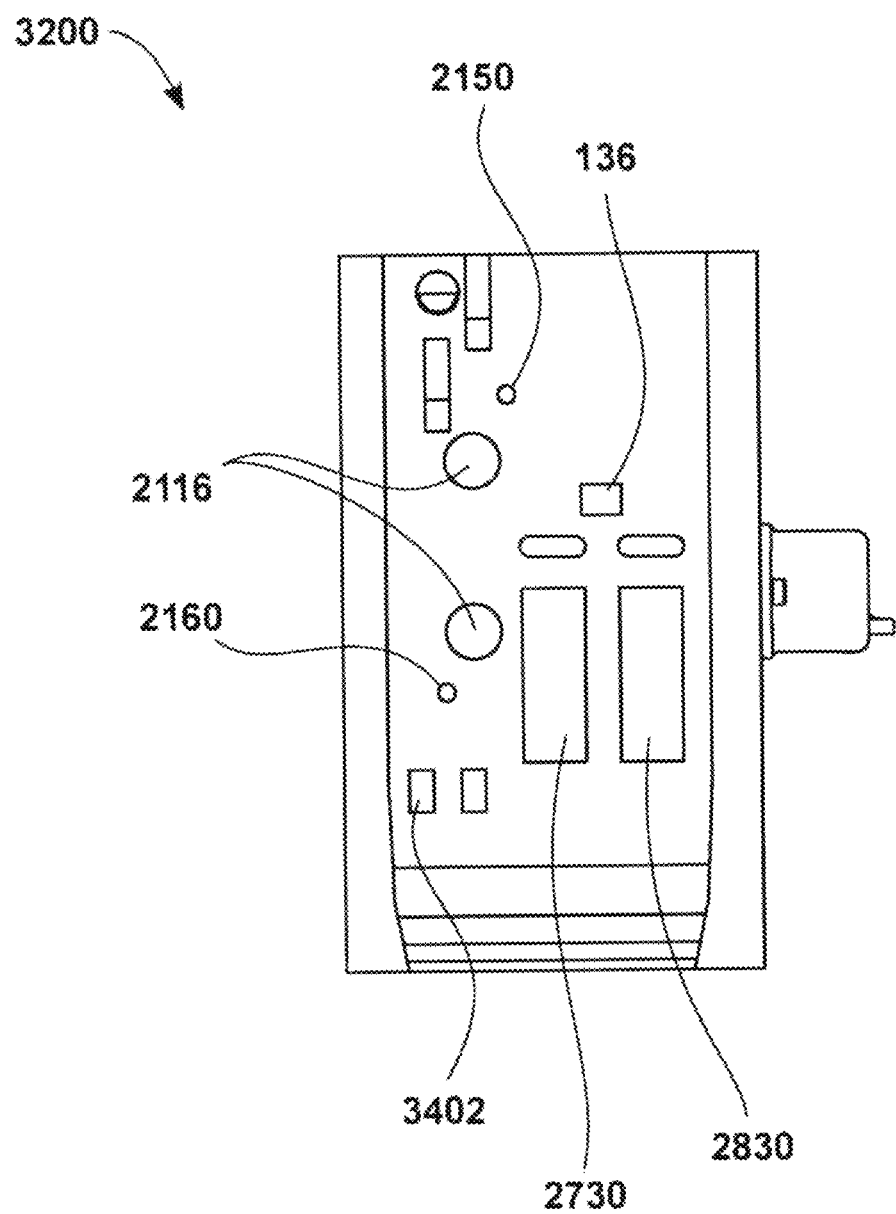
FIG. 34 is a front elevation view of reusable assembly according to some embodiments of the invention.
Figure 35:
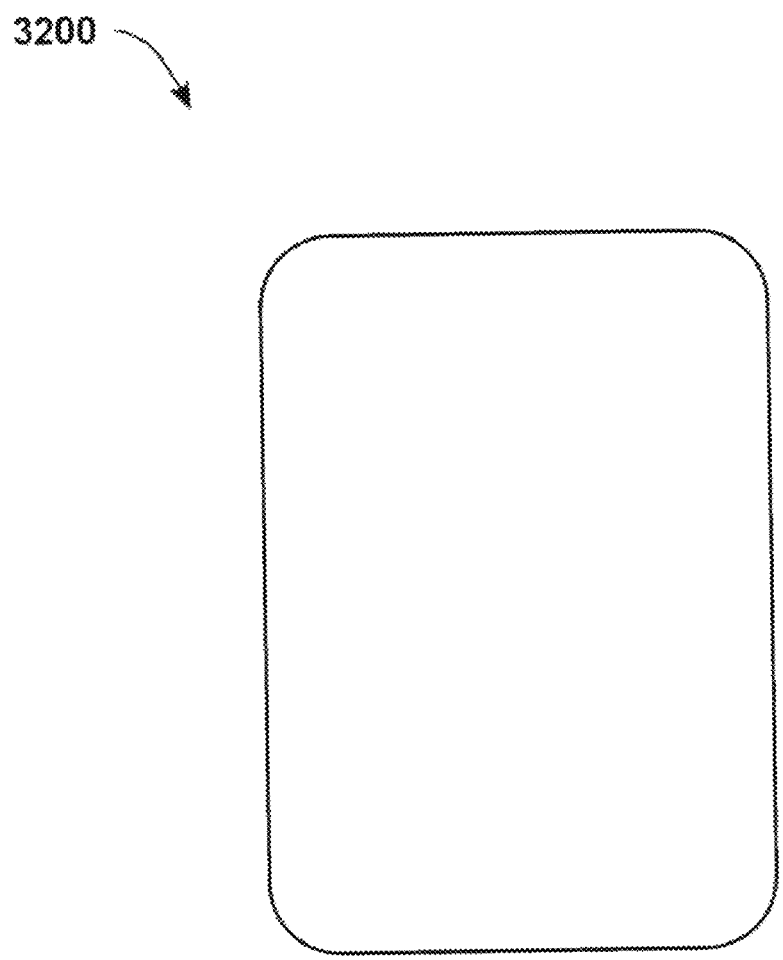
FIG. 35 is a right side elevation view of reusable assembly according to some embodiments of the invention.
Figure 36:
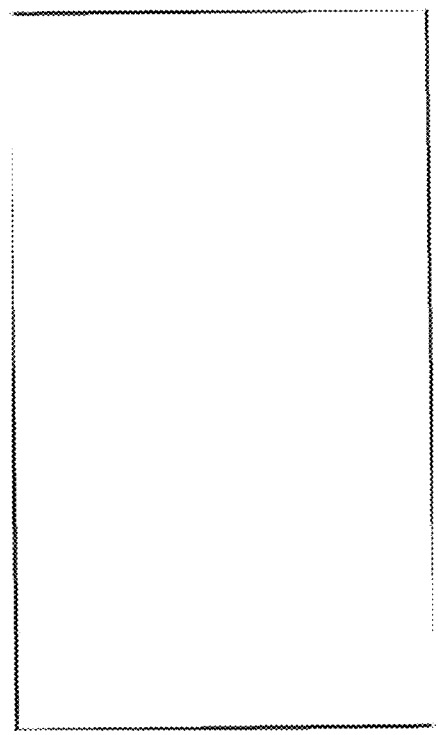
FIG. 36 is a back elevation view of reusable assembly according to some embodiments of the invention.
Figure 37:
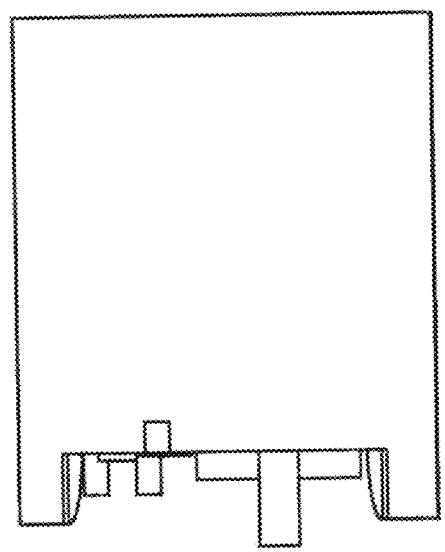
FIG. 37 is a top plan view of reusable assembly according to some embodiments of the invention.
Figure 38:
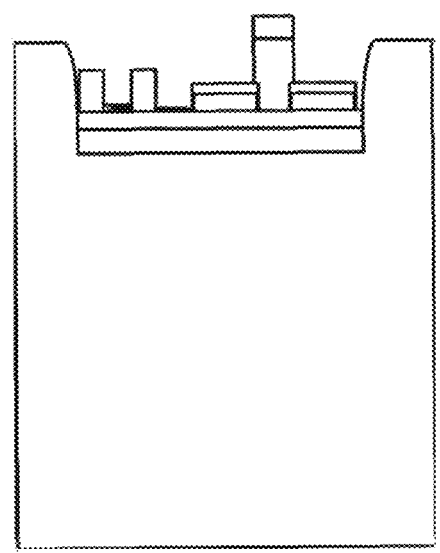
FIG. 38 is a bottom plan view of reusable assembly according to some embodiments of the invention.
Figure 39:
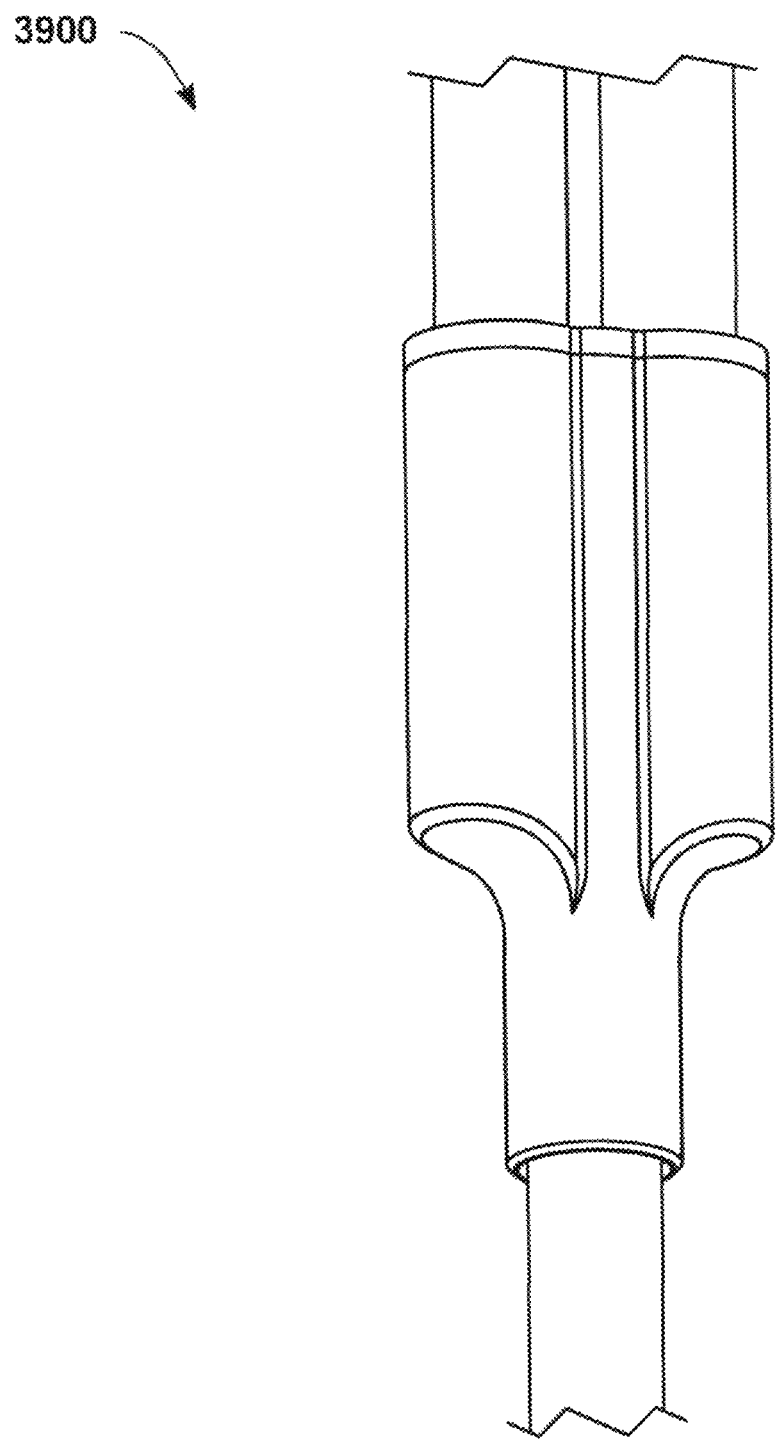
FIG. 39 is a perspective view of one-way valves fitted in conduit upstream of junction of plurality of conduits according to some embodiments of the invention.
Figure 40:
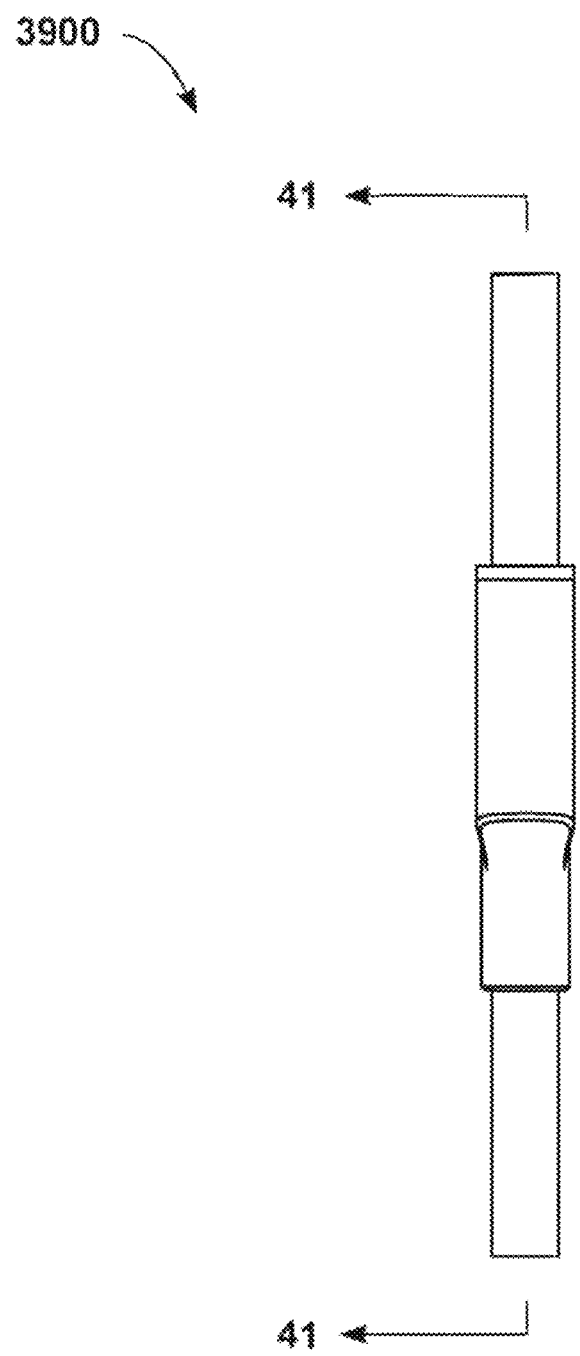
FIG. 40 is a left side elevation view of one-way valves fitted in conduit upstream of junction of plurality of conduits according to some embodiments of the invention.
Figure 41:
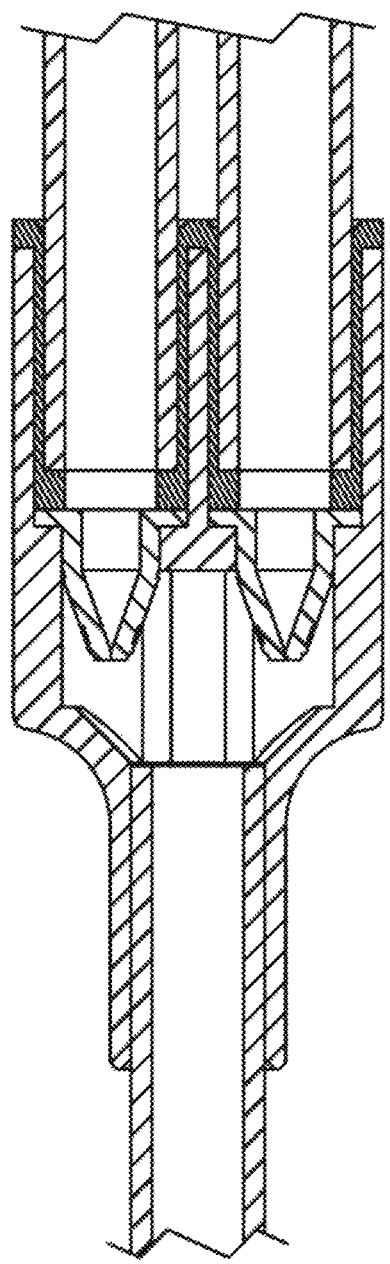
FIG. 41 is a sectional view along line 41-41 of FIG. 40 according to some embodiments of the invention.
Figure 42:
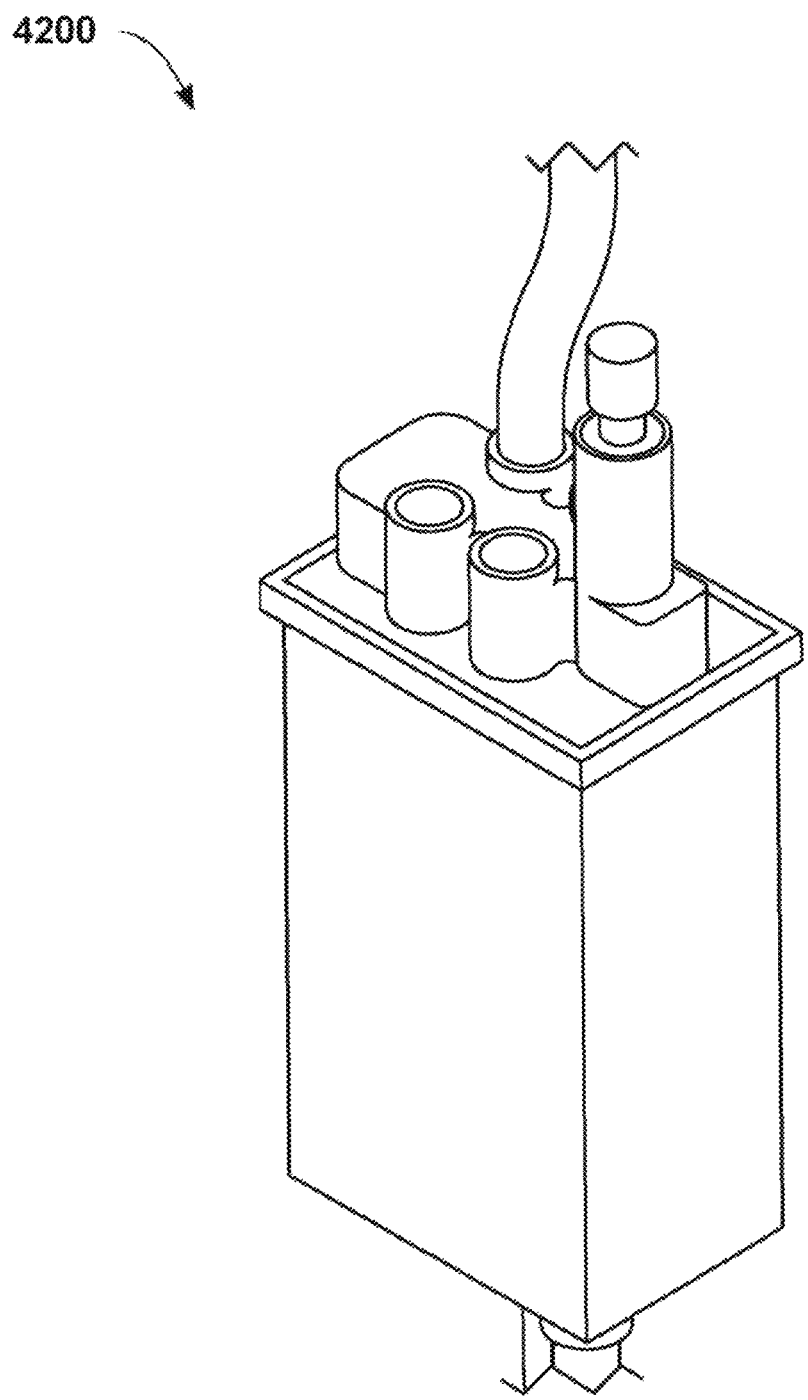
FIG. 42 is a perspective view of filter assembly with passive air release according to some embodiments of the invention.
Figure 43:
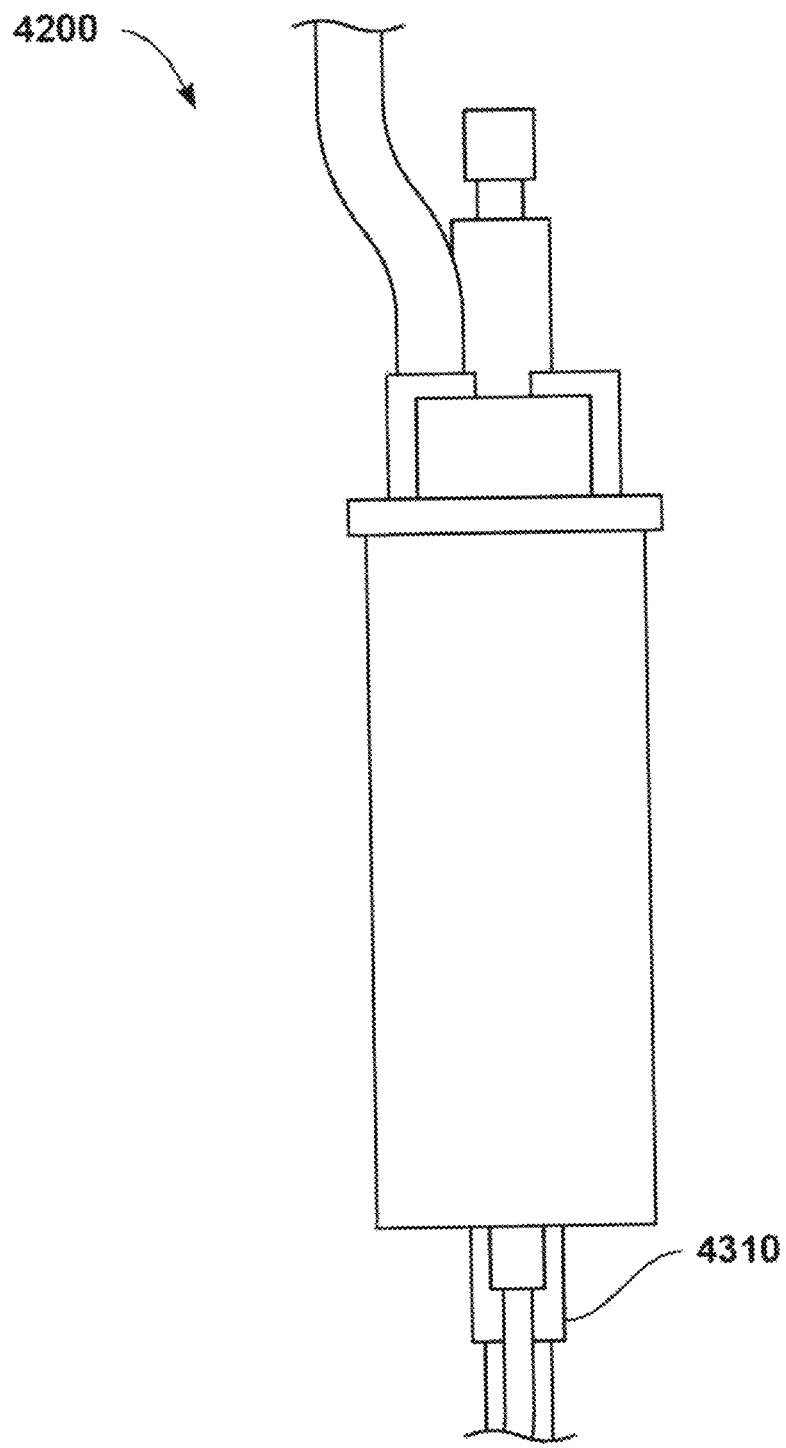
FIG. 43 is a left side elevation view of filter assembly with passive air release according to some embodiments of the invention.
Figure 44:
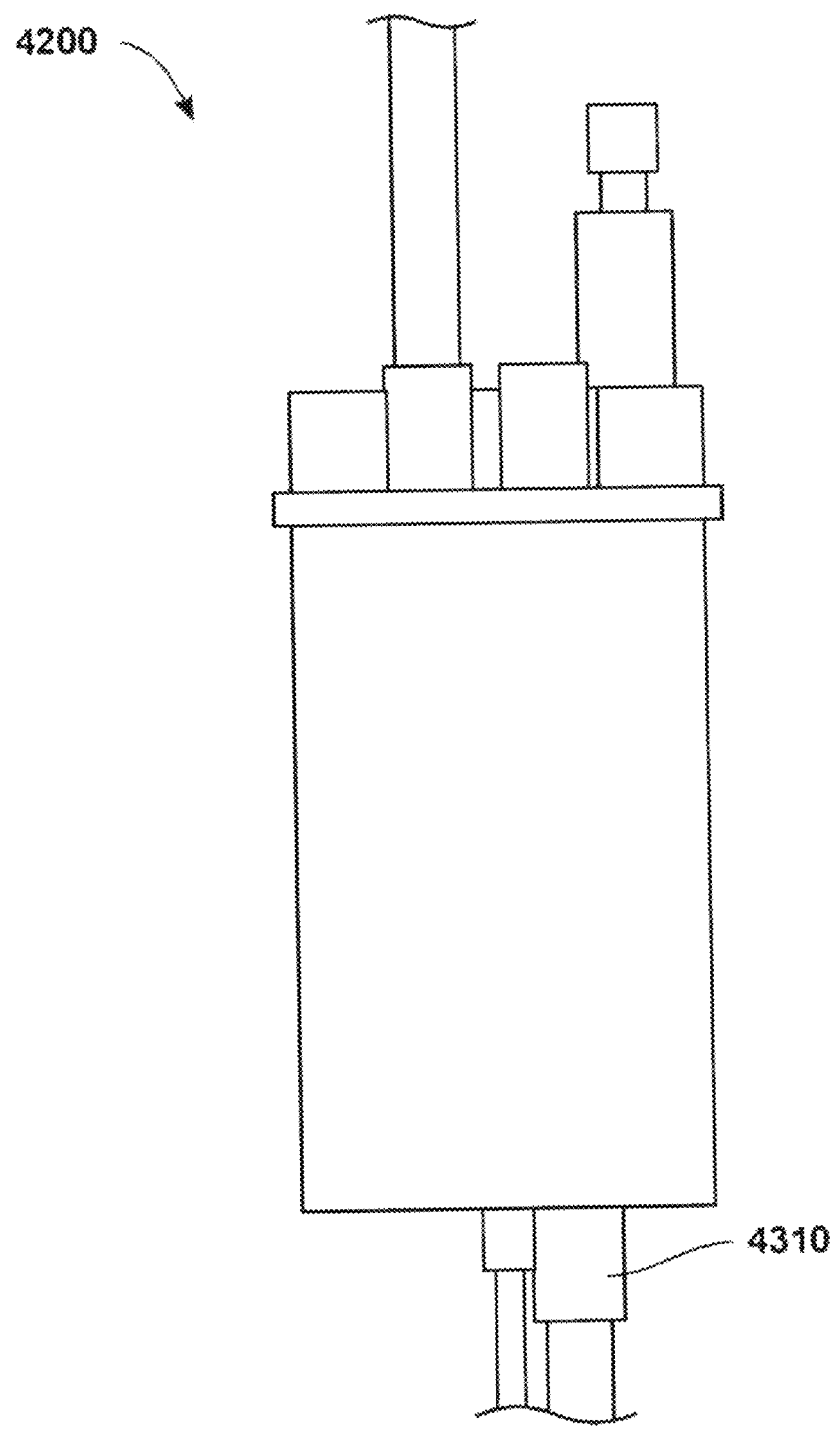
FIG. 44 is a front elevation view of filter assembly with passive air release according to some embodiments of the invention.
Figure 45:
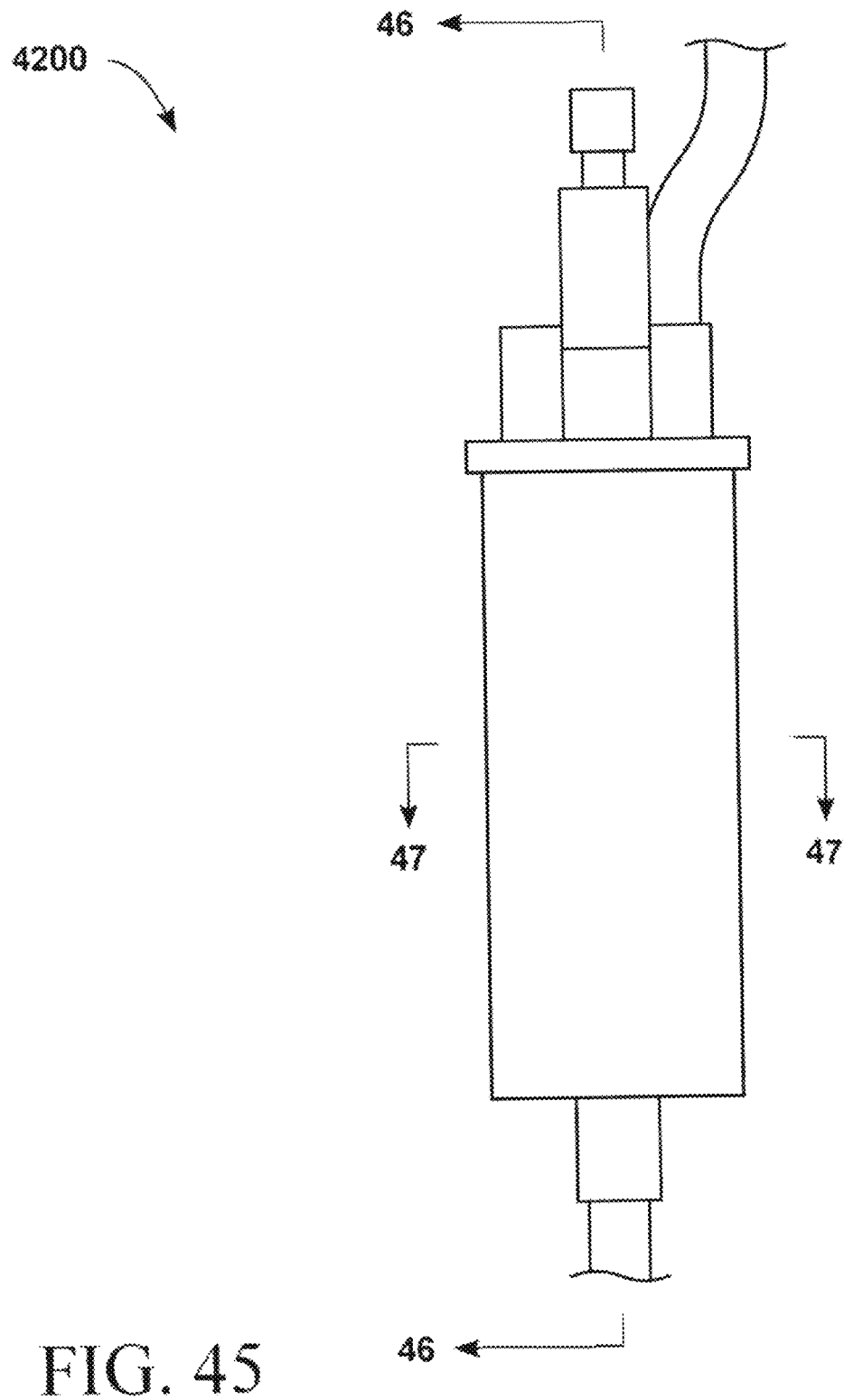
FIG. 45 is a right side elevation view of filter assembly with passive air release according to some embodiments of the invention.
Figure 46:
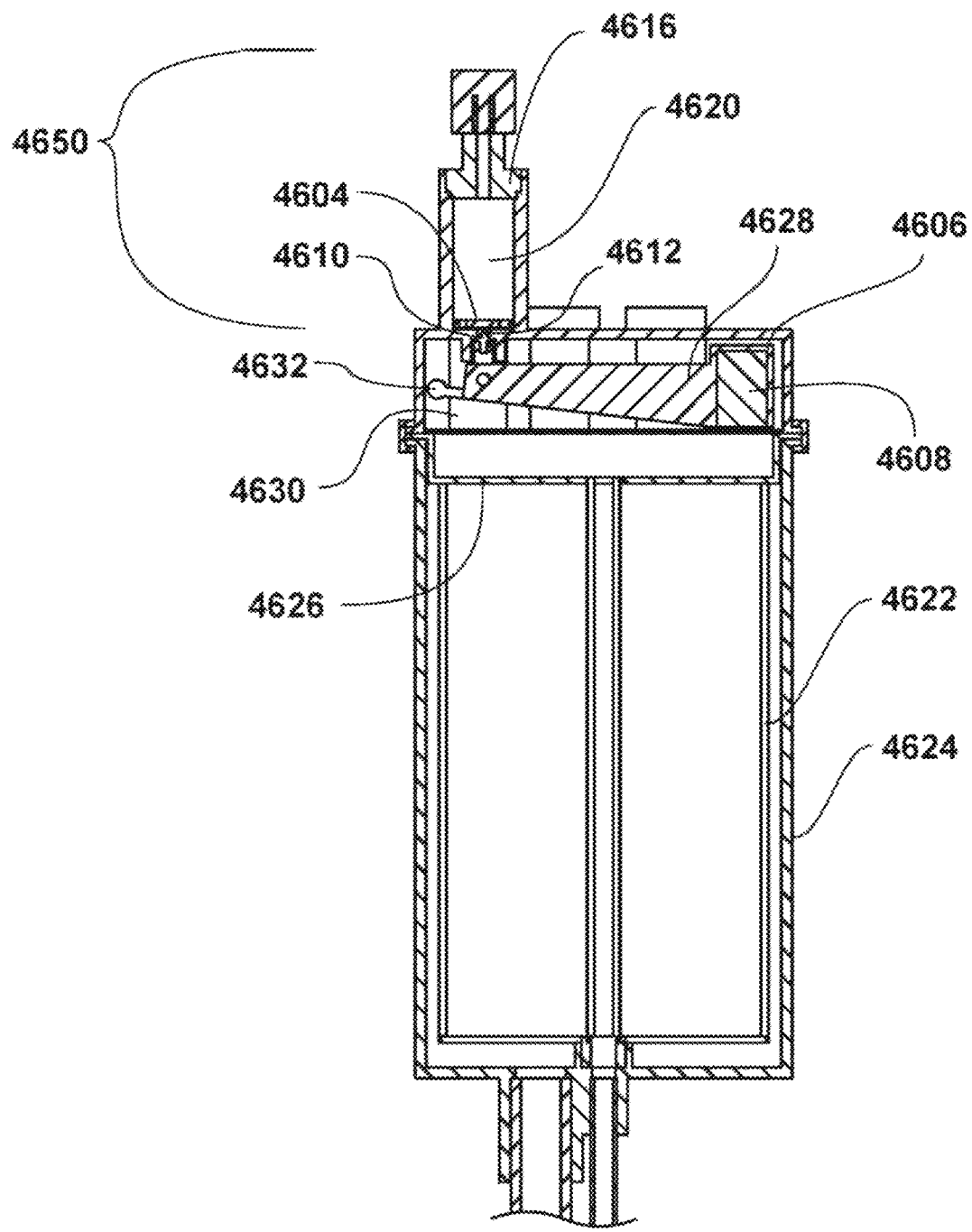
FIG. 46 is a sectional view along line 46-46 of FIG. 45 according to some embodiments of the invention.
Figure 47:
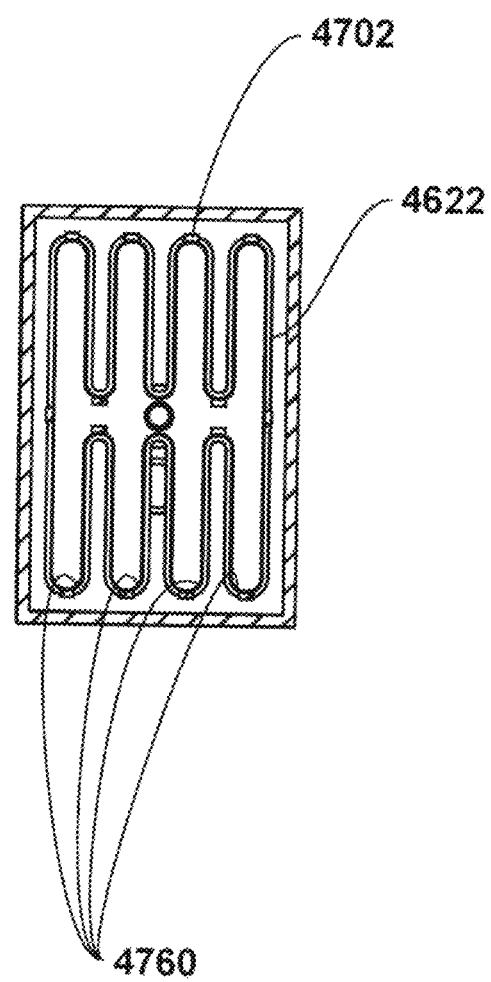
FIG. 47 is a sectional view along line 47-47 of FIG. 45 according to some embodiments of the invention.
Figure 48:
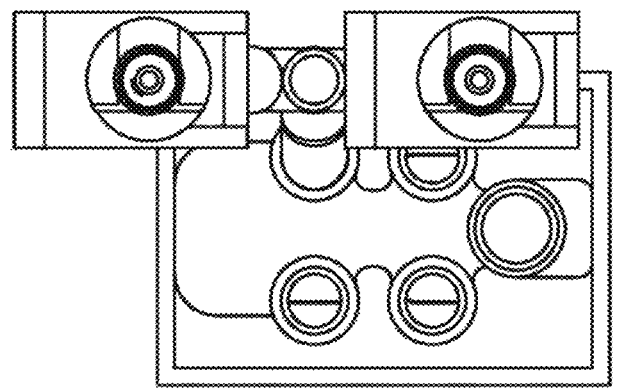
FIG. 48 is a top plan view of filter assembly with passive air release according to some embodiments of the invention.
Figure 49:
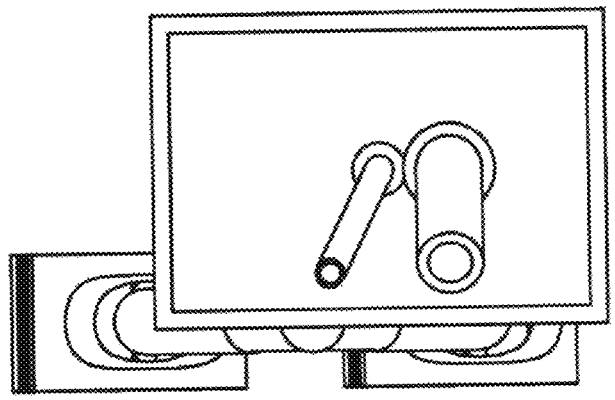
FIG. 49 is a bottom plan view of filter assembly with passive air release according to some embodiments of the invention.
Figure 50:
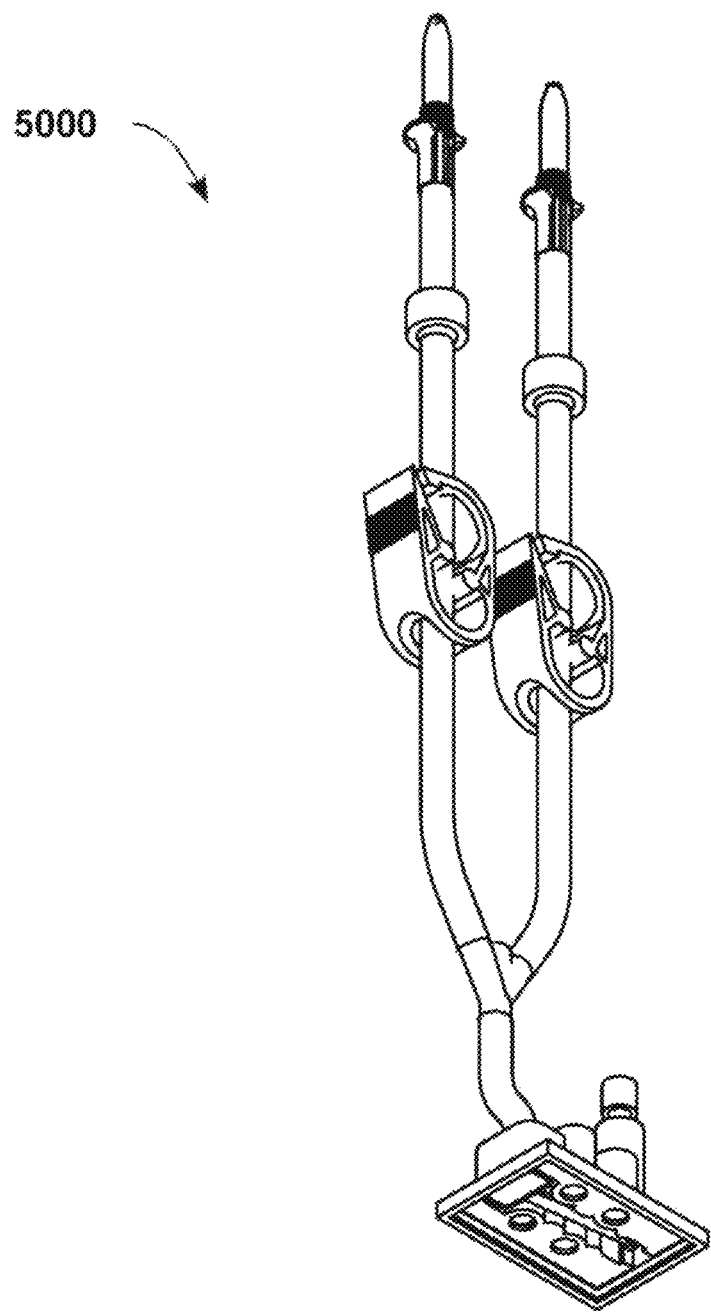
FIG. 50 is a perspective view of manifold assembly according to some embodiments of the invention.
Figure 52:
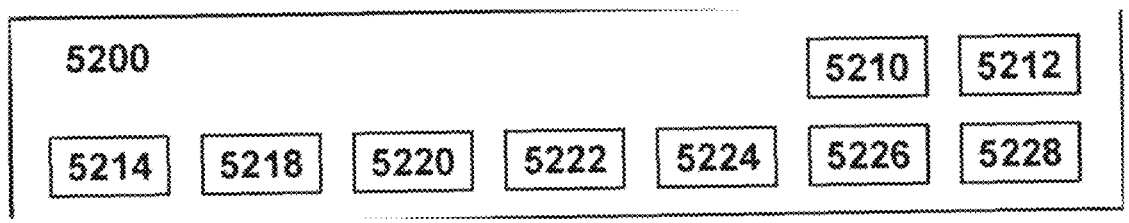
FIG. 52 is a simplified schematic of a system view of medical fluid delivery device with fluid detector according to some embodiments of the invention.
Figure 55:
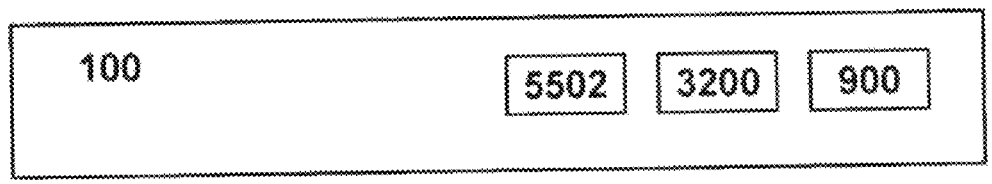
FIG. 55 is a simplified schematic of a system view of assemblies according to some embodiments of the invention.
Figure 56:
FIG. 56 is a simplified schematic of a system view of computer configuration according to some embodiments of the invention.
Figure 57:
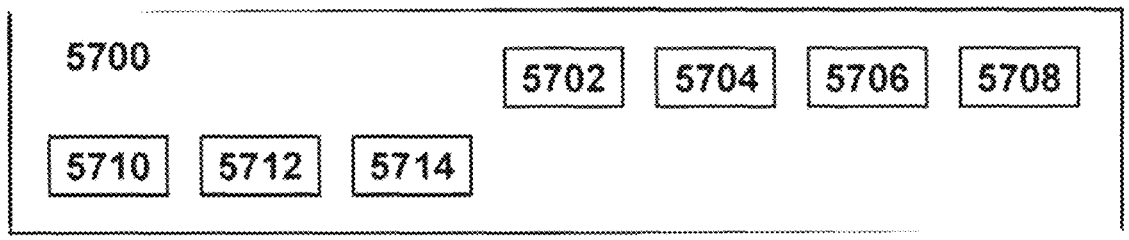
FIG. 57 is a simplified schematic of a system view of disposables according to some embodiments of the invention.
Figure 64:
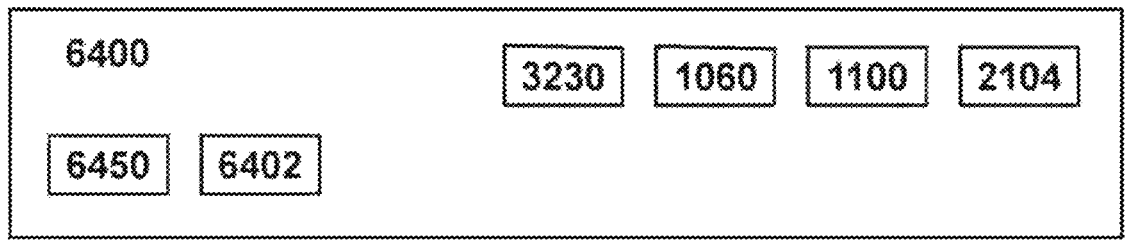
FIG. 64 is a simplified schematic of a system view of medical fluid delivery device with feedback according to some embodiments of the invention.
Figure 70:
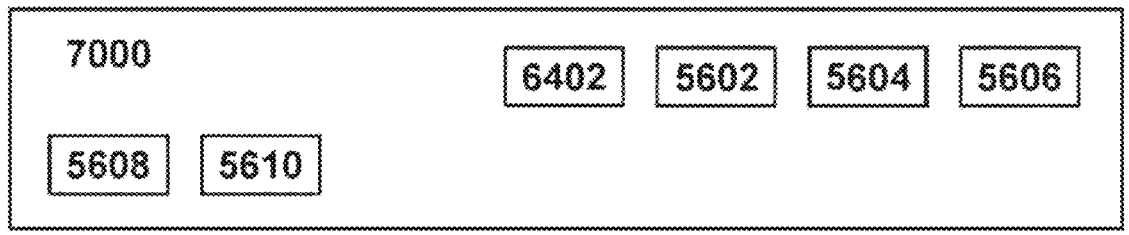
FIG. 70 is a simplified schematic of a system view of computer configuration according to some embodiments of the invention.
Figure 71:
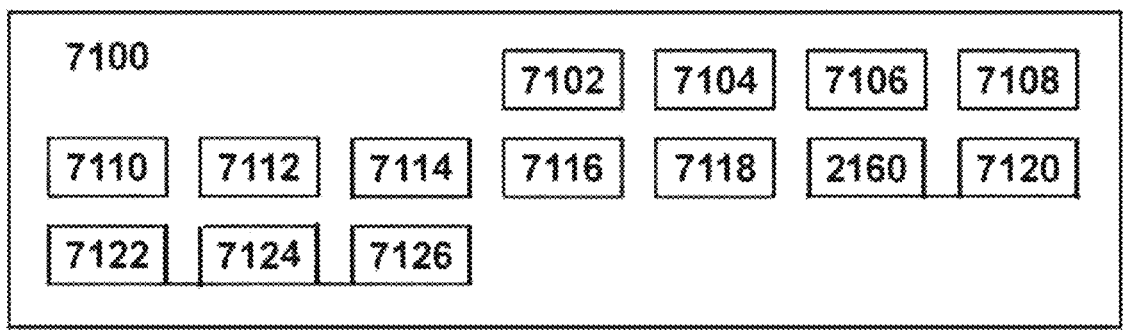
FIG. 71 is a simplified schematic of a system view of medical fluid delivery device with a particular cross-section according to some embodiments of the invention.
Figure 72:
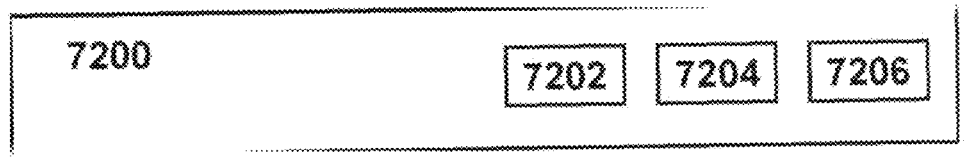
FIG. 72 is a simplified schematic of a system view of medical fluid delivery device that transfers fluid from one patient to the same patient or another patient according to some embodiments of the invention.
Figure 73:
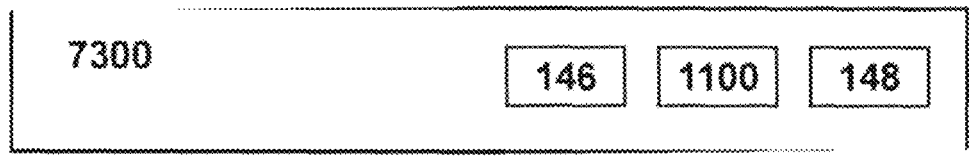
FIG. 73 is a simplified schematic of a system view of medical fluid delivery device with free-flow protection according to some embodiments of the invention.
Figure 76:
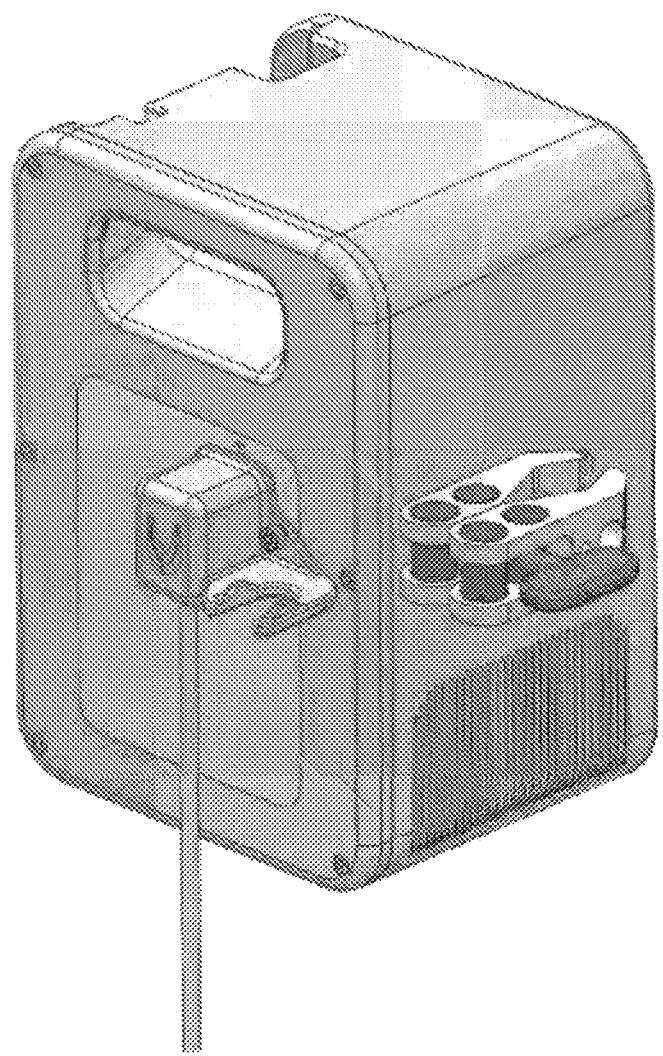
FIG. 76 is a perspective view of reusable assembly according to some embodiments of the invention.
Figure 77:
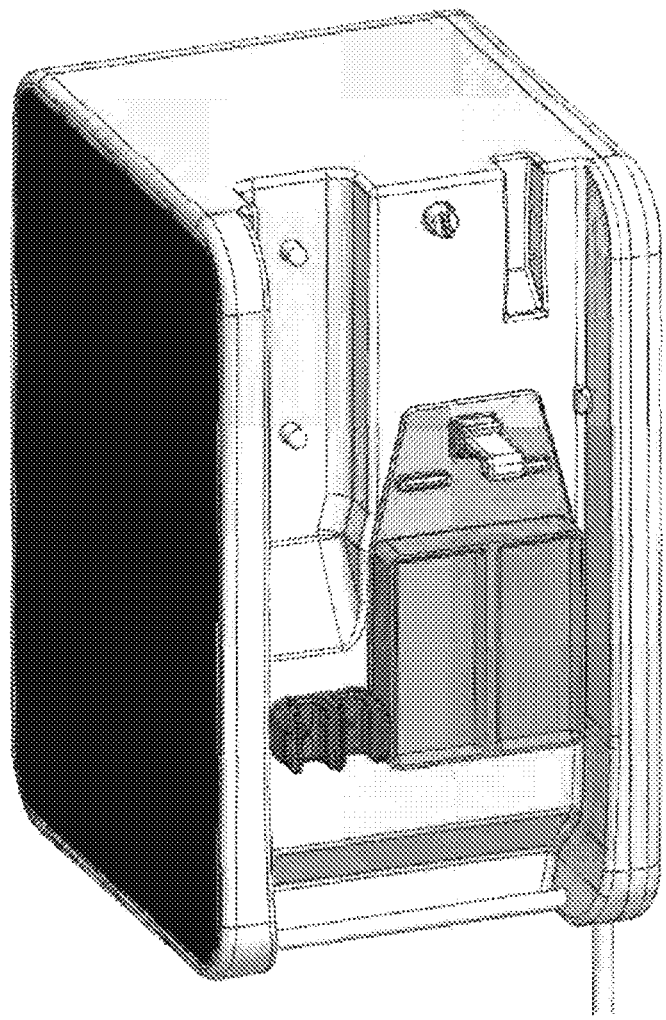
FIG. 77 is a perspective view of reusable assembly according to some embodiments of the invention.
Figure 78:
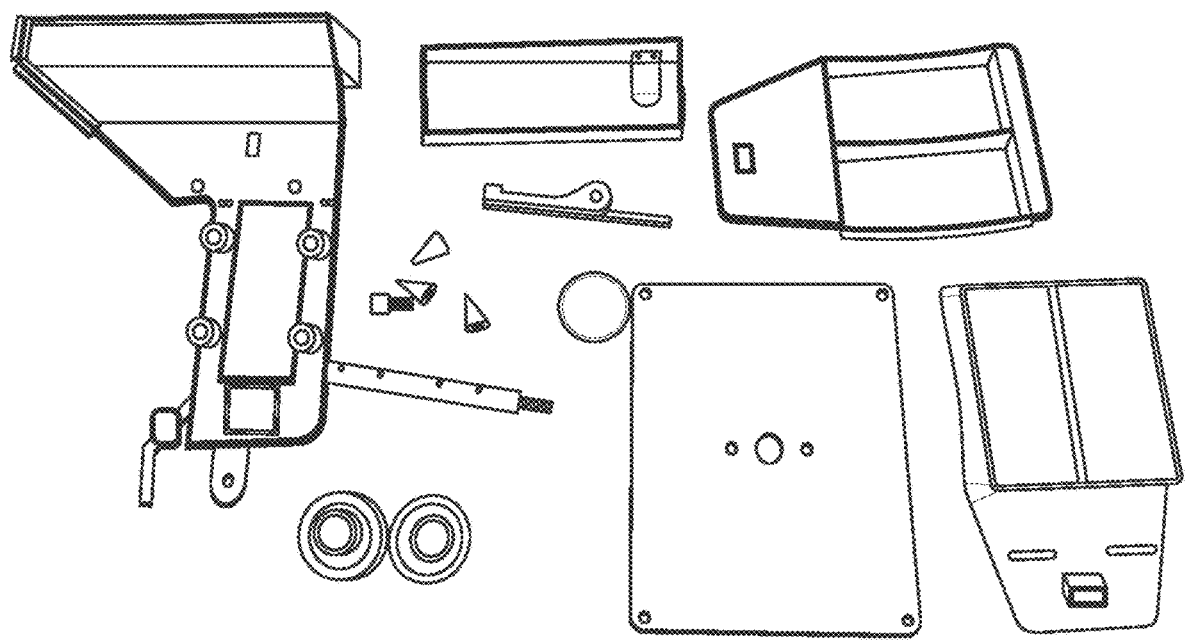
FIG. 78 is a perspective view of device components according to some embodiments of the invention.
Figure 79:
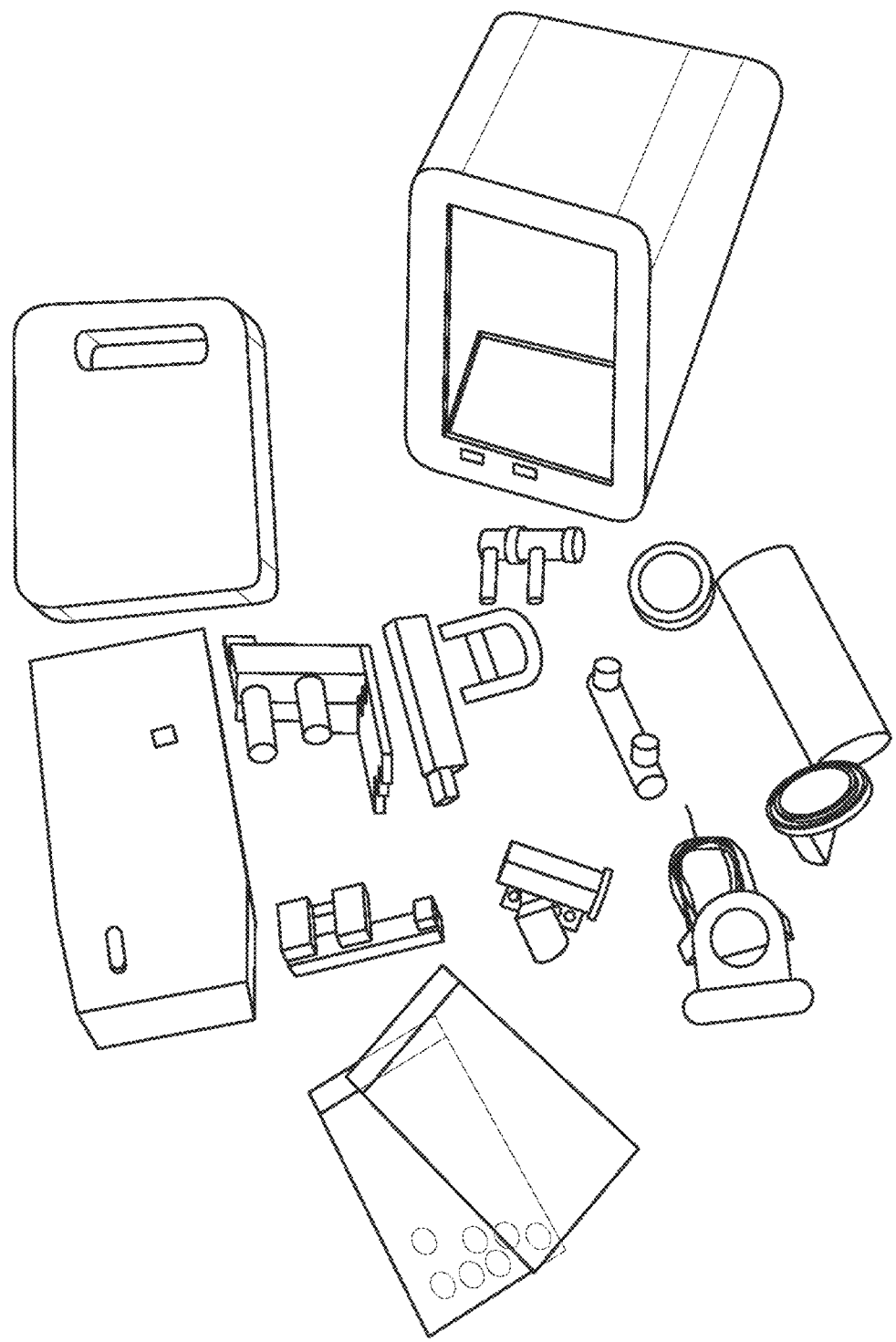
FIG. 79 is a perspective view of device components according to some embodiments of the invention.
Figure 80:
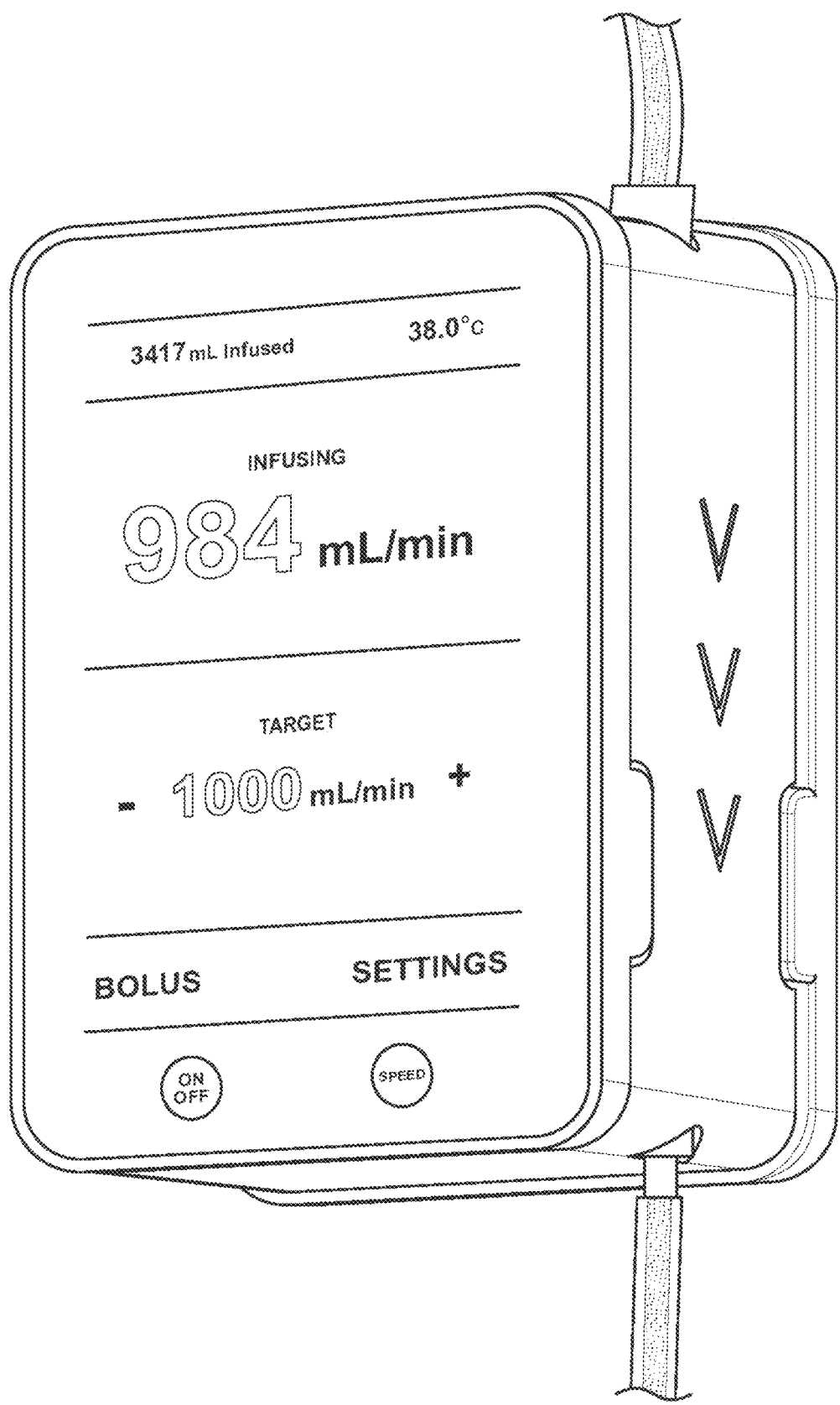
FIG. 80 is a perspective view of an apparatus comprising reusable and disposable assemblies according to some embodiments of the invention.
Figure 81:
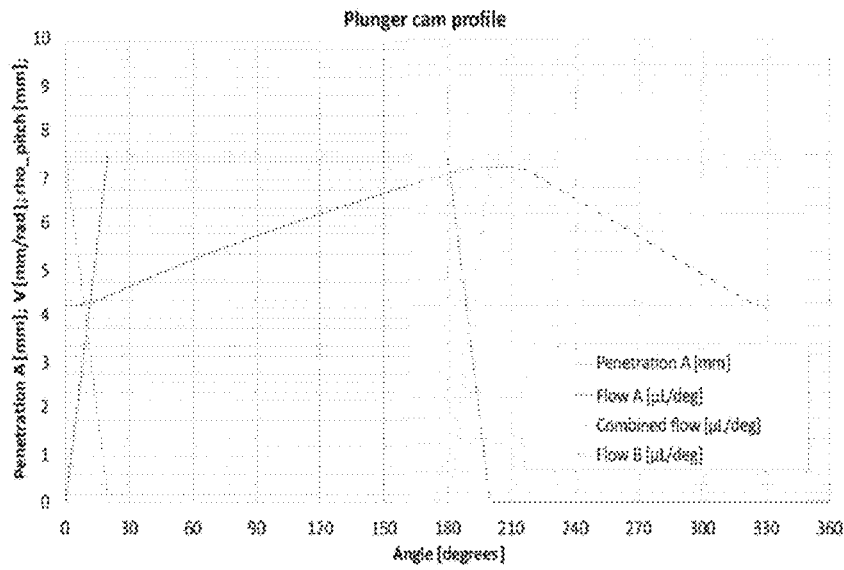
FIG. 81 is a simplified schematic of a system view of medical device with continuous flow according to some embodiments of the invention.
Figure 82:
FIG. 82 is a perspective view of an apparatus comprising reusable and disposable assemblies according to some embodiments of the invention.
Figure 83:
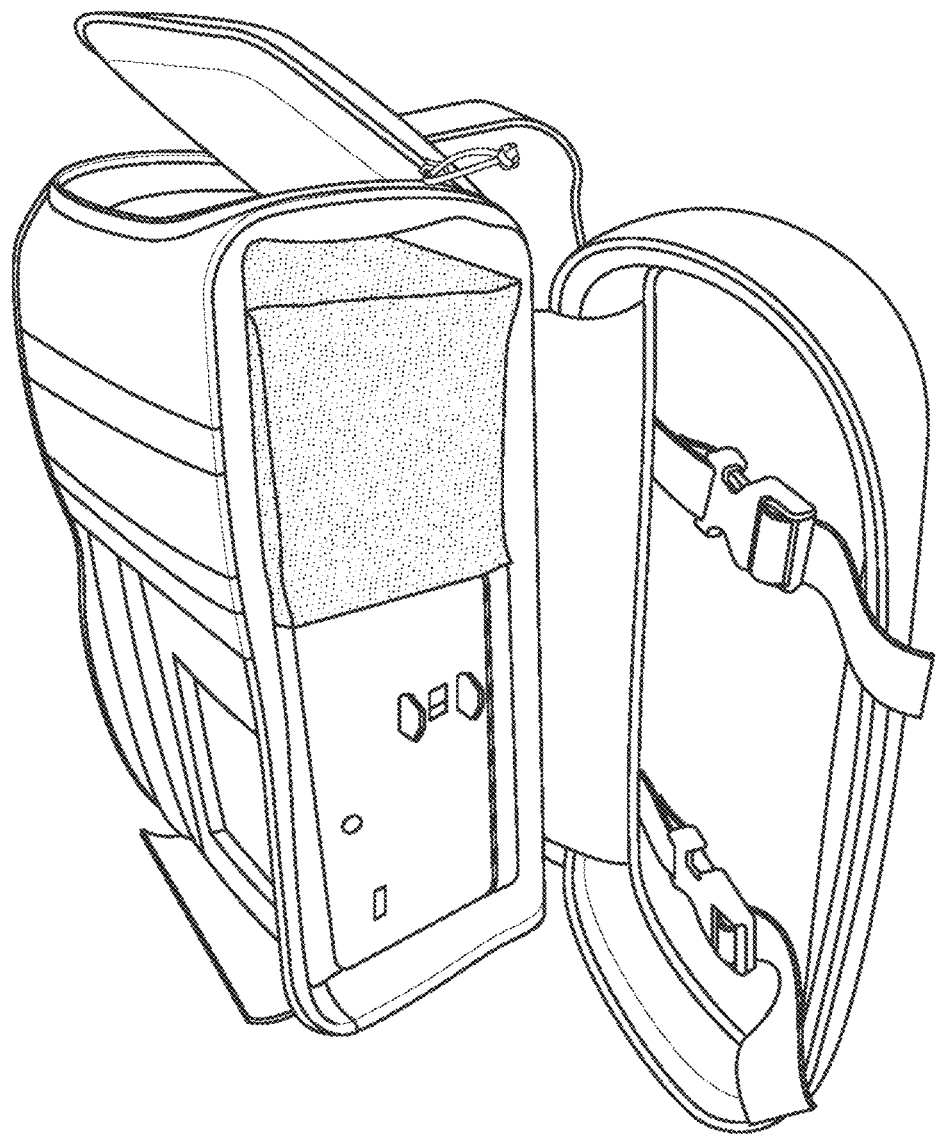
FIG. 83 is a perspective view of a carrying bag able to contain an apparatus comprising reusable and disposable assemblies for medical fluid delivery and contain reservoirs or bags of fluid also contained within a carrying bag according to some embodiments of the invention.

An additional embodiment of the invention is the combination of the fluid delivery device assembled together with fluids to be delivered in a single carrying case with thermal insulation keeping the fluids at the desired storage temperature such that the fluid delivery device is configured to monitor the temperature of the stored fluids and optionally to control a cooling and/or heating system to keep the temperature of the fluids within a desired range and/or communicate the actual temperature of the fluids to a local or remote user. The temperature sensor may be mounting in the housing of the reusable apparatus, for example as should in item 702 in FIG. 7 such that the sensor is in thermal communication with the thermally insulated chamber or the temperature sensor may be mounted in the carrying case and monitored by near field or Bluetooth communication when the fluid delivery device is mounted in the carrying case.

In some embodiments, the medical fluid delivery device is configured to compensate the pumping rate, heating rate, air measurement, pressure measurement and other configurations or processes based on measured temperature, conduit forces, passage of time, pumping rate, heating rate, and/or various other physical parameters together with configured parameters all stored in non-volatile and/or random access memory of the control electronics where typically the magnitude of compensation will be proportionate and meant to counteract the effect of such properties of the soft conduit such as stiffness, compliance and/or expansion which change predictably over time and/or under the influence of temperature, pressure, humidity and other factors.

In some embodiments, the medical fluid delivery device is configured to perform temperature control of fluid cooler for field use.

The medical fluid delivery device may use RF ohmic heating to heat fluid while it is still in a storage reservoir for example IV or blood bag before it begins flowing through a conduit.

Measurement of temperature in order to determine the increase or decrease in heating power required to reach a target set point may be done indirectly without measuring temperature, but rather a temperature dependent parameter such as impedance, capacitance and/or inductance of the fluid.

The heating power may be provided in pulses which are synchronized with progress of pumping mechanism motion such that the correct stable temperature range is reached even when the flow is not uniform.

The pumping may be performed by impinging on the heating and/or air separation chamber for example if it is compliant enough to be partially flattened and elastic enough to spring back to a previously more voluminous geometry when reducing the impingement.

In some embodiments, electrodes are all on one face or side of the heating chamber on one side of fluid such that in order to ensure uniform temperature, especially at the warmest regions and to avoid hotspots, the heating chamber geometry shall cause the fluid to be disposed such that the current flow shall be distributed to avoid especially high areas/regions of current.

Heating of medical fluid may be performed as discussed above by any plurality of electrodes disposed at any plurality of points adjacent to a chamber of low or no conductivity.

A plurality of heating chambers may be disposed in-line with each other or in various connected arrangements such that each will heat fluid by a portion of the desired temperature increase.

The medical fluid delivery device may be configured, such that on-the-fly during heating, using control motorized variable capacitors and/or motorized variable inductors and/or switchable matrices of capacitors and/or inductors and/or resistors the device can configure itself to match the complex impedance of the fluid load and the RF source using the said variable or switchable components as an impedance matching network.

The frequency of the RF current may be configured before, during and/or after heating in order to help achieve impedance matching.

In some embodiments, passive gas removal chamber is configured with fluid input flow directed from a point below the ullage downwards so the incoming current and eddies do not interfere with the lever which is higher in the ullage space.

Fluid entry port typically directs flow to point which is not near the liquid exit port in order to prevent air entrainment and allow air separation.

Figure 84:
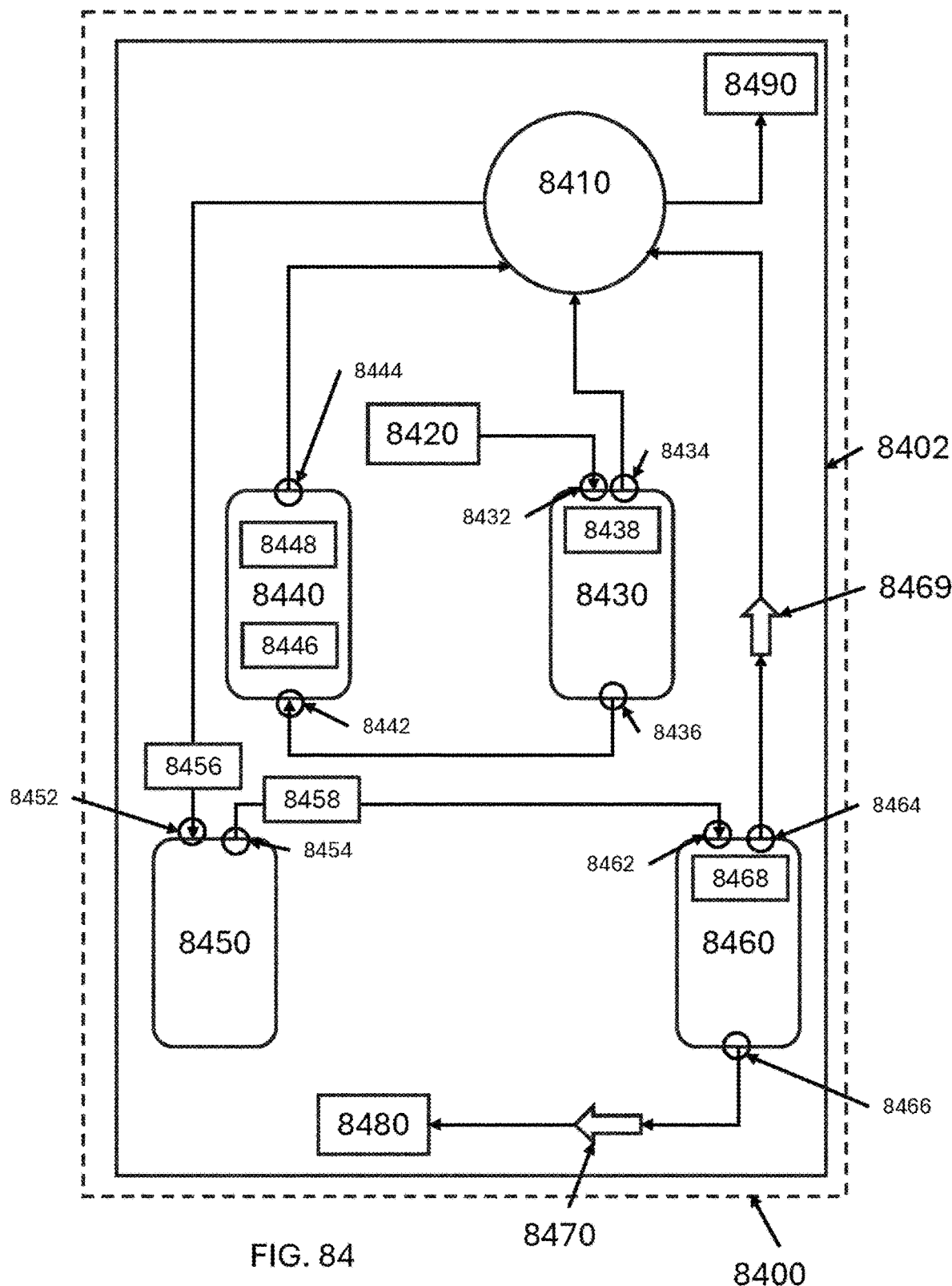
FIG. 84 is a schematic view of a disposable component in accordance with some exemplary embodiments.

In some embodiments, a disposable component defines a flow path for a medical fluid that extends from an inlet to an outlet, along which the medical fluid is heated and gas is separated from the fluid in order to allow for safe delivery of a fluid to a patient via the outlet. FIG. 84 shows a schematic diagram of elements of an exemplary disposable component 8400 and connections between these elements. In some embodiments, the 8400 includes a housing 8402 that contains the other elements of the disposable component 8400 and is configured to be received by a reusable component of an exemplary device.

In some embodiments, the disposable component 8400 includes a multi-state valve 8410. In some embodiments, the multi-state valve 8410 is a type of valve or stopcock that is adjustable to be configured in a number of different operating states. In some embodiments, each of the different operating states of the multi-state valve 8410 allows for flow of fluid between different combinations of elements of the disposable component 8400 as will be described hereinafter. [multi-state valve]

In some embodiments, the disposable component 8400 includes a disposable component fluid inlet 8420. In some embodiments, the disposable component fluid inlet 8420 is configured to receive a medical fluid from a source, such as a blood bag or other container. In some embodiments, the disposable component fluid inlet 8420 includes a filter, such as a particle filter.

In some embodiments, the disposable component 8400 includes a first gas trap 8430. In some embodiments, the first gas trap 8430 includes a chamber having a generally elongate shape that is generally elongate in a vertical directly when the disposable component 8400 is in an upright orientation as will be described hereinafter. In some embodiments, the first gas trap 8430 includes a first gas trap inlet 8432 that enters the first gas trap 8430 at a location that is at or near a top of the first gas trap 8430 when the first gas trap 8430 is properly oriented as described herein. In some embodiments, the first gas trap inlet 8432 is fluidically coupled to the disposable component fluid inlet 8420 so as to allow fluid entering the disposable component 8400 through the disposable component fluid inlet 8420 to pass through the first gas trap inlet 8432 and into the first gas trap 8430. In some embodiments, the first gas trap 8430 includes a first gas trap gas outlet 8434 that enters the first gas trap 8430 at a location that is at or near a top of the first gas trap 8430 when the first gas trap 8430 is properly oriented as described herein. In some embodiments, the first gas trap gas outlet 8434 is fluidically coupled to the multi-state valve 8410 so as to allow fluid to pass into or out of the first gas trap 8430 when the multi-state valve 8410 is in certain operating states, as will be described hereinafter. In some embodiments, the first gas trap 8430 includes a first gas trap fluid outlet 8436 that is at or near a bottom of the first gas trap 8430 when the first gas trap 8430 is properly oriented as described herein. In some embodiments, the first gas trap fluid outlet 8436 is a flow passage that allows fluid to pass out of the first gas trap 8430. In some embodiments, due to passive separation of gas upward from fluid, gas flows away from the first gas trap fluid outlet 8436 so as to prevent or minimize gas flowing out of the first gas trap 8430 through the first gas trap fluid outlet 8436.

In some embodiments, the first gas trap 8430 includes a fluid level sensor 8438. For example, in some embodiments, the fluid level sensor 8438 is an ultrasonic liquid level sensor. In some embodiments, the fluid level sensor 8438 is positioned within the first gas trap 8430 at a level near the top of the first gas trap 8430 (e.g., near the first gas trap gas outlet 8434) when the first gas trap 8430 is properly oriented as described herein. In some embodiments, the fluid level sensor 8438 indicates whether the medical fluid is present within the first gas trap 8430 at the level of the fluid level sensor 8438 or whether a gas is present within the first gas trap 8430 at the level of the fluid level sensor 8438, thereby indicating whether the level of the medical fluid within the first gas trap 8430 is above or below the level of the fluid level sensor 8438. In some embodiments, the fluid level sensor 8438 is utilized to evaluate a threshold fill level for the first gas trap 8430 as will be described hereinafter.

In some embodiments, the disposable component 8400 includes a heating chamber 8440 having a generally elongate shape that is generally elongate in a vertical directly when the disposable component 8400 is in an upright orientation as will be described hereinafter. In some embodiments, the heating chamber 8440 includes a heating chamber inlet 8442 and a heating chamber outlet 8444. In some embodiments, the heating chamber inlet 8442 is fluidically coupled to the first gas trap fluid outlet 8436 of the first gas trap 8430 such that fluid flowing out of the first gas trap 8430 through the first gas trap fluid outlet 8436 flows into the heating chamber 8440 through the heating chamber inlet 8442. In some embodiments, the heating chamber outlet 8444 is fluidically coupled to the multi-state valve 8410 so as to allow fluid to pass out of the heating chamber 8440 and through the multi-state valve 8410 when the multi-state valve 8410 is in certain operating states, as will be described hereinafter. In some embodiments, the heating chamber inlet 8442 and the heating chamber outlet 8444 are positioned at opposite ends of the heating chamber 8440 such that the heating chamber inlet 8442 is at the bottom of the heating chamber 8440 and the heating chamber outlet 8444 is at the top of the heating chamber 8440 when the disposable component 8400 is properly oriented as described herein. In some embodiments, because the heating chamber outlet 8444 is at the top of the heating chamber 8440, gas that is present with the fluid in the heating chamber 8440 (e.g., gas that is outgassed during heating) flows upward with fluid through the heating chamber outlet 8444 rather than being retained within the heating chamber 8440.

In some embodiments, the heating chamber 8440 includes a first dielectric region 8446 (e.g., a dielectric window) and a second dielectric region 8448 (e.g., a dielectric window). In some embodiments, the first dielectric region 8446 and the second dielectric region 8448 are located on or near the housing 8402 of the disposable component 8400 so as to be aligned with electrodes of a reusable component when the reusable component engages the disposable component 8400. In some embodiments, the first dielectric region 8446 and the second dielectric region 8448 are spaced apart from one another along the heating chamber 8440 in order to allow RF current between electrodes of the reusable component to flow through the first dielectric region 8446 and the second dielectric region 8448, along the heating chamber 8440 and through fluid within the heating chamber 8440, to thereby heat the fluid as described herein. For example, in some embodiments, the first dielectric region 8446 is positioned proximate to the heating chamber inlet 8442 and the second dielectric region 8448 is positioned proximate to the heating chamber outlet 8444.

In some embodiments, the heating chamber 8440 includes a support structure 8441 defining a flow channel. In some embodiments, the support structure 8441 is defined by one or more parts formed from a biocompatible material that is suitable for contacting a medical fluid, such as a fluoropolymer, such as perfluoroalkoxy alkane (PFA). In some embodiments, the one or more parts forming the support structure 8441 are formed by molding, such as injection molding. is defined by two opposing polymeric films.

In some embodiments, the first dielectric region 8446 and the second dielectric region 8448 are defined by polymeric films that overlay and seal openings formed within the support structure 8441. In some embodiments, the polymeric films are formed from a material having a sufficiently high relative permittivity (i.e., dielectric constant) to allow heating of a medical fluid by RF heating as described herein. In some embodiments, the polymeric films have a relative permittivity of at least 2 (e.g., between 2 and 12) as measured at room temperature under 1 kHz. In some embodiments, the polymeric films are formed from fluorinated ethylene propylene (FEP). In some embodiments, the polymeric films are attached to the support structure 8441 in a fluid-tight manner (e.g., heat-welded or heat-sealed). In some embodiments, the films are pre-formed and subsequently attached to the support structure 8441. In some embodiments, the films are formed in situ against the contours of the support structure 8441.

In some embodiments, each of the films is secured to the support structure 8441 around a circular perimeter. In some embodiments, the diameter of the circular perimeter is in a range of from 15 mm to 45 mm, or in a range of from 15 mm to 35 mm, or in a range of from 15 mm to 25 mm, or in a range of from 25 mm to 45 mm, or in a range of from 25 mm to 35 mm, or in a range of from 35 mm to 45 mm. In some embodiments, each of the films is heat-sealed to a molded flange region of the support structure 8441. In some embodiments, the films are heat-sealed by a technique that is suitable for compatibility between PFA and FEP, such as impulse or thermal contact welding. In some embodiments, the flange defines a smooth filleted inner boundary that prevents stretching of the film over sharp transitions. In some embodiments, the fillet radius at the fluid-contacting edge is in a range between 0.5 mm and 5 mm.

In some embodiments, the fluid pathway within the heating chamber 8440 is oriented such that, when in use and in a proper orientation, the first dielectric region 8446 positioned proximate to the heating chamber inlet 8442 is positioned lower with respect to gravity than the second dielectric region 8448 positioned proximate to the heating chamber outlet 8444. In some embodiments, this orientation supports gravitational migration of gas bubbles and convection currents within the heating chamber 8440 during low or paused flow, which together help purge heated and outgassed fluid from the heating chamber 8440 and prevent thermal hotspots. In some embodiments, the internal geometry within the heating chamber 8440 is generally wide and uniform in the region adjacent to the first dielectric region 8446 and the second dielectric region 8448. In some embodiments, the internal geometry of the flow channel defined within the heating chamber 8440 is greater than 10 mm in all cross-sectional dimensions so as to minimize impedance variation and avoid local current density spikes during RF heating. In some embodiments, a narrowed region is positioned at the center of the heating chamber 8440 between the first dielectric region 8446 and the second dielectric region 8448, such that the heating chamber 8440 can be understood to have an "hourglass" shape. In some embodiments, this shape increases impedance of the medical fluid and concentrates heating in a region where fluid flow rate and mixing are highest, thereby promoting homogenization of thermal gradients (i.e., promoting even heating).

In some embodiments, the narrowing of the heating chamber 8440 has the effect of concentrating the flow of RF current within the heating chamber 8440 such that the largest concentration of heating occurs in the narrowed region, rather than proximate to the electrodes that are positioned proximate to the first dielectric region 8446 and the second dielectric region 8448 to perform heating as will be described hereinafter. As such, in some embodiments, to sufficiently affect the concentration of heating, the internal diameter of the heating chamber 8440 is less than the diameter of the electrodes of a non-disposable component with which the disposable component 8400 is configured for use (e.g., the first electrode 8620 and the second electrode 8622 that will be described hereinafter) by a suitable ratio. In some embodiments, the ratio of the electrode diameter to the internal diameter of the heating chamber 8440 at the narrowed region is in a range of from 1.4:1 to 10:1 (e.g., for a heating chamber 8440 that has an internal diameter of 10 millimeters at the narrowed region, the electrodes have a diameter that is in a range of from 14 millimeters to 100 millimeters). In some embodiments, the ratio of the electrode diameter to the internal diameter of the heating chamber 8440 at the narrowed region is in a range of from 1.4:1 to 10:1, or is in a range of from 1.4:1 to 7.5:1, or is in a range of from 1.4:1 to 5:1, or is in a range of from 1.4:1 to 3:1, or is in a range of from 1.4:1 to 2:1, or is in a range of from 2:1 to 10:1, or is in a range of from 2:1 to 7.5:1, or is in a range of from 2:1 to 5:1, or is in a range of from 2:1 to 3:1, or is in a range of from 3:1 to 10:1, or is in a range of from 3:1 to 7.5:1, or is in a range of from 3:1 to 5:1, or is in a range of from 5:1 to 10:1, or is in a range of from 5:1 to 7.5:1, or is in a range of from 7.5:1 to 10:1.

In some embodiments, the cross-sectional shape of the heating chamber 8440 (e.g., when viewed along the flow direction) avoids any regions having excessive aspect ratios (e.g., the term "aspect ratio" being used to refer to a the ratio between the size in one direction, such as a width, and the size in another direction, such as a depth), which might otherwise cause low-velocity boundary layer zones susceptible to overheating. In some embodiments, the cross-sectional shape of the heating chamber 8440 avoids any regions having aspect ratios that are greater than 3:1. In some embodiments, shape transitions within the heating chamber 8440 are smooth or conical. In some embodiments, any materials included in the heating chamber 8440 (e.g., FEP and PFA as discussed above) are chemically resistant, biocompatible, and exhibit low dielectric loss during RF heating as described herein.

In some embodiments, the disposable component 8400 includes a pumping segment 8450. In some embodiments, the pumping segment 8450 has a generally elongate shape that is generally elongate in a vertical directly when the disposable component 8400 is in an upright orientation as will be described hereinafter. In some embodiments, the pumping segment 8450 comprises a flexible or pliable material. For example, in some embodiments, the pumping segment 8450 may be made of a biocompatible soft polymer having a Shore A hardness in a range of 55 to 85. In some embodiments, the material of the pumping segment includes a silicone rubber, a polyurethane, a thermoplastic elastomer (TPE), a polyvinyl chloride (PVC), or another biocompatible polymer having a Shore A hardness in a range of 55 to 85. In some embodiments, the material of the pumping segment 8450 is selected to be resistant to fatigue under repetitive compression. In some embodiments, the material of the pumping segment 8450 is compatible with common sterilization methods such as gamma radiation, beta radiation, and/or ethylene oxide.

In some embodiments, the pumping segment 8450 has an outer diameter that is in a range of between 3 mm and 50 mm, or is in a range of between 5 mm and 30 mm, or is in a range of between 5 mm and 25 mm, or is in a range of between 5 mm and 20 mm, or is in a range of between 5 mm and 15 mm, or is in a range of between 5 mm and 10 mm, or is in a range of between 10 mm and 30 mm, or is in a range of between 10 mm and 25 mm, or is in a range of between 10 mm and 20 mm, or is in a range of between 10 mm and 15 mm, or is in a range of between 15 mm and 30 mm, or is in a range of between 15 mm and 25 mm, or is in a range of between 15 mm and 20 mm, or is in a range of between 20 mm and 30 mm, or is in a range of between 20 mm and 25 mm, or is in a range of between 25 mm and 30 mm. In some embodiments, the pumping segment 8450 has a wall thickness that is between 10% and 20% of the outer diameter of the pumping segment 8450. In some embodiments, the outer diameter and wall thickness of the pumping segment 8450 are selected to ensure that the pumping segment 8450 is sufficiently pliable to deform under plunger actuation as described herein, while maintaining sufficient structural integrity and dimensional stability and so as to allow the pumping segment 8450 to be operated to pump fluid through the disposable component 8400 as will be described herein.

In some embodiments, the pumping segment 8450 has a pumping segment inlet 8452 and a pumping segment outlet 8454. In some embodiments, the pumping segment inlet 8452 and the pumping segment outlet 8454 are positioned at a same end of the pumping segment 8450, so as to be positioned at a top of the pumping segment 8450 when the disposable component 8400 is properly oriented as described herein. In some embodiments, the pumping segment inlet 8452 is fluidically coupled to the multi-state valve 8410 so as to allow fluid to from the multi-state valve 8410 and into the pumping segment 8450 via the pumping segment inlet 8452 when the multi-state valve 8410 is in certain operating states, as will be described hereinafter.

In some embodiments, the pumping segment 8450 includes a pumping segment inlet valve 8456 that is positioned near or within the pumping segment inlet 8452. In some embodiments, the pumping segment inlet valve 8456 is a one-way valve that allows fluid to flow through the pumping segment inlet valve 8456 in a direction so as to flow through the pumping segment inlet 8452 and into the pumping segment 8450, but does not allow fluid to flow through the pumping segment inlet valve 8456 in a direction so as to flow out of the pumping segment 8450. In some embodiments, the pumping segment 8450 includes a pumping segment outlet valve 8458 that is positioned near or within the pumping segment outlet 8454. In some embodiments, the pumping segment outlet valve 8458 is a one-way valve that allows fluid to flow through the pumping segment outlet valve 8458 in a direction so as to flow through the pumping segment outlet 8454 and out of the pumping segment 8450, but does not allow fluid to flow through the pumping segment outlet valve 8458 in a direction so as to flow into the pumping segment 8450. In some embodiments, both the pumping segment inlet valve 8456 and the pumping segment outlet valve 8458 are passive valves that are biased to a closed position and can be forced open to allow flow in one direction by a suitable pressure differential in the direction of flow.

In some embodiments, the pumping segment 8450 is exposed to an exterior of the housing 8402 of the disposable component 8400 so as to be acted upon by a plunger (e.g., a reciprocating plunger, which may be, for example, an element of a reusable device portion) as described herein. In some embodiments, a plunger may be operated to compress the pumping segment 8450 (thereby inducing a higher fluid pressure within the pumping segment 8450) and to release compression of the pumping segment 8450 (thereby inducing a lower fluid pressure within the pumping segment 8450). In some embodiments, when the plunger is operated to compress the pumping segment 8450, the higher pressure that is induced forces the pumping segment outlet valve 8458 to an open position and causes fluid to flow out of the pumping segment 8450 through the pumping segment outlet 8454. In this same state, the higher pressure within the pumping segment 8450 causes the pumping segment inlet valve 8456 to remain in a closed position. Conversely, in some embodiments, when the plunger is operated to release compression on the pumping segment 8450, the lower pressure that is induced forces the pumping segment inlet valve 8456 to open and causes fluid to flow into the pumping segment 8450 through the pumping segment inlet 8452. In this same state, the lower pressure within the pumping segment causes the pumping segment outlet valve 8458 to remain in a closed position.

As discussed above, in some embodiments, the pumping segment 8450 includes the pumping segment inlet 8452 and the pumping segment outlet 8454 that are positioned at a same end of the pumping segment 8450, so as to be positioned at a top of the pumping segment 8450 when the disposable component 8400 is properly oriented as described herein. In some embodiments, configuration and orientation of the pumping segment in this manner promotes controlled flow and mixing of the medical fluid. In some embodiments, when the pumping segment 8450 is oriented as described herein, the medical fluid that flows into the pumping segment 8450 through the pumping segment inlet 8452 flows in a "downward" direction with respect to gravity due to the position of the pumping segment inlet 8452 at the top of the pumping segment 8450, and the medical fluid that flows out of the pumping segment 8450 through the pumping segment outlet 8454 flows in an "upward" direction with respect to gravity due to the position of the pumping segment outlet 8454 also at the top of the pumping segment 8450. As such, continuous flow through the pumping segment 8450 from the pumping segment inlet 8452 to the pumping segment outlet 8454 is prevented due to the fact that the medical fluid needs to reverse directions within the pumping segment 8450 in order to flow out of the pumping segment 8450.

In some embodiments, the disposable component 8400 includes a second gas trap 8460. In some embodiments, the second gas trap 8460 includes a chamber having a generally elongate shape that is generally elongate in a vertical directly when the disposable component 8400 is in an upright orientation as will be described hereinafter. In some embodiments, the second gas trap 8460 includes a second gas trap inlet 8462 that enters the second gas trap 8460 at a location that is at or near a top of the second gas trap 8460 when the disposable component 8400 is properly oriented as described herein. In some embodiments, the second gas trap inlet 8462 is fluidically coupled to the pumping segment outlet 8454 so as to allow fluid exiting the pumping segment 8450 to flow through the second gas trap inlet 8462 and into the second gas trap 8460. In some embodiments, the second gas trap 8460 includes a second gas trap gas outlet 8464 that enters the second gas trap 8460 at a location that is at or near a top of the second gas trap 8460 when the second gas trap 8460 is properly oriented as described herein. In some embodiments, the second gas trap gas outlet 8464 is fluidically coupled to the multi-state valve 8410 by way of a one-way valve 8469 so as to allow fluid to out of the second gas trap 8460 through the second gas trap gas outlet 8464 when the multi-state valve 8410 is in certain operating states, but to prevent gas from flowing into the second gas trap 8460 through the second gas trap gas outlet 8464, as will be described hereinafter. In some embodiments, the second gas trap 8460 includes a second gas trap fluid outlet 8466 that is at or near a bottom of the second gas trap 8460 when the second gas trap 8460 is properly oriented as described herein. In some embodiments, the second gas trap fluid outlet 8466 is a flow passage that allows fluid to pass out of the second gas trap 8460. In some embodiments, due to passive separation of gas upward from fluid, gas flows away from the second gas trap fluid outlet 8466 so as to prevent gas flowing out of the second gas trap 8460 through the second gas trap fluid outlet 8466.

In some embodiments, the second gas trap 8460 includes a fluid level sensor 8468. For example, in some embodiments, the fluid level sensor 8468 is an ultrasonic liquid level sensor. In some embodiments, the fluid level sensor 8468 is positioned within the second gas trap 8460 at a level near the top of the second gas trap 8460 (e.g., near the second gas trap gas outlet 8464) when the second gas trap 8460 is properly oriented as described herein. In some embodiments, the fluid level sensor 8468 indicates whether the medical fluid is present within the second gas trap 8460 at the level of the fluid level sensor 8438 or whether a gas is present within the second gas trap 8460 at the level of the fluid level sensor 8468, thereby indicating whether the level of the medical fluid within second gas trap 8460 is above or below the level of the fluid level sensor 8468. In some embodiments, the fluid level sensor 8438 is utilized to evaluate a threshold fill level for the second gas trap 8460 as will be described hereinafter.

In some embodiments, the disposable component 8400 includes a pressure-activated valve 8470 that fluidically connects the second gas trap fluid outlet 8466 to a system fluid outlet 8480. In some embodiments, the pressure-activated valve 8470 is a one-way valve that allows fluid to pass through the pressure-activated valve 8470 and to the system fluid outlet 8480 when the fluid pressure within the second gas trap 8460 is above a certain level, and otherwise remains closed to prevent fluid from flowing to the system fluid outlet 8480 and out of the disposable component 8400. In some embodiments, the pressure-activated valve 8470 has a cracking pressure that is between approximately 0.1 bar and 0.5 bar, such as 0.3 bar±0.2 bar. In some embodiments, the cracking pressure of the pressure-activated valve 8470 is selected to ensure that fluid flows to the system fluid outlet 8480 only during active pumping, thereby preventing passive gravity-induced free flow to the system fluid outlet 8480. In some embodiments, the disposable component 8400 is further configured such that the pressure-activated valve 8470 will only open when the second gas trap gas outlet 8464 of the second gas trap 8460 is closed (e.g., that the multi-state valve 8410 does not define a flow path between the second gas trap gas outlet 8464 and the system gas outlet 8490), thereby allowing pressure to build adequately within the second gas trap 8460 to trigger opening of the pressure-activated valve 8470 in a controlled manner. In some embodiments, this design enhances safety by ensuring that fluid delivery to the system fluid outlet 8480 occurs only under appropriate operating conditions (e.g., when the level of the medical fluid within the second gas trap 8460 is above the corresponding threshold level and the amount of gas within the second gas trap 8460 is comparatively low, thereby ensuring that no gas is delivered to the system fluid outlet 8480). In some embodiments, the system fluid outlet 8480 may be coupled, for example, to downstream patient tubing or to another suitable fluid destination. For example, in some embodiments, when the disposable component 8400 is in use, the system fluid outlet 8480 is coupled to an intravenous line that administers the medical fluid to a patient or to another suitable delivery route.

In some embodiments, the disposable component 8400 includes a system gas outlet 8490. In some embodiments, the system gas outlet 8490 is fluidically coupled to the multi-state valve 8410 so as to receive gas from various elements of the disposable component 8400 depending on the operational state of the multi-state valve 8410, as will be described hereinafter, and to allow such gas to be vented to an external environment. In some embodiments, the system gas outlet 8490 is disposed at a location that is above the remainder of the disposable component 8400 with respect to gravity when the disposable component 8400 is oriented properly for use as described herein. In some embodiments, the system gas outlet 8490 is not positioned within the housing 8402, and is fluidically coupled to elements of the disposable component 8400 that are within the housing 8402 via one or more conduits.

In some embodiments, the system gas outlet 8490 is configured to receive gas from one or more upstream elements of the disposable component 8400 (e.g., the first gas trap 8430 and the second gas trap 8460) depending on the operating state of the multi-state valve 8410. In some embodiments, the system gas outlet 8490 includes a one-way valve that prevents ambient air or gas from being drawn back into the disposable component 8400, while allowing gas to be expelled from the disposable component 8400. In some embodiments, the system gas outlet 8490 further includes a gas overflow chamber, which may contain an absorbent material to retain any liquid that may escape through the other elements of the disposable component 8400. The absorbent material is typically disposed to minimize wetting or clogging of a hydrophobic membrane that is installed downstream of the overflow chamber to allow passage of gas while preventing egress of liquid.

In some embodiments, the system gas outlet 8490 is fluidically coupled to a collection chamber for expelled fluid, which may be used in lieu of direct gas venting to the ambient environment. In some embodiments, components of the system gas outlet 8490, including any valves, membranes, and chambers, are constructed of materials selected for sterilizability by common methods such as ethylene oxide, gamma irradiation, and/or beta irradiation, and for compatibility with single-use disposability and biocompatibility requirements.

As noted above, in some embodiments, the multi-state valve 8410 can be configured in various manners so as to define flow paths within the disposable component 8400 that correspond to various operational states. FIGS. 85A-85D show the disposable component 8400 having the multi-state valve 8410 configured to define such states. For clarity, some elements of the disposable component 8400 that are shown in FIG. 84 are omitted in FIGS. 85A-85D.

Figure 85A:
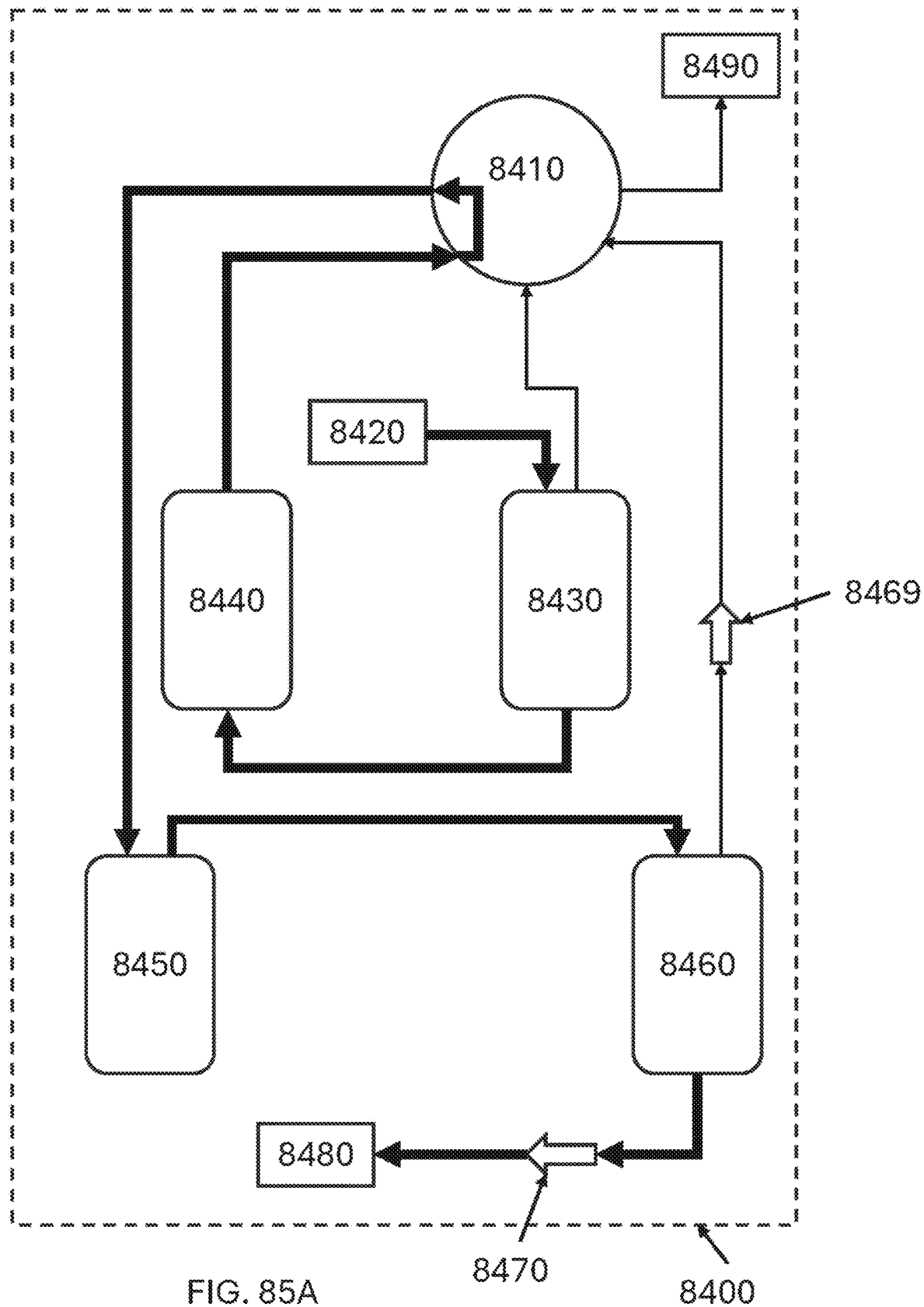
FIG. 85A is a schematic view of the disposable component shown in FIG. 84 with a multi-state valve thereof configured to define flow paths of a PUMP state.

FIG. 85A shows the disposable component 8400 having the multi-state valve 8410 configured to define a PUMP state. As shown in FIG. 85A, in the PUMP state, the multi-state valve 8410 defines a flow path between the heating chamber outlet 8444 of the heating chamber 8440, through the multi-state valve 8410, to the pumping segment inlet 8452 of the pumping segment 8450. In the PUMP state, a flow path is thereby defined through, in order, the disposable component fluid inlet 8420, the first gas trap 8430, the heating chamber 8440, the multi-state valve 8410, the pumping segment 8450, the second gas trap 8460, the pressure-activated valve 8470, and the system fluid outlet 8480.

Figure 85B:
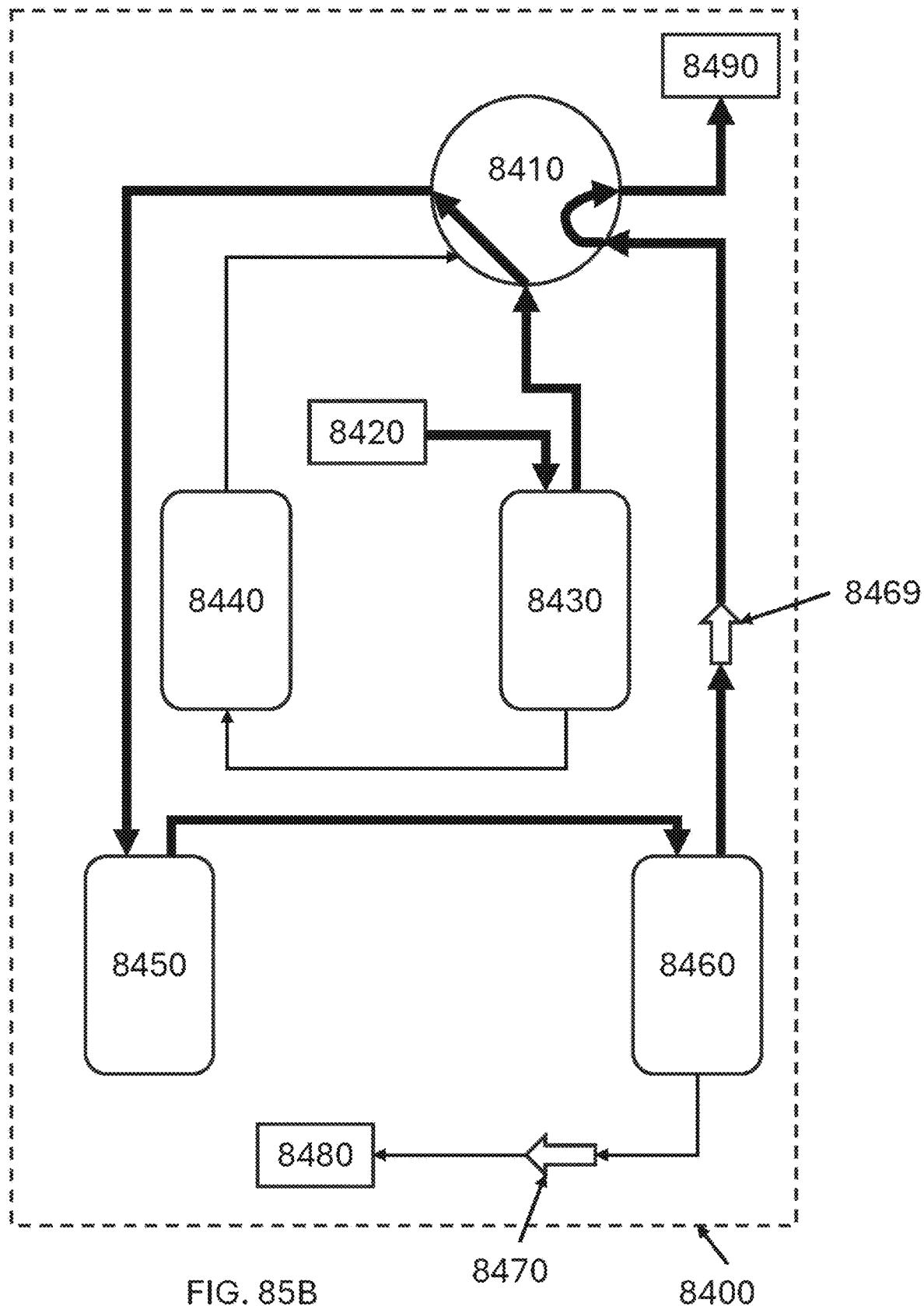
FIG. 85B is a schematic view of the disposable component shown in FIG. 84 with a multi-state valve thereof configured to define flow paths of a VENT state.

FIG. 85B shows the disposable component 8400 having the multi-state valve 8410 configured to define a VENT state. As shown in FIG. 85B, in the VENT state, the multi-state valve 8410 defines a first flow path between the first gas trap gas outlet 8434 of the first gas trap 8430, through the multi-state valve 8410, and to the pumping segment inlet 8452 of the pumping segment 8450. As shown in FIG. 85B, in the VENT state, the multi-state valve 8410 also defines a second flow path between the second gas trap gas outlet 8464, through the one-way valve 8469 and the multi-state valve 8410, and to the system gas outlet 8490.

Figure 85C:
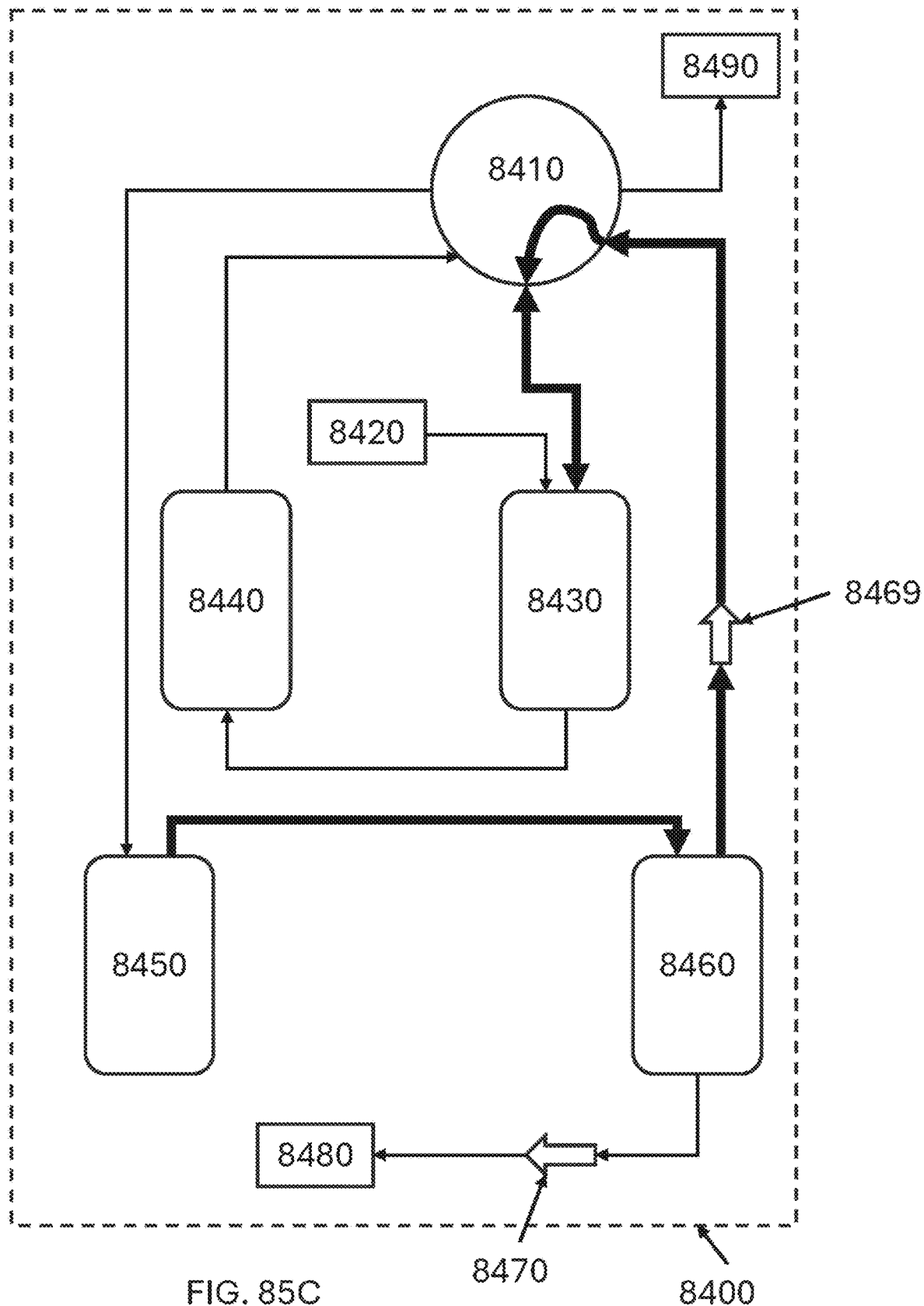
FIG. 85C is a schematic view of the disposable component shown in FIG. 84 with a multi-state valve thereof configured to define flow paths of a LOOP state.

FIG. 85C shows the disposable component 8400 having the multi-state valve 8410 configured to define a LOOP state. As shown in FIG. 85C, in the LOOP state, the multi-state valve 8410 defines a flow path between the second gas trap gas outlet 8464, through the one-way valve 8469 and the multi-state valve 8410, and to the first gas trap gas outlet 8434 of the first gas trap 8430.

Figure 85D:
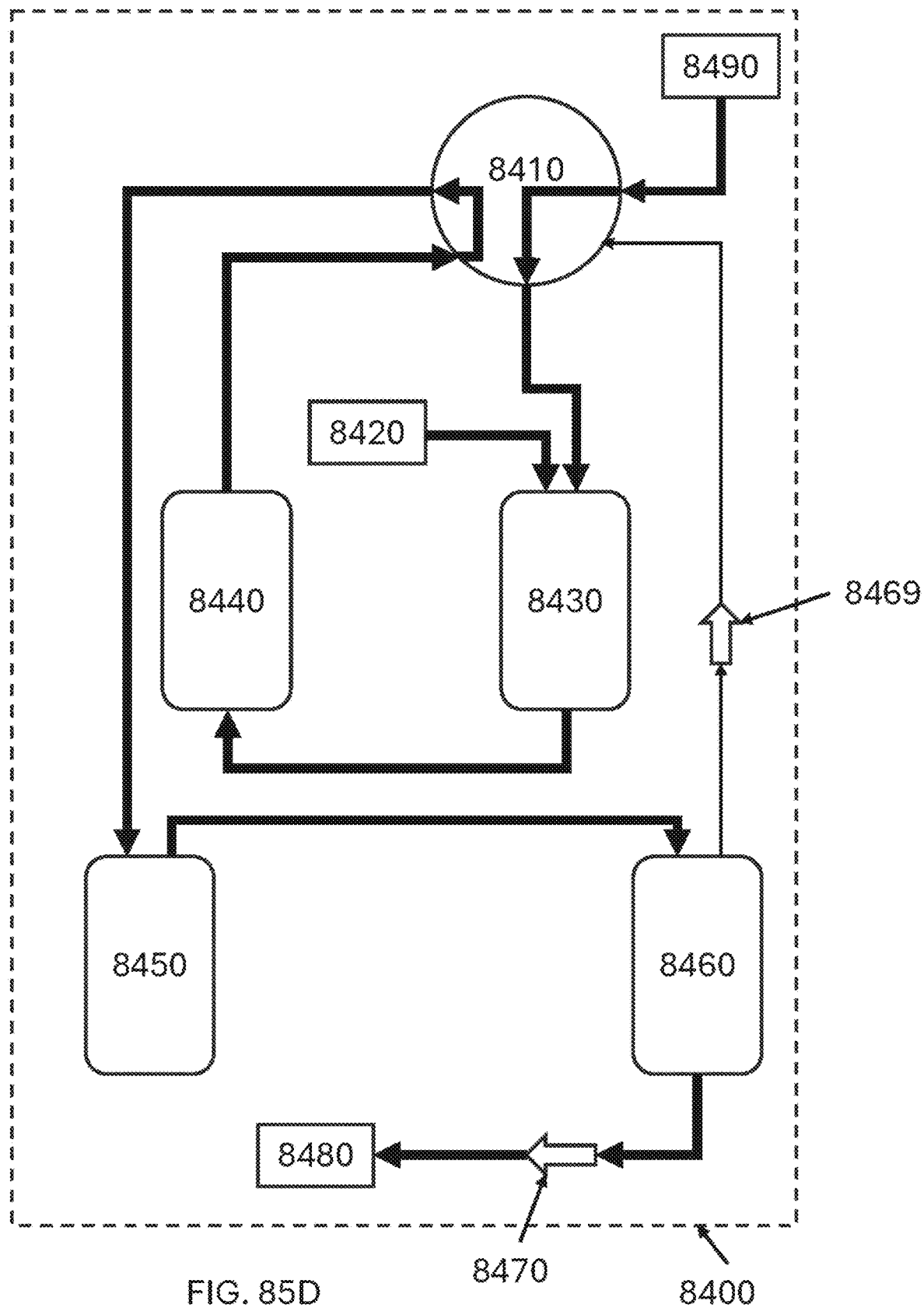
FIG. 85D is a schematic view of the disposable component shown in FIG. 84 with a multi-state valve thereof configured to define flow paths of a EMPTY state.

FIG. 85D shows the disposable component 8400 having the multi-state valve 8410 configured to define an EMPTY state. As shown in FIG. 85D, in the EMPTY state, the multi-state valve 8410 defines a first flow path between the heating chamber outlet 8444 of the heating chamber 8440, through the multi-state valve 8410, to the pumping segment inlet 8452 of the pumping segment 8450. As shown in FIG. 85D, in the EMPTY state, the multi-state valve 8410 also defines a second flow path between the first gas trap gas outlet 8434, through the multi-state valve 8410, to the system gas outlet 8490.

In some embodiments, when the disposable component 8400 is in use to supply a heated medical fluid, the disposable component 8400 is maintained in an upright orientation in order to allow for gas separation and venting to occur as described herein. In some embodiments, a reusable component with which the disposable component 8400 is configured for use includes an azimuth sensor (e.g., an accelerometer or other suitable sensor) operable to sense the orientation of the disposable component 8400. In some embodiments, the disposable component 8400 is received by a reusable component at a fixed orientation, and, thus, a sensor that is included in the reusable component is suitable for sensing the orientation of the disposable component 8400.

In some embodiments, the non-disposable component 8600 is configured such that, if the in-use orientation of the disposable component 8400 deviates from a predetermined upright orientation by more than an allowable threshold, the non-disposable component 8600 may take automated safety actions. These actions may include ceasing pumping and/or heating operations, closing one or more valves, and/or generating a user alert.

In some embodiments, the allowable angular deviation from the upright orientation varies by direction. For example, in some embodiments, in one direction, such as a direction in which the user interface 8650 of the non-disposable component 8600 is tilted upward for viewing from a position elevated with respect to gravity, a deviation of up to approximately 60 degrees from vertical is permitted. In some embodiments, this configuration is possible because the fluid outlet ports of the disposable component 8400 remain positioned above the fluid levels in the respective chambers, thereby preserving gas-liquid separation and preventing undesired entrainment of gas. In some embodiments, in other directions, the permitted angular deviation from vertical is limited to approximately 30 degrees, so as to ensure that liquid levels in chambers such as the first gas trap 8430, the heating chamber 8440, and the second gas trap 8460 are maintained above threshold values. In some embodiments, deviations exceeding this threshold may result in loss of intended fluid stratification, increased risk of gas ingress into downstream conduits, or undesirable exposure of outlet ports to gas phase volumes.

In some embodiments, orientation sensing is performed by a sensor subsystem integrated within the reusable component, as will be described hereinafter. In some embodiments, the sensor subsystem includes one or more accelerometers, gyroscopes, or other inertial measurement units (IMUs) configured to measure azimuthal orientation and gravitational vector alignment in real time. In some embodiments, because the disposable component 8400 is received into a fixed receptacle within the non-disposable component 8600, orientation measurements of the non-disposable component 8600 also characterize the orientation of the disposable component 8400.

In some embodiments, the non-disposable component 8600 suspends fluid delivery operations if the measured orientation exceeds the predetermined threshold. In some embodiments, the non-disposable component 8600 suspends fluid delivery operations if one or more liquid level sensors (e.g., sensors, such as ultrasonic transducers, positioned within any of the chambers of the disposable component 8400, detect insufficient fluid volume to ensure safe downstream flow). In some embodiments, such suspension is temporary and automatically reversible. For example, in some embodiments, when both the relevant fluid level and the orientation of the disposable component 8400 return to acceptable conditions, the non-disposable component 8600 may resume fluid delivery automatically or upon user confirmation, depending on the configured operational mode.

In some embodiments, the reusable component is configured such that, if the in-use orientation of the disposable component diverges from an upright orientation by more than the acceptable range in any particular direction, the reusable component takes appropriate actions, such as ceasing the supply of the medical fluid (e.g., ceases operation of a pumping mechanism) and alerting a user (e.g., via a user interface, by playing an alert sound, etc.) to return the disposable component 8400 to a suitable upright orientation.

In some embodiments, the upright orientation maintains the first gas trap 8430 at an orientation such the first gas trap inlet 8432 and the first gas trap gas outlet 8434 are at the top of the first gas trap 8430, and that the first gas trap fluid outlet 8436 is positioned at the bottom of the first gas trap 8430. In some embodiments, by being oriented in this manner, gas that is mixed with fluid within the first gas trap 8430 passively separates upward out of the fluid so as to flow toward the first gas trap gas outlet 8434, while fluid that is under pressure will flow downward toward the first gas trap fluid outlet 8436, as will be described hereinafter. In some embodiments, the upward orientation maintains the second gas trap 8460 in the same orientation such that its respective components are located and operate in the same manner as those of the first gas trap 8430 described above.

In some embodiments, the upright orientation maintains the heating chamber 8440 at an orientation such that the heating chamber inlet 8442 is at the bottom of the heating chamber 8440 and the heating chamber outlet 8444 is at the top of the heating chamber 8440. In some embodiments, by maintaining the heating chamber 8440 at such an orientation, any gas that is present within the heating chamber 8440 together with the fluid (including, but not limited to, gas that outgasses from the fluid during the heating process) flows upwardly toward the heating chamber outlet 8444 and thereby exits the heating chamber 8440 together with fluid that passes through the heating chamber outlet 8444.

Figure 86:
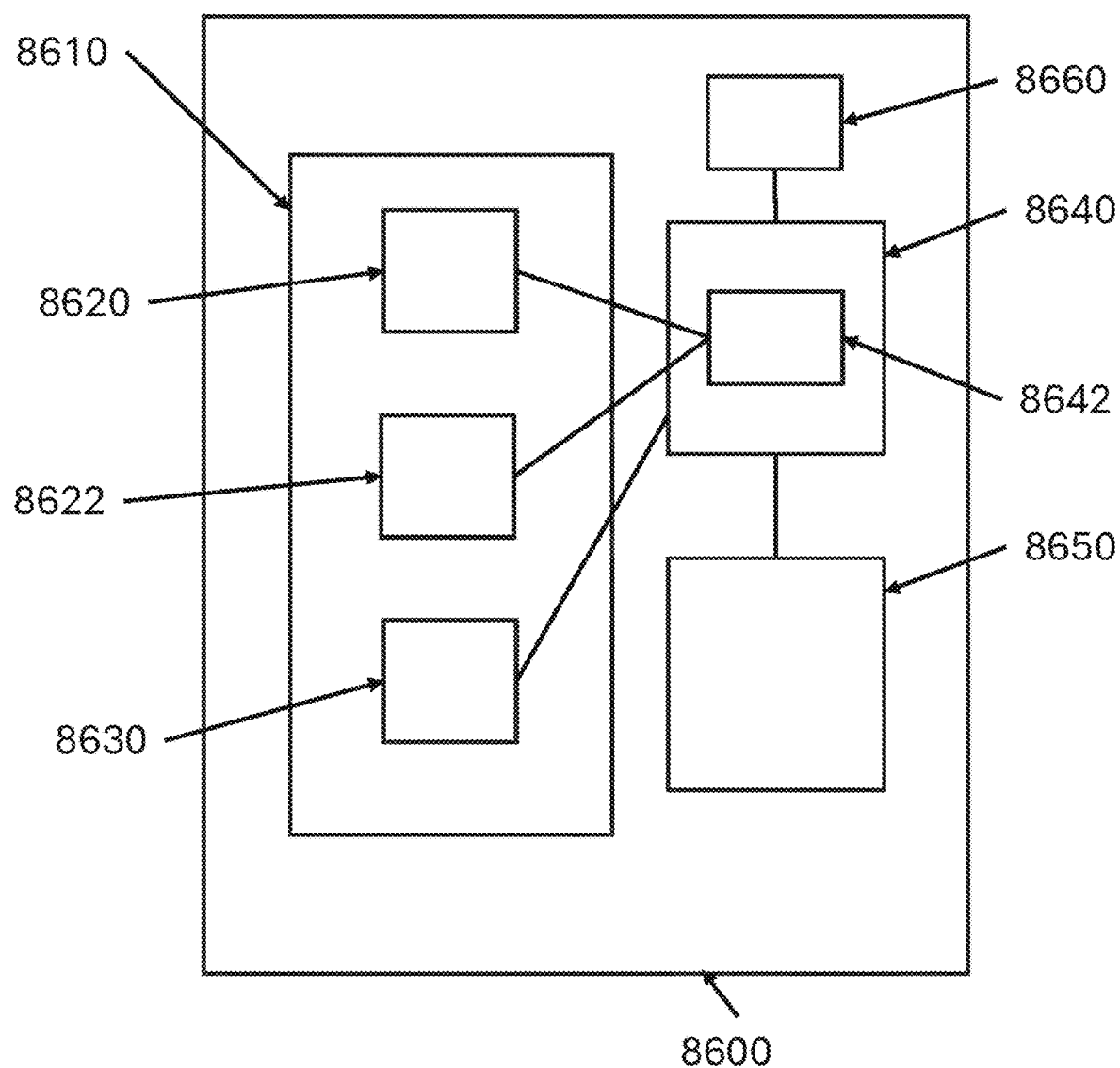
FIG. 86 is a schematic view of a non-disposable component in accordance with some exemplary embodiments.

As discussed herein, in some embodiments, the disposable component 8400 is used in conjunction with a non-disposable component to deliver a medical fluid. FIG. 86 schematically illustrates a non-disposable component 8600. In some embodiments, the non-disposable component 8600 includes a recess 8610 that is configured (e.g., sized and shaped to receive the disposable component 8400. In some embodiments, a first electrode 8620 and a second electrode 8622 are positioned within the recess 8610. In some embodiments, the first electrode 8620 and the second electrode 8622 are positioned within the recess 8610 such that, when the disposable component 8400 is received within the recess 8610, the first electrode 8620 is aligned with the first dielectric region 8446 and the second electrode 8622 is aligned with the second dielectric region 8448. In some embodiments, each of the first electrode 8620 and the second electrode 8622 includes a conductive material coated by a protective and insulating coating. In some embodiments, the conductive material includes aluminum or copper. In some embodiments, the insulating coating includes a ceramic. In some embodiments, the coating includes hard anodized aluminum oxide. In some embodiments, the coating includes silicon nitride. In some embodiments, the coating provides protective properties such as corrosion resistance, mechanical durability, cleanability, and surface disinfectability. In some embodiments, the coating prevents direct current conduction or electrostatic discharge to the medical fluid or to other elements of the non-disposable component 8600 or the disposable component 8400.

In some embodiments, a plunger 8630 is movably positioned within the recess 8610. In some embodiments, the plunger 8630 is positioned such that, when the disposable component 8400 is received within the recess 8610, the plunger 8630 is aligned with the pumping segment 8450. In some embodiments, the plunger 8630 is reciprocally movable into and out of the recess 8610 so as to compress or to release compression on the pumping segment 8450, thereby to induce flow within the disposable component 8400 as described herein.

In some embodiments the non-disposable component 8600 includes a control system 8640. In some embodiments, the control system 8640 includes a microcontroller or system-on-chip (SoC) operating a real-time operating system (RTOS), which is configured to perform time-sensitive and safety-critical functions. Suitable examples include ARM Cortex-M series microcontrollers, STM32 series devices, Microchip PIC32, NXP i.MX RT series, or other similar embedded systems capable of real-time task management and hardware interfacing.

In some embodiments, the control system 8640 may include a variety of hardware modules or sub-circuits, such as analog-to-digital converters (ADCs), digital signal processors (DSPs), motor drivers, wireless communication transceivers (e.g., Wi-Fi, Bluetooth, BLE), watchdog timers, safety shutdown modules, and heartbeat monitors. In some embodiments, such subsystems are responsible for managing and coordinating the operation of the pump, heater, air detectors, power management circuits, and other functional units.

In some embodiments, separate hardware or dedicated processing elements may be used to perform specific roles, including but not limited to: encoder detection of the pumping actuator, index detection of the pumping actuator, motor driving of the pumping system, RF power amplification, reflected RF power measurement, impedance tuning for RF heating efficiency, AC-to-DC power conversion with power factor correction, encoder and index detection of stopcock actuators, motor driving of stopcock systems, ultrasonic or alternative air detection, azimuth/orientation detection, and RFID scanning. In some embodiments, additional dedicated subsystems may include temperature measurement of ambient conditions, input fluid, output fluid, RF MOSFETs, and other high-power components, as well as battery charging and power backup circuits.

In some embodiments, mission-critical software operates under the RTOS of the control system 8640 described above, and manages separate tasks or threads for the pumping, RF heating regulation, valve sequencing, sensor polling, user interaction, and safety monitoring. In some embodiments, the control system 8640 includes redundancy or fallback logic across multiple processors or microcontrollers, and embedded algorithms are provided to ensure self-recovery, self-shutdown, or retry procedures in the event of a detected fault or failure condition.

In some embodiments, the control system 8640 includes a persistent nonvolatile memory for logging operational data, fault histories, user interactions, configuration settings, and performance metrics. This enables diagnostic access and supports quality assurance, device servicing, and traceability.

In some embodiments, the control system 8640 includes an RF application board 8642 which includes components for controlled delivery of RF energy to a medical fluid, as described herein. In some embodiments, the RF application board 8642 includes components as will be described hereinafter to allow controlled application of RF current via the first electrode 8620 and the second electrode 8622 to thereby heat a medical fluid that is flowing through the disposable component 8400. FIG. 86 shows the RF application board 8642 as an element of the control system 8640, but in other embodiments, the RF application board 8642 may be a separate element that is communicatively coupled to the control system 8640.

In some embodiments, the non-disposable component 8600 includes a user interface 8650 that is operable by a user to control the operation of the non-disposable component 8600 and the disposable component 8400 to deliver a medical fluid. In some embodiments, the user interface 8650 includes a physical component of the non-disposable component 8600 (e.g., a touch screen, a non-touch display screen and associated input device such as a keyboard or touchpad, etc.). In some embodiments, the user interface 8650 includes a communication link (e.g., a wired or wireless communication link) that allows the non-disposable component 8600 to be controlled by a separate computing device.

In some embodiments, the non-disposable component 8600 includes an azimuth detector 8660. In some embodiments, the azimuth detector 8660 includes a sensor or arrangement of arrangement of sensors (e.g., an accelerometer, a gyroscope, and/or a magnetometer) that are operable to sense and output the orientation of the non-disposable component 8600. In some embodiments, when the non-disposable component 8600 receives the disposable component 8400 in the recess 8610, the disposable component 8400 is maintained at a fixed position and orientation with respect to the non-disposable component 8600, and, accordingly, the azimuth detector 8660 is also operable to sense and output the orientation of the disposable component 8400, and the various elements thereof that operate properly when maintained at a certain orientation as described herein. In some embodiments, the azimuth detector 8660 is communicatively coupled to the control system 8640 such that the control system 8640 may operate to control operation of the non-disposable component 8600 and/or the disposable component 8400 based on the orientation detected by the azimuth detector 8660.

In some embodiments, the engagement of the non-disposable component 8600 with the disposable component 8400 in the recess 8610 also enables the control system 8640 to control the position of the multi-state valve 8410. For example, in some embodiments, the non-disposable component 8600 includes an element that mechanically engages with the multi-state valve 8410 to reposition the multi-state valve 8410. In some embodiments, the non-disposable component 8600 is coupled to the multi-state valve 8410 electronically such that the control system 8640 sends an appropriate control signal to reposition the multi-state valve 8410.

Figure 87:
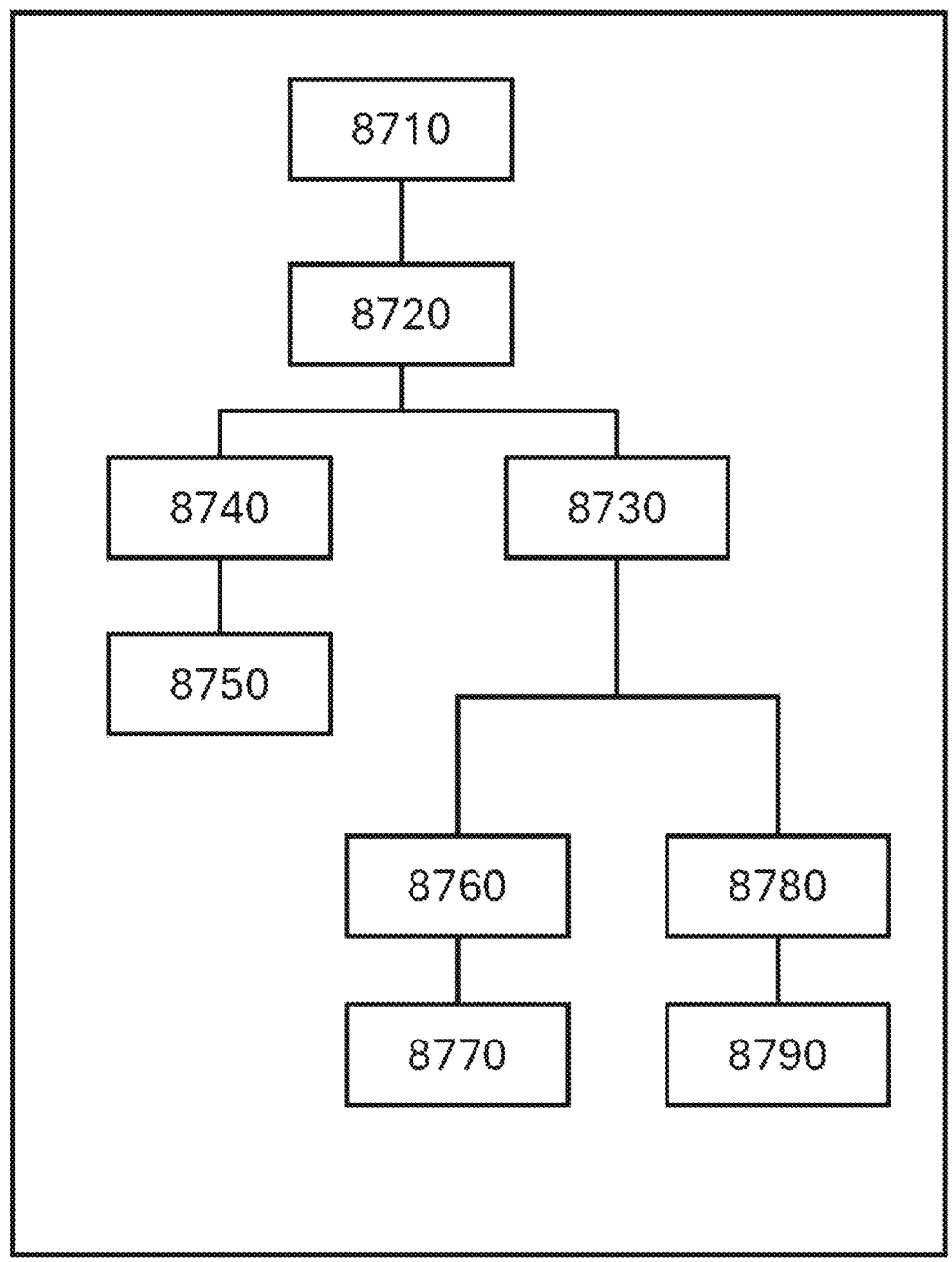
FIG. 87 is a circuit diagram of an RF source in accordance with some exemplary embodiments.

FIG. 87 shows an electrical diagram of the RF application board 8642 that is operable to deliver RF current via the first electrode 8620 and the second electrode 8622. In some embodiments, the RF application board 8642 includes an RF source 8710. In some embodiments, the RF source 8710 includes a MOSFET. In some embodiments, the RF source 8710 is configured to deliver an RF current at a fixed impedance, such as $4.1+j1$ ohms. In some embodiments, the RF application board 8642 includes a first adjustable inductor 8720 and a second adjustable inductor 8730. In some embodiments, each of the first adjustable inductor 8720 and the second adjustable inductor 8730 is configurable to provide a variable inductance. For example, in some embodiments, each of the first adjustable inductor 8720 and the second adjustable inductor 8730 includes a movable slug that is movable within an air core inductor (e.g., by a motorized actuator) to thereby provide the valuable inductance. In other embodiments, other types of devices capable of providing variable inductance are used.

In some embodiments, the first adjustable inductor 8720, the second adjustable inductor 8730, and an additional third inductor are configured to allow impedance tuning of the RF current path to the first electrode 8620 and the second electrode 8622. RF as described herein performed at an RF frequency above 1 MHz. For example, in some embodiments, RF heating is performed in an ISM band centered around 27.12 MHz. In some embodiments, the first adjustable inductor 8720 is connected between the RF source 8710 and a first junction node. A first capacitor, typically having a capacitance in the range of 300 to 2000 picofarads, is connected between the first junction node and ground. In some embodiments, the second adjustable inductor 8730 is then connected between the first junction node and a second junction node. In some embodiments, a second capacitor, typically in the range of 60 to 500 picofarads, is connected between the second junction node and ground. In some embodiments, a third inductor, having a typical inductance in the range of 40 to 400 nanohenries, is connected between the second junction node and one of the electrodes, and the other electrode is connected to ground.

In some embodiments, the first adjustable inductor 8720 has a variable inductance in the range of approximately 20 to 150 nanohenries. In some embodiments, the second adjustable inductor 8730 has a variable inductance in a range of from 80 to 600 nanohenries. In some embodiments, the first adjustable inductor 8720 and the second adjustable inductor 8730 are implemented using motor-controlled movable slugs within air-core coils to enable continuous inductance variation (e.g., are continuously adjustable to any value within the corresponding range, rather than being limited to a discrete set of possible values). The capacitors in some embodiments are fixed-value components selected to suit the desired frequency and load conditions.

In some embodiments, the arrangement of the RF application board 8642 described herein enables impedance matching between an RF source (e.g., which may deliver power in the range of up to approximately 1000 to 2000 watts) and the load presented by a conductive medical fluid. In some embodiments, the effective fluid load may include a series resistance in the range of 1 to 1000 ohms, and a series capacitance due to the dielectric material between the electrodes 8620 and 8622 and the medical fluid (e.g., ceramic and/or polymer coatings) with a typical capacitance range of 1 to 1000 picofarads per electrode. In certain embodiments, the inclusion of an inductive element in series with the capacitive fluid interface permits reactive cancellation effects that result in an effective increase in apparent capacitance over a desired frequency band. In some embodiments, this behavior is governed by the reactive impedance relationship $Z=j\omega L+1/(j\omega C)$, and facilitates enhanced impedance matching without physically increasing the system capacitance. In some embodiments, this configuration is especially advantageous in portable or size-constrained implementations, where heating efficiency and tight power transfer matching are critical for minimizing reflected power and thermal losses.

In some embodiments, the first adjustable inductor 8720 is electrically coupled to the RF source 8710. In some embodiments, the RF application board 8642 includes a first capacitor 8740 that is coupled to the RF source 8710. In some embodiments, the first capacitor 8740 has a capacitance that is in a range of from 100 pF to 1,000 pF. In some embodiments, the first capacitor 8740 is coupled to a ground 8750 opposite the first adjustable inductor 8720.

In some embodiments, the RF application board 8642 includes the second adjustable inductor 8730 that is also coupled to the first adjustable inductor 8720. In some embodiments, the RF application board 8642 includes a second capacitor 8760 that is coupled to the second adjustable inductor 8730. In some embodiments, the second capacitor 8760 has a capacitance that is in a range of from 100 pF to 1,000 pF. In some embodiments, the second capacitor 8760 is coupled to a ground 8770 opposite the second adjustable inductor 8730.

In some embodiments, the RF application board 8642 includes a load 8780 coupled to the second adjustable inductor 8730. In some embodiments, the load 8780 includes the first electrode 8620 and the second electrode 8622 so as to deliver RF current to the first electrode 8620 and the second electrode 8622, between which a medical fluid is electrically coupled via the heating chamber 8440 as described herein. In some embodiments, the load 8780 also includes a series inductor disposed between at least one of the electrodes (e.g., the first electrode 8620 and/or the second electrode 8622) and the remainder of the RF application board 8642. In some embodiments, the second electrode 8622 is coupled to a ground 8790. In some embodiments, by adjusting the inductances provided by the first adjustable inductor 8720 and the second adjustable inductor 8730, the impedance of the RF current delivered to the load 8780 can be varied even as the impedance of the RF source 8710 remains constant.

Figure 88:
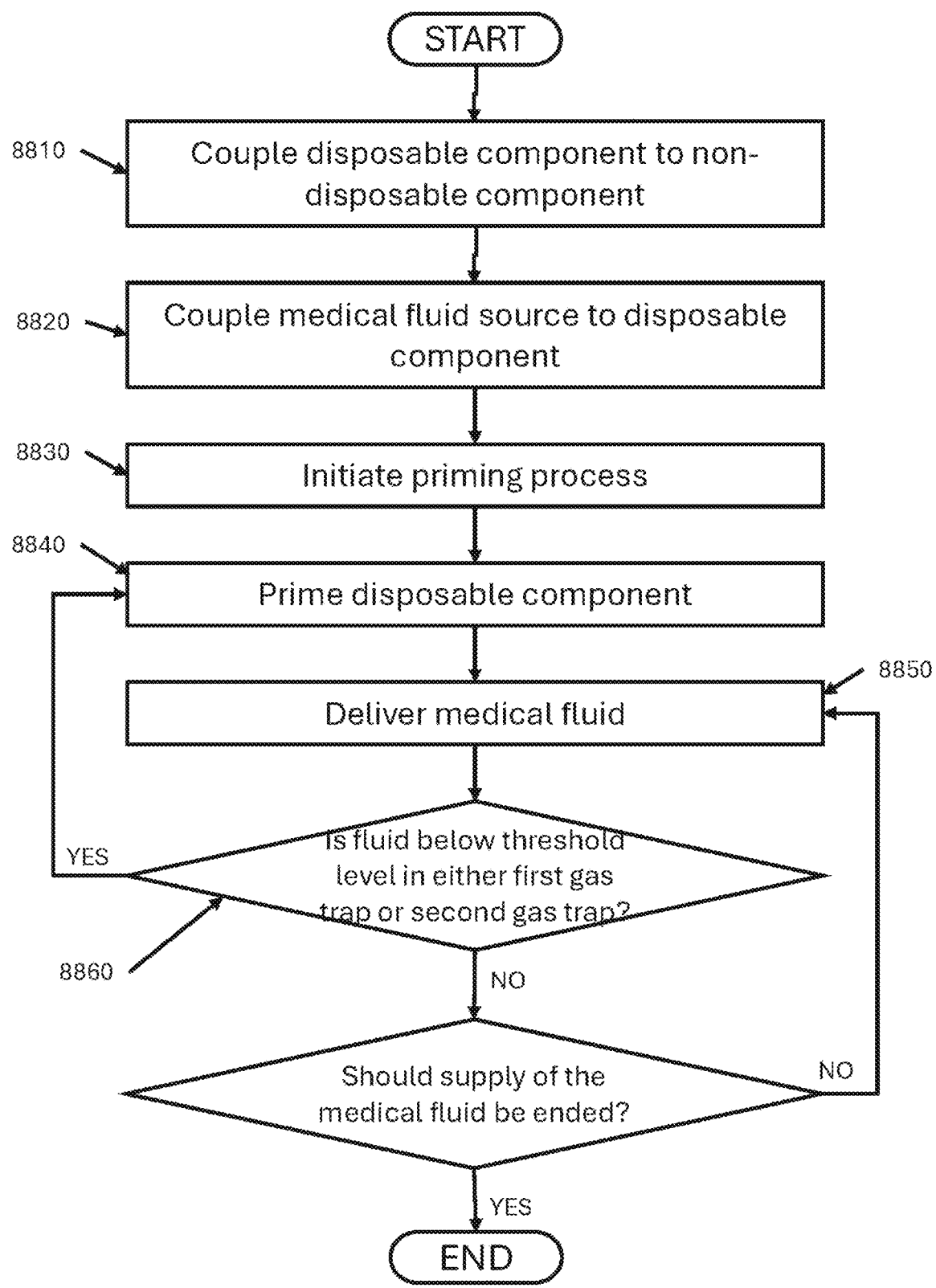
FIG. 88 is a flowchart of an overall operational framework of a disposable component and a non-disposable component in accordance with some exemplary embodiments.

In some embodiments, when a new source of a medical fluid (e.g., a bag of blood to be provided to a patient) is coupled to the disposable component fluid inlet 8420 of the disposable component 8400, before the fluid can begin to be heated for delivery via the system fluid outlet 8480 of the disposable component 8400, the disposable component 8400 is primed. FIG. 88 shows a flowchart of an overall operational process flow of the non-disposable component 8600 and the disposable component 8400. In step 8810, the disposable component 8400 is positioned within the recess 8610 of the non-disposable component 8600 to couple the disposable component 8400 to the non-disposable component 8600. In step 8820, the new source of medical fluid is coupled to the disposable component fluid inlet 8420 of the disposable component 8400. In step 8830, a priming process for the disposable component 8400 is initiated. For example, in some embodiments, a user operates the user interface 8650 of the non-disposable component 8600 to which the disposable component 8400 is coupled to initiate use of the disposable component 8400 to thereby dispense the medical fluid. In step 8840, the priming process causes the elements of the non-disposable component 8600 to interact with the elements of the disposable component 8400 (for example, by operating the multi-state valve 8410 and by actuating the plunger 8630 to interact with the pumping segment 8450 as appropriate) so as to fill both the first gas trap 8430 and the second gas trap 8460 with the medical fluid. For example, in some embodiments, a first iteration of the priming process performed in step 8840 following steps 8810 and 8820 is the priming process that will be described hereinafter with reference to FIG. 89.

In step 8850, the non-disposable component 8600 operates the disposable component 8400 to deliver the medical fluid via the system fluid outlet 8480. For example, in some embodiments, the delivery of the medical fluid in step 8850 includes the pumping process that will be described hereinafter with reference to FIG. 91 and the heating process that will be described hereinafter with reference to FIG. 92.

While fluid delivery is ongoing, the fluid level within the first gas trap 8430 and the second gas trap 8460 are monitored to sure that they are maintained about respective threshold fill levels. In some embodiments, by maintaining these fluid levels sufficiently high, it can be ensured that any gas present within the first gas trap 8430 and the second gas trap 8460 is sufficiently distant from the first gas trap fluid outlet 8436 and the second gas trap fluid outlet 8466, respectively, so that no gas travels onward through the flow path within the disposable component 8400 to be delivered via the system fluid outlet 8480. Such monitoring is performed on an ongoing basis, for example, at a sampling interval such as once per second, ten times per second, etc. At step 8860, at each sampling interval, it is determined whether the fluid level within either the first gas trap 8430 or the second gas trap 8460 has decreased to below the respective threshold fill level. If neither fluid level has decreased, then fluid delivery continues by returning to step 8850, with ongoing periodic monitoring in step 8860 as described above. If either fluid level has decreased to below the respective threshold fill level, then fluid delivery is ceased, and the method returns to step 8840 for the first gas trap 8430 and the second gas trap 8460 to again be appropriately primed. In some embodiments, when the method 8800 returns to step 8840 following step 8860, the priming process of step 8840 is the priming process that will be described hereinafter with reference to FIG. 90.

Figure 94:
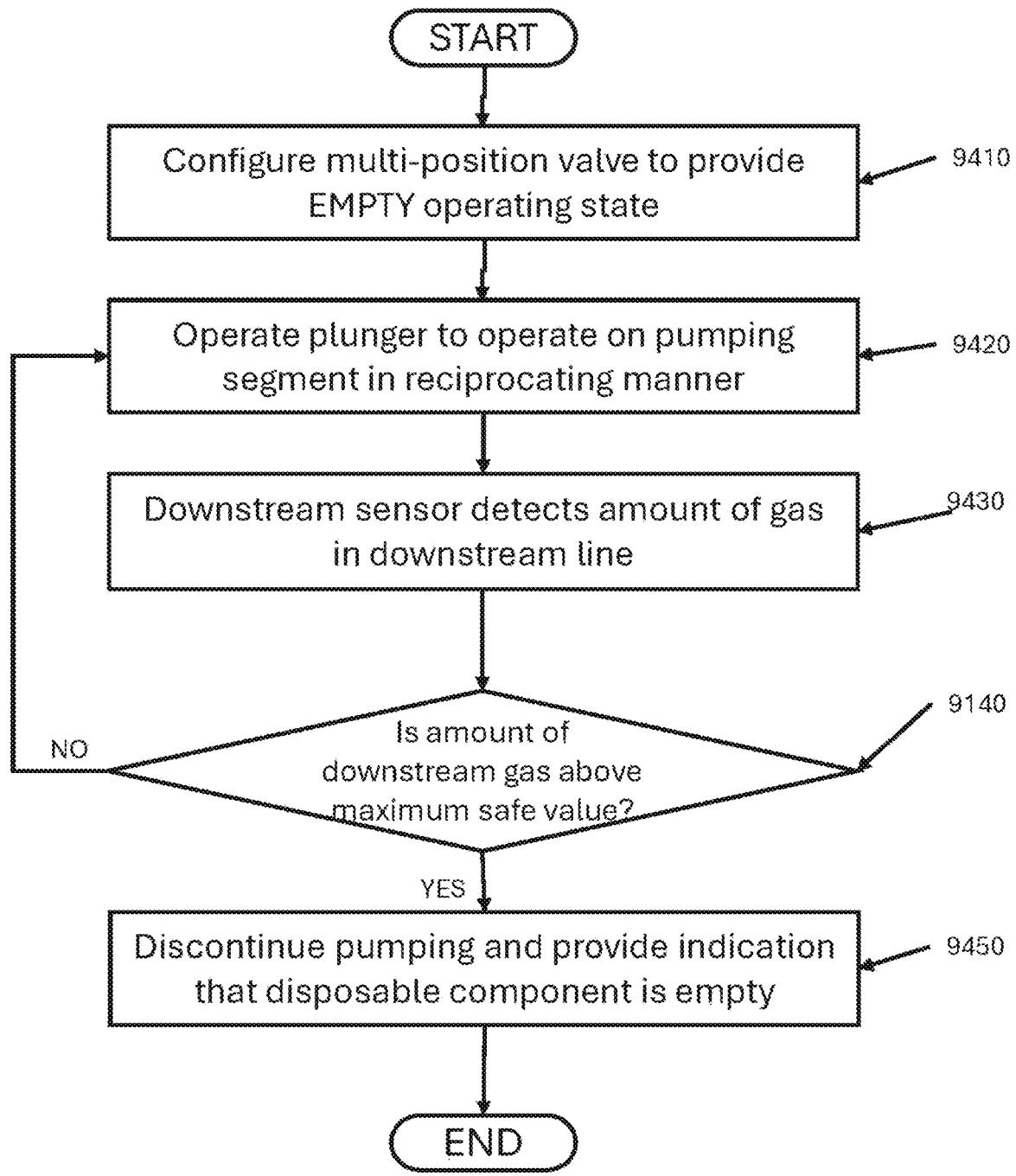
FIG. 94 is a flowchart of a method for emptying a medical fluid from a disposable component in accordance with some exemplary embodiments.

In some embodiments, the method 8700 may be completed when the fluid source is exhausted or when a user operates the user interface 8650 to discontinue delivery of the medical fluid. In some embodiments, after it is determined in step 8860 that neither fluid has decreased to below the corresponding threshold fill level, then in step 8870 it is determined whether the supply of the medical fluid should be terminated (e.g., due to the receipt of an instruction via the user interface 8650). If there is no need for terminating the supply of the medical fluid, then the method returns to step 8850 and the supply of medical fluid continues. If it is determined in step 8870 that the supply of the medical fluid should be terminated, then following step 8870 the method 8800 ends. In some embodiments, supply of the medical fluid is paused and may be subsequently resumed. In some embodiments, supply of the medical fluid is complete and will not be resumed, and in such cases it may be appropriate to empty the disposable component 8400 of the medical fluid. In some such cases, the emptying process that will be described hereinafter with reference to FIG. 94 is included as part of the termination of the method 8700.

In some embodiments, priming of the first gas trap 8430 and the second gas trap 8460, whether an initial priming following steps 8810 and 8820 or a subsequent priming following step 8860, includes filling the first gas trap 8430 to above a level of the fluid level sensor 8438 and filling the second gas trap 8460 to above a level of the fluid level sensor 8468. In some embodiments, the priming process includes filling each of the first gas trap 8430 and the second gas trap 8460 to a point at which the fluid level sensor 8438 and the fluid level sensor 8468 indicate that the medical fluid is present, and then performing a further number of pumping cycles of the plunger 8630 to fill the first gas trap 8430 and the second gas trap 8460 past the fill level indicated by the fluid level sensor 8438 and the fluid level sensor 8468. For example, in some embodiments, the further number of pumping cycles is between one and three (e.g., between one and three additional aliquots of the medical fluid are delivered to the first gas trap 8430 and the second gas trap 8460 past the fill level indicated by the fluid level sensor 8438 and the fluid level sensor 8468, respectively). In some embodiments, the threshold fill levels that are monitored during step 8860 correspond to fill levels of the first gas trap 8430 and the second gas trap 8460 that are at the levels of the fluid level sensor 8438 and the fluid level sensor 8468, respectively. In some embodiments, filling the first gas trap 8430 and the second gas trap 8460 past the fill levels defined by the fluid level sensor 8438 and the fluid level sensor 8468, respectively, allows for some decrease in the levels of the medical fluid within the first gas trap 8430 and the second gas trap 8460 over time during the course of ongoing pumping in step 8850 prior to the need to return to step 8840 for priming to be performed. In other words, filling first gas trap 8430 and the second gas trap 8460 past the fill levels defined by the fluid level sensor 8438 and the fluid level sensor 8468, respectively, prevents overly frequent cycling between the pumping process of step 8850 and the priming process of step 8840.

As noted above, various elements of the disposable component 8400 (e.g., the first gas trap 8430, the heating chamber 8440, the pumping segment 8450, and the second gas trap 8460) operate properly by being maintained in a vertical orientation. Consequently, in some embodiments, during performance of the method 8800, the azimuth detector 8660 monitors the orientation of the non-disposable component 8600 and the disposable component 8400 on an ongoing basis, such as at regular intervals. In some embodiments, if the azimuth detector 8660 determines that the orientation of the disposable component 8400 is sufficiently far from vertical that the elements of the disposable component 8400 will not function properly as described herein, then the control system 8640 ceases pumping action by the plunger 8630 and alerts a user (e.g., via the user interface 8650) of the incorrect orientation.

Figure 89:
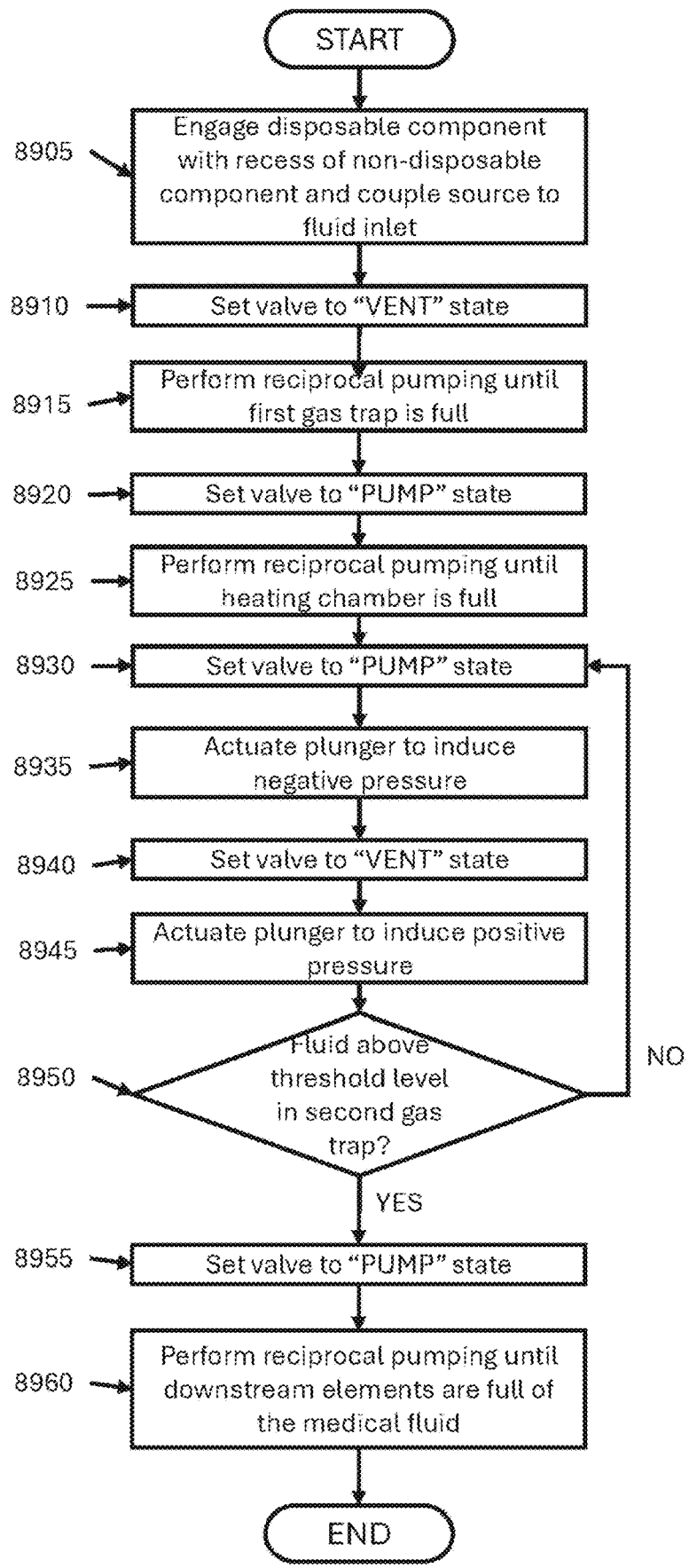
FIG. 89 is a flowchart of a method for initial priming of a disposable component in accordance with some exemplary embodiments.

FIG. 89 shows a flowchart of a method 8900 for initial priming of the disposable component 8400. In some embodiments, the method 8900 is utilized only for initial priming when the disposable component 8400 is first coupled to the non-disposable component 8600 and to a source of a medical fluid, such that the disposable component 8400 is entirely full of ambient gas and no medical fluid is present anywhere within the disposable component 8400. In step 8905, the disposable component 8400 is engaged within the recess 8610 of the non-disposable component 8600 and a source of medical fluid is coupled to the disposable component fluid inlet 8420 of the disposable component 8400. At this stage, an output (e.g., a downstream line) is not yet coupled to the system fluid outlet 8480. For example, in some embodiments, a cap including a gas vent and a hydrophobic membrane is positioned so as to obstruct the system fluid outlet 8480. In step 8910, the multi-state valve 8410 is configured to provide the VENT operational state, defining flow paths within the disposable component 8400 as shown in FIG. 85B. In step 8915, the plunger 8630 is actuated in a reciprocating manner to compress and release compression on the pumping segment 8450, thereby drawing the medical fluid through the disposable component fluid inlet 8420 and into the first gas trap 8430, until the first gas trap 8430 has been filled to a threshold fill level. During step 8915, gas initially present within the first gas trap 8430 flows from the first gas trap 8430, through the multi-state valve 8410, the pumping segment 8450, the second gas trap 8460, the one-way valve 8469, and the multi-state valve 8410, exiting the disposable component 8400 via the system gas outlet 8490. At the end of step 8915, the first gas trap 8430 is full of the medical fluid up to a threshold fill level, while the remaining elements of the disposable component 8400 remain full of ambient gas.

In some embodiments, the threshold fill level for the first gas trap 8430 is a level that is at the level of the fluid level sensor 8438. In some embodiments, as discussed above with reference to the method 8800, the threshold level to which the first gas trap 8430 is filled during step 8915 is a level that is at the level of the fluid level sensor 8438 plus an additional amount of fluid above the level of the fluid level sensor 8438 to prevent overly frequent repetition of priming. In some embodiments, the additional amount of fluid is an additional one to three actuations of the plunger 8630.

In step 8920, the multi-state valve 8410 is configured to provide the PUMP operational state, defining flow paths within the disposable component 8400 as shown in FIG. 85A. In step 8925, the plunger 8630 is actuated in a reciprocating manner to compress and release compression on the pumping segment 8450, thereby drawing the medical fluid from the first gas trap 8430 and into the heating chamber 8440 while drawing additional medical fluid through the disposable component fluid inlet 8420 and into the first gas trap 8430. In some embodiments, step 8925 is performed for a predetermined number of pumping cycles, depending on the volume of the various elements of the disposable component 8400, so as to be sufficient to fill the heating chamber 8440 with the medical fluid and to retain the first gas trap 8430 full of the medical fluid, but without drawing any of the medical fluid into the pumping segment 8450 or the second gas trap 8460. As such, following performance of step 8925, the first gas trap 8430 and the heating chamber 8440 are full of the medical fluid up to a threshold fill level, while the remaining elements of the disposable component 8400 remain full of ambient gas.

Following step 8925, the disposable component 8400 is operated in a "split cycle" mode as described herein. In step 8930, the multi-state valve 8410 is configured to provide the PUMP operational state, defining flow paths within the disposable component 8400 as shown in FIG. 85A. In step 8935, the plunger 8630 is actuated one time in a direction so as to reduce pressure on the pumping segment 8450, thereby drawing the medical fluid from the heating chamber 8440, through the multi-state valve 8410, and into the pumping segment 8450. In step 8940, the multi-state valve 8410 is configured to provide the VENT operational state, defining flow paths within the disposable component 8400 as shown in FIG. 85B. In step 8945, the plunger 8630 is actuated one time in a direction so as to increase pressure on the pumping segment 8450, thereby forcing the medical fluid out of the pumping segment 8450 and into the second gas trap 8460. In step 8950, it is determined whether the level of the medical fluid within the second gas trap 8460 has reached the threshold fill level. If this is not the case, then the method returns to step 8930 and the "split cycle" of steps 8930 through 8945 is repeated.

In some embodiments, the threshold fill level for the second gas trap 8460 is a level that is at the level of the fluid level sensor 8468. In some embodiments, as discussed above with reference to the method 8800, the threshold level to which the second gas trap 8460 is filled during steps 8930 through 8950 is a level that is at the level of the fluid level sensor 8438 plus an additional amount of fluid above the level of the fluid level sensor 8438 to prevent overly frequent repetition of priming. In some embodiments, the additional amount of fluid is an additional one to three actuations of the plunger 8630 (e.g., an additional one to three iterations of steps 8930 through 8945).

Referring again to step 8950, if it is determined that the level of the medical fluid in the second gas trap 8460 has reached the threshold level, then the method continues to step 8955. In step 8955, the multi-state valve 8410 is configured to provide the PUMP operational state, defining flow paths within the disposable component 8400 as shown in FIG. 85A. In step 8960, the plunger 8630 is actuated to perform reciprocal pumping so as to pump the medical fluid along the flow path shown in FIG. 85A, e.g., from the disposable component fluid inlet 8420, through the first gas trap 8430, the heating chamber 8440, the multi-state valve 8410, the pumping segment 8450, the second gas trap 8460, and the pressure-activated valve 8470, to the system fluid outlet 8480. Consequently, by the performance of step 8960, any residual ambient gas that was present in the elements along the flow path from the second gas trap 8460 through the pressure-activated valve 8470 and to the system fluid outlet 8480 prior to the method 8900 is forced out of the disposable component 8400 by the flowing medical fluid. The pumping of step 8960 is performed until all gas has been flushed out of these elements such that they are instead full of the medical fluid. For example, in some embodiments in which the system fluid outlet 8480 is covered by a cap including a gas vent and a hydrophobic membrane, once the medical fluid has reached the cap, flow will become obstructed by the hydrophobic membrane, causing pressure to build up within the disposable component 8400, and pumping by the plunger 8630 ceases once such pressure buildup is detected. Following step 8960, the method 8900 is complete. At this point, the entire flow path described above is full of the medical fluid, and the system fluid outlet 8480 may be coupled to a destination of the medical fluid (e.g., to a patient).

Figure 90:
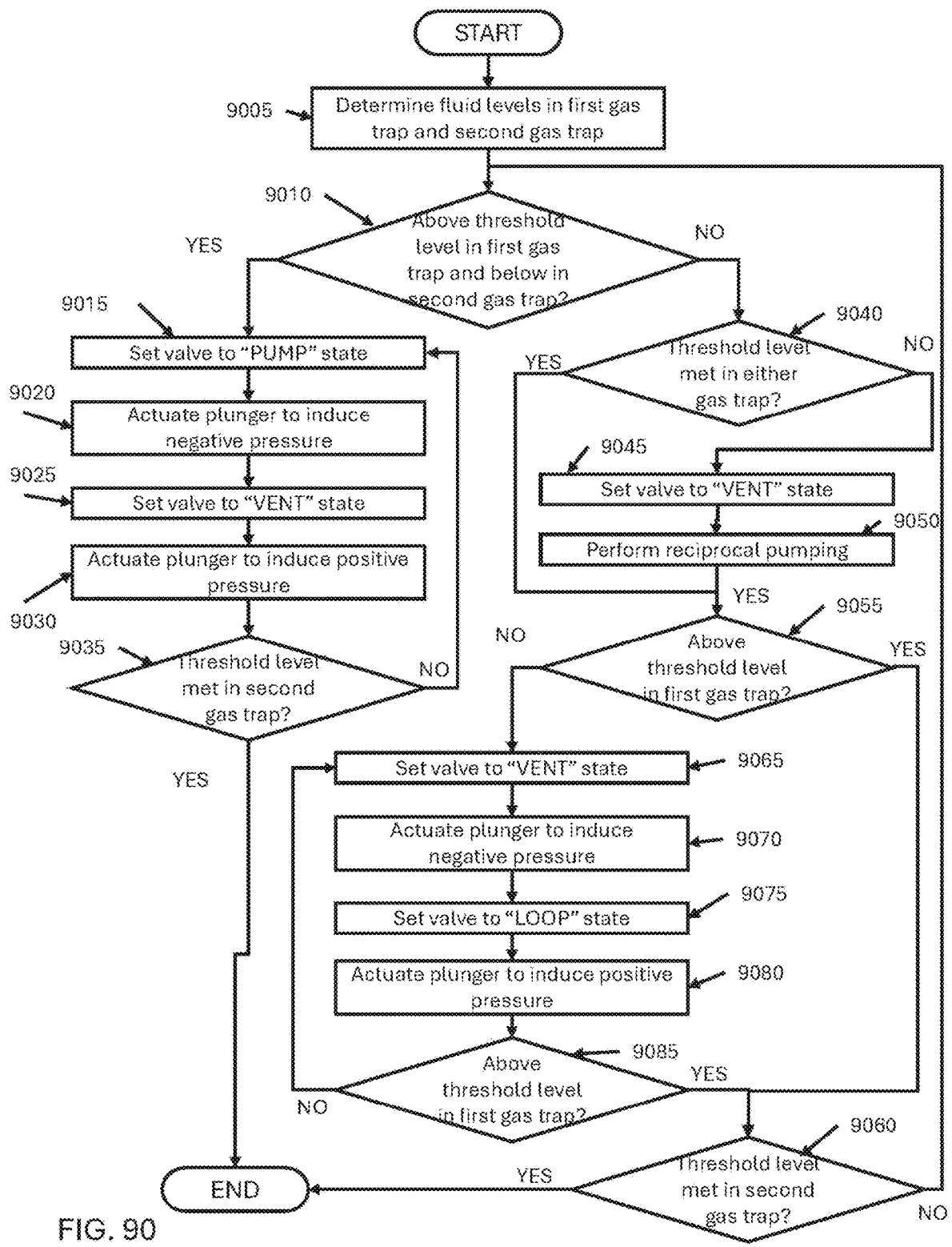
FIG. 90 is a flowchart of a method for subsequent priming of a disposable component in accordance with some exemplary embodiments.

FIG. 90 shows a flowchart of a method 9000 for subsequent priming of the disposable component 8400. In some embodiments, the method 9000 may be performed during ongoing operations of the disposable component 8400 and the non-disposable component 8600 when it is determined that the level of the medical fluid within either the first gas trap 8430 or the second gas trap 8460 has decreased to below the corresponding threshold level (e.g., in step 8860 of the method 8800 described above with reference to FIG. 88) and that the disposable component 8400 therefore needs to be primed so as to bring the level of fluid within both the first gas trap 8430 and the second gas trap 8460 to above the corresponding threshold levels. At the start of the method 9000, the multi-state valve 8410 may be in any state depending on the operational status of the disposable component 8400 prior to beginning the method 9000. In step 9005, the levels of the medical fluid within the first gas trap 8430 and the second gas trap 8460 are measured. In step 9010, it is determined (e.g., by the control system 8640) whether the level of medical fluid is above the threshold level in the first gas trap 8430 and below the threshold level in the second gas trap 8460. If so, the method 9000 continues to step 9015 and begins a "split cycle" process for increasing the level of the medical fluid within the second gas trap 8460.

In step 9015, the multi-state valve 8410 is configured to provide the PUMP operational state, defining flow paths within the disposable component 8400 as shown in FIG. 85A. In step 9020, the plunger 8630 is actuated one time in a direction so as to reduce pressure on the pumping segment 8450, thereby drawing the medical fluid from the first gas trap 8430, through the heating chamber 8440 and the multi-state valve 8410, and into the pumping segment 8450. Also during step 9020, the pressure induced draws an additional amount of the medical fluid through the disposable component fluid inlet 8420 and into the first gas trap 8430, thereby maintaining the level of the medical fluid within the first gas trap 8430. In step 9025, the multi-state valve 8410 is configured to provide the VENT operational state, defining flow paths within the disposable component 8400 as shown in FIG. 85B. In step 9030, the plunger 8630 is actuated one time in a direction so as to increase pressure on the pumping segment 8450, thereby forcing the medical fluid out of the pumping segment 8450 and into the second gas trap 8460. Following each iteration of the "split cycle" though steps 9015 through 9030, it is determined whether the level of the medical fluid in the second gas trap 8460 has reached the threshold level. As noted above, in some embodiments, the threshold level used for filling the second gas trap 8460 is a level that is a predetermined amount past the point at which the fluid level sensor 8468 indicates that the second gas trap 8460 is filled with the medical fluid to the level of the fluid level sensor 8468, such as one to three additional pumping cycles (e.g., one to three iterations through steps 9015 through 9030) past the point at which the fluid level sensor 8468 indicates that the second gas trap 8460 is filled with the medical fluid to the level of the fluid level sensor 8468. If not, the method returns to step 9015 and the "split cycle" is repeated. If it is determined in step 9035 that the level of the medical fluid in the second gas trap 8460 has reached the threshold level, then the method 9000 is complete.

Returning to step 9010, if it is not the case that the level of the medical fluid is above the threshold in the first gas trap 8430 and below the threshold level in the second gas trap 8460, then the method continues to step 9040. In step 9040, it is determined whether the level of the medical fluid is above the corresponding threshold value in either the first gas trap 8430 or the second gas trap 8460. If this is the case, then the method continues to step 9055, which will be described below. If not, the method continues to step 9045. In step 9045, the multi-state valve 8410 is configured to provide the VENT operational state, defining flow paths within the disposable component 8400 as shown in FIG. 85B. In step 9050, the plunger 8630 is actuated in a reciprocating manner to draw the medical fluid into the disposable component 8400 through the disposable component fluid inlet 8420, and through the disposable component 8400 through the first gas trap 8430, the multi-state valve 8410, the pumping segment 8450, and into the second gas trap 8460, until the level of the medical fluid in the second gas trap 8460 is above the threshold fill level. At this point, the method continues to step 9055.

In step 9055, it is determined whether the level of the medical fluid is above the threshold level in the first gas trap 8430. If this is the case, the method continues to step 9060. In step 9060, it is determined whether the level of the medical fluid is also above the threshold level in the second gas trap 8460. If this is also the case, then the method 9000 is complete. If it is determined in step 9060 that the level of the medical fluid does not meet the threshold level in the second gas trap 8460, then the method returns to step 9010 as described above.

Returning to step 9055, if it is determined that the level of the medical fluid is not above the threshold level in the first gas trap 8430, then the method continues in step 9065 in which a "split cycle" begins to transfer gas from the first gas trap 8430 to the second gas trap 8460. In step 9065, the multi-state valve 8410 is configured to provide the VENT operational state, defining flow paths within the disposable component 8400 as shown in FIG. 85B. In step 9070, the plunger 8630 is actuated one time in a direction so as to reduce pressure on the pumping segment 8450, thereby drawing gas from the first gas trap 8430, through the multi-state valve 8410, and into the pumping segment 8450. In step 9075, the multi-state valve 8410 is configured to provide the LOOP operational state, defining flow paths within the disposable component 8400 as shown in FIG. 85C. In step 9080, the plunger 8630 is actuated one time in a direction so as to increase pressure on the pumping segment 8450, thereby forcing the gas out of the pumping segment 8450 and into the second gas trap 8460. As a result of step 9080, the gas that is forced into the second gas trap 8460 propels a quantity of the medical fluid from the second gas trap 8460, through the one-way valve 8469 and the multi-state valve 8410, and into the first gas trap 8430, followed by a quantity of the gas that prevents residual medical fluid from remaining along this flow path. Following each iteration of the "split cycle" though steps 9065 through 9080, it is determined whether the level of the medical fluid in the first gas trap 8430 has reached the threshold level. As noted above, in some embodiments, the threshold level used for filling the first gas trap 8430 is a level that is a predetermined amount past the point at which the fluid level sensor 8438 indicates that the first gas trap 8430 is filled with the medical fluid to the level of the fluid level sensor 8438, such as one to three additional pumping cycles (e.g., one to three iterations through steps 9065 through 9080) past the point at which the fluid level sensor 8438 indicates that the first gas trap 8430 is filled with the medical fluid to the level of the fluid level sensor 8438. If this is the case, the method continues to step 9060 as described above. If not, the method returns to step 9065 and the "split cycle" is repeated. As a result of the performance of the method 9000 as described above, both the first gas trap 8430 and the second gas trap 8460 will be filled with the medical fluid to above the corresponding threshold levels.

Figure 91:
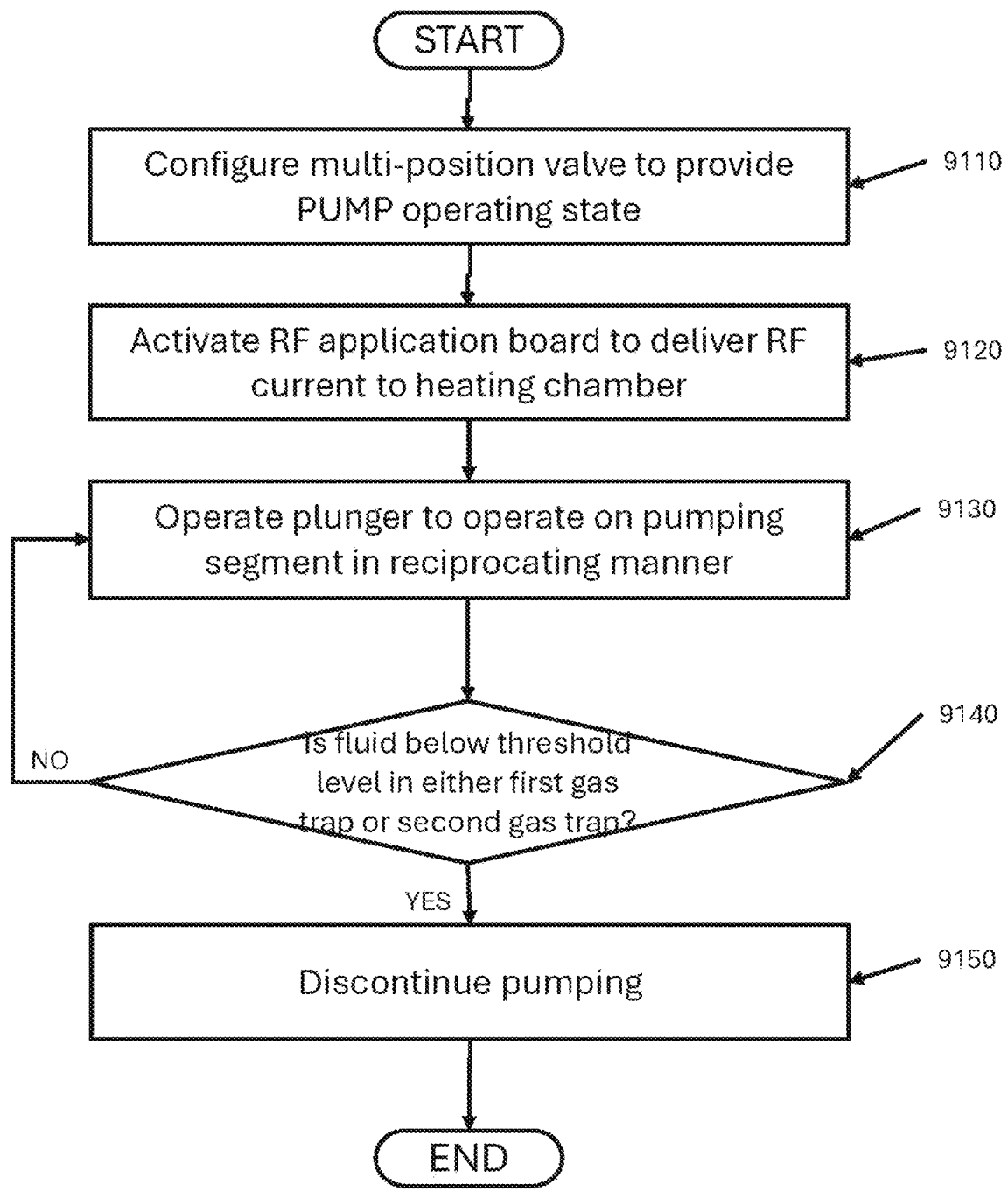
FIG. 91 is a flowchart of a method for pumping a medical fluid through a disposable component for delivery in accordance with some exemplary embodiments.

FIG. 91 shows a flowchart of a method 9100 for pumping the medical fluid through the disposable component 8400 for delivery via the system fluid outlet 8480. In some embodiments, before the method 9100 is initiated, the first gas trap 8430 and the second gas trap 8460 are primed such that the level of the medical fluid in each is above a threshold level. In step 9110, the multi-state valve 8410 is placed in a PUMP state so as to configure the multi-state valve 8410 to-define flow paths as shown in FIG. 85A. In step 9120, the control system 8640 activates the RF application board 8642 to deliver RF current via the first electrode 8620 and the second electrode 8622, thereby heating the medical fluid as it passes through the heating chamber 8440. The heating process will be discussed in more detail hereinafter with reference to FIG. 92.

In step 9130, the plunger 8630 is operated to reciprocally act on the pumping segment 8450, thereby inducing a pressure within the disposable component 8400 that draws the medical fluid from the disposable component fluid inlet 8420, through the first gas trap 8430 and the heating chamber 8440, via the multi-state valve 8410, and to the pumping segment 8450. In some embodiments, the medical fluid is heated as it passes through the heating chamber 8440. In some embodiments, the pressure induced within the pumping segment 8450 forces the medical fluid along the flow path shown in FIG. 85A into the second gas trap 8460. In some embodiments, the positive pressure caused within the pumping segment 8450 forces open the pressure-activated valve 8470, allowing the medical fluid to reach the system fluid outlet 8480 and be delivered.

In step 9140, fluid levels within the first gas trap 8430 and the second gas trap 8460 are monitored. In some embodiments, if either fluid level decreases below the relevant threshold value, the method continues to step 9150, in which pumping is discontinued to avoid risk of gas being delivered at the system fluid outlet 8480. Following step 9150, the method 9100 terminates by returning to the priming process as discussed above with reference to FIG. 89. As discussed above with reference to the method 8800, in some embodiments, the threshold levels within the first gas trap 8430 and the second gas trap 8460 that are considered during fluid delivery are fluid levels that are at the level of the fluid level sensor 8438 and the fluid level sensor 8468, respectively. Additionally, as discussed above with reference to the method 8800, the threshold levels that are used for filling the first gas trap 8430 and the second gas trap 8460 during priming processes are at the level of the fluid level sensor 8438 and the fluid level sensor 8468, respectively, plus an additional amount of the medical fluid such as an additional one to three pumping cycles. Consequently, in some embodiments, an amount of hysteresis exists between the priming/filling threshold level and the pumping/emptying threshold level that allows the level of the medical fluid within the first gas trap 8430 and/or the second gas trap 8460 to vary and/or decrease from their respective initial levels during the pumping/emptying process during the pumping process of the method 9100 before arriving at the need (e.g., in steps 9140 and step 9150) to cease pumping and repeat a priming process. As a result, the pumping method 9100 is able to proceed in a continuous manner for a longer period of time, rather than requiring the disposable component 8400 to frequently be switched between the pumping method 9100 and the priming method 9000.

Figure 92:
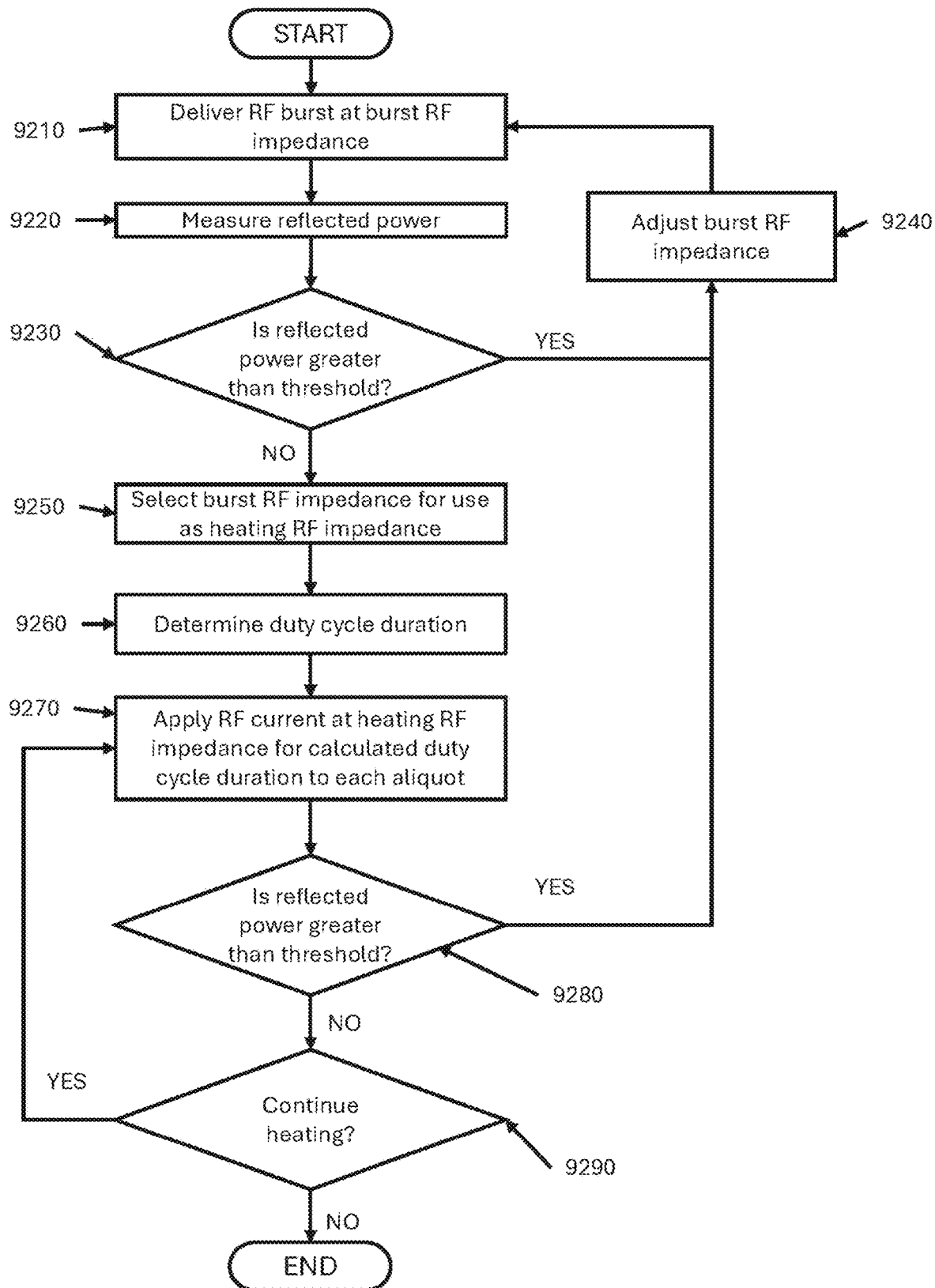
FIG. 92 is a flowchart of a method for heating a medical fluid that is being pumped through a disposable component in accordance with some exemplary embodiments.

FIG. 92 shows a flowchart of a method 9200 for heating a medical fluid that is being pumped through the disposable component 8400 as described herein. The method 9200 includes a process that includes both initialization of heating and ongoing heating. In some embodiments, the method 9200 is performed while pumping is ongoing (e.g., during performance of the method 9100 described above). In step 9210, the control system 8640 controls the RF application board 8642 to deliver an initial RF current burst at a burst RF impedance between the first electrode 8620 and the second electrode 8622. In some embodiments, the RF application board 8642 is preconfigured with an initial value to be used in this process.

In step 9220, reflected power between the first electrode 8620 and the second electrode 8622 resulting from the RF current burst delivered in step 9210 is measured. In step 9230, the reflected power measured in step 9220 is compared to a reflected power threshold value. In some embodiments, the reflected power threshold value is a ratio of 1.2:1. If, in step 9230, it is determined that the reflected power measured in step 9220 exceeds the reflected power threshold value, then the method 9200 proceeds to step 9240.

In step 9240, the burst RF impedance is adjusted (e.g., by adjusting the first adjustable inductor 8720 and/or the second adjustable inductor 8730 to so as to provide a different impedance at the load 8780). Following step 9240, the method 9200 returns to step 9210 and another RF current burst is delivered. In some embodiments, steps 9210 through 9240 may be performed as an iterative method until the measured reflected power is less than the reflected power threshold value. For example, in some embodiments, in a first iteration of step 9240, the burst RF impedance may be either increased or decreased, and the burst RF impedance may then be further adjusted in the same direction or may be adjusted in the opposite direction depending on the change in reflected power resulting from the first adjustment.

If, in step 9230, it is determined that the reflected power measured in step 9220 is less than the reflected power threshold value, then the method 9200 proceeds to step 9250. In step 9250, the burst RF impedance is selected for use as a heating RF impedance (e.g., an impedance to use on an ongoing basis for heating of medical fluid). Following step 9250, the method continues to step 9260. In step 9260, a duty cycle duration is determined for use during an ongoing heating process. In some embodiments, the duty cycle duration is a duration that is sufficient to heat each aliquot of the medical fluid from a measured input temperature (e.g., measured using a temperature sensor in the disposable component fluid inlet 8420 or the first gas trap 8430) to a target temperature (e.g., defined by a user using the user interface 8650) using RF current at the heating RF impedance selected in step 9250. In some embodiments, the duty cycle duration is determined based on factors including the measured input temperature, the desired output temperature, the selected heating RF impedance, a constant RF power utilized by the RF application board 8642, a volumetric heat capacity of the medical fluid (e.g., a known value for a given medical fluid), and a volume of each aliquot of the medical fluid (e.g., depending on a volume of the heating chamber 8440).

In step 9270, the medical fluid is heated on an ongoing basis by delivering RF current to each aliquot of the medical fluid at the constant RF power and the heating RF impedance for the calculated duty cycle duration. In step 9280, the reflected power is measured and compared to the reflected power threshold value for each aliquot of the medical fluid. If the reflected power exceeds the threshold value, then the method 9200 returns to step 9240 for determination of a new RF impedance in accordance with the iterative process described above. If the reflected power remains below the threshold value, then it is determined in step 9290 whether the heating is to be terminated for another reason (e.g., a user discontinues delivery of the medical fluid, the source of the medical fluid is exhausted, the orientation of the disposable component 8400 is incorrect, or the fluid level in the first gas trap 8430 or the second gas trap 8460 is too low). If there is no call for heating to be terminated, then the method returns to step 9270, and heating continues to be applied to each aliquot of the medical fluid. If it is determined in step 9290 that heating is to be terminated, then following step 9290 the method ends.

In some embodiments, while heating is ongoing such as in accordance with the method 9200, the control system 8640 continuously monitors current flow to and from each electrode (e.g., to and from the first electrode 8620 and the second electrode 8622). In some embodiments, if any non-zero current differential is detected between the input and return paths, provision of electrical power is automatically disabled to prevent potential leakage through the fluid path. In some embodiments, as described above with reference to FIG. 84, the heating chamber 8440 is positioned upstream of the pumping segment 8450, such that at least one valve along the fluid path between the electrodes 8620 and 8622 (e.g., either the pumping segment inlet valve 8456 or the pumping segment outlet valve 8458) is always closed during operation, eliminating any direct electrical conduction path to the patient.

In some embodiments, each of the first electrode 8620 and the second electrode 8622, together with its insulating film interface (e.g., the first dielectric region 8446 and the second dielectric region 8448) and the adjacent conductive medical fluid, forms a capacitive element of a series RF heating circuit. In some embodiments, these elements together present a capacitance that is typically in a range of between 1 and 1000 picofarads, often around 30 picofarads, depending on the thickness and dielectric properties of the first dielectric region 8446 and the second dielectric region 8448. In some embodiments, the fluid path between the two capacitive interfaces forms a resistive element with a resistance that is typically in a range of between 1 and 1000 ohms (e.g., between 20 to 80 ohms) based on fluid conductivity values from 0.4 to 1.6 S/m. In some embodiments, this series RC configuration supports effective ohmic heating using RF alternating current while ensuring safety, efficiency, and uniformity of fluid warming.

Figure 93:
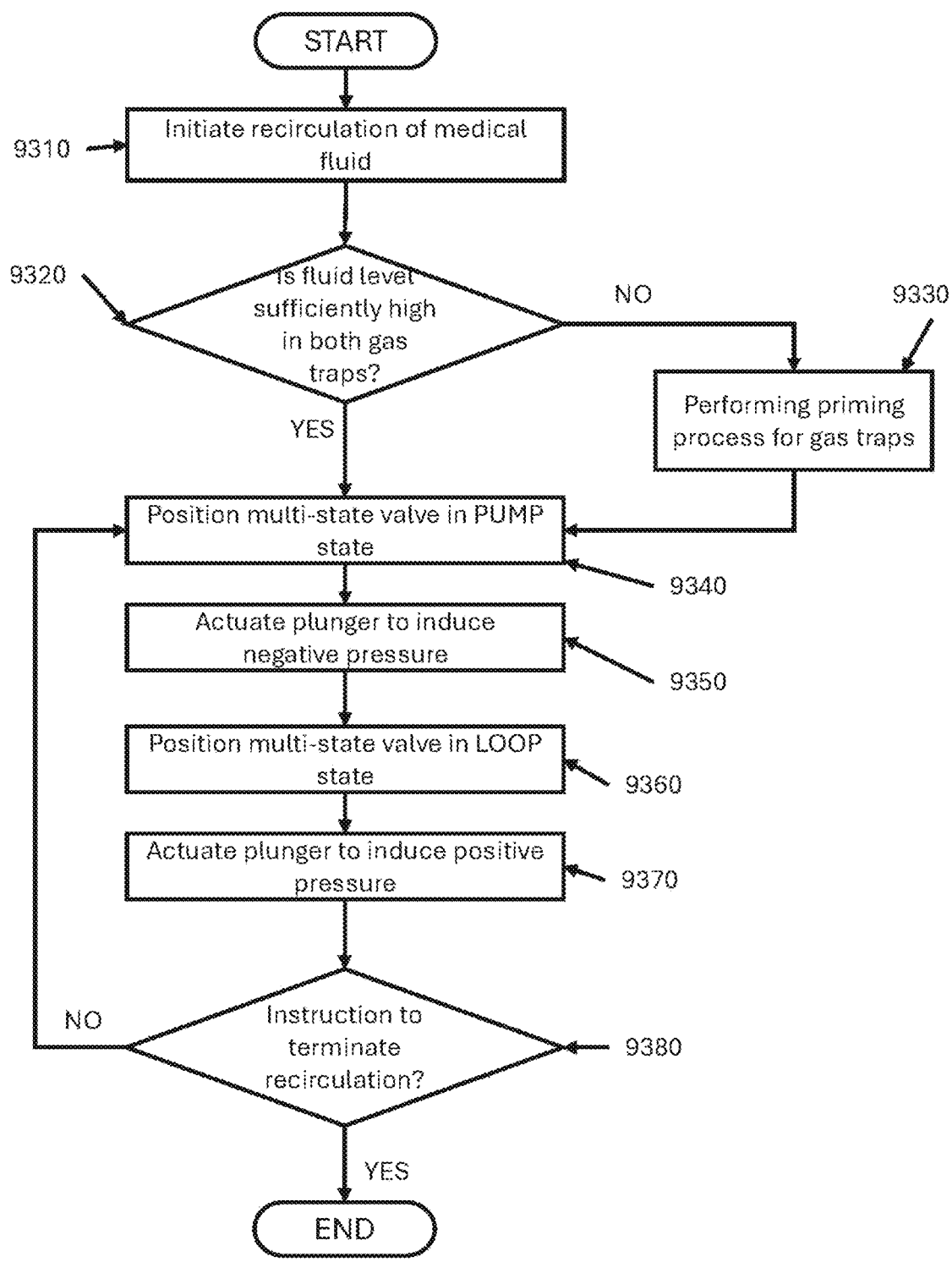
FIG. 93 is a flowchart of a method for recirculating a medical fluid through a disposable component in accordance with some exemplary embodiments.

FIG. 93 is a flowchart of a method 9300 for recirculating a medical fluid within the disposable component 8400. In some embodiments, the method 9300 may be performed, for example, when the medical fluid is not presently being delivered, but it is desired to maintain the medical fluid in a heated state to be ready for delivery when needed. In step 9310, the method 9300 is initiated, such as by an input via the user interface 8650 to initiate such operation. In step 9320, it is verified (e.g., by the control system 8640) that the fluid level in both the first gas trap 8430 and the second gas trap 8460 is above the corresponding threshold fill level as described herein. If it is determined that the fluid level in either the first gas trap 8430 or the second gas trap 8460 is below the corresponding threshold fill level, then the method 9300 proceeds to step 9330. In step 9330, the non-disposable component 8600 and the disposable component 8400 are operated to perform a priming process to bring the fill level in both the first gas trap 8430 and the second gas trap 8460 to above the corresponding threshold levels by performance of the method 8900 as described above with reference to FIG. 89.

If it is determined in step 9320 that the fluid level in both the first gas trap 8430 and the second gas trap 8460 is sufficiently high, or following performance of step 9330, the method 9300 continues in step 9340. In step 9340, the multi-state valve 8410 is configured in the PUMP state as shown in FIG. 85A. In step 9350, the plunger 8630 is actuated a single time in a direction so as to induce a reduced pressure within the pumping segment 8450, thereby inducing flow of the medical fluid from the first gas trap 8430, through the heating chamber 8440 and the multi-state valve 8410, and to the pumping segment 8450. In step 9360, the multi-state valve 8410 is configured in the LOOP state as shown in FIG. 85C. In step 9370, the plunger 8630 is actuated a single time in a direction so as to induce an increased pressure within the pumping segment 8450, thereby inducing flow of the medical fluid from the pumping segment 8450 through the second gas trap 8460, out of the second gas trap gas outlet 8464, through the one-way valve 8469 and the multi-state valve 8410, and into the first gas trap 8430. In some embodiments, because the plunger 8630 is actuated in this direction only a single time in step 9370, sufficient pressure does not build up within the second gas trap 8460 to force open the pressure-activated valve 8470 and induce flow through the pressure-activated valve 8470 to the system fluid outlet 8480.

In some embodiments, the method 9300 may continue on an ongoing basis until it is terminated, such as by a user input. In step 9380, it is determined whether an instruction to terminate the recirculation method 9300 has been received via the user interface 8650. If no instruction to terminate the method 9300 has been received, then the method returns to step 9340, and the method 9300 continues. If an instruction to terminate the method 9300 has been received, then following step 9380 the method 9300 terminates.

As discussed above, in some cases, the method 9300 is performed when it is desirable to maintain the medical fluid at a heated temperature. In such cases, the RF application board 8642 is active during performance of the method 9300 so as to heat the medical fluid while it passes through the heating chamber 8440 in step 9350. In other cases, the method 9300 may be performed without need to maintain the medical fluid at a heated temperature. For example, in some cases, the method 9300 is performed to prevent clotting or other effects of stagnation of the medical fluid. In such cases, the RF application board 8642 is not active during performance of the method 9300.

FIG. 94 shows a flowchart of a method 9400 for emptying medical fluid from the disposable component 8400. In some embodiments, the method 9400 may be performed when delivery of the medical fluid using the disposable component 8400 is to be concluded (e.g., in the case where the medical fluid is blood and the disposable component 8400 and the non-disposable component 8600 are utilized to deliver heated blood, where no further units of blood are to be provided) and it is desirable to operate the disposable component 8400 so as to deliver via the system fluid outlet 8480 all of the medical fluid that has been taken into the disposable component 8400. In some embodiments, the method 9400 is initiated, for example, by a user input via the user interface 8650 instructing the non-disposable component 8600 to empty the disposable component 8400. In some embodiments, when the method 9400 is performed, a source of the medical fluid that is coupled to the disposable component fluid inlet 8420 is exhausted or close to exhausted.

In step 9410, the multi-state valve 8410 is placed in the EMPTY state as shown in FIG. 85D. In step 9420, the plunger 8630 is operated on a reciprocating basis. In some embodiments, when the plunger 8630 moves in a direction so as to induce a reduced pressure within the pumping segment 8450, gas is drawn inward from the system gas outlet 8490 through the multi-state valve 8410 and into the first gas trap 8430 via the first gas trap gas outlet 8434. In some embodiments, the gas forces the medical fluid out of the first gas trap 8430, through the heating chamber 8440 and the multi-state valve 8410, and into the pumping segment 8450. In some embodiments, when the plunger 8630 reciprocates so as to induce an increased pressure within the pumping segment 8450, the remaining medical fluid and eventually the gas that has been drawn in through the system gas outlet 8490 are flowed into the second gas trap 8460, through the second gas trap fluid outlet 8466 and through the pressure-activated valve 8470, to the system fluid outlet 8480.

In some embodiments, a sensor is positioned downstream of the pumping segment 8450, such as at a location within the flow conduit that is near the pressure-activated valve 8470. In some embodiments, the sensor is operative to detect whether gas or liquid is currently present within the flow conduit. In some embodiments, step 9430, the sensor detects the amount of gas that has reached the downstream location of the sensor. For example, in some embodiments, the sensor is performing such detection on an ongoing basis while pumping is being performed in step 9420. In step 9440, the amount of gas downstream is compared to a threshold value. For example, in some embodiments, the threshold value is a value indicative of a safe amount of gas to have arrived at the downstream location so as to prevent deliver of gas with the medical fluid. If the amount of gas has not reached the threshold value, then the method returns to step 9420 and pumping continues. If the amount of gas has reached the threshold value, then the method continues to step 9450. In step 9450, pumping is discontinued and an indication that emptying is complete is provided, such as via the user interface 8650. Following step 9450, the method 9400 is complete.

In some embodiments, by performance of the method 9400, all or substantially all of the medical fluid is pumped through the disposable component 8400 and delivered via the system fluid outlet 8480. For example, in some embodiments, no "priming volume" of the medical fluid remains present within the disposable component 8400 following performance of the method 9400. As used herein, a priming volume refers to a volume of medical fluid that is present within the elements of the disposable component 8400 in order for the medical fluid to be pumped on an ongoing basis (e.g., the volume of the medical fluid that is present within the disposable component 8400 following performance of the method 9100 that primes the disposable component 8400). For example, in some embodiments, the priming volume includes the combined volume of the first gas trap 8430, the heating chamber 8440, the pumping segment 8450, the second gas trap 8460, and the conduits within the disposable component 8400 that connect these elements. Accordingly, by delivering the priming volume of the medical fluid through the system fluid outlet 8480, rather than retaining the priming volume within the disposable component 8400 when the disposable component disposable component 8400 is disposed, the method 9400 enables waste of the medical fluid to be reduced or substantially eliminated.

In some embodiments, due to the shape of the heating chamber 8440 and the characteristics of the heating that is performed by the method 9200 as described herein, the medical fluid that is pumped through the disposable component 8400 is heated uniformly. For example, in some embodiments, the medical fluid is heated in a manner such that there are no hot spots or cold spots that are heated to a temperature that differs from a target heating temperature by more than four (4) degrees Celsius. In some embodiments, the target heating temperature is a normothermic human body temperature. In some embodiments, the target heating temperature is 38 degrees Celsius. In some embodiments, the medical fluid is heated in such a manner that that the medical fluid, after heating, includes no hot spots that are heated to above 46 degrees Celsius. In some embodiments, the medical fluid is heated in such a manner that that the medical fluid, after heating, includes no hot spots that are heated to above 45 degrees Celsius. In some embodiments, the medical fluid is heated in such a manner that that the medical fluid, after heating, includes no hot spots that are heated to above 44 degrees Celsius. In some embodiments, the medical fluid is heated in such a manner that that the medical fluid, after heating, includes no hot spots that are heated to above 43 degrees Celsius. In some embodiments, the medical fluid is heated in such a manner that that the medical fluid, after heating, includes no hot spots that are heated to above 42 degrees Celsius.

FIGS. 95-121 show renderings of elements of a system in accordance with some exemplary embodiments. In some embodiments, the elements shown in FIGS. 95-121 show renderings of practical implementations of elements represented schematically in FIGS. 84-86.

Figure 95:
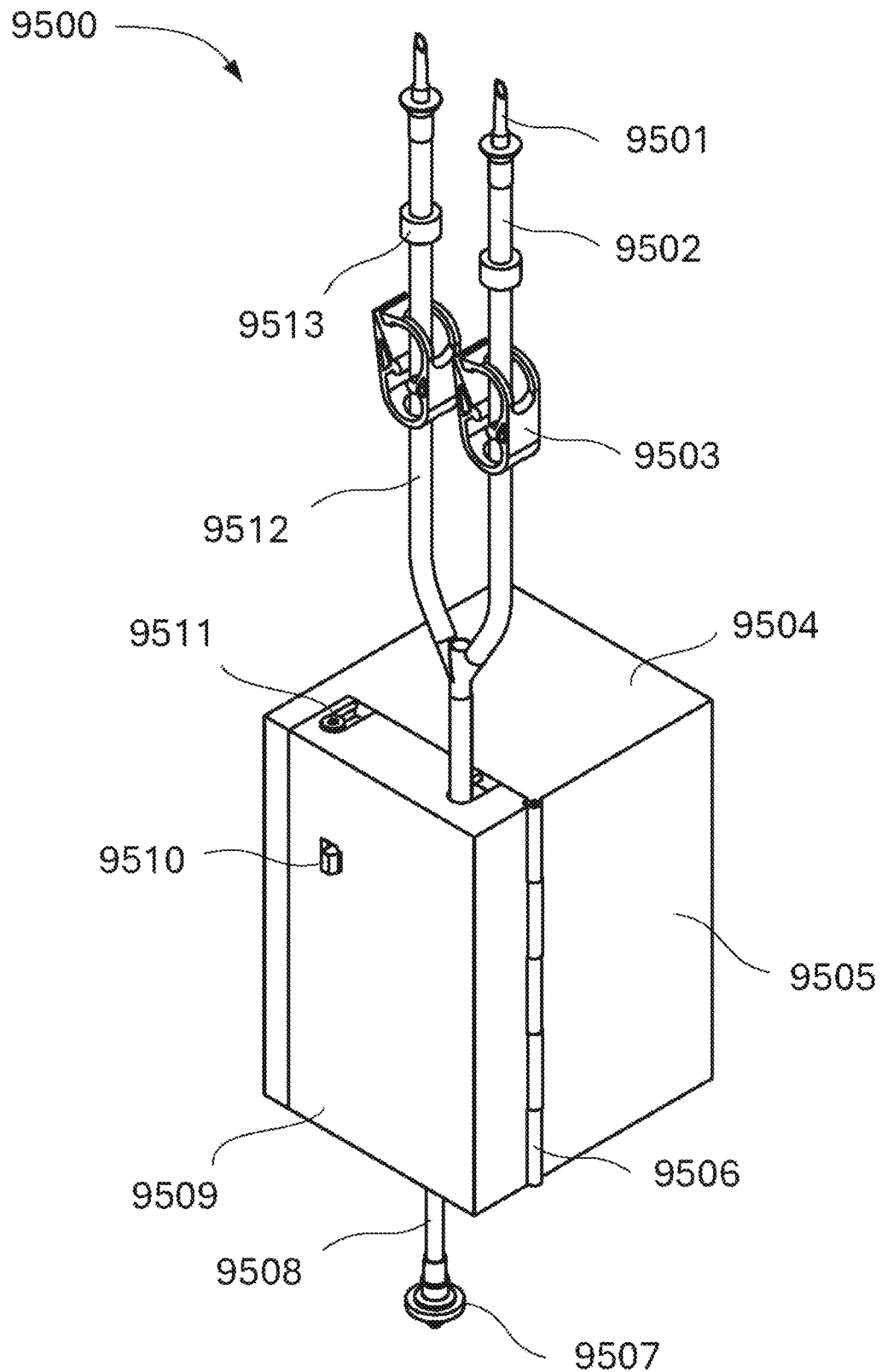
FIG. 95 is a perspective view of an apparatus comprising non-disposable and disposable assemblies according to some exemplary embodiments.
Figure 96:
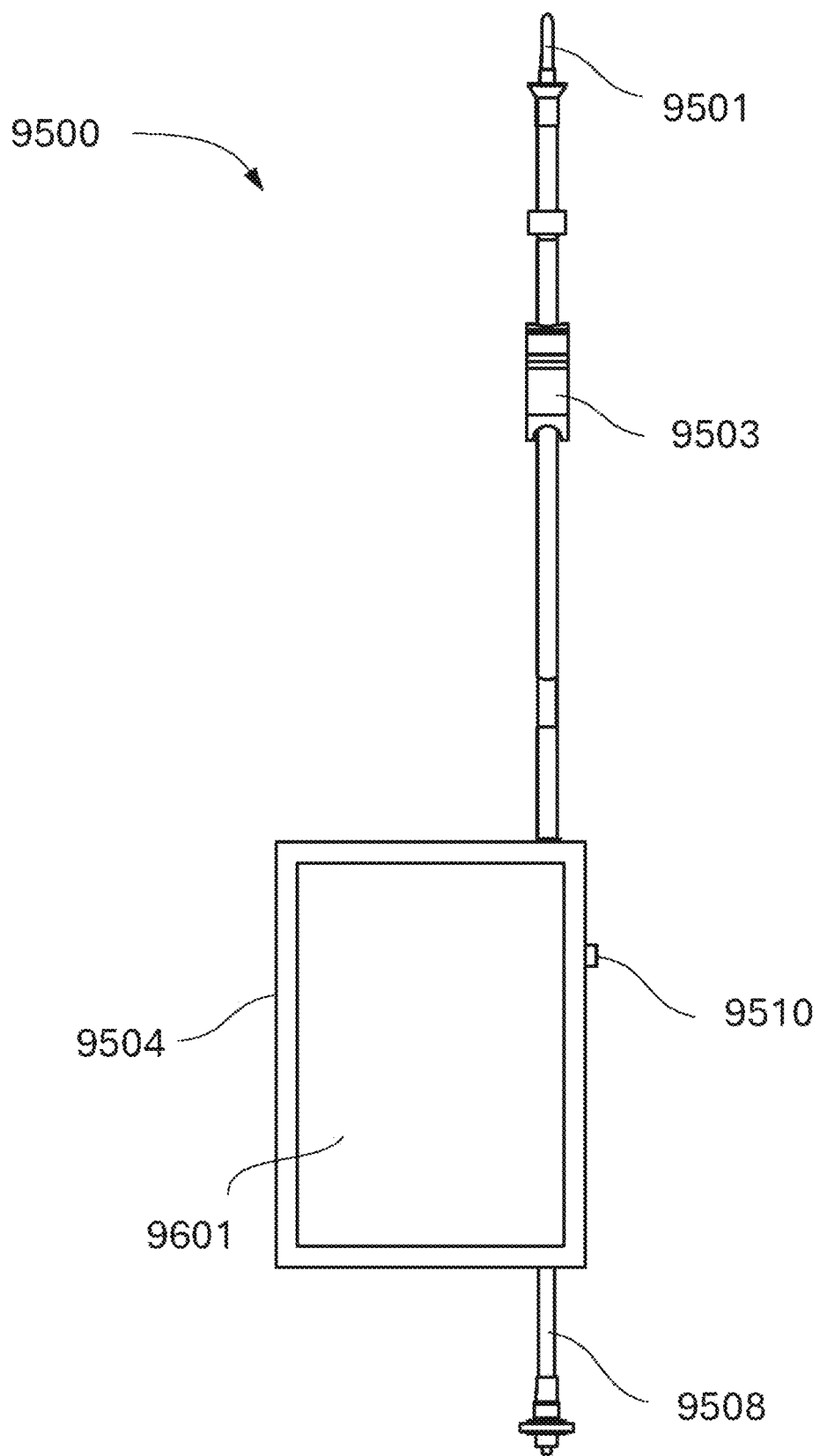
FIG. 96 is a left side elevation view of an apparatus comprising non-disposable and disposable assemblies according to some exemplary embodiments.
Figure 97:
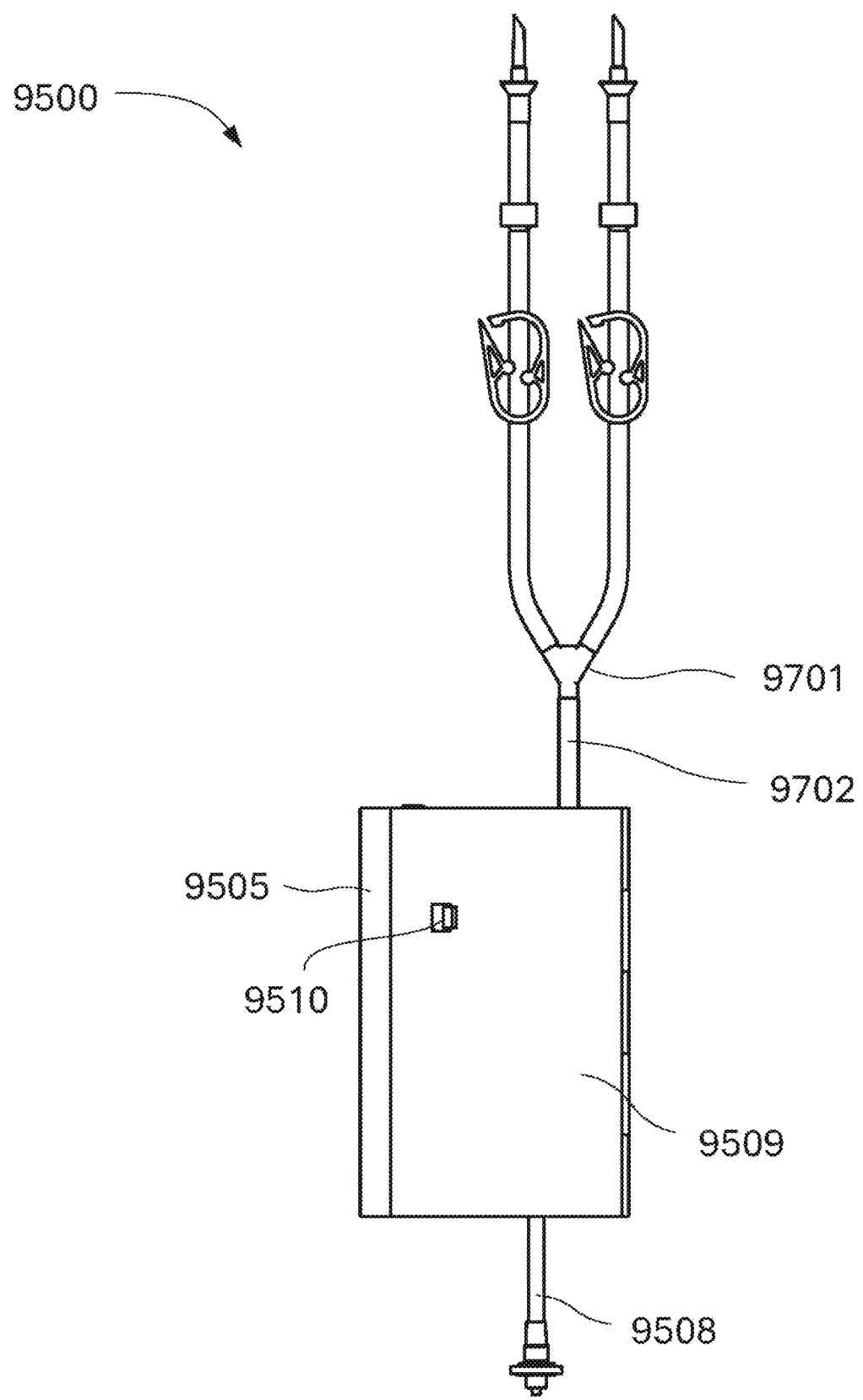
FIG. 97 is a front elevation view of an apparatus comprising non-disposable and disposable assemblies according to some exemplary embodiments.
Figure 98:
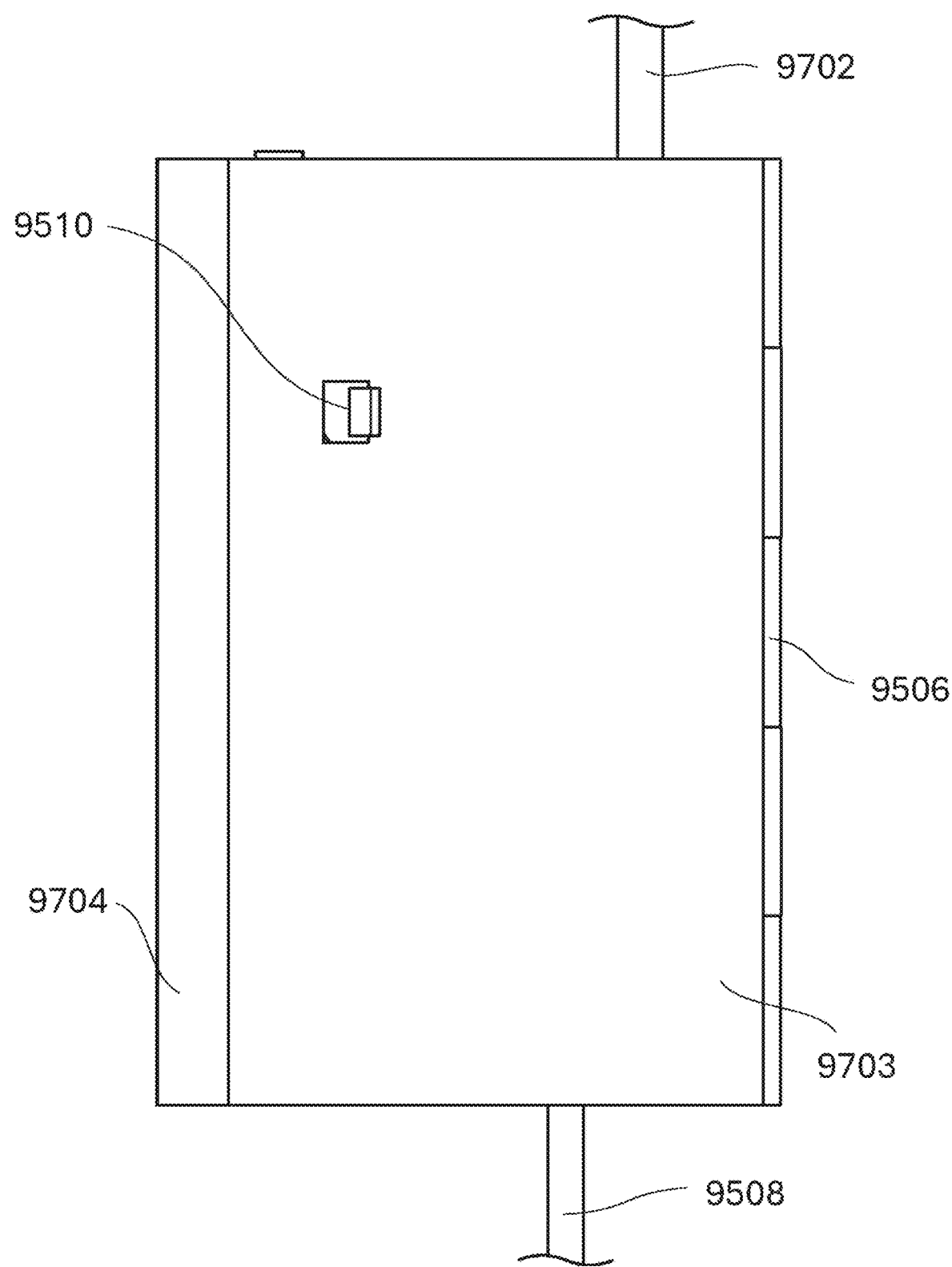
FIG. 98 is a front elevation view of the central portion of an apparatus comprising non-disposable and disposable assemblies according to some exemplary embodiments.
Figure 99:
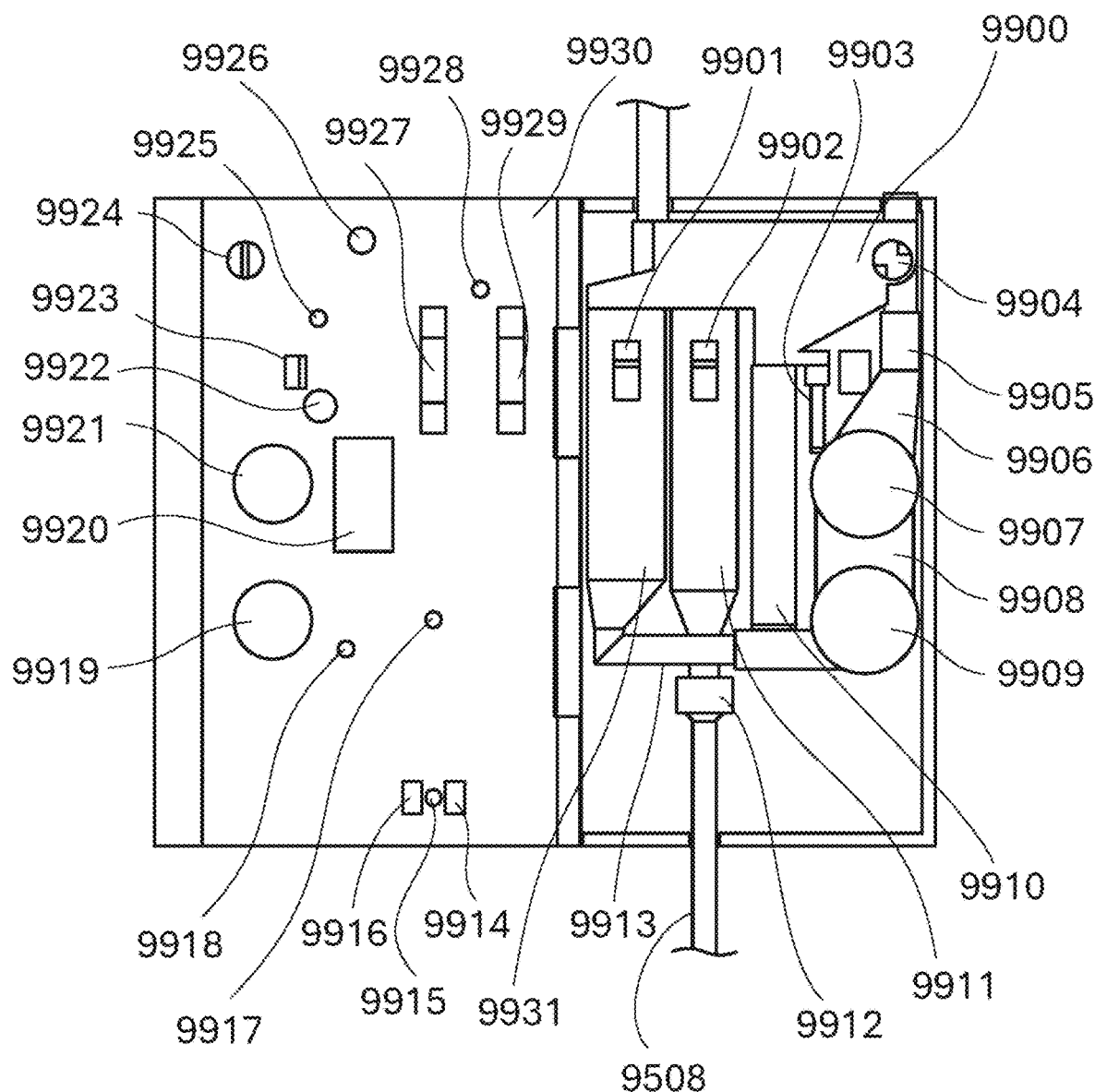
FIG. 99 is a front elevation view of the central portion of an apparatus comprising non-disposable and disposable assemblies configured with a door and the disposable in a rotated position such that the disposable is accessible according to some exemplary embodiments.
Figure 100:
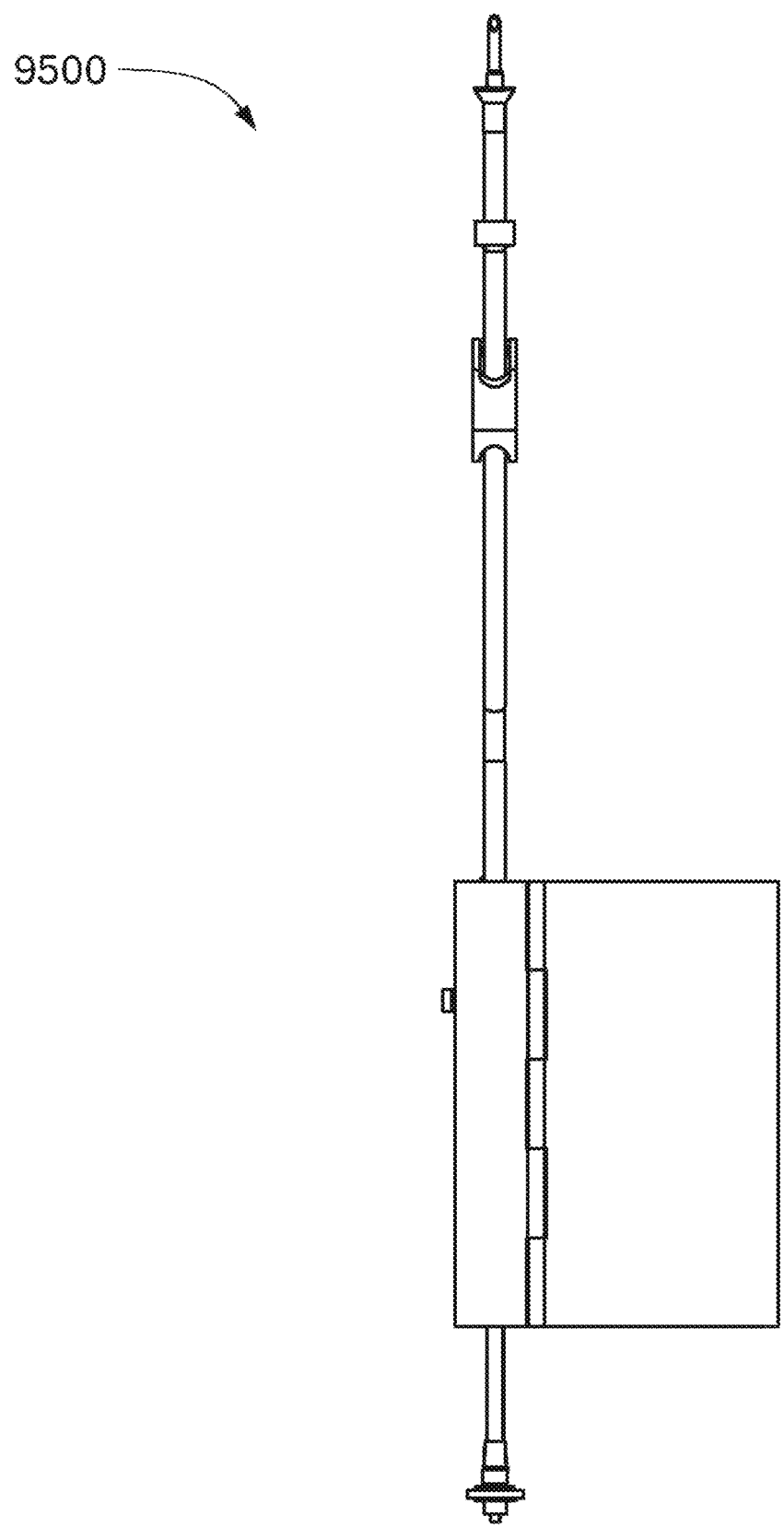
FIG. 100 is a right side elevation view of an apparatus comprising non-disposable and disposable assemblies according to some exemplary embodiments.
Figure 101:
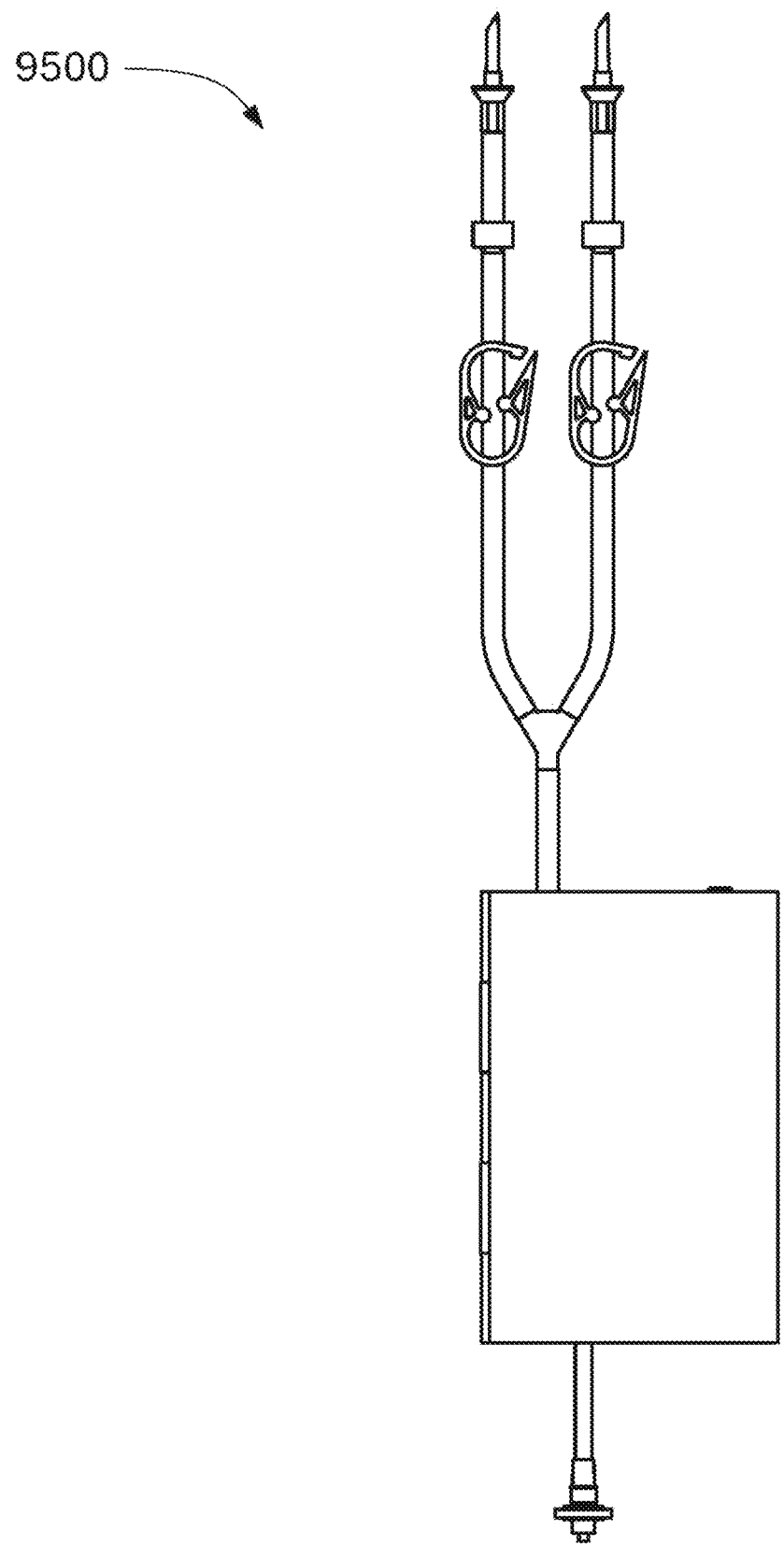
FIG. 101 is a back elevation view of an apparatus comprising non-disposable and disposable assemblies according to some exemplary embodiments.
Figure 102A:
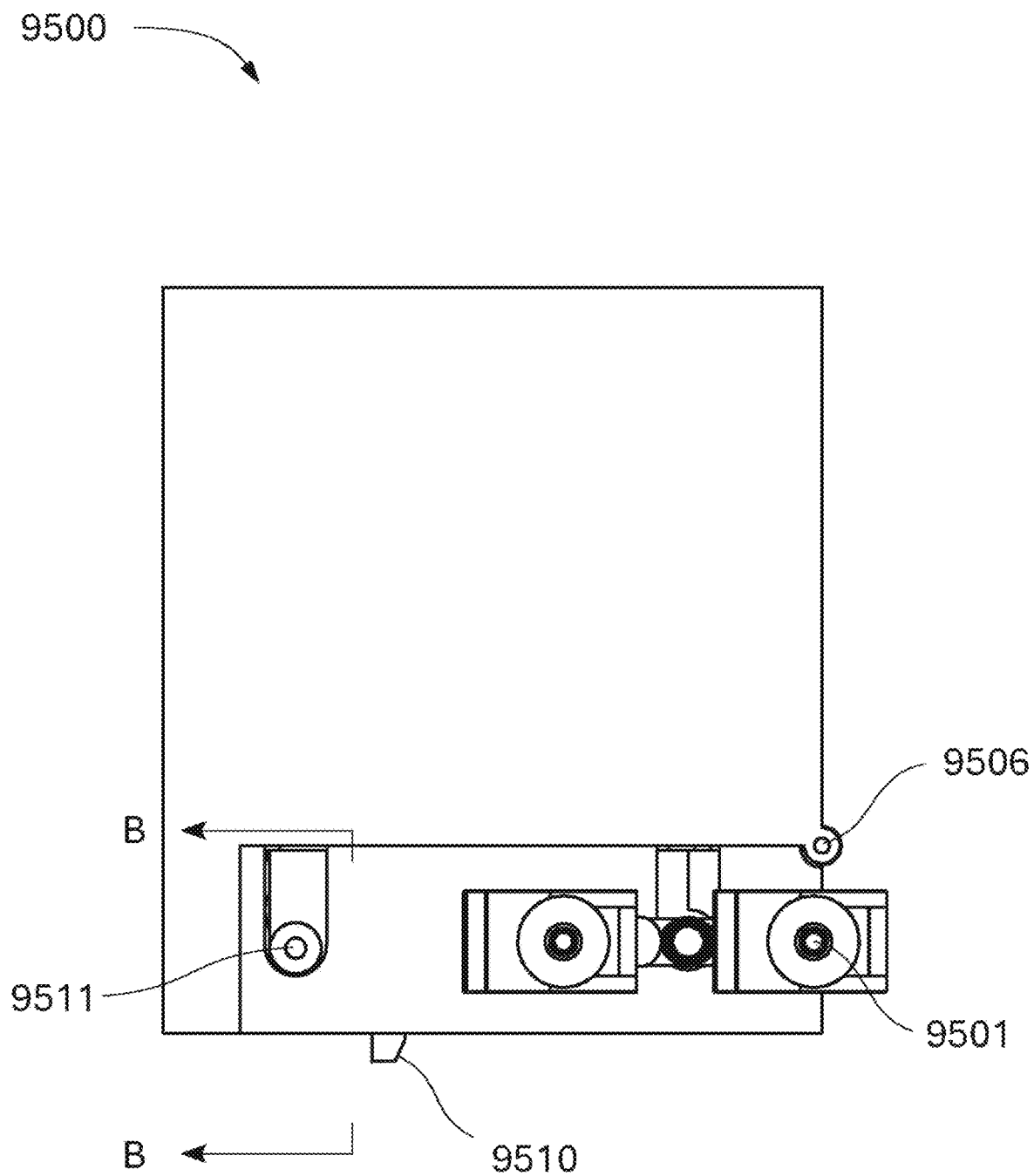
FIG. 102A is a top plan view of an apparatus comprising non-disposable and disposable assemblies according to some exemplary embodiments.
Figure 102B:
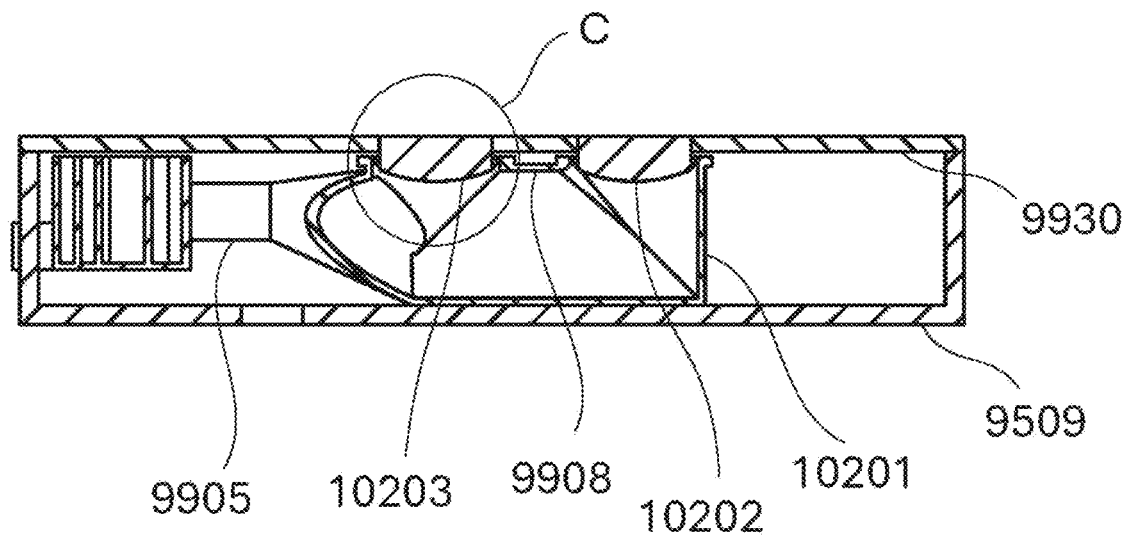
FIG. 102B is a sectional view taken along line B-B of FIG. 102 according to some exemplary embodiments.
Figure 102C:
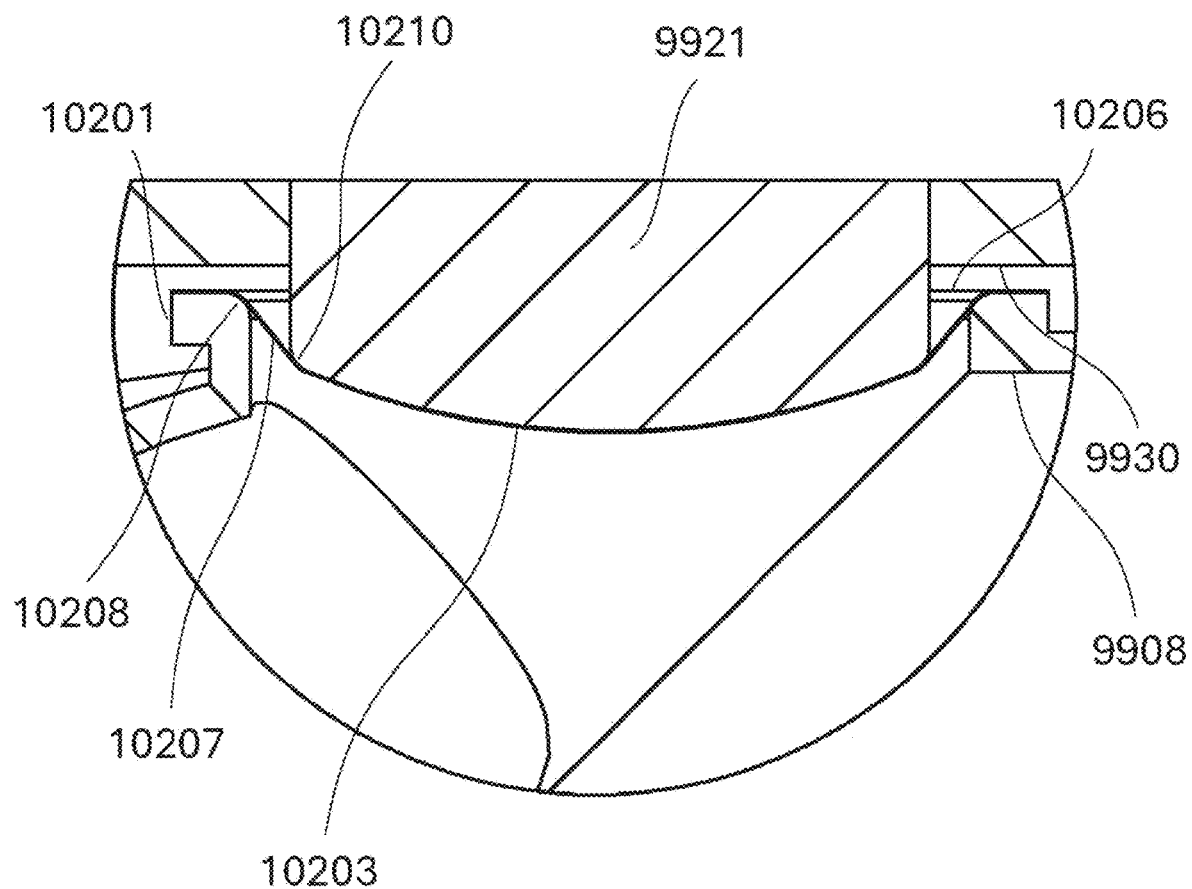
FIG. 102C is a detail view of area C of FIG. 102B according to some exemplary embodiments.
Figure 103:
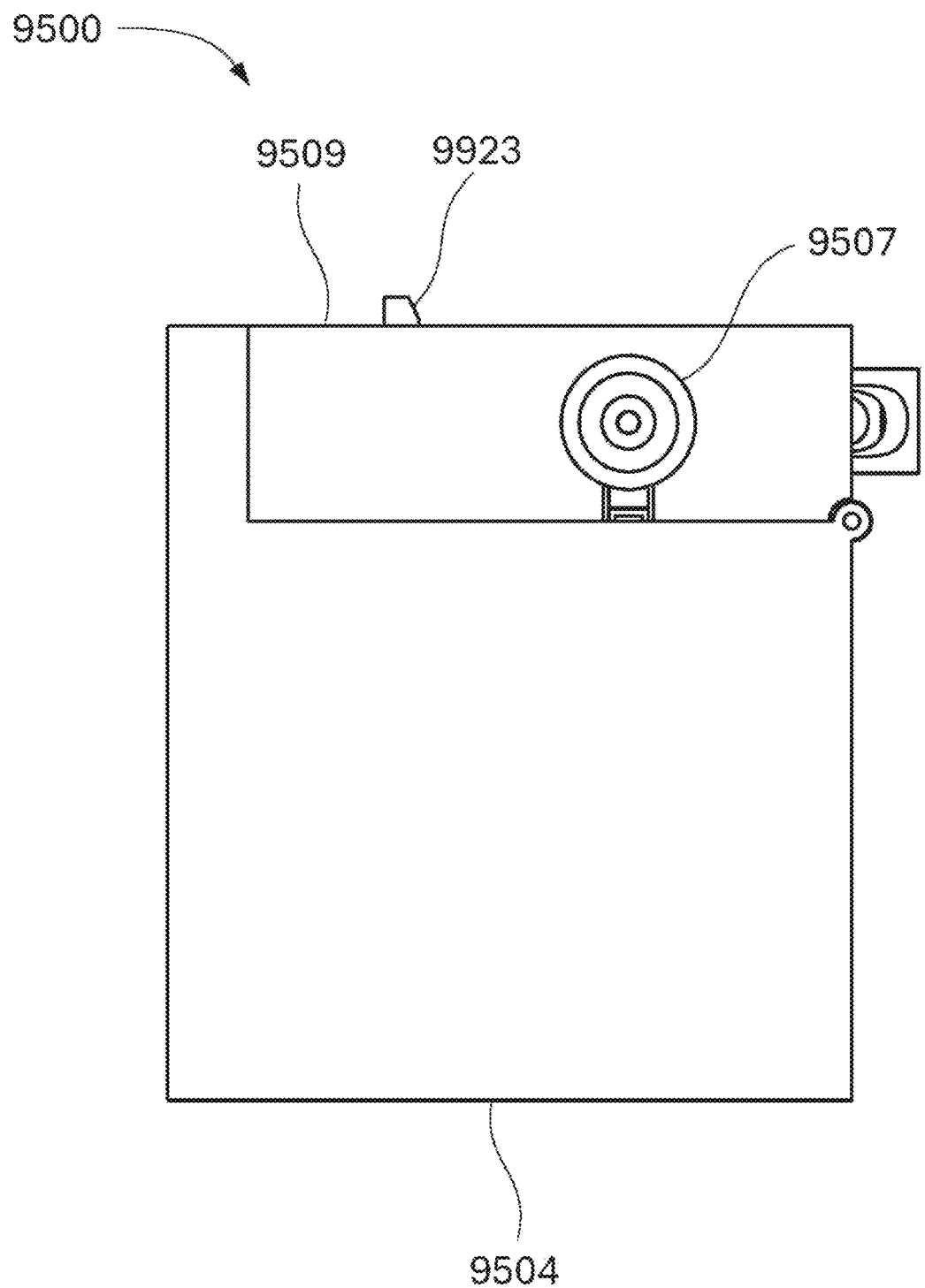
FIG. 103 is a bottom plan view of an apparatus comprising non-disposable and disposable assemblies according to some exemplary embodiments.

FIGS. 95-103 show renderings of an apparatus 9500 that includes a disposable component and a non-disposable component. FIG. 95 is a perspective view. FIG. 96 is a left side elevation view. FIG. 97 is a front elevation view. FIG. 98 is a front elevation view of the central portion of the apparatus 9500. FIG. 99 is a front elevation view of the central portion of the apparatus 9500 showing a door in a rotated position to expose the disposable component. FIG. 100 is a right side elevation view. FIG. 101 is a back elevation view. FIG. 102A is a top plan view. FIG. 102B is a sectional view taken along line B-B shown in FIG. 102A. FIG. 102C is a detail view of area C shown in FIG. 102B. FIG. 103 is a bottom plan view.

Referring now to FIG. 95, the apparatus 9500 includes a connection 9501 to a source of a medical fluid. A conduit 9502 connects an upstream connection to a one-way valve. The apparatus 9500 includes a manual valve 9503. The apparatus 9500 includes a non-disposable component 9504. In some embodiments, the non-disposable component may be analogous to, include similar elements to, and operate in a manner similar to the non-disposable component 8600 described above. The non-disposable component 9504 includes a housing 9505. The non-disposable component 9504 includes a hinge 9506. The apparatus 9500 includes a downstream assembly 9507 including a hydrophobic membrane and a downstream conduit 9508. The non-disposable component 9504 includes a door 9509 that is connected to the housing 9554 by the hinge 9506. A latch 9510 retains the door 9509 in a closed position. The apparatus 9500 includes a vent 9511. The apparatus 9500 includes a conduit 9512 and a one-way valve 9513.

Referring now to FIG. 96, the non-disposable component 9504 includes a user interface 9601, such as a touch screen.

Referring now to FIG. 97, the apparatus 9500 includes a y-connector 9701 coupled to an upstream conduit 9702.

Referring now to FIG. 99, the door 9509 of the non-disposable component 9504 is shown in an opened position to expose the disposable component 9900 and internal elements of the non-disposable component 9504. In some embodiments, the disposable component 9900 may be analogous to, include similar elements to, and operate in a manner similar to the disposable component 8400 described above. The disposable component 9900 includes a first gas trap 9931 and a second gas trap 9911. The disposable component 9900 includes a level sensing interface 9901 of the first gas trap 9931 and a level sensing interface 9902 of the second gas trap 9911. The disposable component 9900 includes a pressure sensing interface 9903. The disposable component 9900 includes a multi-state valve 9904. The disposable component 9900 includes a heating chamber 9908. The heating chamber 9908 includes a first dielectric window 9909, a second dielectric window 9907, a funnel-shaped downstream portion 9906, and an exit port 9905. The disposable component 9900 includes a pumping conduit 9910. The disposable component 9900 includes pressure-activated valve 9912. A conduit 9913 connects a first gas trap 9931 to the heating chamber 9908.

The non-disposable component 9504 includes a temperature sensor 9915 at a location where medical fluid exits the disposable component 9900. The temperature sensor 9915 includes an ultrasonic transmitter 9914 and an ultrasonic receiver 9916. The non-disposable component 9504 includes a temperature sensor 9917 that is positioned to sense a temperature of medical fluid in the first gas trap 9931. The non-disposable component 9504 includes an upstream temperature sensor 9918. The non-disposable component 9504 includes a first electrode 9919 and a second electrode 9921. The non-disposable component 9504 includes a pumping plunger 9920. The non-disposable component 9504 includes a pressure sensor 9922. The door 9509 includes an opening 9923 for the latch 9510. The non-disposable component 9504 includes an actuator 9924 for changing the position of the multi-state valve 9904. The non-disposable component 9504 includes temperature sensors 9925 and 9928 and a camera 9926. The non-disposable component 9504 includes a first gas-liquid sensor 9927 (e.g., an ultrasonic sensor) configured to sense a liquid level in the first gas trap 9931 and a second gas-liquid sensor 9929 (e.g., an ultrasonic sensor) configured to sense a liquid level in the second gas trap 9911. The non-disposable component 9504 includes an interface 9930 for interfacing with the disposable component 9900.

Referring now to FIGS. 102A-102C, FIG. 102A shows a top plan view of the apparatus 9500. FIG. 102B shows a section view taken along line B-B shown in FIG. 102A so as to show a cross-section of a heating chamber housing 10201 of the disposable component 9900. The disposable component 9900 includes a first film 10202 (e.g., a first dielectric region) and a second film 10203 (e.g., a second dielectric region). FIG. 102B shows the first film 10202 and the second film 10203 as configured (e.g., stretched) by the first electrode 9919 and the second electrode 9921. FIG. 102C shows a detailed view of the region indicated as C in FIG. 102B. As shown in FIG. 102C, the second film 10203 is attached to the heating chamber housing 10201 at a first filleted connection region 10206 and a second filleted connection region 10208. The second film 10203 includes a stretched region 10207 between the second filleted connection region 10208 and a contact region with the second electrode 9921. The second electrode 9921 includes a filleted edge area 10210 to prevent stress concentrations of the second film 10203.

Figure 104:
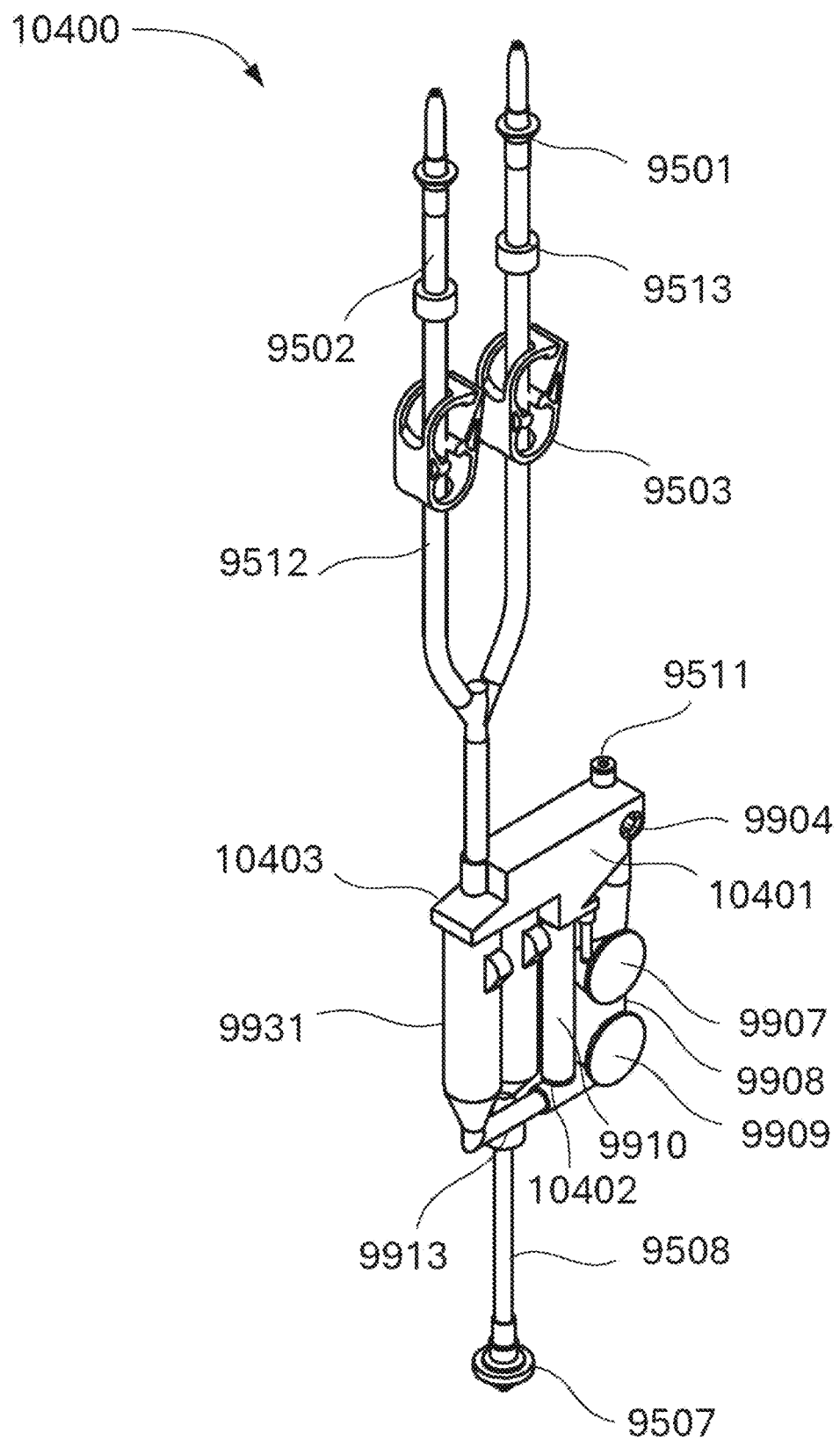
FIG. 104 is a perspective view of a disposable assembly according to some exemplary embodiments.
Figure 105:
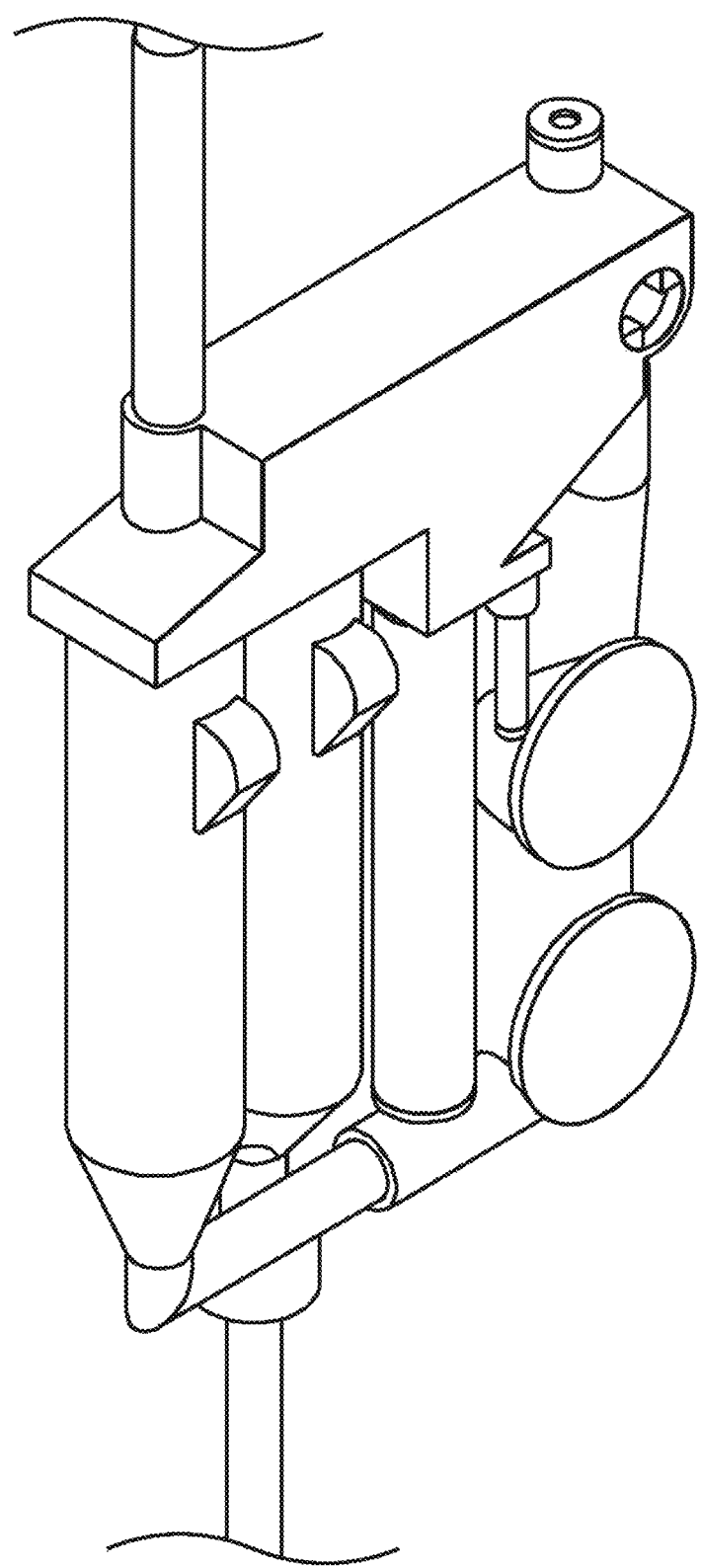
FIG. 105 is a detail view of the central portion of a disposable assembly according to some exemplary embodiments.

Referring now to FIG. 104, a disposable assembly 10400 including the disposable component 9900 and attached conduits is shown. As shown in FIG. 104, the disposable component 9900 includes a housing 10403 defining a fluid path and a film 10401 covering the fluid path. Also as shown in FIG. 104, the disposable component 9900 includes a plug 10402 at the end of the pumping conduit 9910.

Figure 106:
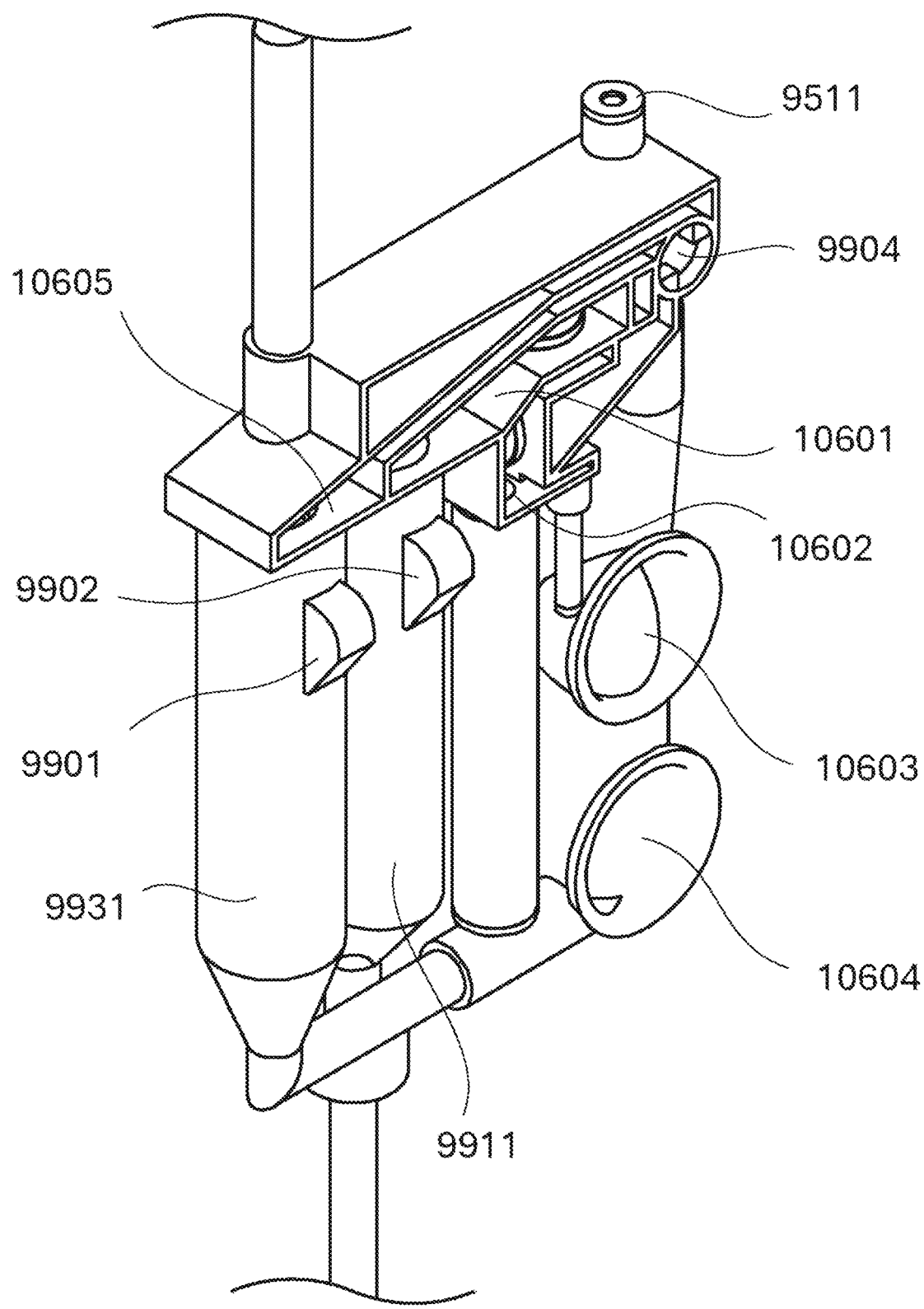
FIG. 106 is a detail view of the central portion of a disposable assembly configured without certain parts that cover some portions of the fluid path such that certain internal surfaces of the fluid path are visible according to some exemplary embodiments.
Figure 107:
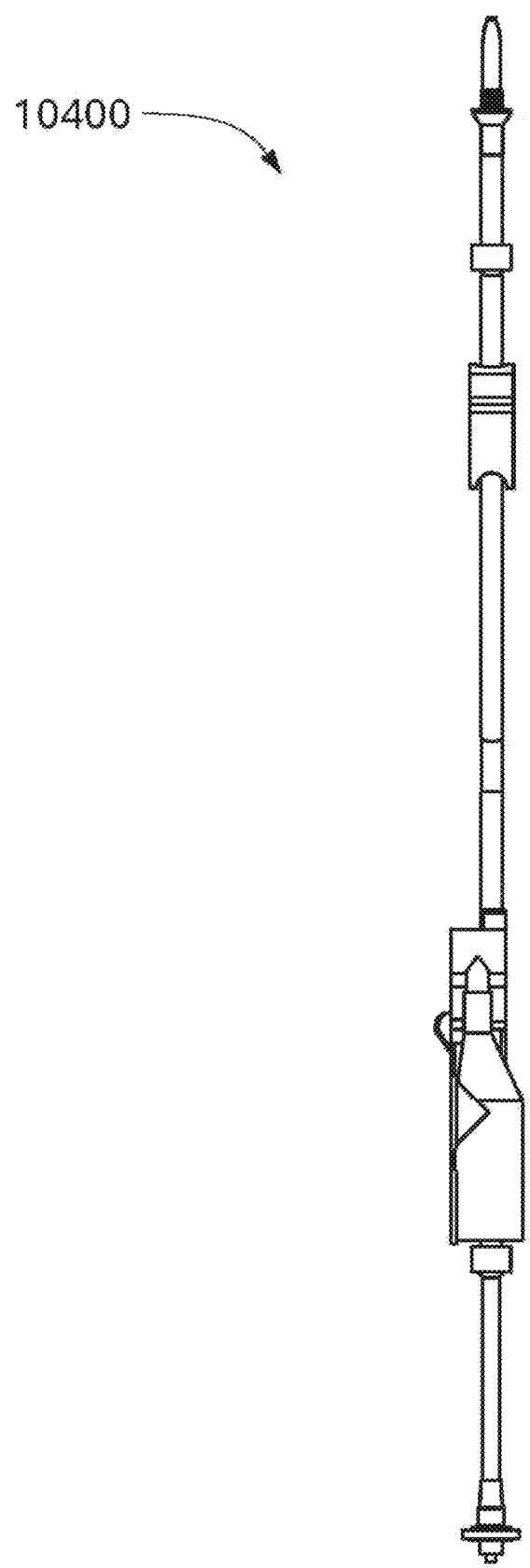
FIG. 107 is a left side elevation view of a disposable assembly according to some exemplary embodiments.

Referring now to FIG. 106, the disposable component 9900 is shown. The disposable component 9900 includes a gas flow path 10605 from the first gas trap 9931 and a gas flow path 10601 from the second gas trap 9911. The disposable component 9900 includes a flow path 10602 from the pumping conduit 9910. The disposable component 9900 includes a first region 10604 of the heating chamber 9908 that is configured to be positioned near the first electrode 9919 and a second region 10603 of the heating chamber 9908 that is configured to be positioned near the second electrode 9921.

Figure 108A:
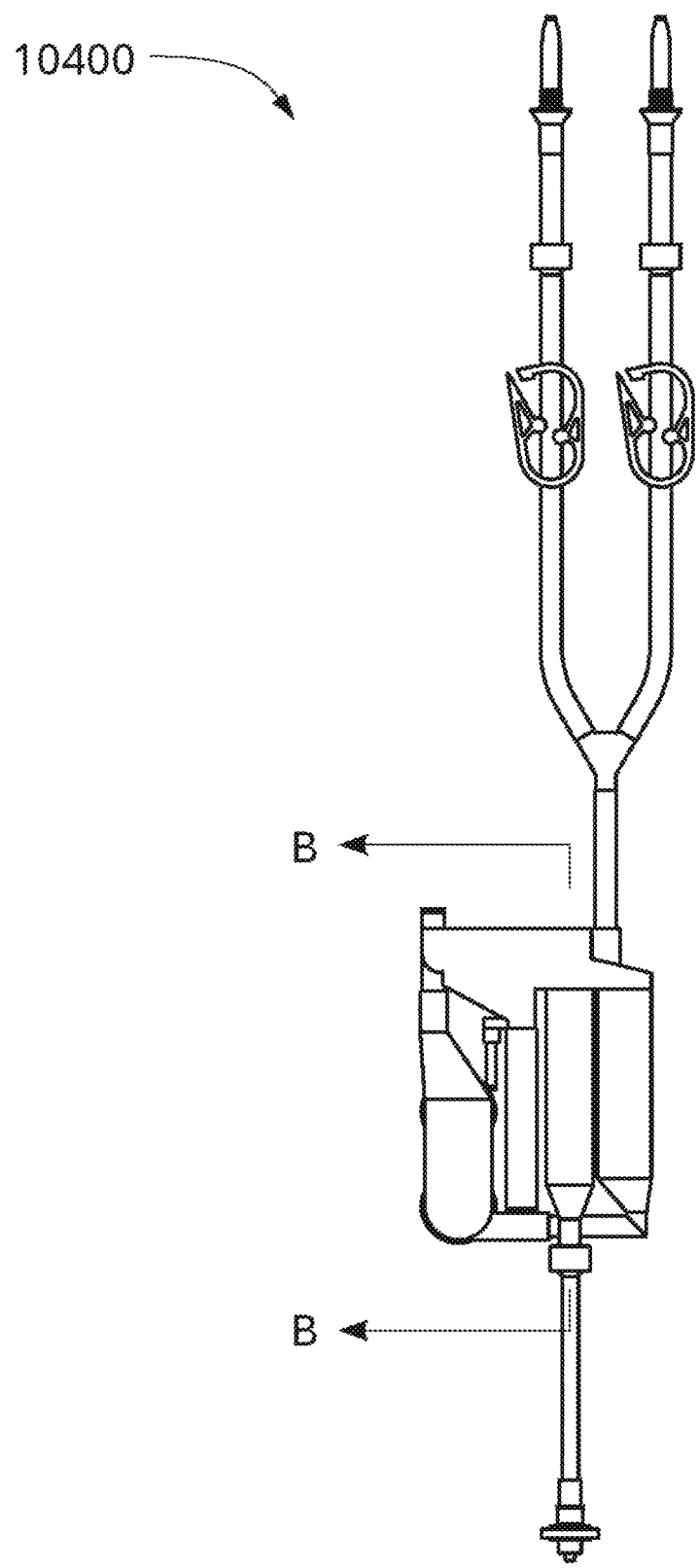
FIG. 108A is a front elevation view of a disposable assembly according to some exemplary embodiments.
Figure 108B:
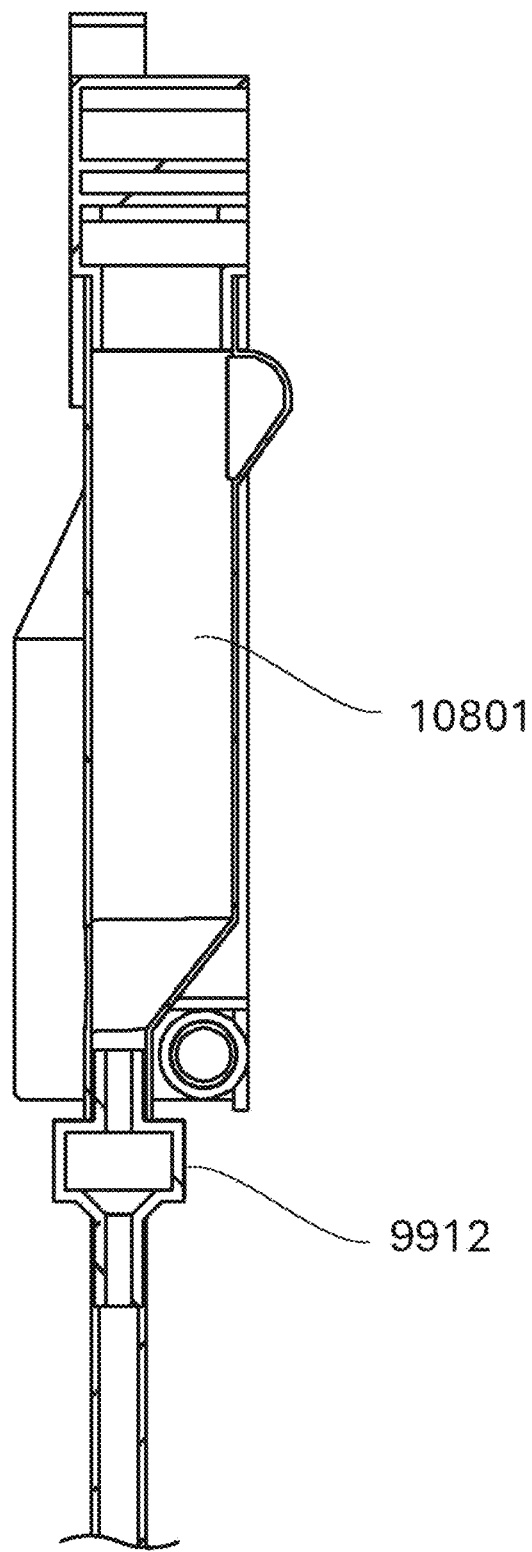
FIG. 108B is a sectional view of area B of FIG. 108A according to some exemplary embodiments.

Referring now to FIGS. 108A and 108B, FIG. 108A shows a front view of the disposable assembly 10400 and FIG. 108B shows a section view along line B-B shown in FIG. 108A. FIG. 108B shows the interior 10801 of the second gas trap 9911.

Figure 109A:
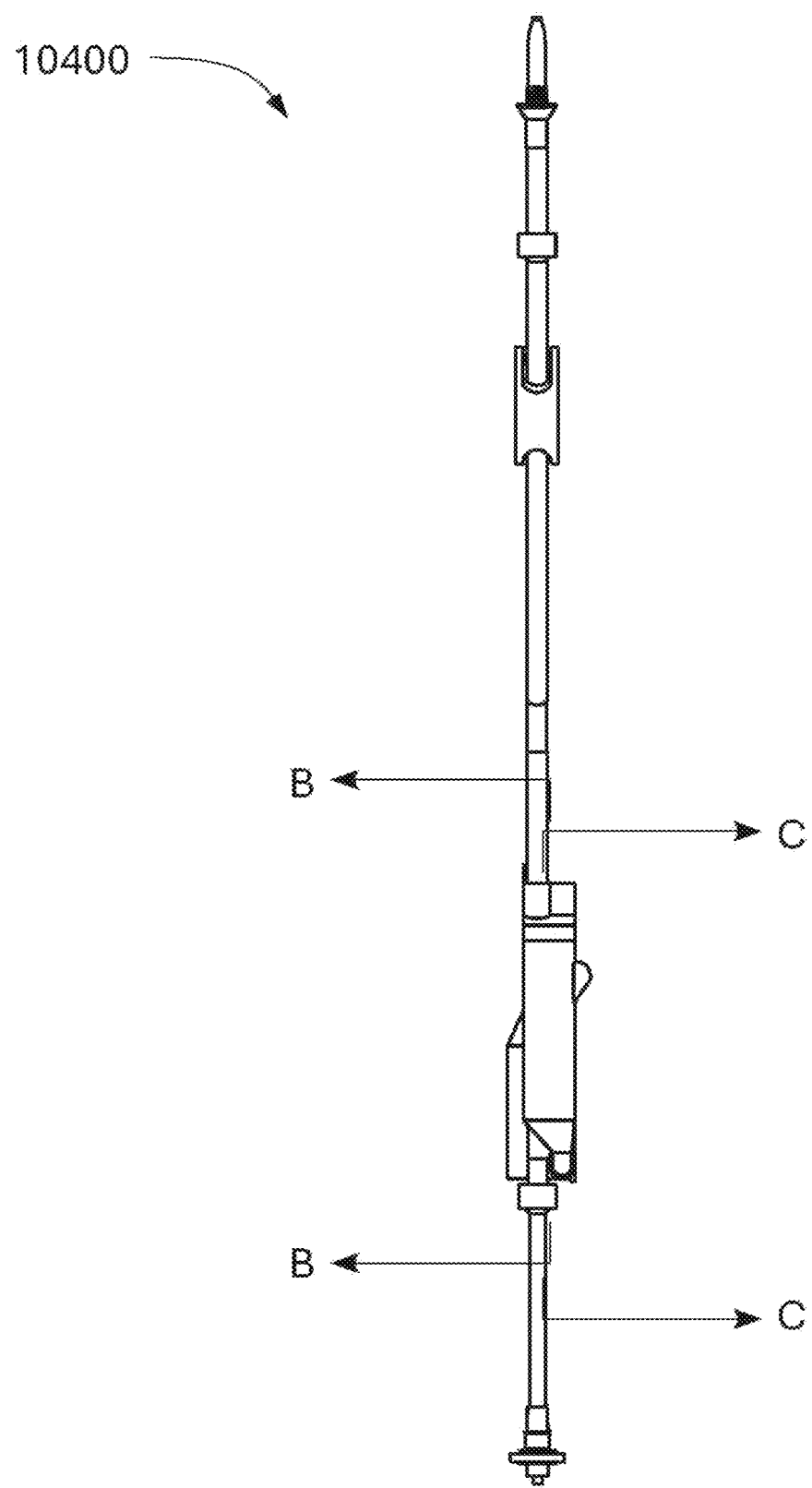
FIG. 109A is a right side elevation view of a disposable assembly according to some exemplary embodiments.
Figure 109B:
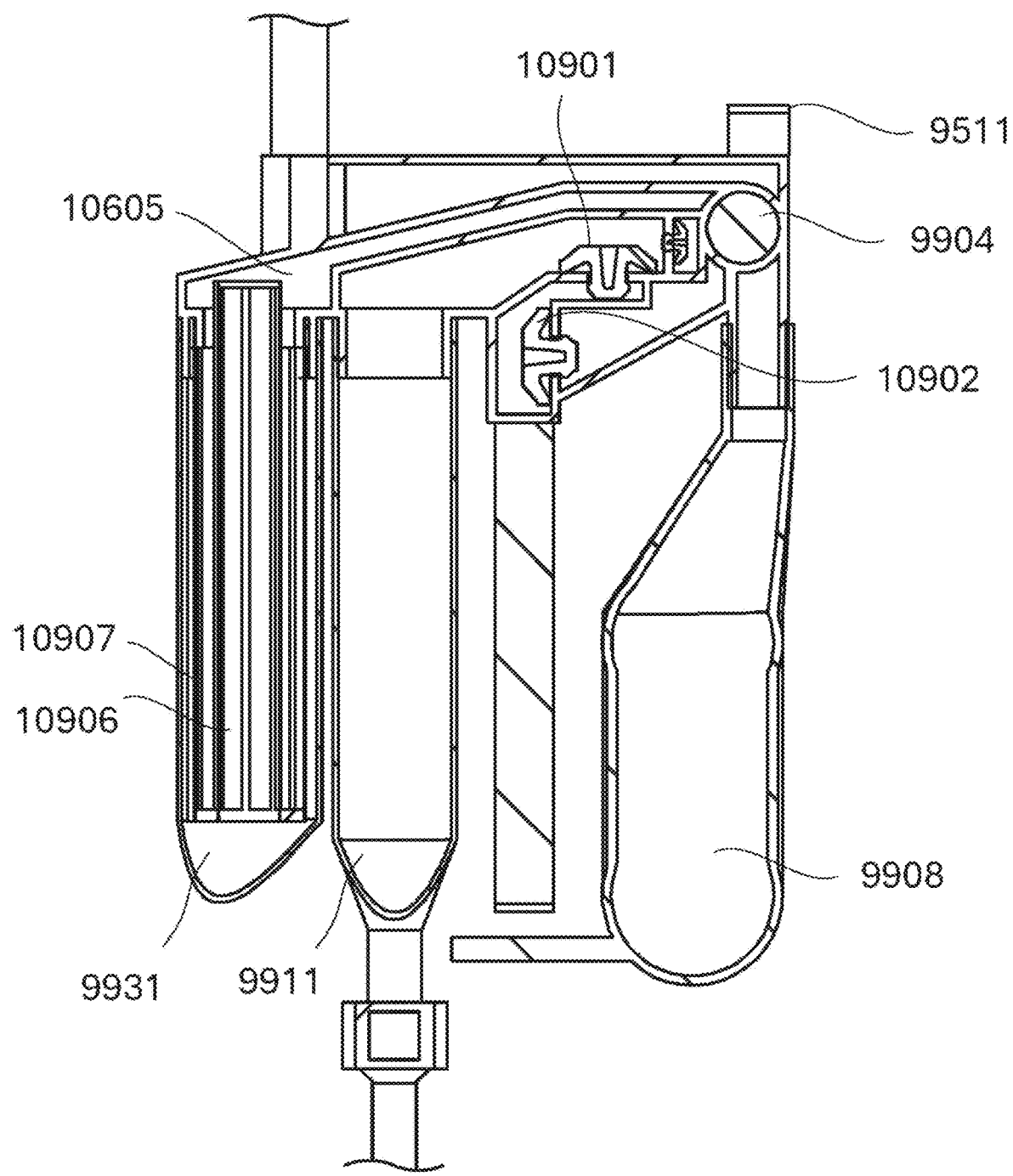
FIG. 109B is a sectional view taken along line B-B of FIG. 109A according to some exemplary embodiments.
Figure 109C:
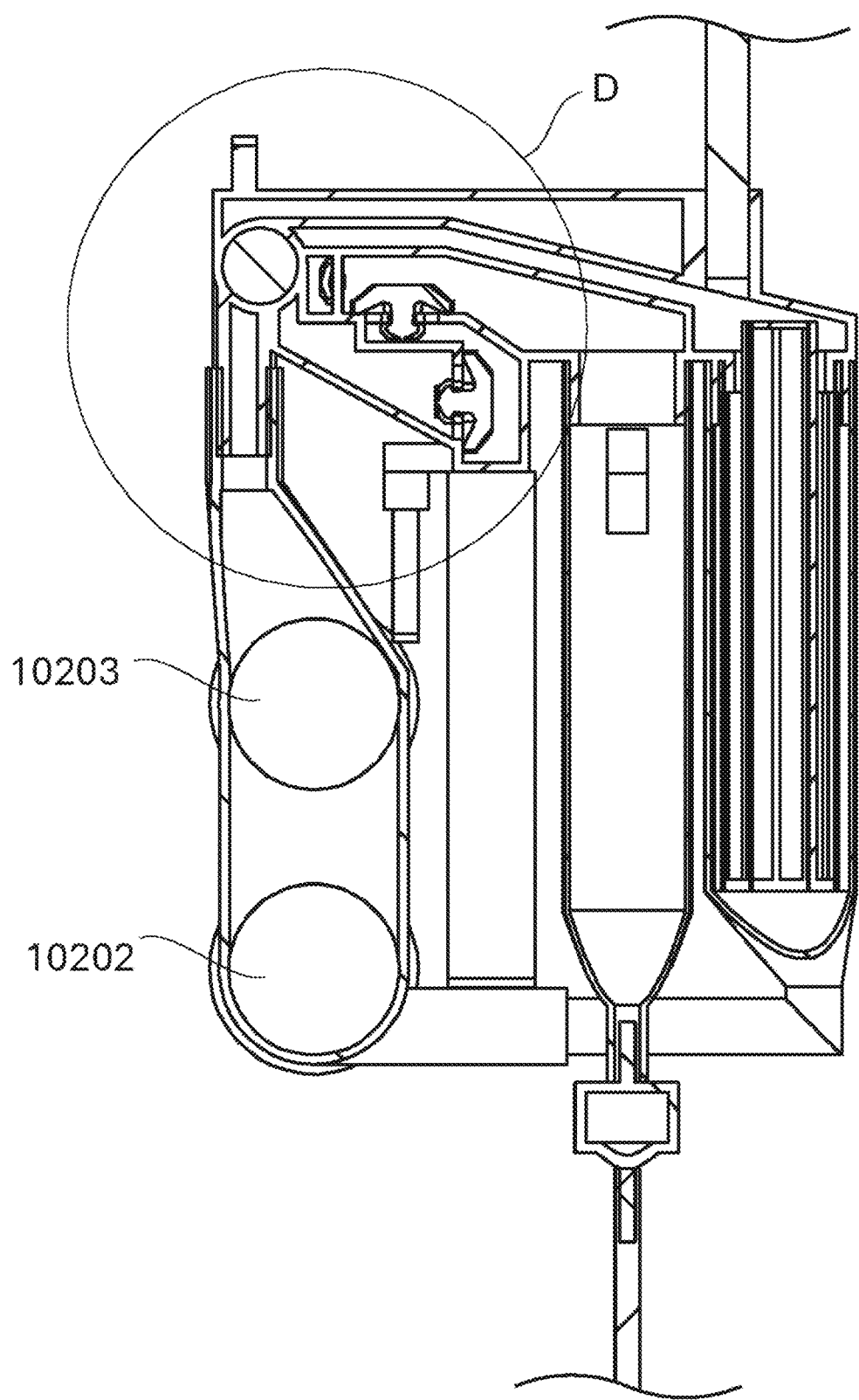
FIG. 109C is a sectional view taken along line C-C of FIG. 109A according to some exemplary embodiments.
Figure 109D:
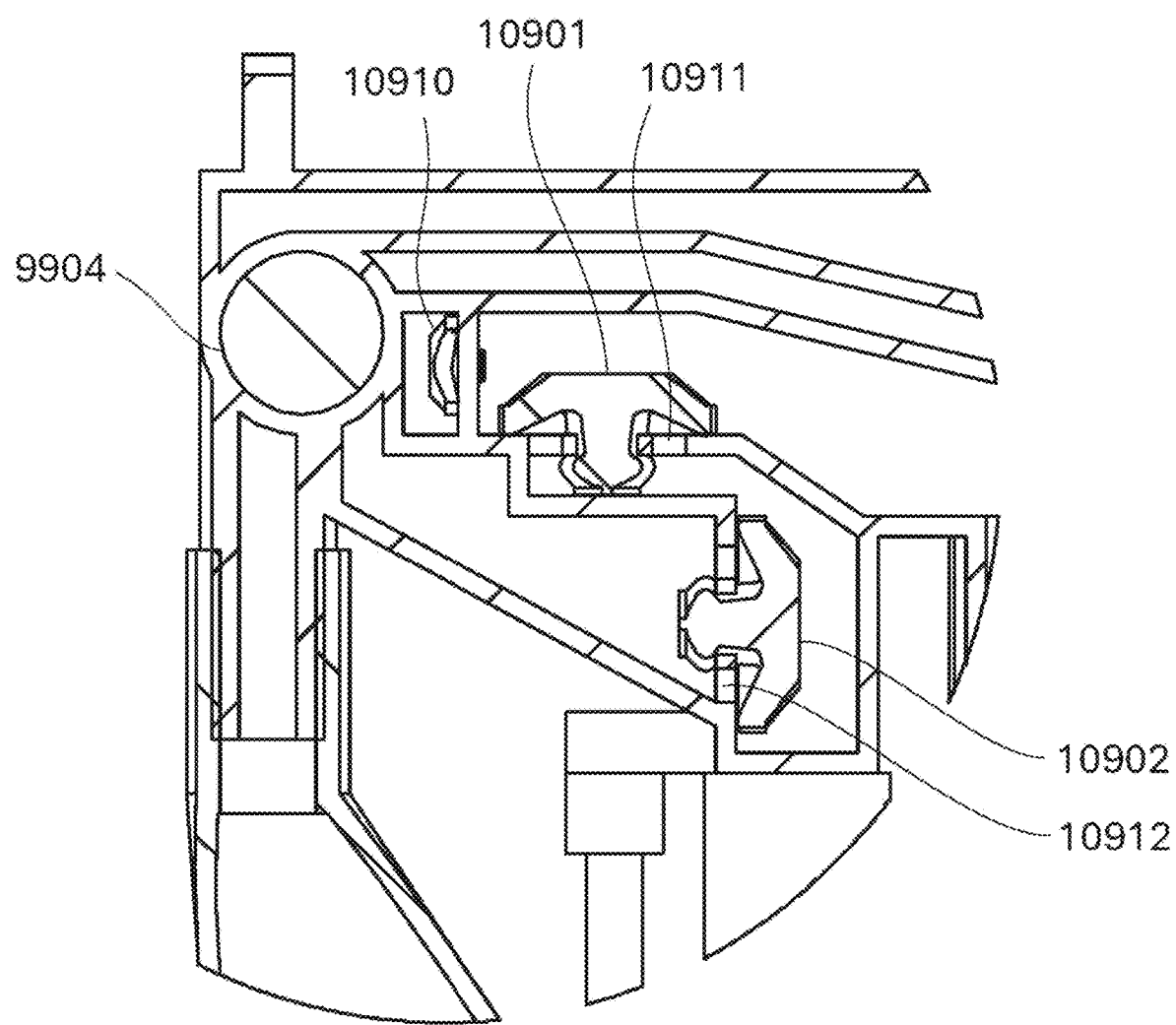
FIG. 109D is a detail view of area D of FIG. 109C according to some exemplary embodiments.

Referring now to FIGS. 109A-109D, FIG. 109A shows a side view of the disposable assembly 10400. FIG. 109B shows a section view along line B-B shown in FIG. 109A and FIG. 109C shows a section view along line C-C shown in FIG. 109A. FIG. 109D shows a detailed view of the region indicated at D in FIG. 109C. As shown in FIG. 109B, the disposable component 9900 includes a pumping segment inlet valve 10901 and a pumping segment outlet valve 10902 that are located at a same end of the pumping conduit 9910. The disposable component 9900 includes an inner filter membrane 10906 and an outer filter membrane 10907 (e.g., particulate filters) positioned within the first gas trap 9931 to separate contaminants from flow of a medical fluid. Referring now to FIG. 109D, the disposable component 9900 includes a one-way valve 10910 between the second gas trap 9911 and the multi-state valve 9904. The pumping segment inlet valve 10901 is secured in an orifice 10911 and the pumping segment outlet valve 10902 is secured in an orifice 10912.

Figure 110A:
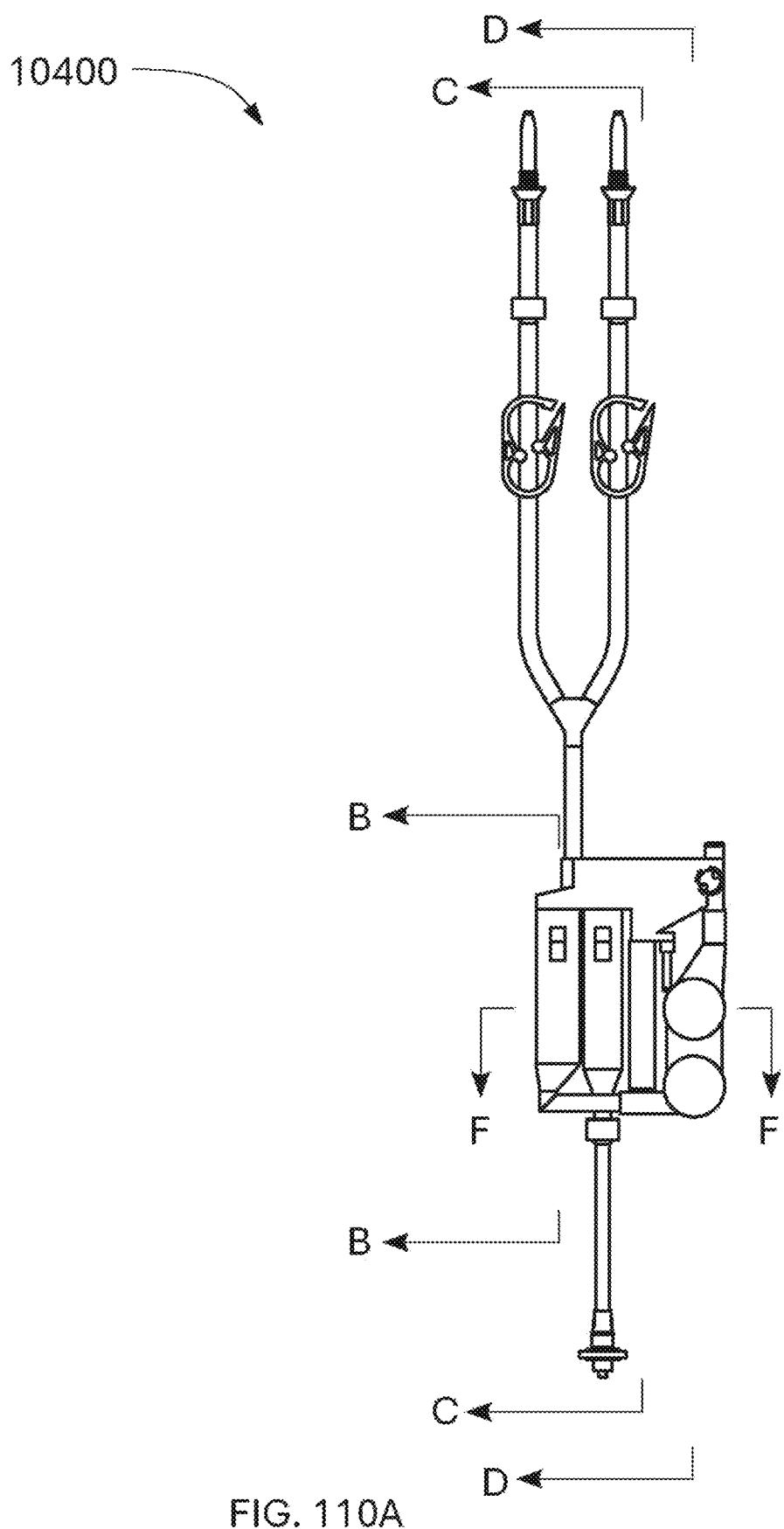
Figure 110B:
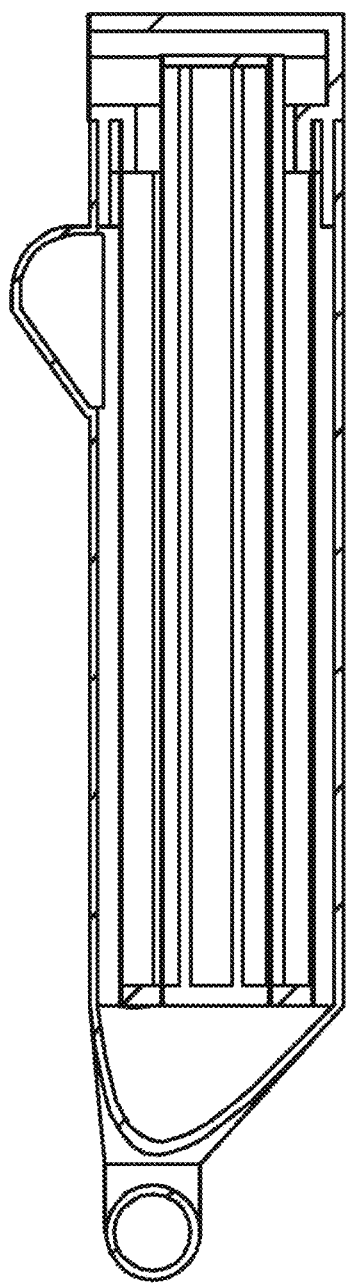
Figure 110C:
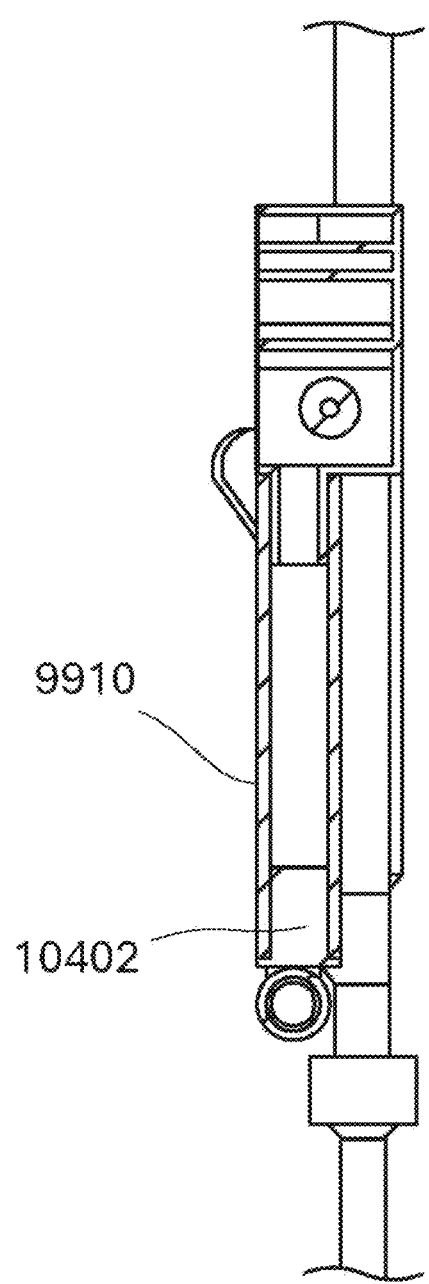
Figure 110D:
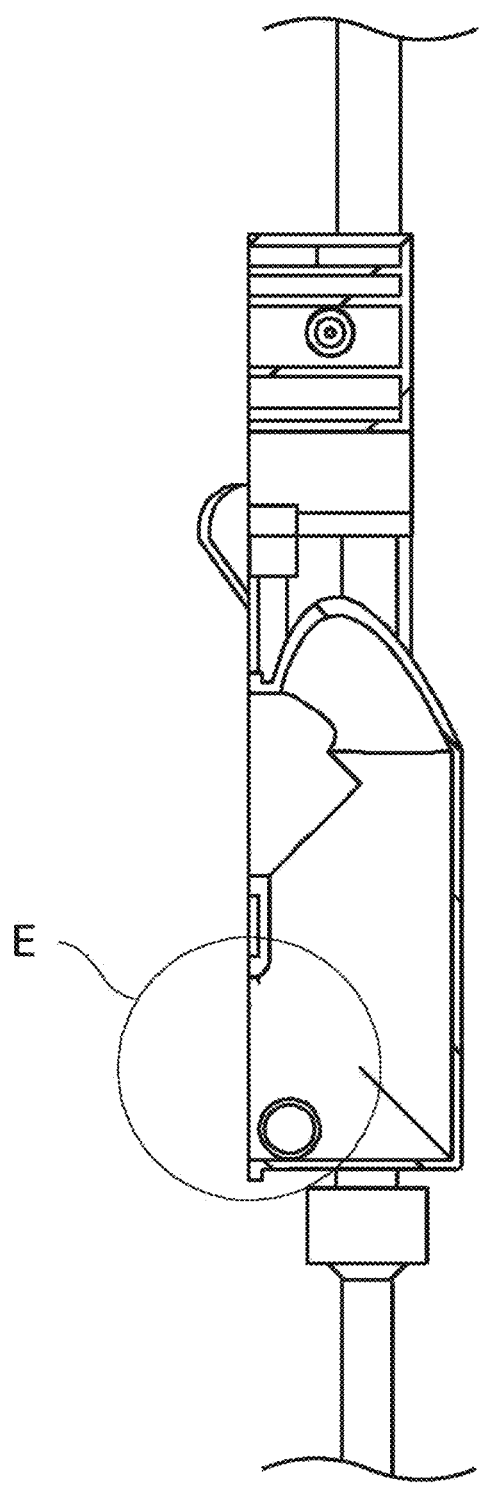
Figure 110E:
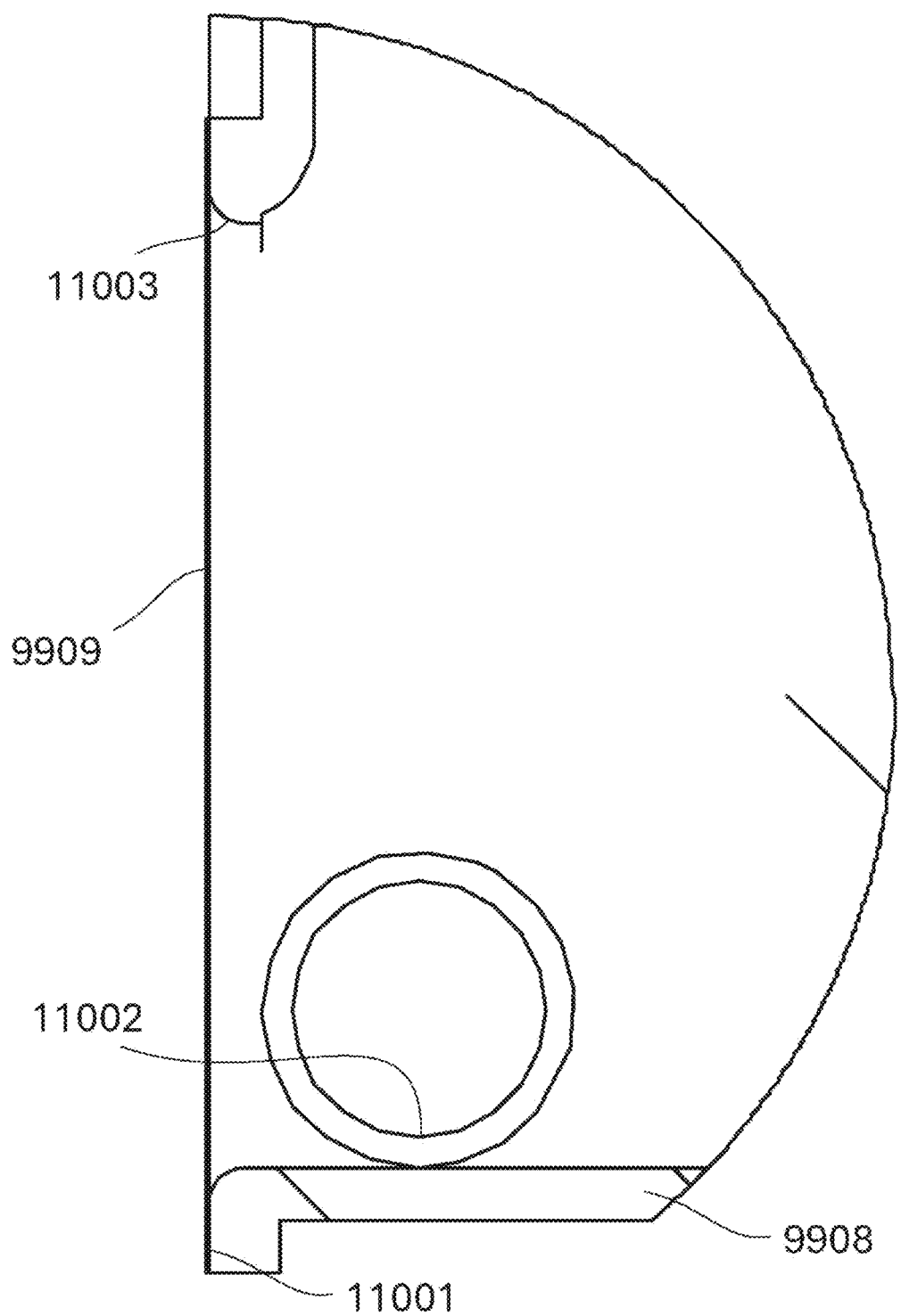
Figure 110F:
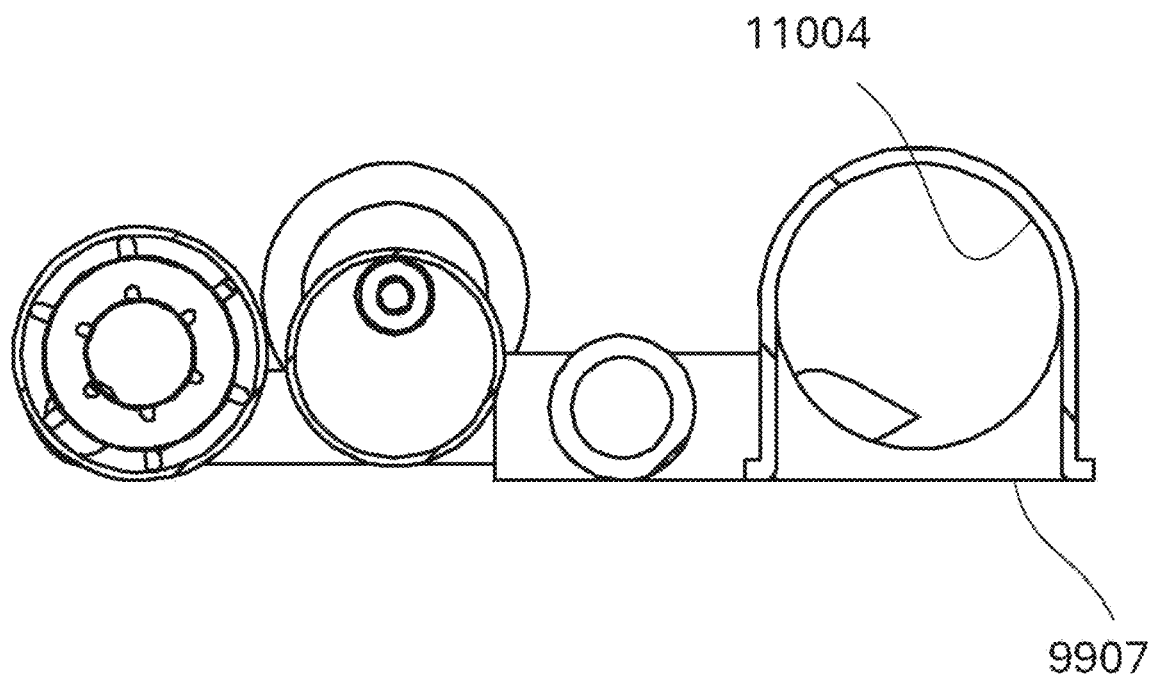
Figure 111:
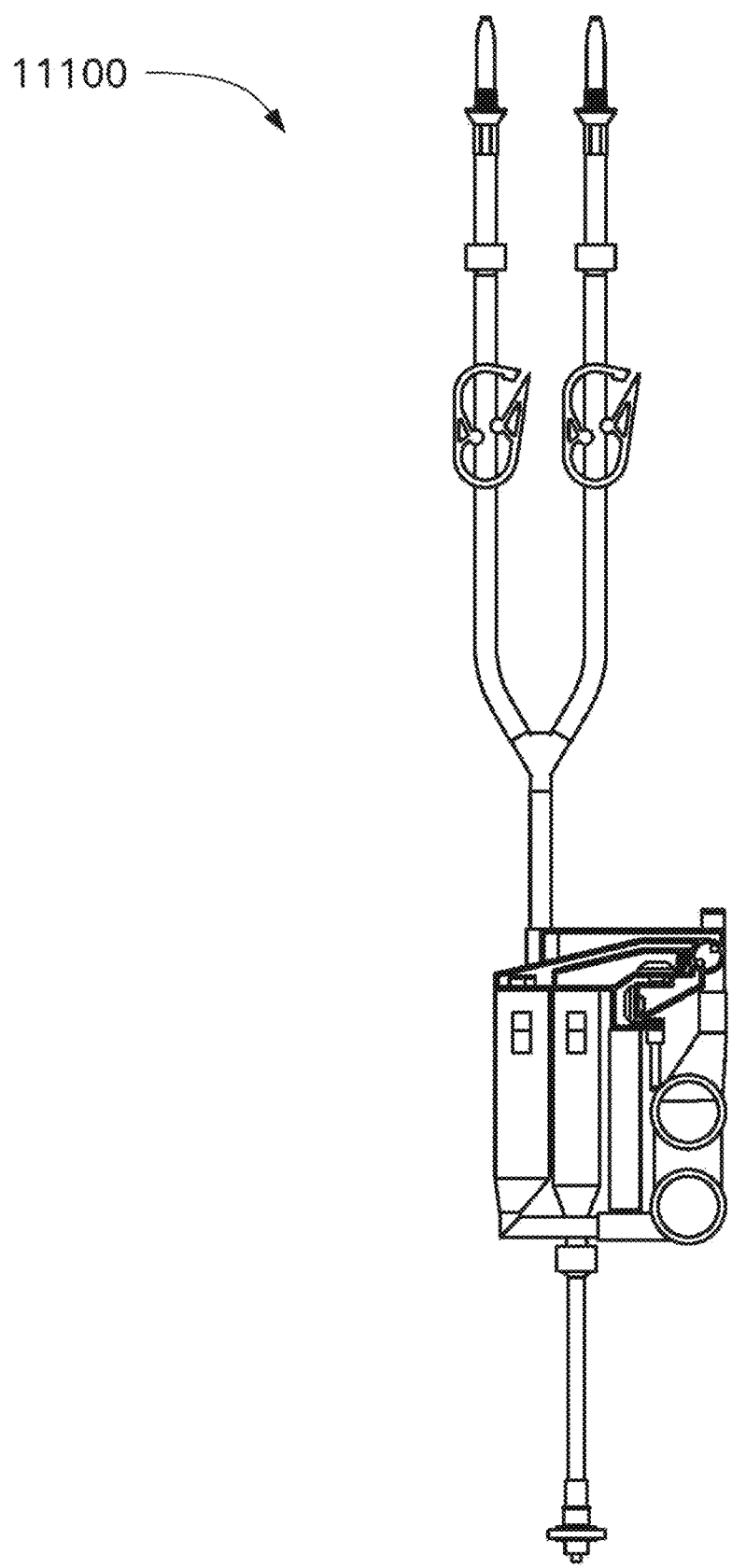

Referring now to FIGS. 110A-110F, FIG. 110A shows a rear elevation view of the disposable assembly 10400. FIG. 110B shows a section view along line B-B shown in FIG. 110A, FIG. 110C shows a section view along line C-C shown in FIG. 110A, FIG. 110D shows a section view along line D-D shown in FIG. 110A, and FIG. 110F shows a section view along line F-F shown in FIG. 110A, FIG. 110E shows a detailed view of the region indicated at E in FIG. 110D. Referring now to FIG. 110E, the first dielectric window 9909 is shown as secured to the heating chamber 9908 by a heat weld 11001 proximate to an inlet port 11002 of the heating chamber 9908. The heating chamber 9908 includes a filleted edge 11003 to avoid stress concentrations. Referring now to FIG. 110F, the inner wall 11004 of the heating chamber 9908 is shown.

Figure 112A:
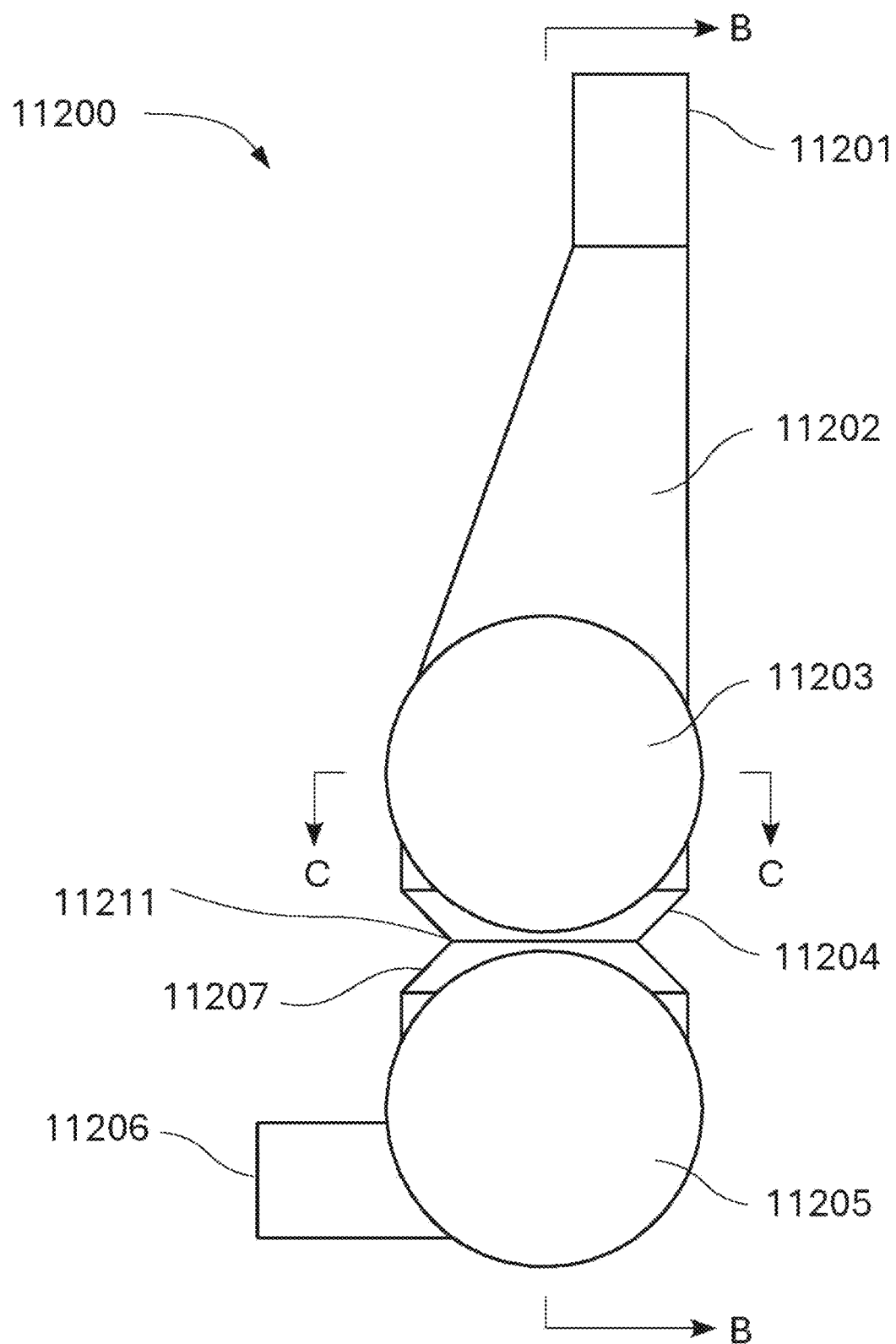
Figure 112B:
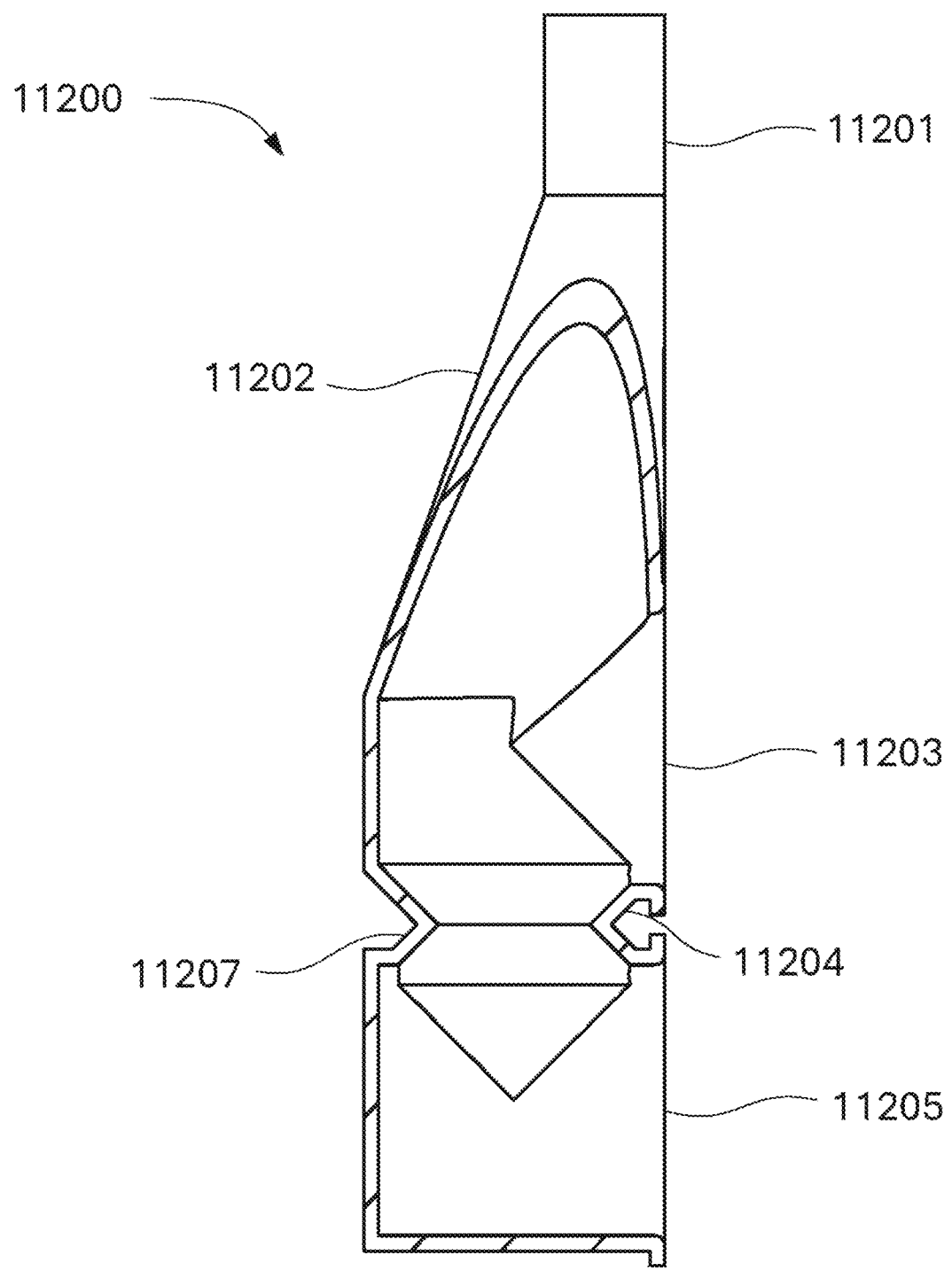
Figure 112C:
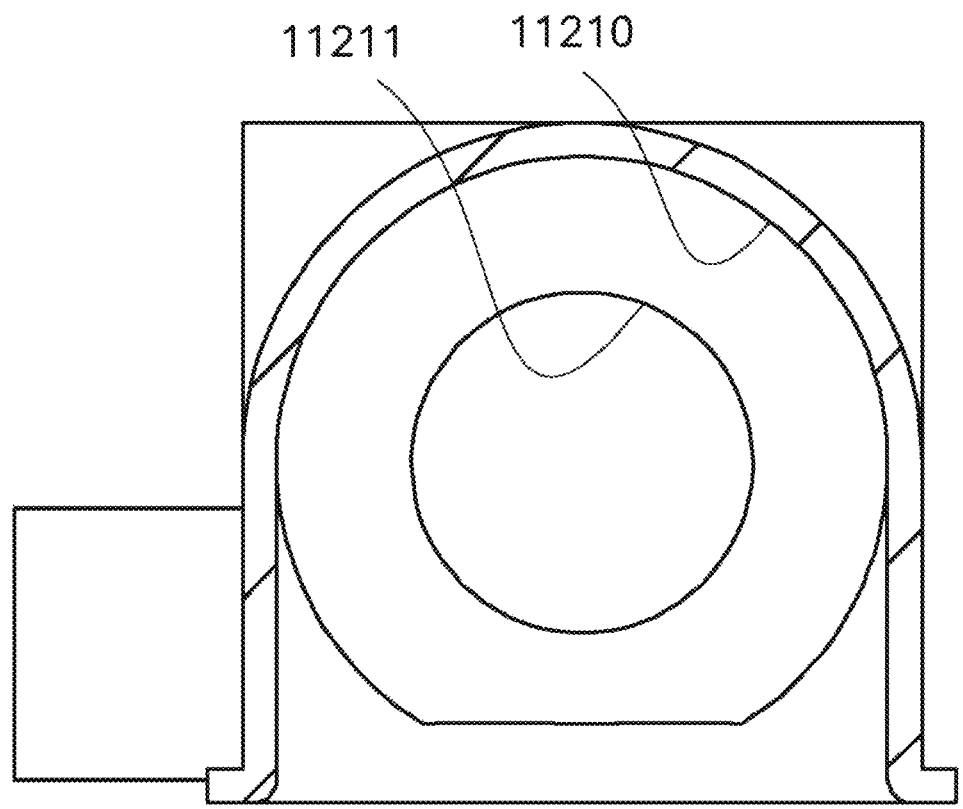
Figure 113:
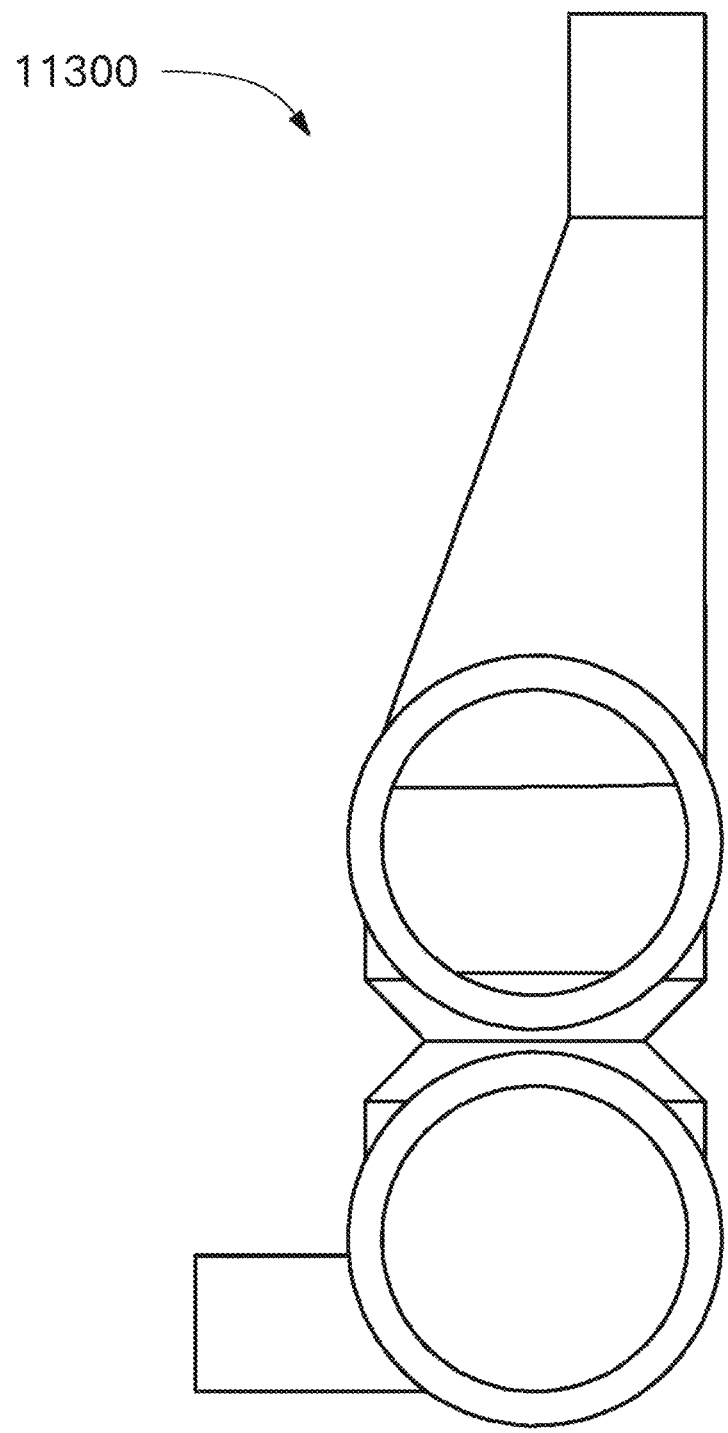

Referring now to FIGS. 112A-112C, additional detail of the heating chamber 9908 is shown. In particular, FIGS. 112A-112C show an embodiment of a heating chamber 11200 that includes a narrowed or "hourglass" shape between the electrodes as discussed above. FIG. 112A shows a rear elevation view of the heating chamber 11200, FIG. 112B shows a section view taken along line B-B shown in FIG. 112A, and FIG. 112C shows a section line taken along line C-C shown in FIG. 112A. The heating chamber 11200 includes an inlet port 11206 that is positioned at the bottom of the heating chamber 11200 when correctly oriented as described herein, and an exit port 11201 that is positioned at the top of the heating chamber 11200 when correctly oriented as described herein. The heating chamber 11200 includes a first dielectric window 11205 located near the inlet port 11206 and a second dielectric window 11203 located near the exit port 11201. The heating chamber 11200 includes a funnel-shaped downstream region 11202 between the second dielectric window 11203 and the exit port 11201. The "hourglass" shape is defined by an inwardly tapered conical wall 11207 tapered toward the orifice 11211 and an outwardly tapered conical wall 11204 tapered away from the orifice 11211. As shown in FIG. 112C, the heating chamber 11200 includes the orifice 11211 and an inner wall 11210.

In some embodiments, a method includes coupling a disposable device to a reusable device, wherein the disposable device includes: a heating segment, wherein the heating segment includes: a fluid conduit including an inlet and an outlet, a first dielectric window into the fluid conduit at an upstream location that is proximate to the inlet, and a second dielectric window into the fluid conduit at a downstream location that is proximate to the outlet, wherein the reusable device includes: a receptacle configured to receive the disposable device, a first electrode positioned within the receptacle, and a second electrode positioned within the receptacle, wherein the first electrode and the second electrode are spaced apart from one another to align the first electrode with the first dielectric window and to align the second electrode with the second dielectric window when the disposable device is received within the receptacle; supplying blood to the inlet of the fluid conduit to result in the blood passing through the fluid conduit; and activating the reusable device, wherein the activating causes the reusable device to apply an RF current between the first electrode and the second electrode, and wherein the RF current between the first electrode and the second electrode is conducted into the fluid conduit through the first dielectric window and the second dielectric window, thereby being conducted through the blood in the fluid conduit to result in heating of the blood in the fluid conduit.

In some embodiments, the first electrode and the second electrode are positioned within the receptacle so as to be on a same side of the fluid conduit when the receptacle receives the disposable device.

In some embodiments, during the method the reusable device and the disposable device are maintained at an orientation such that the outlet of the fluid conduit is positioned above the inlet of the fluid conduit.

In some embodiments, the blood in the fluid conduit is heated to a normothermic human body temperature. In some embodiments, the blood in the fluid conduit is heated to the normothermic human body temperature with sufficient uniformity such that none of the blood is heated to a temperature above 42 degrees Celsius.

In some embodiments, the heating of the blood in the fluid conduit produces heated blood, and the method also includes supplying the heated blood to a patient.

In some embodiments, each of the first dielectric window and the second dielectric window includes a dielectric material positioned to separate the blood in the fluid conduit from respective ones of the first and second electrodes. In some embodiments, the dielectric material includes a dielectric polymer having a relative permittivity that is in a range of between 2 and 12. In some embodiments, the dielectric polymer includes a fluorinated ethylene propylene film.

In some embodiments, each of the first electrode and the second electrode includes a conductive material coated by an insulative coating.

In some embodiments, the RF current is impedance matched to an impedance of the blood. In some embodiments, the RF current is impedance matched to the impedance of the blood by a process including: performing an iterative process to initialize a heating system, wherein the iterative process includes: applying an RF current burst at a burst RF impedance between the first electrode and the second electrode, measuring an initialization process reflected power between the first electrode and the second electrode resulting from the RF current burst; if the initialization process reflected power is less than a predetermined threshold reflected power, concluding the iterative process and using the burst RF impedance as a heating RF impedance of the RF current; and if the initialization process reflected power is greater than the predetermined threshold reflective power, reducing adjusting the burst RF impedance and repeating the iterative process. In some embodiments, the blood is heated by a steady state heating process, wherein the steady state heating process includes: applying the RF current between the first electrode and the second electrode at the heating RF impedance and at a constant RF power for a duty cycle duration for each aliquot of blood; wherein the RF current between the first electrode and the second electrode is conducted into the fluid conduit through the first dielectric window and the second dielectric window, thereby being conducted through the blood in the fluid conduit to result in heating of the blood in the fluid conduit, and wherein the duty cycle duration is controlled based on the inlet temperature, the target temperature, the heating RF impedance, the constant RF power, a volumetric heat capacity of the blood, and a volume of the aliquot to thereby cause the blood to be at the target temperature when the blood passes through the outlet of the fluid conduit; measuring a steady state reflected power during heating of each aliquot of blood; if the steady state reflected power is less than the predetermined threshold reflected power, continuing the steady state heating process; and if the steady state reflected power is greater than the predetermined threshold reflected power, repeating the iterative process. In some embodiments, an RF burst inductance is varied to thereby vary the RF burst impedance. In some embodiments, the RF burst inductance is varied by varying an inductance of at least one variable inductor.

In some embodiments, a method includes performing an initial priming process, wherein the initial priming process includes: operating a pump to flow blood into a first chamber of a device; operating the pump to flow the blood from the first chamber of the device to a second chamber of the device; while the blood flows to the second chamber, maintaining the device at an orientation such that gas within the second chamber separates from the blood within the second chamber and flows out of the device until the first chamber and the second chamber contain an amount of the blood that is greater than a predetermined threshold level; operating the pump to cause the blood to flow out of the second chamber and to an outlet of the device; while the blood is flowed out of the second chamber to an outlet of the device, monitoring a level of blood in the first chamber and the second chamber; if the level of the blood in the first chamber or the level of the blood in the second chamber is less than a predetermined threshold level, performing steps of: ceasing flow of the blood to the outlet of the device, and performing a subsequent priming process.

In some embodiments, the method also includes heating the blood in a heating chamber to produce heated blood, wherein the blood that flows to the outlet of the device is the heated blood. In some embodiments, the heating chamber is upstream of the pump.

In some embodiments, the pump is a reciprocating pump that acts on a pumping chamber of the device to thereby induce pressure in the pumping chamber that causes the blood to flow within the device. In some embodiments, the blood flows through a pressure-activated valve between the second chamber and the outlet of the device. In some embodiments, the pressure induced by the pump activates the pressure-activated valve.

In some embodiments, a method includes coupling a disposable device to a reusable device, wherein the disposable device includes a pumping segment, wherein the pumping segment includes: a flexible tube comprising an inlet and an outlet, wherein the inlet and the outlet are located at a same end of the pumping segment, an inlet valve positioned at the inlet, and an outlet valve positioned at the outlet, and wherein the reusable device includes: a receptacle configured to receive the disposable device, and a plunger positioned within the receptacle so as to contact the flexible tube when the disposable device is received within the receptacle; supplying blood to the disposable device; activating the reusable device to pump the blood through the disposable device, wherein the activating causes the reusable device to cycle the plunger between: an intake position in which the blood is drawn into the flexible tube, and a delivery position, in which the blood is forced out of the flexible tube.

In some embodiments, the disposable device is oriented such that the inlet valve and the outlet valve are positioned at a top end of the pumping segment with respect to gravity.

In some embodiments, when the plunger is positioned in the intake position, the plunger does not compress the flexible tube, thereby inducing a reduced pressure that causes the blood to flow into the flexible tube. In some embodiments, when the reduced pressure is induced, the inlet valve is forced to an open position to allow the blood to flow into the flexible tube, and the outlet valve is forced to a closed position to prevent the blood from flowing out of the flexible tube.

In some embodiments, when the plunger is positioned in the delivery position, the plunger compresses the flexible tube, thereby inducing an increased pressure that causes the blood to flow out of the flexible tube. In some embodiments, when the increased pressure is induced, the inlet valve is forced to a closed position to prevent the blood from flowing into the flexible tube, and the outlet valve is forced to an open position to allow the blood to flow out of the flexible tube.

In some embodiments, a method includes: supplying blood to an inlet of a fluid conduit to result in the blood passing through the fluid conduit, wherein the fluid conduit includes: an inlet, an outlet, a first dielectric window into the fluid conduit at an upstream location that is proximate to the inlet, and a second dielectric window into the fluid conduit at a downstream location that is proximate to the outlet, and wherein the blood is supplied at an inlet temperature; activating a heating device to cause the heating device to heat the blood to a target temperature, wherein the activating causes the heating device to perform a heating process including: performing an iterative process to initialize a heating system, wherein the iterative process includes: applying an RF current burst at a burst RF impedance between a first electrode and a second electrode, wherein the first electrode is aligned with the first dielectric window, and wherein the second electrode is aligned with the second dielectric window, measuring an initialization process reflected power between the first electrode and the second electrode resulting from the RF current burst; if the initialization process reflected power is less than a predetermined threshold reflected power, concluding the iterative process and using the burst RF impedance as a heating RF impedance; and if the initialization process reflected power is greater than the predetermined threshold reflective power, reducing adjusting the burst RF impedance and repeating the iterative process.

In some embodiments, the heating process also includes performing a steady state heating process, wherein the steady state heating process includes: applying an RF current between the first electrode and the second electrode at the heating RF impedance and at a constant RF power for a duty cycle duration for each aliquot of blood; wherein the RF current between the first electrode and the second electrode is conducted into the fluid conduit through the first dielectric window and the second dielectric window, thereby being conducted through the blood in the fluid conduit to result in heating of the blood in the fluid conduit, and wherein the duty cycle duration is controlled based on the inlet temperature, the target temperature, the heating RF impedance, the constant RF power, a volumetric heat capacity of the blood, and a volume of the aliquot to thereby cause the blood to be at the target temperature when the blood passes through the outlet of the fluid conduit; measuring a steady state reflected power during heating of each aliquot of blood; if the steady state reflected power is less than the predetermined threshold reflected power, continuing the steady state heating process; and if the steady state reflected power is greater than the predetermined threshold reflected power, repeating the iterative process. In some embodiments, the target temperature is a normothermic human body temperature. In some embodiments, the steady state heating process results in the blood being uniformly heated to a temperature that is within 4 degrees Celsius of the normothermic human body temperature.

In some embodiments, an RF burst inductance is varied to thereby vary the RF burst impedance. In some embodiments, the RF burst inductance is varied by varying an inductance of at least one variable inductor.

Some exemplary embodiments have been described herein with specific reference to devices and methods for heating blood. In other embodiments, the devices and methods described herein are equally applicable to heating any other conductive medical fluid, such as saline, dialysis fluid, etc.

With respect to the above description, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. Ranges described herein are inclusive, i.e., a range of 5 to 10 includes 5, 10, and all values therebetween.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
    coupling a disposable device to a reusable device,
        wherein the disposable device comprises:
            a heating segment, wherein the heating segment comprises:
            a fluid conduit comprising an inlet and an outlet,
            a first dielectric window into the fluid conduit at an upstream location that is proximate to the inlet, and
            a second dielectric window into the fluid conduit at a downstream location that is proximate to the outlet,
        wherein the reusable device comprises:
            a receptacle configured to receive the disposable device,
            a first electrode positioned within the receptacle, and
            a second electrode positioned within the receptacle,
            wherein the first electrode and the second electrode are spaced apart from one another to align the first electrode with the first dielectric window and to align the second electrode with the second dielectric window when the disposable device is received within the receptacle;
    supplying blood to the inlet of the fluid conduit to result in the blood passing through the fluid conduit; and
    activating the reusable device,
        wherein the activating causes the reusable device to apply an RF current between the first electrode and the second electrode, and
        wherein the RF current between the first electrode and the second electrode is conducted into the fluid conduit through the first dielectric window and the second dielectric window, thereby being conducted through the blood in the fluid conduit to result in heating of the blood in the fluid conduit.

2. The method of claim 1, wherein the first electrode and the second electrode are positioned within the receptacle so as to be on a same side of the fluid conduit when the receptacle receives the disposable device.

3. The method of claim 1, wherein during the method the reusable device and the disposable device are maintained at an orientation such that the outlet of the fluid conduit is positioned above the inlet of the fluid conduit.

4. The method of claim 1, wherein the blood in the fluid conduit is heated to a normothermic human body temperature.

5. The method of claim 4, wherein the blood in the fluid conduit is heated to the normothermic human body temperature with sufficient uniformity such that none of the blood is heated to a temperature above 42 degrees Celsius.

6. The method of claim 1, wherein the heating of the blood in the fluid conduit produces heated blood, and wherein the method further comprises supplying the heated blood to a patient.

7. The method of claim 1, wherein the first dielectric window and the second dielectric window comprise a dielectric material positioned to separate the blood in the fluid conduit from respective ones of the first and second electrodes.

8. The method of claim 7, wherein the dielectric material comprises a dielectric polymer having a relative permittivity that is in a range of between 2 and 12.

9. The method of claim 8, wherein the dielectric polymer comprises a fluorinated ethylene propylene film.

10. The method of claim 1, wherein each of the first electrode and the second electrode comprises a conductive material coated by an insulative coating.

11. The method of claim 1, wherein the RF current is impedance matched to an impedance of the blood.

12. The method of claim 11, wherein the RF current is impedance matched to the impedance of the blood by a process comprising:
    performing an iterative process to initialize a heating system, wherein the iterative process comprises:
        applying an RF current burst at a burst RF impedance between the first electrode and the second electrode,
        measuring an initialization process reflected power between the first electrode and the second electrode resulting from the RF current burst;
        if the initialization process reflected power is less than a predetermined threshold reflected power, concluding the iterative process and using the burst RF impedance as a heating RF impedance of the RF current; and
        if the initialization process reflected power is greater than the predetermined threshold reflective power, reducing adjusting the burst RF impedance and repeating the iterative process.

13. The method of claim 12,
    wherein the blood is heated by a steady state heating process, wherein the steady state heating process comprises:
        applying the RF current between the first electrode and the second electrode at the heating RF impedance and at a constant RF power for a duty cycle duration for each aliquot of blood;
            wherein the RF current between the first electrode and the second electrode is conducted into the fluid conduit through the first dielectric window and the second dielectric window, thereby being conducted through the blood in the fluid conduit to result in heating of the blood in the fluid conduit, and wherein the duty cycle duration is controlled based on an inlet temperature, a target temperature, the heating RF impedance, the constant RF power, a volumetric heat capacity of the blood, and a volume of the aliquot to thereby cause the blood to be at the target temperature when the blood passes through the outlet of the fluid conduit;
        measuring a steady state reflected power during heating of each aliquot of blood;
        if the steady state reflected power is less than the predetermined threshold reflected power, continuing the steady state heating process; and
        if the steady state reflected power is greater than the predetermined threshold reflected power, repeating the iterative process.

14. The method of claim 12, wherein an RF burst inductance is varied to thereby vary the RF burst impedance.

15. The method of claim 14, wherein the RF burst inductance is varied by varying an inductance of at least one variable inductor.

* * * * *